(12) United States Patent
Konda

(10) Patent No.: US 12,015,566 B1
(45) Date of Patent: *Jun. 18, 2024

(54) FAST SCHEDULING AND OPTIMIZATION OF MULTI-STAGE HIERARCHICAL NETWORKS

(71) Applicant: Venkat Konda, San Jose, CA (US)

(72) Inventor: Venkat Konda, San Jose, CA (US)

(73) Assignee: Konda Technologies Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/878,090

(22) Filed: Aug. 1, 2022

Related U.S. Application Data

(63) Continuation of application No. 17/167,089, filed on Feb. 4, 2021, now Pat. No. 11,405,332, which is a
(Continued)

(51) Int. Cl.
| | |
|---|---|
| *H04L 12/933* | (2013.01) |
| *H04L 49/102* | (2022.01) |
| *H04L 49/1515* | (2022.01) |

(52) U.S. Cl.
CPC ........ *H04L 49/1515* (2013.01); *H04L 49/102* (2013.01)

(58) Field of Classification Search
CPC ... H04L 49/1515; H04L 49/102; H04L 49/15; H04L 49/101; H04L 49/1507; H04L 49/10; H04L 49/109; H04L 12/50
See application file for complete search history.

(56) References Cited

U.S. PATENT DOCUMENTS

| | | |
|---|---|---|
| 5,153,843 A | 10/1992 | Batcher |
| 5,451,936 A | 9/1995 | Yang et al. |

(Continued)

FOREIGN PATENT DOCUMENTS

| | | |
|---|---|---|
| WO | WO 2008/109756 A1 | 12/2008 |
| WO | WO 2008/147926 A1 | 12/2008 |

(Continued)

OTHER PUBLICATIONS

A. DeHon, "Unifying Mesh- and Tree-Based Programmable Interconnect," IEEE Trans. on Very Large Scale Int. Systems, vol. 12, No. 10, pp. 1051-1065, Oct. 2004.
(Continued)

*Primary Examiner* — Rasheed Gidado

(57) ABSTRACT

Significantly optimized multi-stage networks including scheduling methods for faster scheduling of connections, useful in wide target applications, with VLSI layouts using only horizontal wires and vertical wires to route large scale partial multi-stage hierarchical networks having inlet and outlet links, and laid out in an integrated circuit device in a two-dimensional grid arrangement of blocks are disclosed. The optimized multi-stage networks in each block employ one or more slices of rings of stages of switches with inlet and outlet links of partial multi-stage hierarchical networks connecting to rings from either left-hand side or right-hand side; and employ hop wires or multi-drop hop wires wherein hop wires or multi-drop wires are connected from switches of stages of rings of slices of a first partial multi-stage hierarchical network to switches of stages of rings of slices of the first or a second partial multi-stage hierarchical network.

20 Claims, 30 Drawing Sheets

Related U.S. Application Data continuation of application No. 16/562,450, filed on Sep. 6, 2019, now Pat. No. 10,992,597, which is a continuation of application No. 15/884,911, filed on Jan. 31, 2018, now Pat. No. 10,412,025, which is a continuation of application No. 15/331,855, filed on Oct. 22, 2016, now Pat. No. 9,929,977, which is a continuation of application No. 14/329,876, filed on Jul. 11, 2014, now Pat. No. 9,509,634, which is a continuation-in-part of application No. 14/199,168, filed on Mar. 6, 2014, now Pat. No. 9,374,322, which is a continuation of application No. PCT/US2012/053814, filed on Sep. 6, 2012.

(60) Provisional application No. 61/846,083, filed on Jul. 15, 2013, provisional application No. 61/531,615, filed on Sep. 7, 2011.

(56) References Cited

U.S. PATENT DOCUMENTS

| | | | |
|---|---|---|---|
| 6,018,523 A | 1/2000 | Even | |
| 6,185,220 B1 | 2/2001 | Muthukrishnan et al. | |
| 6,215,786 B1 * | 4/2001 | Larson | H04L 49/45 370/386 |
| 6,504,841 B1 * | 1/2003 | Larson | H04L 49/309 370/386 |
| 6,940,308 B2 | 9/2005 | Wong | |
| 7,167,481 B2 * | 1/2007 | Steele | H04L 49/256 370/428 |
| 7,397,796 B1 * | 7/2008 | Smiljani | H04L 49/1515 370/335 |
| 8,170,040 B2 | 5/2012 | Konda | |
| 8,265,070 B2 * | 9/2012 | Khanduri | H04Q 3/68 370/387 |
| 8,269,523 B2 | 9/2012 | Konda | |
| 8,270,400 B2 | 9/2012 | Konda | |
| 8,363,649 B2 | 1/2013 | Konda | |
| 8,804,710 B2 * | 8/2014 | Aybay | H04L 49/00 370/386 |
| 8,898,611 B2 | 11/2014 | Konda | |
| 9,529,958 B2 | 12/2016 | Konda | |

FOREIGN PATENT DOCUMENTS

| | | |
|---|---|---|
| WO | WO 2008/147927 A1 | 12/2008 |
| WO | WO 2008/147928 A1 | 12/2008 |
| WO | WO 2011/047368 A2 | 4/2011 |
| WO | WO 2013/036544 A1 | 3/2013 |

OTHER PUBLICATIONS

Guy Lemieux and David Lewis. Analtyical framework for switch block design. In Intl. Conference on Field Programmable Logic and Applications, pp. 122-131, Sep. 2002.

Chen, G; Lau, FCM, "A tight layout of the cube-connected cycles", The 4th International Conference on High Perf. Computing, Bangalore, India, Dec. 18-21, 1997, p. 422-427.

Michael Shyu, Yu-Dong Chang, Guang-Ming Wu, and Yao-Wen Chang, Generic universal switch blocks. IEEE Transactions on Computers,49(4):348-359, Apr. 2000.

Y. Yamada, et al., "Folded Fat H-Tree: an interconnection topology for Dynamically Reconfigurable Processor Array", Embed and Ubiq. Cmpting, Intl Conf. EUC 2004.

V. P. Roychdowdhury et al., "Segmented Channel Routing," IEEE Trans on Computer-Aided Design of Integrated Circuits and Systems, vol. 12, No. 1, pp. 79-95, Jan. 1993.

André DeHon. Compact, Multilayer Layout for Butterfly Fat-Tree. In Twelfth Annual ACM Symposium on Parallel Algs and Architectures (SPAA 2000), pp. 206-215, Jul. 9-12, 2000.

Guy Lemieux et.al., Generating highlyroutablesparse crossbars for PLDs. In ACMlSIGDA Int'l. Symposium on Field Programmable Gate Arrays, pp. 155-164, Monterey, CA, Feb. 2000.

S. Sivaswamy et al., "HARP: hard-wired routing pattern FPGAs", FPGA'05, Monterey, California, USA, Feb. 20-22, 2005.

Yeh, C.-H., E.A. Varvarigos, and B. Parhami, "Efficient VLSI layouts of hypercubic networks," Proc. Symp. Frontiers of Massively Parallel Computation, Feb. 1999.

C. Clos, "A Study of Non-Blocking Switching Networks," Bell System Technical Journal, 32:406-424, 1953.

A. DeHon, "Balancing Interconnect and Computation in a Reconfigurable Computing Array," ACM Int. Symp. on FPGA, pp. 69-78, Feb. 1999.

Chihming Chang, Rami Melhem, "Arbitrary Size Benes Networks", Journal: Parallel Processing Letters—PPL , vol. 7, No. 3, pp. 279-284, 1997.

Hoda El-Sayed and Abdou Youssef; "The r-truncated Benes Networks and their Randomized Routing Algorithms"1997 Intl Conf on Parallel and Dist Sys, Seoul, Korea, Dec. 1997.

Guy Lemieux and David Lewis, "Using Sparse Crossbars within LUT Clusters", Procds of the ACM/SIGDA Intl Symp on Field Prog Gate Arrays 2001, Feb. 11-13, 2001, Monterey, CA.

P. Manuel, W. K. Qureshi, A. William, A. Muthumalai, "VLSI layout of Benes networks,", J. of Discrete Math. Sci. & Cryptography, vol. 10, No. 4, pp. 461-472, 2007.

Quinn, Michael J, "Parallel Computing: Theory and Practice", 2nd. ed., 1994, McGraw Hill Series in computer Science, Networks, and parallel computing, ISBN 0-07-051294-9.

Ronald I. Greenberg, "The Fat-Pyramid and Universal Parallel Computation Independent of wire delay" IEEE Trans. Computers, 43(12):1358-1364, Dec. 1994.

Hypertree: A Multiprocessor Interconnection Topology , by James R. Goodman and Carlo H Sequin, Computer Science Technical Report #427, Dept , of EECS, University of California.

Data Movement Techniques for the pyramid computer, Russ Miller and Quentin F. Stout, SIAM Journal on Computing, vol. 16, No. 1, pp. 38-60, Feb. 1987.

Ivo Dobbelaere, Mark Horowitz, and Abbas El Gamal. Regenerative feedback repeaters for programmable interconnections. IEEE Journal of Solid-State Circuits, 30(11), 1995.

F. Petrini et al., k-ary n-trees: High performance networks for massively parallel architectures, in: Proceedings of the 11th Intl Parallel Proc. Symp. , IPPS'97, pp. 87-93.

P.Pande et al. "Evaluation of MP-SoC Interconnect Architectures: a Case Study", Proceedings of 4th IWSOC, Banff, Alberta, Canada, Jul. 19-21, 2004.

Yeh, C.-H., Varvarigos, E.A., Parhami, B.: Multilayer VLSI layout for interconnection networks. In: Proc. Intl. Conf. on Parallel Processing, 2000.

M. Lin, A. El Gamal, "A Low-Power Field-Programmable Gate Array Routing Fabric," IEEE Transactions on Very Large Scale Integration, vol. 17, No. 10, pp. 1481-1494, Oct. 2009.

Avior, A et al., A Tight Layout of the Butterfly Network. Proc. 8-th Annual ACM Symp. on Parallel Alg. and Arch. (SPAA '96), ACM Press Ed., 1996, pp. 170-175.

A. El Gamal et al., "An Architecture for Electrically Configurable Gate Arrays," IEEE Jrnl of Solid-State Circuits, vol. 24, No. 2, pp. 394-398, Apr. 1989.

Vaughn Betz et al., Directional bias and non-uniformity in FPGA global routing architectures. In IEEE/ACM Intl. Conference on Computer-Aided Design, pp. 652-659, san jose, 96.

André DeHon. Rent's Rule Based Switching Requirements. In System-Level Interconnect Prediction (SLIP 2001), pp. 197-204, Mar. 31-Apr. 1, 2001.

\* cited by examiner

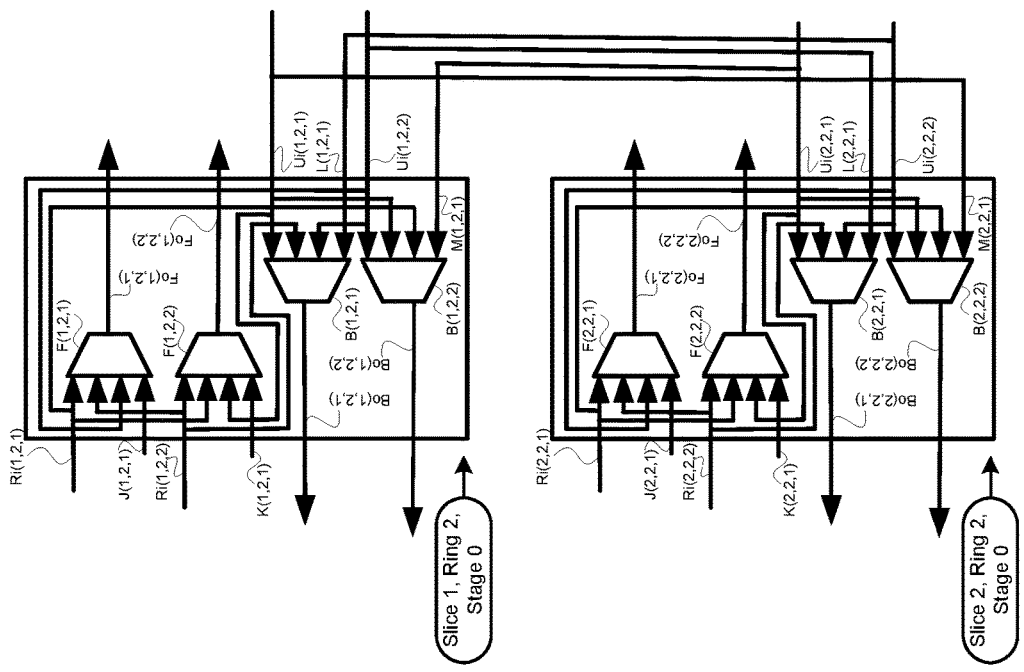
FIG. 1C2
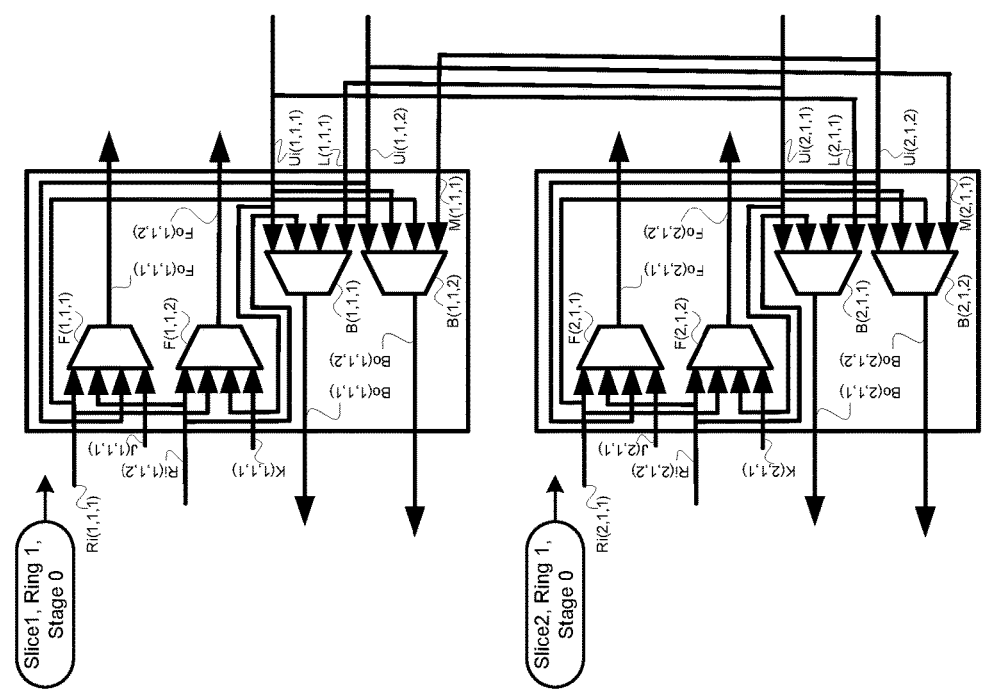
FIG. 1C1

FIG. 1C4
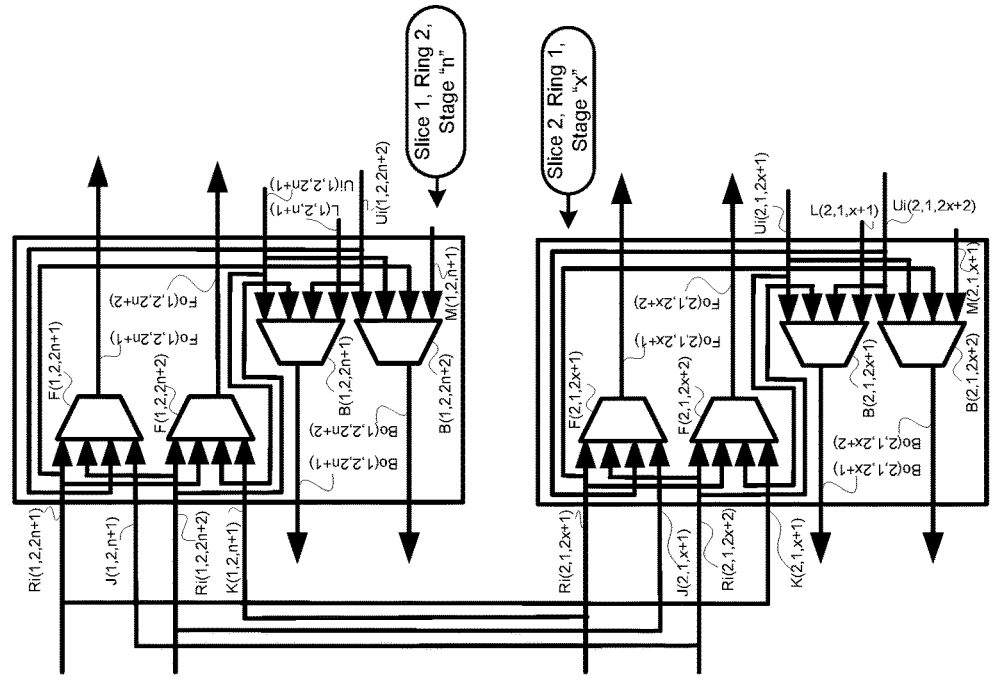
FIG. 1C3
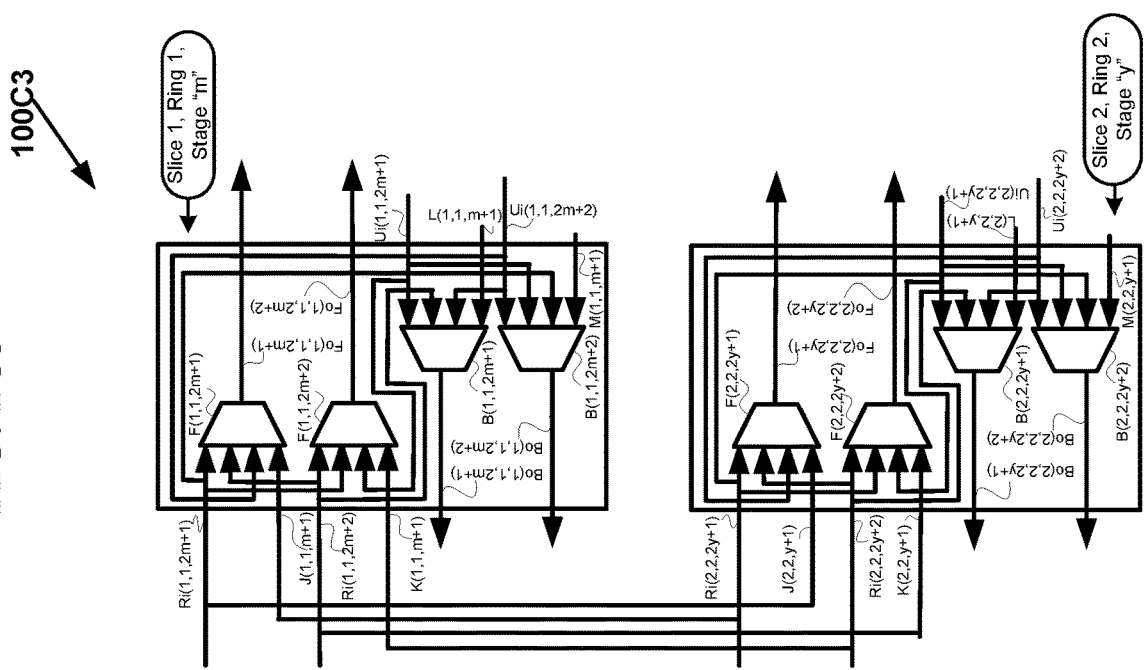

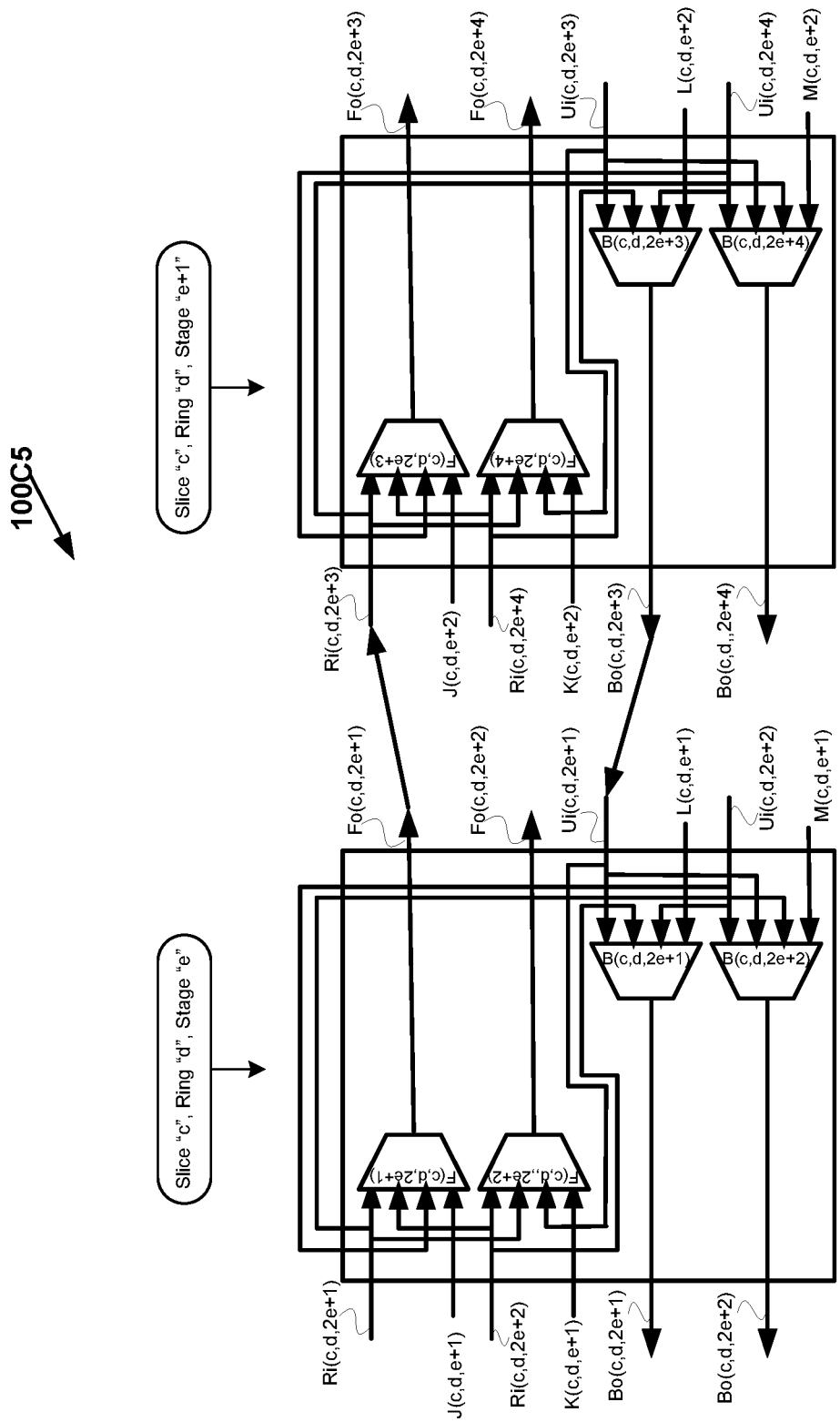
FIG. 1C5

FIG. 8

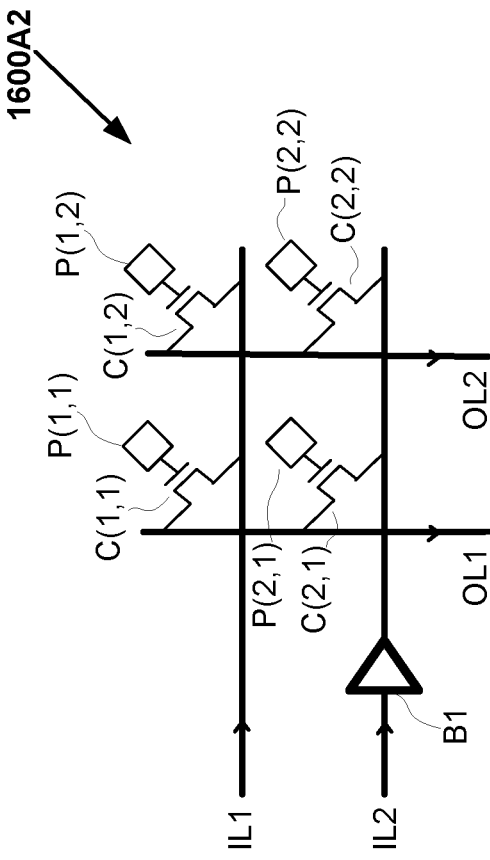
FIG. 16A2 (Prior Art)
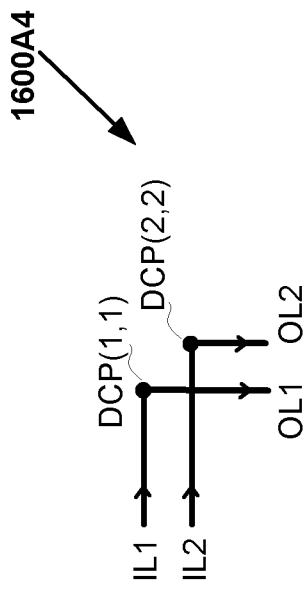
FIG. 16A4 (Prior Art)
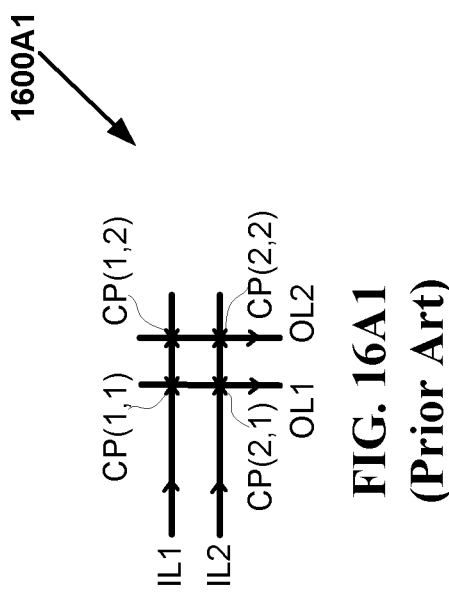
FIG. 16A1 (Prior Art)
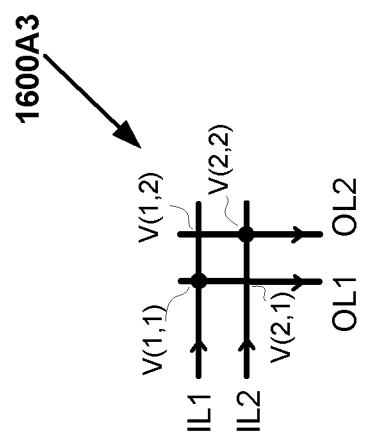
FIG. 16A3 (Prior Art)

FAST SCHEDULING AND OPTIMIZATION OF MULTI-STAGE HIERARCHICAL NETWORKS

CROSS REFERENCE TO RELATED APPLICATIONS

This application is Continuation Applications and claims priority to U.S. application Ser. No. 17/167,089 entitled "FAST SCHEDULING AND OPTIMIZATION OF MULTI-STAGE HIERARCHICAL NETWORKS" by Venkat Konda assigned to the same assignee as the current application, filed Feb. 4, 2021, which is Continuation Application and claims priority to U.S. application Ser. No. 16/562,450 entitled "FAST SCHEDULING AND OPTIMIZATION OF MULTI-STAGE HIERARCHICAL NETWORKS" by Venkat Konda assigned to the same assignee as the current application, filed Sep. 6, 2019, which is Continuation Application and claims priority to U.S. application Ser. No. 15/884,911 entitled "FAST SCHEDULING AND OPTIMIZATION OF MULTI-STAGE HIERARCHICAL NETWORKS" by Venkat Konda assigned to the same assignee as the current application, filed Jan. 31, 2018, which is Continuation Application and claims priority to U.S. application Ser. No. 15/331,855 entitled "FAST SCHEDULING AND OPTIMIZATION OF MULTI-STAGE HIERARCHICAL NETWORKS" by Venkat Konda assigned to the same assignee as the current application, filed Oct. 22, 2016, issued as U.S. Pat. No. 9,929,977 on Mar. 27, 2018, which is Continuation Application and claims priority to U.S. application Ser. No. 14/329,876 entitled "FAST SCHEDULING AND OPTIMIZATION OF MULTI-STAGE HIERARCHICAL NETWORKS" by Venkat Konda assigned to the same assignee as the current application, filed Jul. 11, 2014, issued as U.S. Pat. No. 9,509,634 on Nov. 29, 2016, which claims priority to U.S. Provisional Patent Application Ser. No. 61/846,083 entitled "FAST SCHEDULING AND OPTIMIZATION OF MULTI-STAGE HIERARCHICAL NETWORKS" by Venkat Konda assigned to the same assignee as the current application, filed Jul. 15, 2013, and also Continuation-in-Part Application and claims priority to US Application Serial No. U.S. Ser. No. 14/199,168 entitled "OPTIMIZATION OF MULTI-STAGE HIERARCHICAL NETWORKS FOR PRACTICAL ROUTING APPLICATIONS" by Venkat Konda assigned to the same assignee as the current application, filed Mar. 6, 2014, issued as U.S. Pat. No. 9,374,322 on Jun. 21, 2016, which in turn is bypass continuation application and claims priority to PCT Application Serial No. PCT/US12/53814 entitled "OPTIMIZATION OF MULTI-STAGE HIERARCHICAL NETWORKS FOR PRACTICAL ROUTING APPLICATIONS" by Venkat Konda assigned to the same assignee as the current application, filed Sep. 6, 2012, which is Continuation-in-Part application and claims priority to U.S. Provisional Patent Application Ser. No. 61/531,615 entitled "OPTIMIZATION OF MULTI-STAGE HIERARCHICAL NETWORKS FOR PRACTICAL ROUTING APPLICATIONS" by Venkat Konda assigned to the same assignee as the current application, filed Sep. 7, 2011.

This application is related to and incorporates by reference in its entirety the U.S. Pat. No. 8,270,400 entitled "FULLY CONNECTED GENERALIZED MULTI-STAGE NETWORKS" by Venkat Konda assigned to the same assignee as the current application, issued Sep. 18, 2012, which claims priority to PCT Application Serial No. PCT/US08/56064 entitled "FULLY CONNECTED GENERALIZED MULTI-STAGE NETWORKS" by Venkat Konda assigned to the same assignee as the current application, filed Mar. 6, 2008, which claims priority to U.S. Provisional Patent Application Ser. No. 60/905,526 entitled "LARGE SCALE CROSSPOINT REDUCTION WITH NON-BLOCKING UNICAST & MULTICAST IN ARBITRARILY LARGE MULTI-STAGE NETWORKS" by Venkat Konda assigned to the same assignee as the current application, filed Mar. 6, 2007, and U.S. Provisional Patent Application Ser. No. 60/940,383 entitled "FULLY CONNECTED GENERALIZED MULTI-STAGE NETWORKS" by Venkat Konda assigned to the same assignee as the current application, filed May 25, 2007.

This application is related to and incorporates by reference in its entirety U.S. Pat. No. 8,170,040 entitled "FULLY CONNECTED GENERALIZED BUTTERFLY FAT TREE NETWORKS" by Venkat Konda assigned to the same assignee as the current application, issued May 1, 2012, which claims priority to PCT Application Serial No. PCT/US08/64603 entitled "FULLY CONNECTED GENERALIZED BUTTERFLY FAT TREE NETWORKS" by Venkat Konda assigned to the same assignee as the current application, filed May 22, 2008, which claims priority to U.S. Provisional Patent Application Ser. No. 60/940,387 entitled "FULLY CONNECTED GENERALIZED BUTTERFLY FAT TREE NETWORKS" by Venkat Konda assigned to the same assignee as the current application, filed May 25, 2007, and U.S. Provisional Patent Application Ser. No. 60/940,390 entitled "FULLY CONNECTED GENERALIZED MULTI-LINK BUTTERFLY FAT TREE NETWORKS" by Venkat Konda assigned to the same assignee as the current application, filed May 25, 2007

This application is related to and incorporates by reference in its entirety U.S. Pat. No. 8,363,649 entitled "FULLY CONNECTED GENERALIZED MULTI-LINK MULTI-STAGE NETWORKS" by Venkat Konda assigned to the same assignee as the current application, issued Jan. 29, 2013, which claims priority to PCT Application Serial No. PCT/US08/64604 entitled "FULLY CONNECTED GENERALIZED MULTI-LINK MULTI-STAGE NETWORKS" by Venkat Konda assigned to the same assignee as the current application, filed May 22, 2008, which claims priority to U.S. Provisional Patent Application Ser. No. 60/940,389 entitled "FULLY CONNECTED GENERALIZED REARRANGEABLY NONBLOCKING MULTI-LINK MULTI-STAGE NETWORKS" by Venkat Konda assigned to the same assignee as the current application, filed May 25, 2007, U.S. Provisional Patent Application Ser. No. 60/940,391 entitled "FULLY CONNECTED GENERALIZED FOLDED MULTI-STAGE NETWORKS" by Venkat Konda assigned to the same assignee as the current application, filed May 25, 2007 and U.S. Provisional Patent Application Ser. No. 60/940,392 entitled "FULLY CONNECTED GENERALIZED STRICTLY NONBLOCKING MULTI-LINK MULTI-STAGE NETWORKS" by Venkat Konda assigned to the same assignee as the current application, filed May 25, 2007.

This application is related to and incorporates by reference in its entirety U.S. Pat. No. 8,269,523 entitled "VLSI LAYOUTS OF FULLY CONNECTED GENERALIZED NETWORKS" by Venkat Konda assigned to the same assignee as the current application, issued Sep. 18, 2012, which claims priority to PCT Application Ser. No. PCT/U08/64605 entitled "VLSI LAYOUTS OF FULLY CONNECTED GENERALIZED NETWORKS" by Venkat Konda assigned to the same assignee as the current application, filed May 22, 2008, which claims priority to U.S.

Provisional Patent Application Ser. No. 60/940,394 entitled "VLSI LAYOUTS OF FULLY CONNECTED GENERALIZED NETWORKS" by Venkat Konda assigned to the same assignee as the current application, filed May 25, 2007.

This application is related to and incorporates by reference in its entirety U.S. Pat. No. 8,898,611 entitled "VLSI LAYOUTS OF FULLY CONNECTED GENERALIZED AND PYRAMID NETWORKS WITH LOCALITY EXPLOITATION" by Venkat Konda assigned to the same assignee as the current application, issued Nov. 25, 2014, which claims priority to PCT Application Serial No. PCT/US10/52984 entitled "VLSI LAYOUTS OF FULLY CONNECTED GENERALIZED AND PYRAMID NETWORKS WITH LOCALITY EXPLOITATION" by Venkat Konda assigned to the same assignee as the current application, filed Oct. 16, 2010, which claims priority to U.S. Provisional Patent Application Ser. No. 61/252,603 entitled "VLSI LAYOUTS OF FULLY CONNECTED NETWORKS WITH LOCALITY EXPLOITATION" by Venkat Konda assigned to the same assignee as the current application, filed Oct. 16, 2009, and U.S. Provisional Patent Application Ser. No. 61/252,609 entitled "VLSI LAYOUTS OF FULLY CONNECTED GENERALIZED AND PYRAMID NETWORKS" by Venkat Konda assigned to the same assignee as the current application, filed Oct. 16, 2009.

BACKGROUND OF INVENTION

Multi-stage interconnection networks such as Benes networks and butterfly fat tree networks are widely useful in telecommunications, parallel and distributed computing. However VLSI layouts, known in the prior art, of these interconnection networks in an integrated circuit are inefficient and complicated.

Other multi-stage interconnection networks including butterfly fat tree networks, Banyan networks, Batcher-Banyan networks, Baseline networks, Delta networks, Omega networks and Flip networks have been widely studied particularly for self-routing packet switching applications. Also Benes Networks with radix of two have been widely studied and it is known that Benes Networks of radix two are shown to be built with back to back baseline networks which are rearrangeably nonblocking for unicast connections.

The most commonly used VLSI layout in an integrated circuit is based on a two-dimensional grid model comprising only horizontal and vertical tracks. An intuitive interconnection network that utilizes two-dimensional grid model is 2D Mesh Network and its variations such as segmented mesh networks. Hence routing networks used in VLSI layouts are typically 2D mesh networks and its variations. However Mesh Networks require large scale cross points typically with a growth rate of $O(N^2)$ where N is the number of computing elements, ports, or logic elements depending on the application.

Multi-stage interconnection network with a growth rate of $O(N \times \log N)$ requires significantly small number of cross points. U.S. Pat. No. 6,185,220 entitled "Grid Layouts of Switching and Sorting Networks" granted to Muthukrishnan et al. describes a VLSI layout using existing VLSI grid model for Benes and Butterfly networks. U.S. Pat. No. 6,940,308 entitled "Interconnection Network for a Field Programmable Gate Array" granted to Wong describes a VLSI layout where switches belonging to lower stage of Benes Network are laid out close to the logic cells and switches belonging to higher stages are laid out towards the center of the layout.

Due to the inefficient and in some cases impractical VLSI layout of Benes and butterfly fat tree networks on a semiconductor chip, today mesh networks and segmented mesh networks are widely used in the practical applications such as field programmable gate arrays (FPGAs), programmable logic devices (PLDs), and parallel computing interconnects. The prior art VLSI layouts of Benes and butterfly fat tree networks and VLSI layouts of mesh networks and segmented mesh networks require large area to implement the switches on the chip, large number of wires, longer wires, with increased power consumption, increased latency of the signals which effect the maximum clock speed of operation. Some networks may not even be implemented practically on a chip due to the lack of efficient layouts.

Fully connected Benes and butterfly fat tree networks are an over kill for certain practical routing applications and need to be optimized to significantly improve area, power and performance of the routing network.

SUMMARY OF INVENTION

Significantly optimized multi-stage networks for faster scheduling of connections, useful in wide target applications, with VLSI layouts (or floor plans) using only horizontal wires and vertical wires to route large scale partial multi-stage hierarchical networks having inlet and outlet links, and laid out in an integrated circuit device in a two-dimensional grid arrangement of blocks, (for example in an FPGA where the partial multi-stage hierarchical networks to route Lookup Tables, or memory blocks, or DSP blocks) are disclosed. The optimized multi-stage networks in each block employ one or more slices of rings of stages of switches with inlet and outlet links of partial multi-stage hierarchical networks connecting to rings from either left-hand side or right-hand side.

The optimized multi-stage networks employ hop wires or multi-drop hop wires wherein hop wires or multi-drop wires are connected from switches of stages of rings of slices of a first partial multi-stage hierarchical network to switches of stages of rings of slices of a second partial multi-stage hierarchical network or switches of stages of rings of slices of the first partial multi-stage hierarchical network so that said hop wires or multi-drop hop wires are either vertical wires or horizontal wires.

The VLSI layouts exploit spatial locality so that partial multi-stage hierarchical networks that are spatially nearer are connected with shorter hop wires compared to the hop wires between spatially farther partial multi-stage hierarchical networks. The optimized multi-stage networks provide high routability for broadcast, unicast and multicast connections, yet with the benefits of significantly lower cross points hence smaller area, lower signal latency, lower power and with significant fast compilation or routing time. Various scheduling methods are also disclosed to schedule a set of multicast connections in the multi-stage hierarchical network.

The optimized multi-stage networks $V_{Comb}(N_1, N_2, d, s)$ & $V_{D\text{-}Comb}(N_1, N_2, d, s)$ according to the current invention inherit the properties of one or more generalized multi-stage and pyramid networks $V(N_1, N_2, d, s)$ & $V_P(N_1, N_2, d, s)$, generalized folded multi-stage and pyramid networks $V_{fold}(N_1, N_2, d, s)$ & $V_{fold\text{-}p}(N_1, N_2, d, s)$, generalized butterfly fat tree and butterfly fat pyramid networks $V_b (N_1, N_2, d, s)$ & $V_{bfp}(N_1, N_2, d, s)$, generalized multi-link multi-stage and pyramid networks $V_{mlink}(N_1, N_2, d, s)$ & $V_{mlink\text{-}p}(N_1, N_2, d, s)$, generalized folded multi-link multi-stage and pyramid networks $V_{fold\text{-}mlink}(N_1, N_2, d, s)$ & $V_{fold\text{-}mlink\text{-}p}(N_1, N_2, d, s)$, generalized multi-link butterfly fat tree and butterfly fat pyramid networks $V_{mlink-bft}(N_1, N_2, d, s)$ & $V_{Mlink-bfp}(NI, N_2, d, s)$, generalized hypercube networks $V_{hcube}(NI, N_2, d, s)$, and generalized cube connected cycles networks $V_{CCC}(N_1, N_2, d, s)$ for s=1,2,3 or any number in general.

BRIEF DESCRIPTION OF DRAWINGS

FIG. 1C1 is a diagram 100C1, FIG. 1C2 is a diagram 100C2, FIG. 1C3 is a diagram 100C3, and FIG. 1C4 is a diagram 100C4 illustrate the specific details of the diagram 100C of FIG. 1C, particularly the connections between different slices.

FIG. 1C5 is a diagram 100C5 illustrate the specific details of the diagram 100C of FIG. 1C, particularly the internal connections between two successive stages of any ring of any slice, in one embodiment.

FIG. 8 is a diagram 800, is an embodiment of 2D-grid of blocks with each block corresponding to a partial multi-stage network to implement an exemplary multi-stage hierarchical network, in accordance with the invention.

FIG. 16A1 is a diagram 1600A1 of an exemplary prior art implementation of a two by two switch; FIG. 16A2 is a diagram 1600A2 for programmable integrated circuit prior art implementation of the diagram 1600A1 of FIG. 16A1; FIG. 16A3 is a diagram 1600A3 for one-time programmable integrated circuit prior art implementation of the diagram 1600A1 of FIG. 16A1; FIG. 16A4 is a diagram 1600A4 for integrated circuit placement and route implementation of the diagram 1600A1 of FIG. 16A1.

DETAILED DESCRIPTION OF THE INVENTION

Figure 1A:
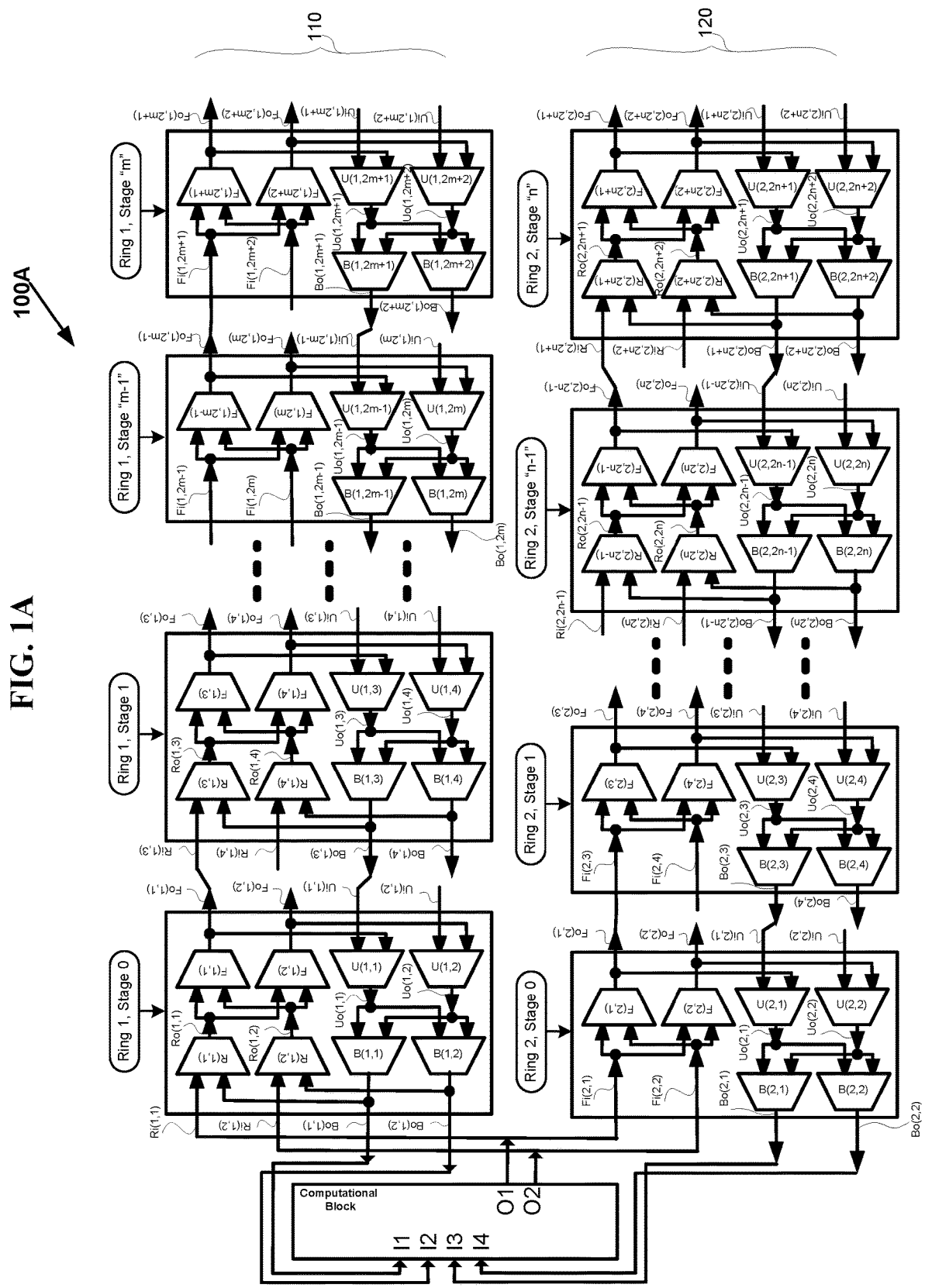
FIG. 1A is a diagram 100A of an exemplary partial multi-stage hierarchical network corresponding to one block with 4 inputs and 2 outputs of a computational block (hereinafter alternatively referred to as "programmable logic block") connecting only from left-hand side, to route practical applications such as FPGA routing of hardware designs in accordance with the invention.

Fully connected multi-stage hierarchical networks are an over kill in every dimension such as area, power, and performance for certain practical routing applications and need to be optimized to significantly improve savings in area, power and performance of the routing network. The present invention discloses several embodiments of the optimized multi-stage hierarchical networks for practical routing applications along with their VLSI layout (floor plan) feasibility and simplicity.

The multi-stage hierarchical networks considered for optimization in the current invention include: generalized multi-stage networks $V(N_1, N_2, d, s)$, generalized folded multi-stage networks $V_{fold}(N_1, N_2, d, s)$, generalized butterfly fat tree networks $V_{bft}(N_1, N_2, d, s)$, generalized multi-link multi-stage networks $V_{mlink}(N_1, N_2, d, s)$, generalized folded multi-link multi-stage networks $V_{fold-mlink}(N_1, N_2, d, s)$, generalized multi-link butterfly fat tree networks $V_{mlink-bft}(N_1, N_2, d, s)$, generalized hypercube networks $V_{hcube}(N_1, N_2, d, s)$, and generalized cube connected cycles networks $V_{CCC}(N_1, N_2, d, s)$ for s=1,2,3 or any number in general. Alternatively the optimized multi-stage hierarchical networks disclosed in this invention inherit the properties of one or more of these networks, in addition to additional properties that may not be exhibited these networks.

The optimized multi-stage hierarchical networks disclosed are applicable for practical routing applications, with several goals such as: 1) all the signals in the design starting from an inlet link of the network to an outlet link of the network need to be setup without blocking. These signals may consist of broadcast, unicast and multicast connections; Each routing resource may need to be used by only one signal or connection; 2) physical area consumed by the routing network to setup all the signals needs to be small; 3) power consumption of the network needs to be small, after the signals are setup. Power may be both static power and dynamic power; 4) Delay of the signal or a connection needs to be small after it is setup through a path using several routing resources in the path. The smaller the delay of the connections will lead to faster performance of the design. Typically delay of the critical connections determines the performance of the design on a given network; 5) Designs need to be not only routed through the network (i.e., all the signals need to be setup from inlet links of the network to the outlet links of the network.), but also the routing needs to be in faster time using efficient routing algorithms; 6) Efficient VLSI layout of the network is also critical and can greatly influence all the other parameters including the area taken up by the network on the chip, total number of wires, length of the wires, delay through the signal paths and hence the maximum clock speed of operation.

The different varieties of multi-stage networks described in various embodiments in the current invention have not been implemented previously on the semiconductor chips. The practical application of these networks includes Field Programmable Gate Array (FPGA) chips. Current commercial FPGA products such as Xilinx's Vertex, Altera's Stratix, Lattice's ECPx implement island-style architecture using mesh and segmented mesh routing interconnects using either full crossbars or sparse crossbars. These routing interconnects consume large silicon area for crosspoints, long wires, large signal propagation delay and hence consume lot of power.

The current invention discloses the optimization and scheduling methods of multi-stage hierarchical networks with fast scheduling of connections, for practical routing applications of numerous types of multi-stage networks also using multi-drop links. The optimizations disclosed in the current invention are applicable to including the numerous generalized multi-stage networks disclosed in the following patent applications:

1) Strictly and rearrangeably nonblocking for arbitrary fan-out multicast and unicast for generalized multi-stage networks $V(N_1, N_2, d, s)$ with numerous connection topologies and the scheduling methods are described in detail in the U.S. Pat. No. 8,270,400 that is incorporated by reference above.

2) Strictly and rearrangeably nonblocking for arbitrary fan-out multicast and unicast for generalized butterfly fat tree networks $V_{bft}(N_1, N_2, d, s)$ with numerous connection topologies and the scheduling methods are described in detail in the U.S. Pat. No. 8,170,040 that is incorporated by reference above.

3) Rearrangeably nonblocking for arbitrary fan-out multicast and multicast, and strictly nonblocking for unicast for generalized multi-link multi-stage networks $V_{mlink}$ ($N_1$, $N_2$,d,s) and generalized folded multi-link multi-stage networks $V_{fold-mlink}$($N_1$, $N_2$,d,s) with numerous connection topologies and the scheduling methods are described in detail in the U.S. Pat. No. 8,363,649 that is incorporated by reference above.

4) Strictly and rearrangeably nonblocking for arbitrary fan-out multicast and unicast for generalized multi-link butterfly fat tree networks $V_{mlink-bft}$($N_1$, $N_2$,d,s) with numerous connection topologies and the scheduling methods are described in detail in the U.S. Pat. No. 8,170,040 that is incorporated by reference above.

5) Strictly and rearrangeably nonblocking for arbitrary fan-out multicast and unicast for generalized folded multi-stage networks $V_{fold}$($N_1$, $N_2$,d,s) with numerous connection topologies and the scheduling methods are described in detail in the U.S. Pat. No. 8,363,649 that is incorporated by reference above.

6) Strictly nonblocking for arbitrary fan-out multicast and unicast for generalized multi-link multi-stage networks $V_{mlink}$($N_1$, $N_2$,d,s) and generalized folded multi-link multi-stage networks $V_{fold-mlink}$($N_1$, $N_2$,d,s) with numerous connection topologies and the scheduling methods are described in detail in the U.S. Pat. No. 8,363,649 that is incorporated by reference above.

7) VLSI layouts of numerous types of multi-stage networks are described in the U.S. Pat. No. 8,269,523 entitled "VLSI LAYOUTS OF FULLY CONNECTED NETWORKS" that is incorporated by reference above.

8) VLSI layouts of numerous types of multi-stage networks are described in the U.S. Pat. No. 8,898,611 entitled "VLSI LAYOUTS OF FULLY CONNECTED GENERALIZED AND PYRAMID NETWORKS WITH LOCALITY EXPLOITATION" that is incorporated by reference above.

In addition the optimization with the VLSI layouts disclosed in the current invention are also applicable to generalized multi-stage pyramid networks $V_p$($N_1$, $N_2$,d,s), generalized folded multi-stage pyramid networks $V_{fold-p}$($N_1$, $N_2$,d,s), generalized butterfly fat pyramid networks $V_{bfp}$($N_1$, $N_2$,d,s), generalized multi-link multi-stage pyramid networks $V_{mlink-p}$($N_1$, $N_2$,d,s), generalized folded multi-link multi-stage pyramid networks $V_{fold-mlink-p}$($N_1$, $N_2$,d,s), generalized multi-link butterfly fat pyramid networks $V_{mlink-bfp}$($N_1$, $N_2$,d,s), generalized hypercube networks $V_{hcube}$($N_1$, $N_2$,d,s) and generalized cube connected cycles networks $V_{CCC}$($N_1$, $N_2$,d,s) for s=1,2,3 or any number in general.

Finally the current invention discloses the optimizations and VLSI layouts of multi-stage hierarchical networks $V_{comb}$($N_1$, $N_2$,d,s) and the optimizations and VLSI layouts of multi-stage hierarchical networks $V_{D-Comb}$($N_1$, $N_2$,d,s) for practical routing applications (particularly to set up broadcast, unicast and multicast connections), where "Comb" denotes the combination of and "D-Comb" denotes the delay optimized combination of any of the generalized multi-stage networks $V(N_1, N_2,d,s)$, generalized folded multi-stage networks $V_{fold}$($N_1$, $N_2$,d,s), generalized butterfly fat tree networks $V_{bft}$($N_1$, $N_2$, d, s), generalized multi-link multi-stage networks $V_{mlink}$($N_1$, $N_2$,d,s), generalized folded multi-link multi-stage networks $V_{fold-mlink}$($N_1$, $N_2$,d,s), generalized multi-link butterfly fat tree networks $V_{link-bft}$($N_1$, $N_2$,d,s), generalized multi-stage pyramid networks $V_p$($N_1$, $N_2$,d,s), generalized folded multi-stage pyramid networks $V_{fold-p}$($N_1$, $N_2$,d,s), generalized butterfly fat pyramid networks $V_{bfp}$($N_1$, $N_2$,d,s), generalized multi-link multi-stage pyramid networks $V_{mlink-p}$($N_1$, $N_2$,d,s), generalized folded multi-link multi-stage pyramid networks $V_{fold-mlink-p}$($N_1$, $N_2$,d,s), generalized multi-link butterfly fat pyramid networks $V_{mlink-bfp}$($N_1$, $N_2$,d,s), generalized hypercube networks $V_{hcube}$($N_1$, $N_2$,d,s), and generalized cube connected cycles networks $V_{CCC}$($N_1$, $N_2$,d,s) for s=1,2,3 or any number in general.

Multi-Stage Hierarchical Network $V_{Comb}$(($N_1$, $N_2$,d,s):

Referring to diagram 100A in FIG. 1A, in one embodiment, an exemplary partial multi-stage hierarchical network $V_{Comb}$($N_1$, $N_2$,d,s) where $N_1$=200; $N_2$=400; d=2; and s=1 corresponding to one computational block, with each computational block having 4 inlet links namely I1, I2, I3, and I4; and 2 outlet links namely O1 and O2. And for each computational block the corresponding partial multi-stage hierarchical network $V_{Comb}$ ($N_1$, $N_2$, d, s) 100A consists of two rings 110 and 120, where ring 110 consists of "m+1" stages namely (ring 1, stage 0), (ring 1, stage 1), . . . (ring 1, stage "m–1"), and (ring 1, stage "m"), and ring 120 consists of "n+1" stages namely (ring 2, stage 0), (ring 2, stage 1), . . . (ring 2, stage "n–1"), and (ring 2, stage "n"), where "m" and "n" are positive integers.

Ring 110 has inlet links Ri(1,1) and Ri(1,2), and has outlet links Bo(1,1) and Bo(1,2). Ring 120 has inlet links Fi(2,1) and Fi(2,2), and outlet links Bo(2,1) and Bo(2,2). And hence the partial multi-stage hierarchical network $V_{Comb}$(($N_1$, $N_2$,d,s) 100A consists of 4 inlet links and 4 outlet links corresponding to the two rings 110 and 120. Outlet link O1 of the computational block is connected to inlet link Ri(1,1) of ring 110 and also inlet link of Fi(2,1) of ring 120. Similarly outlet link O2 of the computational block is connected to inlet link Ri(1,2) of Ring 110 and also inlet link of Fi(2,2) of Ring 120. And outlet link Bo(1,1) of Ring 110 is connected to inlet link I1 of the computational block. Outlet link Bo(1,2) of Ring 110 is connected to inlet link I2 of the computational block. Similarly outlet link Bo(2,1) of Ring 120 is connected to inlet link I3 of the computational block. Outlet link Bo(2,2) of Ring 120 is connected to inlet link I4 of the computational block. Since in this embodiment outlet link O1 of the computational block is connected to both inlet link Ri(1,1) of ring 110 and inlet link Fi(2,1) of ring 120; and outlet link O2 of the computational block is connected to both inlet link Ri(1,2) of ring 110 and inlet link Fi(2,2) of ring 120, the partial multi-stage hierarchical network $V_{Comb}$($N_1$, $N_2$,d,s) 100A consists of 2 inlet links and 4 outlet links.

Figure 8:
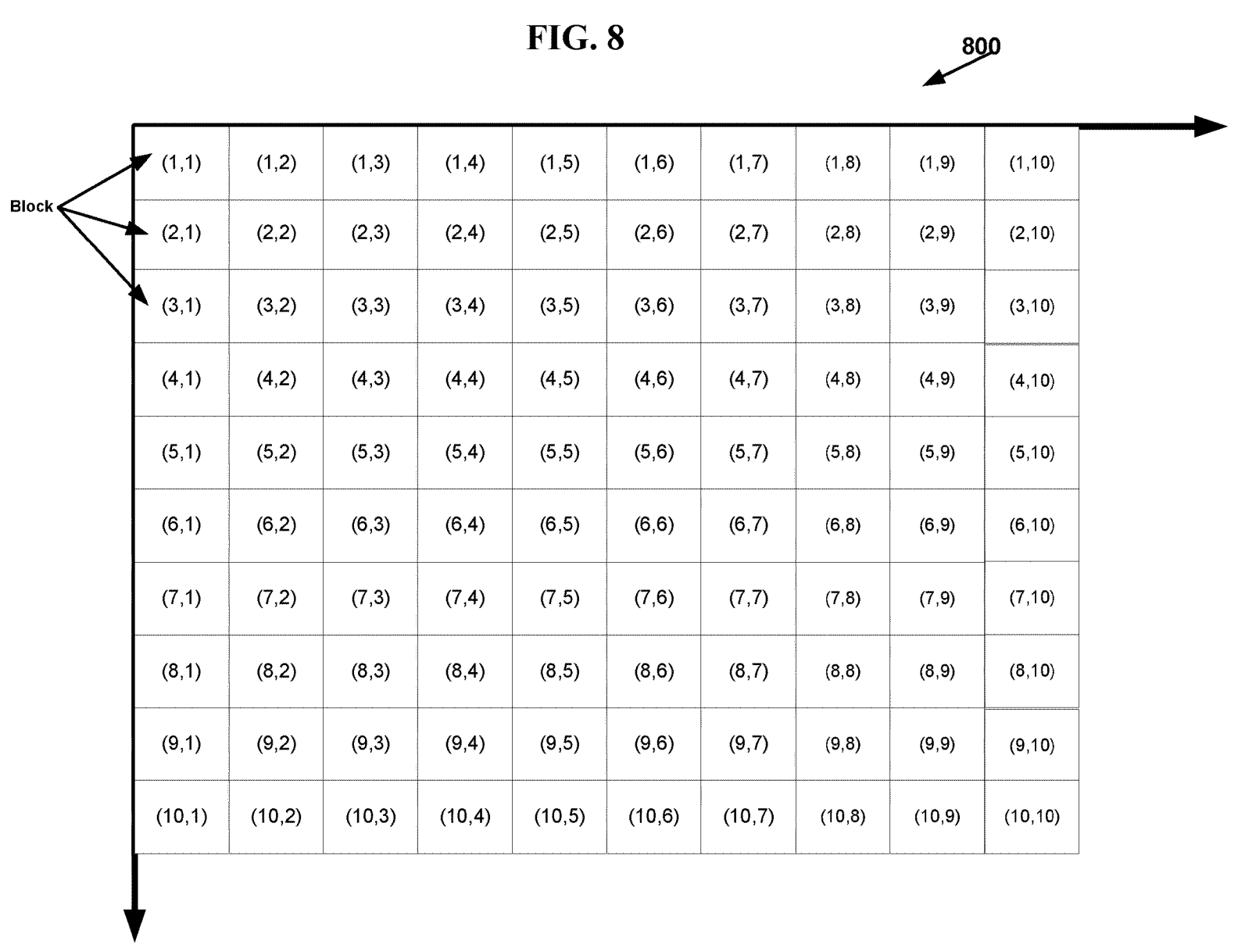

The two dimensional grid 800 in FIG. 8 illustrates an exemplary arrangement of 100 blocks arranged in 10 rows and 10 columns, in an embodiment. Each row of 2D-grid consisting of 10 block numbers namely the first row consists of the blocks (1,1), (1,2), (1,3), . . . , (1,9), and (1,10). The second row consists of the blocks (2,1), (2,2), (2,3), . . . , (2,9), and (2,10). Similarly 2D-grid 800 consists of 10 rows of each with 10 blocks and finally the tenth row consists of the blocks (10,1), (10,2), (10,3), . . . , (10,9), and (10,10). Each block of 2D-grid 800, in one embodiment, is part of the die area of a semiconductor integrated circuit (hereinafter alternatively referred to as "integrated circuit device" or "IC device"), so that the complete 2D-grid 800 of 100 blocks represents the complete die of the semiconductor integrated circuit. In one embodiment, each block of 2D-grid 800 consists of one of the partial multi-stage hierarchical network $V_{Comb}$($N_1$, $N_2$,d,s) 100A with 2 inlet links and 4 outlet links and the corresponding computational block with 4 inlet links and 2 outlet links. For example block (1,1) of 2D-grid 800 consists of one of the partial multi-stage hierarchical network $V_{Comb}(N_1, N_2,d,s)$ 100A with 2 inlet links and 4 outlet links and the corresponding computational block with 4 inlet links and 2 outlet links. Similarly each of the 100 blocks of 2D-grid 800 has a separate partial multi-stage hierarchical network $V_{Comb}(N_1, N_2,d,s)$ 100A with 2 inlet links and 4 outlet links and the corresponding computational block with 4 inlet links and 2 outlet links. Hence the complete multi-stage hierarchical network $V_{Comb}(N_1, N_2,d,s)$ corresponding to 2D-grid 800 has $N_1$=200 inlet links and $N_2$=400 outlet links. And there are 100 computational blocks each one corresponding to one of the blocks with each computational block having 4 inlet links and 2 outlet links. Also the 2D-grid 800 is organized in the fourth quadrant of the 2D-Plane. In other embodiments the 2D-grid 800 may be organized as either first quadrant, or second quadrant or third quadrant of the 2D-Plane.

Referring to partial multi-stage hierarchical network $V_{Comb}(N_1, N_2,d,s)$ 100A in FIG. 1A, the stage (ring 1, stage 0) consists of 4 inputs namely Ri(1,1), Ri(1,2), Ui(1,1), and Ui(1,2); and 4 outputs Bo(1,1), Bo(1,2), Fo(1,1), and Fo(1,2). The stage (ring 1, stage 0) also consists of eight 2:1 multiplexers (A multiplexer is hereinafter called a "mux") namely R(1,1), R(1,2), F(1,1), F(1,2), U(1,1), U(1,2), B(1,1), and B(1,2). The 2:1 Mux R(1,1) has two inputs namely Ri(1,1) and Bo(1,1) and has one output Ro(1,1). The 2:1 Mux R(1,2) has two inputs namely Ri(1,2) and Bo(1,2) and has one output Ro(1,2). The 2:1 Mux F(1,1) has two inputs namely Ro(1,1) and Ro(1,2) and has one output Fo(1,1). The 2:1 Mux F(1,2) has two inputs namely Ro(1,1) and Ro(1,2) and has one output Fo(1,2).

The 2:1 Mux U(1,1) has two inputs namely Ui(1,1) and Fo(1,1) and has one output Uo(1,1). The 2:1 Mux U(1,2) has two inputs namely Ui(1,2) and Fo(1,2) and has one output Uo(1,2). The 2:1 Mux B(1,1) has two inputs namely Uo(1,1) and Uo(1,2) and has one output Bo(1,1). The 2:1 Mux B(1,2) has two inputs namely Uo(1,1) and Uo(1,2) and has one output Bo(1,2).

The stage (ring 1, stage 1) consists of 4 inputs namely Ri(1,3), Ri(1,4), Ui(1,3), and Ui(1,4); and 4 outputs Bo(1,3), Bo(1,4), Fo(1,3), and Fo(1,4). The stage (ring 1, stage 1) also consists of eight 2:1 Muxes namely R(1,3), R(1,4), F(1,3), F(1,4), U(1,3), U(1,4), B(1,3), and B(1,4). The 2:1 Mux R(1,3) has two inputs namely Ri(1,3) and Bo(1,3) and has one output Ro(1,3). The 2:1 Mux R(1,4) has two inputs namely Ri(1,4) and Bo(1,4) and has one output Ro(1,4). The 2:1 Mux F(1,3) has two inputs namely Ro(1,3) and Ro(1,4) and has one output Fo(1,3). The 2:1 Mux F(1,4) has two inputs namely Ro(1,3) and Ro(1,4) and has one output Fo(1,4).

The 2:1 Mux U(1,3) has two inputs namely Ui(1,3) and Fo(1,3) and has one output Uo(1,3). The 2:1 Mux U(1,4) has two inputs namely Ui(1,4) and Fo(1,4) and has one output Uo(1,4). The 2:1 Mux B(1,3) has two inputs namely Uo(1,3) and Uo(1,4) and has one output Bo(1,3). The 2:1 Mux B(1,4) has two inputs namely Uo(1,3) and Uo(1,4) and has one output Bo(1,4).

The output Fo(1,1) of the stage (ring 1, stage 0) is connected to the input Ri(1,3) of the stage (ring 1, stage 1) which is called hereinafter an internal connection (hereinafter alternatively referred to as "straight link" or "straight middle link") between two successive stages of a ring. And the output Bo(1,3) of the stage (ring 1, stage 1) is connected to the input Ui(1,1) of the stage (ring 1, stage 0), is another internal connection between stage 0 and stage 1 of the ring 1.

The stage (ring 1, stage "m−1") consists of 4 inputs namely Fi(1,2m−1), Fi(1,2m), Ui(1,2m−1), and Ui(1,2m); and 4 outputs Bo(1,2m−1), Bo(1,2m), Fo(1,2m−1), and Fo(1,2m). The stage (ring 1, stage "m−1") also consists of six 2:1 Muxes namely F(1,2m−1), F(1,2m), U(1,2m−1), U(1,2m), B(1,2m−1), and B(1,2m). The 2:1 Mux F(1,2m−1) has two inputs namely Fi(1,2m−1) and Fi(1,2m) and has one output Fo(1,2m−1). The 2:1 Mux F(1,2m) has two inputs namely Fi(1,2m−1) and Fi(1,2m) and has one output Fo(1,2m).

The 2:1 Mux U(1,2m−1) has two inputs namely Ui(1,2m−1) and Fo(1,2m−1) and has one output Uo(1,2m−1). The 2:1 Mux U(1,2m) has two inputs namely Ui(1,2m) and Fo(1,2m) and has one output Uo(1,2m). The 2:1 Mux B(1,2m−1) has two inputs namely Uo(1,2m−1) and Uo(1,2m) and has one output Bo(1,2m−1). The 2:1 Mux B(1,2m) has two inputs namely Uo(1,2m−1) and Uo(1,2m) and has one output Bo(1,2m).

The stage (ring 1, stage "m") consists of 4 inputs namely Fi(1,2m+1), Fi(1,2m+2), Ui(1,2m+1), and Ui(1,2m+2); and 4 outputs Bo(1,2m+1), Bo(1,2m+2), Fo(1,2m+1), and Fo(1,2m+2). The stage (ring 1, stage "m") also consists of six 2:1 Muxes namely F(1,2m+1), F(1,2m+2), U(1,2m+1), U(1,2m+2), B(1,2m+1), and B(1,2m+2). The 2:1 Mux F(1,2m+1) has two inputs namely Fi(1,2m+1) and Fi(1,2m+2) and has one output Fo(1,2m+1). The 2:1 Mux F(1,2m+2) has two inputs namely Fi(1,2m+1) and Fi(1,2m+2) and has one output Fo(1,2m+2).

The 2:1 Mux U(1,2m+1) has two inputs namely Ui(1,2m+1) and Fo(1,2m+1) and has one output Uo(1,2m+1). The 2:1 Mux U(1,2m+2) has two inputs namely Ui(1,2m+2) and Fo(1,2m+2) and has one output Uo(1,2m+2). The 2:1 Mux B(1,2m+1) has two inputs namely Uo(1,2m+1) and Uo(1,2m+2) and has one output Bo(1,2m+1). The 2:1 Mux B(1,2m+2) has two inputs namely Uo(1,2m+1) and Uo(1,2m+2) and has one output Bo(1,2m+2).

The output Fo(1,2m−1) of the stage (ring 1, stage "m−1") is connected to the input Fi(1,2m+1) of the stage (ring 1, stage "m"), is an internal connection between stage "m−1" and stage "m" of the ring 1. And the output Bo(1,2m+1) of the stage (ring 1, stage "m") is connected to the input Ui(1,2m−1) of the stage (ring 1, stage "m−1"), is another internal connection between stage "m−1" and stage "m" of the ring 1

Just the same way the stages (ring 1, stage 0), (ring 1, stage 1), there are also stages (ring 1, stage 2), (ring 1, stage 3), . . . (ring 1, stage "m−1"), (ring 1, stage "m") in that order, where the stages from (ring 1, stage 2), (ring 1, stage 3), . . . , (ring 1, stage "m−2") are not shown in the diagram 100A. Just the same way the two successive stages (ring 1, stage 0) and (ring 1, stage 1) have internal connections between them as described before, any two successive stages have similar internal connections. For example (ring 1, stage 1) and (ring 1, stage 2) have similar internal connections and (ring 1, stage "m−2") and (ring 1, stage "m−1") have similar internal connections.

Stage (ring 1, stage 0) is also called hereinafter the "entry stage" or "first stage" of ring 1, since inlet links and outlet links of the computational block are directly connected to stage (ring 1, stage 0). Also stage (ring 1, stage "m") is hereinafter the "last stage" or "root stage" of ring 1.

The stage (ring 2, stage 0) consists of 4 inputs namely Fi(2,1), Fi(2,2), Ui(2,1), and Ui(2,2); and 4 outputs Bo(2,1), Bo(2,2), Fo(2,1), and Fo(2,2). The stage (ring 2, stage 0) also consists of six 2:1 Muxes namely F(2,1), F(2,2), U(2,1), U(2,2), B(2,1), and B(2,2). The 2:1 Mux F(2,1) has two inputs namely Fi(2,1) and Fi(2,2) and has one output Fo(2,1). The 2:1 Mux F(2,2) has two inputs namely Fi(2,1) and Fi(2,2) and has one output Fo(2,2).

The 2:1 Mux U(2,1) has two inputs namely Ui(2,1) and Fo(2,1) and has one output Uo(2,1). The 2:1 Mux U(2,2) has two inputs namely Ui(2,2) and Fo(2,2) and has one output Uo(2,2). The 2:1 Mux B(2,1) has two inputs namely Uo(2,1) and Uo(2,2) and has one output Bo(2,1). The 2:1 Mux B(2,2) has two inputs namely Uo(2,1) and Uo(2,2) and has one output Bo(2,2).

The stage (ring 2, stage 1) consists of 4 inputs namely Fi(2,3), Fi(2,4), Ui(2,3), and Ui(2,4); and 4 outputs Bo(2,3), Bo(2,4), Fo(2,3), and Fo(2,4). The stage (ring 2, stage 1) also consists of six 2:1 Muxes namely F(2,3), F(2,4), U(2,3), U(2,4), B(2,3), and B(2,4). The 2:1 Mux F(2,3) has two inputs namely Fi(2,3) and Fi(2,4) and has one output Fo(2,3). The 2:1 Mux F(2,4) has two inputs namely Fi(2,3) and Fi(2,4) and has one output Fo(2,4).

The 2:1 Mux U(2,3) has two inputs namely Ui(2,3) and Fo(2,3) and has one output Uo(2,3). The 2:1 Mux U(2,4) has two inputs namely Ui(2,4) and Fo(2,4) and has one output Uo(2,4). The 2:1 Mux B(2,3) has two inputs namely Uo(2,3) and Uo(2,4) and has one output Bo(2,3). The 2:1 Mux B(2,4) has two inputs namely Uo(2,3) and Uo(2,4) and has one output Bo(2,4).

The output Fo(2,1) of the stage (ring 2, stage 0) is connected to the input Fi(2,3) of the stage (ring 2, stage 1), is an internal connection between stage 0 and stage 1 of the ring 2. And the output Bo(2,3) of the stage (ring 2, stage 1) is connected to the input Ui(2,1) of the stage (ring 2, stage 0), is another internal connection between stage 0 and stage 1 of the ring 1.

The stage (ring 2, stage "n−1") consists of 4 inputs namely Ri(2,2n−1), Ri(2,2n), Ui(1,2n−1), and Ui(1,2n); and 4 outputs Bo(1,2n−1), Bo(1,2n), Fo(1,2n−1), and Fo(1,2n). The stage (ring 2, stage "n−1") also consists of eight 2:1 Muxes namely R(2,2n−1), R(2,2n), F(2,2n−1), F(1,2n), U(1,2n−1), U(1,2n), B(1,2n−1), and B(1,2n). The 2:1 Mux R(2,2n−1) has two inputs namely Ri(2,2n−1) and Bo(2,2n−1) and has one output Ro(2,2n−1). The 2:1 Mux R(2,2n) has two inputs namely Ri(2,2n) and Bo(2,2n) and has one output Ro(2,2n). The 2:1 Mux F(2,2n−1) has two inputs namely Ro(2,2n−1) and Ro(2,2n) and has one output Fo(2,2n−1). The 2:1 Mux F(2,2n) has two inputs namely Ro(2,2n−1) and Ro(2,2n) and has one output Fo(2,2n).

The 2:1 Mux U(2,2n−1) has two inputs namely Ui(2,2n−1) and Fo(2,2n−1) and has one output Uo(2,2n−1). The 2:1 Mux U(2,2n) has two inputs namely Ui(2,2n) and Fo(2,2n) and has one output Uo(2,2n). The 2:1 Mux B(2,2n−1) has two inputs namely Uo(2,2n−1) and Uo(2,2n) and has one output Bo(2,2n−1). The 2:1 Mux B(2,2n) has two inputs namely Uo(2,2n−1) and Uo(2,2n) and has one output Bo(2,2n).

The stage (ring 2, stage "n") consists of 4 inputs namely Ri(2,2n+1), Ri(2,2n+2), Ui(2,2n+1), and Ui(2,2n+2); and 4 outputs Bo(2,2n+1), Bo(2,2n+2), Fo(2,2n+1), and Fo(2,2n+2). The stage (ring 2, stage "n") also consists of eight 2:1 Muxes namely R(2,2n+1), R(2,2n+2), F(2,2n+1), F(2,2n+2), U(2,2n+1), U(2,2n+2), B(2,2n+1), and B(2,2n+2). The 2:1 Mux R(2,2n+1) has two inputs namely Ri(2,2n+1) and Bo(2,2n+1) and has one output Ro(2,2n+1). The 2:1 Mux R(2,2n+2) has two inputs namely Ri(2,2n+2) and Bo(2,2n+2) and has one output Ro(2,2n+2). The 2:1 Mux F(2,2n+1) has two inputs namely Ro(2,2n+1) and Ro(2,2n+2) and has one output Fo(2,2n+1). The 2:1 Mux F(2,2n+2) has two inputs namely Ro(2,2n+1) and Ro(2,2n+2) and has one output Fo(2,2n+2).

The 2:1 Mux U(2,2n+1) has two inputs namely Ui(2,2n+1) and Fo(2,2n+1) and has one output Uo(2,2n+1). The 2:1 Mux U(2,2n+2) has two inputs namely Ui(2,2n+2) and Fo(2,2n+2) and has one output Uo(2,2n+2). The 2:1 Mux B(2,2n+1) has two inputs namely Uo(2,2n+1) and Uo(2,2n+2) and has one output Bo(2,2n+1). The 2:1 Mux B(2,2n+2) has two inputs namely Uo(2,2n+1) and Uo(2,2n+2) and has one output Bo(2,2n+2).

The output Fo(2,2n−1) of the stage (ring 2, stage "n−1") is connected to the input Ri(2,2n+1) of the stage (ring 2, stage "n"), is an internal connection between stage "n−1" and stage "n" of the ring 1. And the output Bo(2,2n+1) of the stage (ring 2, stage "n") is connected to the input Ui(2,2n−1) of the stage (ring 2, stage "n−1"), is another internal connection between stage "n−1" and stage "n" of the ring 1.

Each stage of any ring of the partial multi-stage hierarchical network $V_{Comb}(N_1, N_2,d,s)$ 100A consists of 4 inputs and 2*d=4 outputs. Even though the stages (ring 1, stage 0), (ring 1, stage 1), (ring 2, stage "n−1"), and (ring 2, stage "n") each have eight 2:1 muxes, and the stages (ring 2, stage 0), (ring 2, stage 1), (ring 1, stage "m−1"), and (ring 1, stage "m") each have six 2:1 muxes, in other embodiments any of these stages can be one of the four by four switch diagrams namely 200A of FIG. 2A, 200B of FIG. 2B, 200C of FIG. 2C, and one of the eight by four switch diagrams namely 200E of FIG. 2E, 200F of FIG. 2F.

Figure 1B:
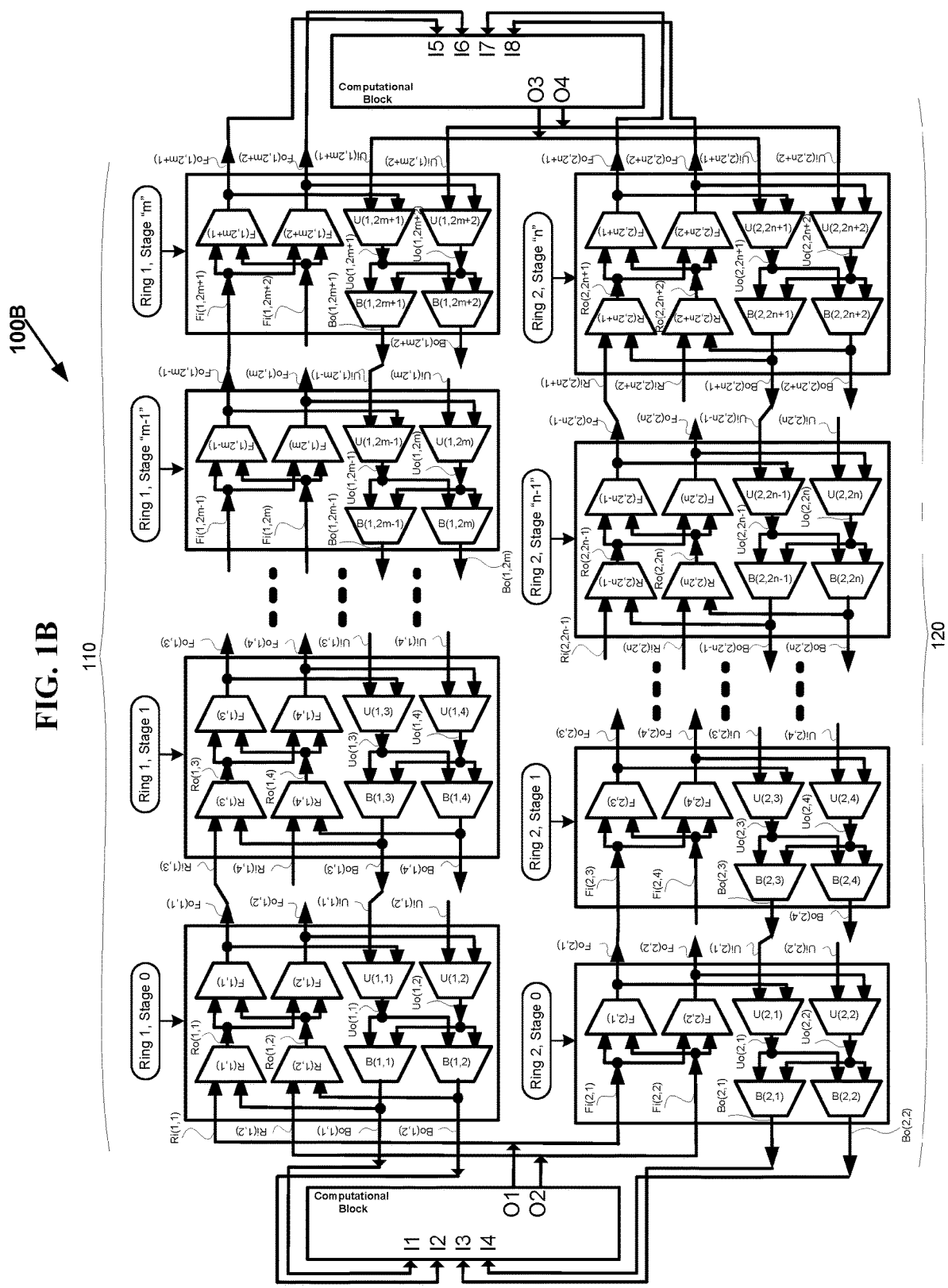
FIG. 1B is a diagram 100B of an exemplary partial multi-stage hierarchical network corresponding to one block with 8 inputs and 4 outputs of a computational block connecting from both left-hand side and right-hand side, to route practical applications such as FPGA routing of hardware designs in accordance with the invention.

Referring to diagram 100B in FIG. 1B, in one embodiment, an exemplary partial multi-stage hierarchical network $V_{Comb}(N_1, N_2,d,s)$ where $N_1$=400; $N_2$=800; d=2; and s=1 corresponding to one computational block, with each computational block having 8 inlet links namely I1, I2, I3, I4, I5, I6, I7, and I8; and 4 outlet links namely O1, O2, O3, and O4. And for each computational block the corresponding partial multi-stage hierarchical network $V_{Comb}(N_1, N_2,d,s)$ 100B consists of two rings 110 and 120, where ring 110 consists of "m+i" stages namely (ring 1, stage 0), (ring 1, stage 1), ... (ring 1, stage "m−1"), and (ring 1, stage "m"), and ring 120 consists of "n+i" stages namely (ring 2, stage 0), (ring 2, stage 1), ... (ring 2, stage "n−1"), and (ring 2, stage "n"), where "m" and "n" are positive integers.

Ring 110 has inlet links Ri(1,1) and Ri(1,2) from the left-hand side, and has outlet links Bo(1,1) and Bo(1,2) from left-hand side. Ring 110 also has inlet links Ui(1,2m+1) and Ui(1,2m+2) from the right-hand side, and has outlet links Fo(1,2m+1) and Fo(1,2m+2) from right-hand side. Ring 120 has inlet links Fi(2,1) and Fi(2,2) from left-hand side, and outlet links Bo(2,1) and Bo(2,2) from left-hand side. Ring 120 also has inlet links Ui(2,2n+1) and Ui(2,2n+2) from the right-hand side, and has outlet links Fo(2,2n+1) and Fo(2,2n+2) from right-hand side.

And the partial multi-stage hierarchical network $V_{Comb}(N_1, N_2,d,s)$ 100B consists of 8 inlet links and 4 outlet links corresponding to the two rings 110 and 120. From left-hand side, outlet link O1 of the computational block is connected to inlet link Ri(1,1) of ring 110 and also inlet link of Fi(2,1) of ring 120. Similarly from left-hand side, outlet link O2 of the computational block is connected to inlet link Ri(1,2) of Ring 110 and also inlet link of Fi(2,2) of Ring 120. And from left-hand side, outlet link Bo(1,1) of Ring 110 is connected to inlet link I1 of the computational block. From left-hand side, Outlet link Bo(1,2) of Ring 110 is connected to inlet link I2 of the computational block. Similarly from left-hand side, outlet link Bo(2,1) of Ring 120 is connected to inlet link I3 of the computational block. From left-hand side, outlet link Bo(2,2) of Ring 120 is connected to inlet link I4 of the computational block.

From right-hand side, outlet link O3 of the computational block is connected to inlet link Ui(1,2m+1) of ring 110 and also inlet link of Ui(2,2n+1) of ring 120. Similarly from right-hand side, outlet link O4 of the computational block is connected to inlet link Ui(1,2m+2) of Ring 110 and also inlet link of Ui(2,2n+2) of Ring 120. And from right-hand side, outlet link Fo(1,2m+1) of Ring 110 is connected to inlet link I5 of the computational block. From right-hand side, outlet link Fo(1,2m+2) of Ring 110 is connected to inlet link I6 of the computational block. Similarly from right-hand side, outlet link Fo(2,2n+1) of Ring 120 is connected to inlet link I7 of the computational block. From right-hand side, outlet link Fo(2,2n+2) of Ring 120 is connected to inlet link 18 of the computational block.

Since in this embodiment outlet link O1 of the computational block is connected to both inlet link Ri(1,1) of ring 110 and inlet link Fi(2,1) of ring 120; outlet link O2 of the computational block is connected to both inlet link Ri(1,2) of ring 110 and inlet link Fi(2,2) of ring 120; outlet link O3 of the computational block is connected to both inlet link Ui(1,2m+1) of ring 110 and inlet link Ui(2,2n+1) of ring 120; and outlet link O4 of the computational block is connected to both inlet link Ui(1,2m+2) of ring 110 and inlet link Ui(2,2n+2) of ring 120, the partial multi-stage hierarchical network $V_{Com}(N_1, N_2,d,s)$ 100B consists of 4 inlet links and 8 outlet links.

Referring to two dimensional grid 800 in FIG. 8 illustrates, in another embodiment, each block of 2D-grid 800 consists of one of the partial multi-stage hierarchical network $V_{Comb}(N_1, N_2,d,s)$ 100B with 4 inlet links and 8 outlet links and the corresponding computational block with 8 inlet links and 4 outlet links. For example block (1,1) of 2D-grid 800 consists of one of the partial multi-stage hierarchical network $V_{Comb}(N_1, N_2,d,s)$ 100B with 4 inlet links and 8 outlet links and the corresponding computational block with 8 inlet links and 4 outlet links. Similarly each of the 100 blocks of 2D-grid 800 has a separate partial multi-stage hierarchical network $V_{Comb}(N_1, N_2,d,s)$ 100B with 4 inlet links and 8 outlet links and the corresponding computational block with 8 inlet links and 4 outlet links. Hence the complete multi-stage hierarchical network $V_{Comb}(N_1, N_2,d,s)$ corresponding to 2D-grid 800 has $N_1$=400 inlet links and $N_2$=800 outlet links. Since there are 100 computational blocks each one corresponding to one of the blocks with each computational block having 8 inlet links and 4 outlet links. Also the 2D-grid 800 is organized in the fourth quadrant of the 2D-Plane. In other embodiments the 2D-grid 800 may be organized as either first quadrant, or second quadrant or third quadrant of the 2D-Plane.

Referring to partial multi-stage hierarchical network $V_{Comb}(N_1, N_2,d,s)$ 100B in FIG. 1B, the stage (ring 1, stage 0) consists of 4 inputs namely Ri(1,1), Ri(1,2), Ui(1,1), and Ui(1,2); and 4 outputs Bo(1,1), Bo(1,2), Fo(1,1), and Fo(1,2). The stage (ring 1, stage 0) also consists of eight 2:1 multiplexers (A multiplexer is hereinafter called a "mux") namely R(1,1), R(1,2), F(1,1), F(1,2), U(1,1), U(1,2), B(1,1), and B(1,2). The 2:1 Mux R(1,1) has two inputs namely Ri(1,1) and Bo(1,1) and has one output Ro(1,1). The 2:1 Mux R(1,2) has two inputs namely Ri(1,2) and Bo(1,2) and has one output Ro(1,2). The 2:1 Mux F(1,1) has two inputs namely Ro(1,1) and Ro(1,2) and has one output Fo(1,1). The 2:1 Mux F(1,2) has two inputs namely Ro(1,1) and Ro(1,2) and has one output Fo(1,2).

The 2:1 Mux U(1,1) has two inputs namely Ui(1,1) and Fo(1,1) and has one output Uo(1,1). The 2:1 Mux U(1,2) has two inputs namely Ui(1,2) and Fo(1,2) and has one output Uo(1,2). The 2:1 Mux B(1,1) has two inputs namely Uo(1,1) and Uo(1,2) and has one output Bo(1,1). The 2:1 Mux B(1,2) has two inputs namely Uo(1,1) and Uo(1,2) and has one output Bo(1,2).

The stage (ring 1, stage 1) consists of 4 inputs namely Ri(1,3), Ri(1,4), Ui(1,3), and Ui(1,4); and 4 outputs Bo(1,3), Bo(1,4), Fo(1,3), and Fo(1,4). The stage (ring 1, stage 1) also consists of eight 2:1 Muxes namely R(1,3), R(1,4), F(1,3), F(1,4), U(1,3), U(1,4), B(1,3), and B(1,4). The 2:1 Mux R(1,3) has two inputs namely Ri(1,3) and Bo(1,3) and has one output Ro(1,3). The 2:1 Mux R(1,4) has two inputs namely Ri(1,4) and Bo(1,4) and has one output Ro(1,4). The 2:1 Mux F(1,3) has two inputs namely Ro(1,3) and Ro(1,4) and has one output Fo(1,3). The 2:1 Mux F(1,4) has two inputs namely Ro(1,3) and Ro(1,4) and has one output Fo(1,4).

The 2:1 Mux U(1,3) has two inputs namely Ui(1,3) and Fo(1,3) and has one output Uo(1,3). The 2:1 Mux U(1,4) has two inputs namely Ui(1,4) and Fo(1,4) and has one output Uo(1,4). The 2:1 Mux B(1,3) has two inputs namely Uo(1,3) and Uo(1,4) and has one output Bo(1,3). The 2:1 Mux B(1,4) has two inputs namely Uo(1,3) and Uo(1,4) and has one output Bo(1,4).

The output Fo(1,1) of the stage (ring 1, stage 0) is connected to the input Ri(1,3) of the stage (ring 1, stage 1) which is called hereinafter an internal connection between two successive stages of a ring. And the output Bo(1,3) of the stage (ring 1, stage 1) is connected to the input Ui(1,1) of the stage (ring 1, stage 0), is another internal connection between stage 0 and stage 1 of the ring 1.

The stage (ring 1, stage "m−1") consists of 4 inputs namely Fi(1,2m−1), Fi(1,2m), Ui(1,2m−1), and Ui(1,2m); and 4 outputs Bo(1,2m−1), Bo(1,2m), Fo(1,2m−1), and Fo(1,2m). The stage (ring 1, stage "m−1") also consists of six 2:1 Muxes namely F(1,2m−1), F(1,2m), U(1,2m−1), U(1,2m), B(1,2m−1), and B(1,2m). The 2:1 Mux F(1,2m−1) has two inputs namely Fi(1,2m−1) and Fi(1,2m) and has one output Fo(1,2m−1). The 2:1 Mux F(1,2m) has two inputs namely Fi(1,2m−1) and Fi(1,2m) and has one output Fo(1, 2m).

The 2:1 Mux U(1,2m−1) has two inputs namely Ui(1, 2m−1) and Fo(1,2m−1) and has one output Uo(1,2m−1). The 2:1 Mux U(1,2m) has two inputs namely Ui(1,2m) and Fo(1,2m) and has one output Uo(1,2m). The 2:1 Mux B(1,2m−1) has two inputs namely Uo(1,2m−1) and Uo(1, 2m) and has one output Bo(1,2m−1). The 2:1 Mux B(1,2m) has two inputs namely Uo(1,2m−1) and Uo(1,2m) and has one output Bo(1,2m).

The stage (ring 1, stage "m") consists of 4 inputs namely Fi(1,2m+1), Fi(1,2m+2), Ui(1,2m+1), and Ui(1,2m+2); and 4 outputs Bo(1,2m+1), Bo(1,2m+2), Fo(1,2m+1), and Fo(1, 2m+2). The stage (ring 1, stage "m") also consists of six 2:1 Muxes namely F(1,2m+1), F(1,2m+2), U(1,2m+1), U(1, 2m+2), B(1,2m+1), and B(1,2m+2). The 2:1 Mux F(1,2m+1) has two inputs namely Fi(1,2m+1) and Fi(1,2m+2) and has one output Fo(1,2m+1). The 2:1 Mux F(1,2m+2) has two inputs namely Fi(1,2m+1) and Fi(1,2m+2) and has one output Fo(1,2m+2).

The 2:1 Mux U(1,2m+1) has two inputs namely Ui(1, 2m+1) and Fo(1,2m+1) and has one output Uo(1,2m+1). The 2:1 Mux U(1,2m+2) has two inputs namely Ui(1,2m+2) and Fo(1,2m+2) and has one output Uo(1,2m+2). The 2:1 Mux B(1,2m+1) has two inputs namely Uo(1,2m+1) and Uo(1,2m+2) and has one output Bo(1,2m+1). The 2:1 Mux B(1,2m+2) has two inputs namely Uo(1,2m+1) and Uo(1, 2m+2) and has one output Bo(1,2m+2).

The output Fo(1,2m−1) of the stage (ring 1, stage "m−1") is connected to the input Fi(1,2m+1) of the stage (ring 1, stage "m"), is an internal connection between stage "m−1" and stage "m" of the ring 1. And the output Bo(1,2m+1) of the stage (ring 1, stage "m") is connected to the input Ui(1,2m−1) of the stage (ring 1, stage "m−1"), is another internal connection between stage "m−1" and stage "m" of the ring 1

Just the same way the stages (ring 1, stage 0), (ring 1, stage 1), there are also stages (ring 1, stage 2), (ring 1, stage 3), . . . (ring 1, stage "m−1"), (ring 1, stage "m") in that order, where the stages from (ring 1, stage 2), (ring 1, stage 3), . . . , (ring 1, stage "m−2") are not shown in the diagram 100B. Just the same way the two successive stages (ring 1, stage 0) and (ring 1, stage 1) have internal connections between them as described before, any two successive stages have similar internal connections. For example (ring 1, stage 1) and (ring 1, stage 2) have similar internal connections and (ring 1, stage "m−2") and (ring 1, stage "m−1") have similar internal connections.

Stage (ring 1, stage 0) is also called hereinafter the "entry stage" or "first stage" of ring 1, since inlet links and outlet links of the computational block are directly connected to stage (ring 1, stage 0). Also stage (ring 1, stage "m") is hereinafter the "last stage" or "root stage" of ring 1.

The stage (ring 2, stage 0) consists of 4 inputs namely Fi(2,1), Fi(2,2), Ui(2,1), and Ui(2,2); and 4 outputs Bo(2,1), Bo(2,2), Fo(2,1), and Fo(2,2). The stage (ring 2, stage 0) also consists of six 2:1 Muxes namely F(2,1), F(2,2), U(2,1), U(2,2), B(2,1), and B(2,2). The 2:1 Mux F(2,1) has two inputs namely Fi(2,1) and Fi(2,2) and has one output Fo(2,1). The 2:1 Mux F(2,2) has two inputs namely Fi(2,1) and Fi(2,2) and has one output Fo(2,2).

The 2:1 Mux U(2,1) has two inputs namely Ui(2,1) and Fo(2,1) and has one output Uo(2,1). The 2:1 Mux U(2,2) has two inputs namely Ui(2,2) and Fo(2,2) and has one output Uo(2,2). The 2:1 Mux B(2,1) has two inputs namely Uo(2,1) and Uo(2,2) and has one output Bo(2,1). The 2:1 Mux B(2,2) has two inputs namely Uo(2,1) and Uo(2,2) and has one output Bo(2,2).

The stage (ring 2, stage 1) consists of 4 inputs namely Fi(2,3), Fi(2,4), Ui(2,3), and Ui(2,4); and 4 outputs Bo(2,3), Bo(2,4), Fo(2,3), and Fo(2,4). The stage (ring 2, stage 1) also consists of six 2:1 Muxes namely F(2,3), F(2,4), U(2,3), U(2,4), B(2,3), and B(2,4). The 2:1 Mux F(2,3) has two inputs namely Fi(2,3) and Fi(2,4) and has one output Fo(2,3). The 2:1 Mux F(2,4) has two inputs namely Fi(2,3) and Fi(2,4) and has one output Fo(2,4).

The 2:1 Mux U(2,3) has two inputs namely Ui(2,3) and Fo(2,3) and has one output Uo(2,3). The 2:1 Mux U(2,4) has two inputs namely Ui(2,4) and Fo(2,4) and has one output Uo(2,4). The 2:1 Mux B(2,3) has two inputs namely Uo(2,3) and Uo(2,4) and has one output Bo(2,3). The 2:1 Mux B(2,4) has two inputs namely Uo(2,3) and Uo(2,4) and has one output Bo(2,4).

The output Fo(2,1) of the stage (ring 2, stage 0) is connected to the input Fi(2,3) of the stage (ring 2, stage 1), is an internal connection between stage 0 and stage 1 of the ring 2. And the output Bo(2,3) of the stage (ring 2, stage 1) is connected to the input Ui(2,1) of the stage (ring 2, stage 0), is another internal connection between stage 0 and stage 1 of the ring 1.

The stage (ring 2, stage "n−1") consists of 4 inputs namely Ri(2,2n−1), Ri(2,2n), Ui(1,2n−1), and Ui(1,2n); and 4 outputs Bo(1,2n−1), Bo(1,2n), Fo(1,2n−1), and Fo(1,2n). The stage (ring 2, stage "n−1") also consists of eight 2:1 Muxes namely R(2,2n−1), R(2,2n), F(2,2n−1), F(1,2n), U(1,2n−1), U(1,2n), B(1,2n−1), and B(1,2n). The 2:1 Mux R(2,2n−1) has two inputs namely Ri(2,2n−1) and Bo(2,2n−1) and has one output Ro(2,2n−1). The 2:1 Mux R(2,2n) has two inputs namely Ri(2,2n) and Bo(2,2n) and has one output Ro(2,2n). The 2:1 Mux F(2,2n−1) has two inputs namely Ro(2,2n−1) and Ro(2,2n) and has one output Fo(2,2n−1). The 2:1 Mux F(2,2n) has two inputs namely Ro(2,2n−1) and Ro(2,2n) and has one output Fo(2,2n).

The 2:1 Mux U(2,2n−1) has two inputs namely Ui(2,2n−1) and Fo(2,2n−1) and has one output Uo(2,2n−1). The 2:1 Mux U(2,2n) has two inputs namely Ui(2,2n) and Fo(2,2n) and has one output Uo(2,2n). The 2:1 Mux B(2,2n−1) has two inputs namely Uo(2,2n−1) and Uo(2,2n) and has one output Bo(2,2n−1). The 2:1 Mux B(2,2n) has two inputs namely Uo(2,2n−1) and Uo(2,2n) and has one output Bo(2,2n).

The stage (ring 2, stage "n") consists of 4 inputs namely Ri(2,2n+1), Ri(2,2n+2), Ui(2,2n+1), and Ui(2,2n+2); and 4 outputs Bo(2,2n+1), Bo(2,2n+2), Fo(2,2n+1), and Fo(2,2n+2). The stage (ring 2, stage "n") also consists of eight 2:1 Muxes namely R(2,2n+1), R(2,2n+2), F(2,2n+1), F(2,2n+2), U(2,2n+1), U(2,2n+2), B(2,2n+1), and B(2,2n+2). The 2:1 Mux R(2,2n+1) has two inputs namely Ri(2,2n+1) and Bo(2,2n+1) and has one output Ro(2,2n+1). The 2:1 Mux R(2,2n+2) has two inputs namely Ri(2,2n+2) and Bo(2,2n+2) and has one output Ro(2,2n+2). The 2:1 Mux F(2,2n+1) has two inputs namely Ro(2,2n+1) and Ro(2,2n+2) and has one output Fo(2,2n+1). The 2:1 Mux F(2,2n+2) has two inputs namely Ro(2,2n+1) and Ro(2,2n+2) and has one output Fo(2,2n+2).

The 2:1 Mux U(2,2n+1) has two inputs namely Ui(2,2n+1) and Fo(2,2n+1) and has one output Uo(2,2n+1). The 2:1 Mux U(2,2n+2) has two inputs namely Ui(2,2n+2) and Fo(2,2n+2) and has one output Uo(2,2n+2). The 2:1 Mux B(2,2n+1) has two inputs namely Uo(2,2n+1) and Uo(2,2n+2) and has one output Bo(2,2n+1). The 2:1 Mux B(2,2n+2) has two inputs namely Uo(2,2n+1) and Uo(2,2n+2) and has one output Bo(2,2n+2).

The output Fo(2,2n−1) of the stage (ring 2, stage "n−1") is connected to the input Ri(2,2n+1) of the stage (ring 2, stage "n"), is an internal connection between stage "n−1" and stage "n" of the ring 1. And the output Bo(2,2n+1) of the stage (ring 2, stage "n") is connected to the input Ui(2,2n−1) of the stage (ring 2, stage "n−1"), is another internal connection between stage "n−1" and stage "n" of the ring 1.

Each stage of any ring of the partial multi-stage hierarchical network $V_{Comb}(N_1, N_2, d, s)$ 100B consists of 2*d=4 outputs. Even though each stage has four 4:1 muxes, in other embodiments any of these stages can be one of the four by four switch diagrams namely 200A of FIG. 2A, 200B of FIG. 2B, 200C of FIG. 2C, and one of the eight by four switch diagrams namely 200E of FIG. 2E, 200F of FIG. 2F.

In general, any ring of the partial multi-stage hierarchical network $V_{Comb}(N_1, N_2, d, s)$ may have inputs and outputs connected from computational block from either only from left-hand side as in the partial multi-stage hierarchical network $V_{Comb}(N_1, N_2, d, s)$ 100A; or only from right-hand side; or from both left-hand and right-hand sides as in the partial multi-stage hierarchical network $V_{Comb}(N_1, N_2, d, s)$ 100B.

Figure 1C:
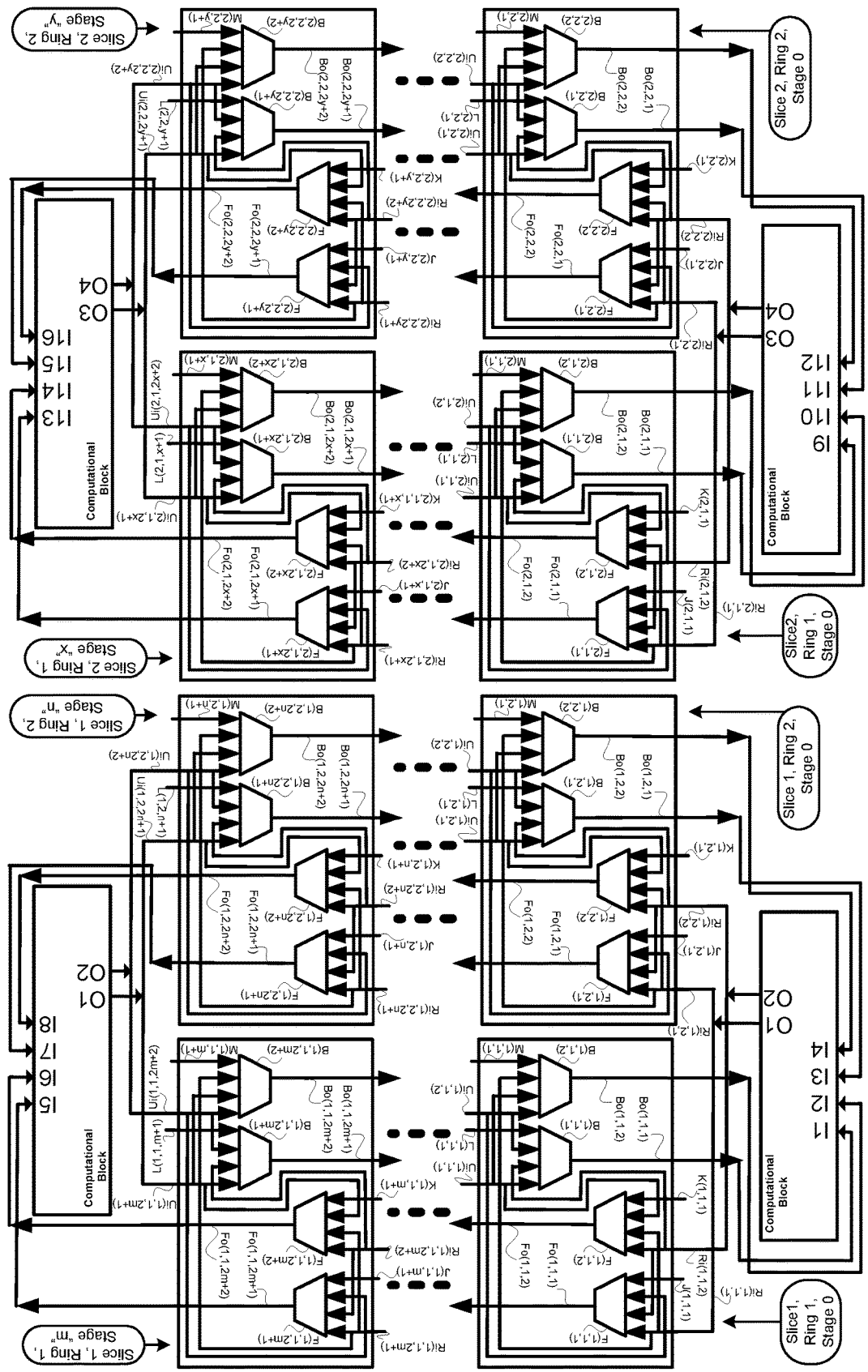
FIG. 1C is a diagram 100C of an exemplary partial multi-stage hierarchical network corresponding to one block, by dividing the network into two parallel and independent slices, with 16 inputs and 4 outputs of a computational block connecting from both left-hand side and right-hand side, to route practical applications such as FPGA routing of hardware designs in accordance with the invention.

Referring to diagram 100C in FIG. 1C, in one embodiment, an exemplary partial multi-stage hierarchical network $V_{Comb}(N_1, N_2, d, s)$ where $N_1=400$; $N_2=1600$; $d=2$; and $s=1$ corresponding to one computational block, with each computational block having 16 inlet links namely I1, I2, I3, I4, I5, I6, I7, I8, I9, I10, I11, I12, I13, I14, I15, and I16; and 4 outlet links namely O1, O2, O3, and O4. And for each computational block the corresponding partial multi-stage hierarchical network $V_{Comb}(N_1, N_2, d, s)$ 100C consists of two slices namely slice 1 and slice 2. Slice 1 consists of two rings namely (slice 1, ring 1) and (slice 1, ring 2). Similarly slice 2 consists of two rings namely (slice 2, ring 1) and (slice 2, ring 2).

The ring (slice 1, ring 1) consists of "m+1" stages namely (slice 1, ring 1, stage 0), (slice 1, ring 1, stage 1), . . . (slice 1, ring 1, stage "m−1"), and (slice 1, ring 1, stage "m"). And the ring (slice 1, ring 2) consists of "n+1" stages namely (slice 1, ring 2, stage 0), (slice 1, ring 2, stage 1), . . . (slice 1, ring 2, stage "n−1"), and (slice 1, ring 2, stage "n"), where "m" and "n" are positive integers.

Similarly the ring (slice 2, ring 1) consists of "x+1" stages namely (slice 2, ring 1, stage 0), (slice 2, ring 1, stage 1), . . . (slice 2, ring 1, stage "x−1"), and (slice 2, ring 1, stage "x"). And the ring (slice 2, ring 2) consists of "y+1" stages namely (slice 2, ring 2, stage 0), (slice 2, ring 2, stage 1), . . . (slice 2, ring 2, stage "y−1"), and (slice 2, ring 2, stage "y"), where "x" and "y" are positive integers.

In general "m" may be or may not be equal to "x" and "n" may be or may not be equal to "y". Also in general, "m" may be or may not be equal to "n" and "x" may be or may not be equal to "y".

Ring (slice 1, ring 1) has inlet links Ri(1,1,1) and Ri(1,1,2) from the left-hand side, and has outlet links Bo(1,1,1) and Bo(1,1,2) from left-hand side. Ring (slice 1, ring 1) also has inlet links Ui(1,1,2m+1) and Ui(1,1,2m+2) from the right-hand side, and has outlet links Fo(1,1,2m+1) and Fo(1,1,2m+2) from right-hand side. Ring (slice 1, ring 2) has inlet links Ri(1,2,1) and Ri(1,2,2) from left-hand side, and outlet links Bo(1,2,1) and Bo(1,2,2) from left-hand side. Ring (slice 1, ring 2) also has inlet links Ui(1,2,2n+1) and Ui(1,2,2n+2) from the right-hand side, and has outlet links Fo(1,2,2n+1) and Fo(1,2,2n+2) from right-hand side.

Ring (slice 2, ring 1) has inlet links Ri(2,1,1) and Ri(2,1,2) from the left-hand side, and has outlet links Bo(2,1,1) and Bo(2,1,2) from left-hand side. Ring (slice 2, ring 1) also has inlet links Ui(2,1,2x+1) and Ui(2,1,2x+2) from the right-hand side, and has outlet links Fo(2,1,2x+1) and Fo(2,1,2x+2) from right-hand side. Ring (slice 2, ring 2) has inlet links Ri(2,2,1) and Ri(2,2,2) from left-hand side, and outlet links Bo(2,2,1) and Bo(2,2,2) from left-hand side. Ring (slice 2, ring 2) also has inlet links Ui(2,2,2y+1) and Ui(2,2,2y+2) from the right-hand side, and has outlet links Fo(2,2,2y+1) and Fo(2,2,2y+2) from right-hand side.

And the partial multi-stage hierarchical network $V_{Comb}$ ($N_1$, $N_2$,d,s) 100C consists of 16 inlet links and 4 outlet links corresponding to the two slices slice 1 and slice 2. From left-hand side, outlet link O1 of the computational block is connected to inlet link Ri(1,1,1) of ring (slice 1, ring 1) and also inlet link of Ri(1,2,1) of ring (slice 1, ring 2). Similarly from left-hand side, outlet link O2 of the computational block is connected to inlet link Ri(1,1,2) of Ring (slice 1, ring 1) and also inlet link of Ri(1,2,2) of Ring (slice 1, ring 2). And from left-hand side, outlet link Bo(1,1,1) of Ring (slice 1, ring 1) is connected to inlet link I1 of the computational block. From left-hand side, Outlet link Bo(1,1,2) of Ring (slice 1, ring 1) is connected to inlet link I2 of the computational block. Similarly from left-hand side, outlet link Bo(1,2,1) of Ring (slice 1, ring 2) is connected to inlet link I3 of the computational block. From left-hand side, outlet link Bo(1,2,2) of Ring (slice 1, ring 2) is connected to inlet link I4 of the computational block.

From right-hand side, outlet link O1 of the computational block is connected to inlet link Ui(1,1,2m+1) of ring (slice 1, ring 1) and also inlet link of Ui(1,2,2n+1) of ring (slice 1, ring 2). Similarly from right-hand side, outlet link O2 of the computational block is connected to inlet link Ui(1,1,2m+2) of Ring (slice 1, ring 1) and also inlet link of Ui(1,2,2n+2) of Ring (slice 1, ring 2). And from right-hand side, outlet link Fo(1,1,2m+1) of Ring (slice 1, ring 1) is connected to inlet link I5 of the computational block. From right-hand side, outlet link Fo(1,1,2m+2) of Ring (slice 1, ring 1) is connected to inlet link I6 of the computational block. Similarly from right-hand side, outlet link Fo(1,2,2n+1) of Ring (slice 1, ring 2) is connected to inlet link I7 of the computational block. From right-hand side, outlet link Fo(1,2,2n+2) of Ring (slice 1, ring 2) is connected to inlet link I8 of the computational block.

From left-hand side, outlet link O3 of the computational block is connected to inlet link Ri(2,1,1) of ring (slice 2, ring 1) and also inlet link of Ri(2,2,1) of ring (slice 2, ring 2). Similarly from left-hand side, outlet link O4 of the computational block is connected to inlet link Ri(2,1,2) of Ring (slice 2, ring 1) and also inlet link of Ri(2,2,2) of Ring (slice 2, ring 2). And from left-hand side, outlet link Bo(2,1,1) of Ring (slice 2, ring 1) is connected to inlet link I9 of the computational block. From left-hand side, Outlet link Bo(2,1,2) of Ring (slice 2, ring 1) is connected to inlet link I10 of the computational block. Similarly from left-hand side, outlet link Bo(2,2,1) of Ring (slice 2, ring 2) is connected to inlet link I11 of the computational block. From left-hand side, outlet link Bo(2,2,2) of Ring (slice 2, ring 2) is connected to inlet link I12 of the computational block.

From right-hand side, outlet link O3 of the computational block is connected to inlet link Ui(2,1,2x+1) of ring (slice 2, ring 1) and also inlet link of Ui(2,2,2y+1) of ring (slice 2, ring 2). Similarly from right-hand side, outlet link O4 of the computational block is connected to inlet link Ui(2,1,2x+2) of Ring (slice 2, ring 1) and also inlet link of Ui(2,2,2y+2) of Ring (slice 2, ring 2). And from right-hand side, outlet link Fo(2,1,2x+1) of Ring (slice 2, ring 1) is connected to inlet link I13 of the computational block. From right-hand side, outlet link Fo(2,1,2x+2) of Ring (slice 2, ring 1) is connected to inlet link I14 of the computational block. Similarly from right-hand side, outlet link Fo(2,2,2y+1) of Ring (slice 2, ring 2) is connected to inlet link I15 of the computational block. From right-hand side, outlet link Fo(2,2,2y+2) of Ring (slice 2, ring 2) is connected to inlet link I16 of the computational block.

In this embodiment outlet links O1 and O2 of the computational block are connected only to slice 1. Similarly outlet links O3 and O4 of the computational block are connected only to slice 2.

Referring to two dimensional grid 800 in FIG. 8 illustrates, in another embodiment, each block of 2D-grid 800 consists of one of the partial multi-stage hierarchical network $V_{Comb}$($N_1$, $N_2$,d,s) 100C with 4 inlet links and 16 outlet links and the corresponding computational block with 16 inlet links and 4 outlet links. For example block (1,1) of 2D-grid 800 consists of one of the partial multi-stage hierarchical network $V_{Comb}$($N_1$, $N_2$,d,s) 100C with 4 inlet links and 16 outlet links and the corresponding computational block with 16 inlet links and 4 outlet links. Similarly each of the 100 blocks of 2D-grid 800 has a separate partial multi-stage hierarchical network $V_{Comb}$($N_1$, $N_2$,d,s) 100C with 4 inlet links and 16 outlet links and the corresponding computational block with 16 inlet links and 4 outlet links. Hence the complete multi-stage hierarchical network $V_{Comb}$ ($N_1$, $N_2$,d,s) corresponding to 2D-grid 800 has $N_1$=400 inlet links and $N_2$=1600 outlet links. Since there are 100 computational blocks each one corresponding to one of the blocks with each computational block having 16 inlet links and 4 outlet links. Also the 2D-grid 800 is organized in the fourth quadrant of the 2D-Plane. In other embodiments the 2D-grid 800 may be organized as either first quadrant, or second quadrant or third quadrant of the 2D-Plane.

Referring to partial multi-stage hierarchical network $V_{Comb}(N_1, N_2,d,s)$ 100C in FIG. 1C, the stage (slice 1, ring 1, stage 0) consists of 8 inputs namely Ri(1,1,1), Ri(1,1,2), Ui(1,1,1), Ui(1,1,2), J(1,1,1), K(1,1,1), L(1,1,1), and M(1,1,1); and 4 outputs Bo(1,1,1), Bo(1,1,2), Fo(1,1,1), and Fo(1,1,2). The stage (slice 1, ring "1", stage "0") also consists of four 4:1 Muxes namely F(1,1,1), F(1,1,2), B(1,1,1), and B(1,1,2). The 4:1 Mux F(1,1,1) has four inputs namely Ri(1,1,1), Ri(1,1,2), Ui(1,1,2), and J(1,1,1), and has one output Fo(1,1,1). The 4:1 Mux F(1,1,2) has four inputs namely Ri(1,1,1), Ri(1,1,2), Ui(1,1,1), and K(1,1,1), and has one output Fo(1,1,2).

The 4:1 Mux B(1,1,1) has four inputs namely Ui(1,1,1), Ui(1,1,2), Ri(1,1,2), and L(1,1,1), and has one output Bo(1,1,1). The 4:1 Mux B(1,1,2) has four inputs namely Ui(1,1,1), Ui(1,1,2), Ri(1,1,1) and M(1,1,1), and has one output Bo(1,1,2). In different embodiments the inputs J(1,1,1), K(1,1,1), L(1,1,1), and M(1,1,1) are connected from any of the outputs of any other stages of any ring of any block of the multi-stage hierarchical network $V_{comb}(N_1, N_2,d,s)$.

The stage (slice 1, ring 1, stage "m") consists of 8 inputs namely Ri(1,1,2m+1), Ri(1,1,2m+2), Ui(1,1,2m+1), Ui(1,1,2m+2), J(1,1,m+1), K(1,1,m+1), L(1,1,m+1), and M(1,1,m+1); and 4 outputs Bo(1,1,2m+1), Bo(1,1,2m+2), Fo(1,1,2m+1), and Fo(1,1,2m+2). The stage (slice 1, ring 1, stage "m") also consists of four 4:1 Muxes namely F(1,1,2m+1), F(1,1,2m+2), B(1,1,2m+1), and B(1,1,2m+2). The 4:1 Mux F(1,1,2m+1) has four inputs namely Ri(1,1,2m+1), Ri(1,1,2m+2), Ui(1,1,2m+2), and J(1,1,m+1), and has one output Fo(1,1,2m+1). The 4:1 Mux F(1,1,2m+2) has four inputs namely Ri(1,1,2m+1), Ri(1,1,2m+2), Ui(1,1,2m+1), and K(1,1,m+1), and has one output Fo(1,1,2m+2).

The 4:1 Mux B(1,1,2m+1) has four inputs namely Ui(1,1,2m+1), Ui(1,1,2m+2), Ri(1,1,2m+2), and L(1,1,m+1), and has one output Bo(1,1,2m+1). The 4:1 Mux B(1,1,2m+2) has four inputs namely Ui(1,1,2m+1), Ui(1,1,2m+2), Ri(1,1,2m+1) and M(1,1,m+1), and has one output Bo(1,1,2m+2). In different embodiments the inputs J(1,1,m+1), K(1,1,m+1), L(1,1,m+1), and M(1,1,m+1) are connected from any of the outputs of any other stages of any ring of any block of the multi-stage hierarchical network $V_{Comb}(N_1, N_2,d,s)$.

Just the same way the stage (slice 1, ring 1, stage 0), there are also stages (slice 1, ring 1, stage 1), (slice 1, ring 1, stage 2), (slice 1, ring 1, stage 3), . . . (slice 1, ring 1, stage "m−1"), (slice 1, ring 1, stage "m") in that order, where the stages from (slice 1, ring 1, stage 1), (slice 1, ring 1, stage 2), . . . , (slice 1, ring 1, stage "m−1") are not shown in the diagram 100C.

Referring to diagram 100C in FIG. 1C5 illustrates specific details of partial multi-stage hierarchical network $V_{Comb}(N_1, N_2,d,s)$ 100C in FIG. 1C, particularly the internal connections between two successive stages of any ring of any slice, in one embodiment. The stage (slice "c", ring "d", stage "e") consists of 8 inputs namely Ri(c,d, 2e+1), Ri(c,d, 2e+2), Ui(c,d, 2e+1), Ui(c,d, 2e+2), J(c, d, e+1), K(c, d, e+1), L(c, d, e+1), and M(c, d, e+1); and 4 outputs Bo(c,d, 2e+1), Bo(c,d, 2e+2), Fo(c,d, 2e+1), and Fo(c,d, 2e+2). The stage (slice "c", ring "d", stage "e") also consists of four 4:1 Muxes namely F(c,d, 2e+1), F(c,d, 2e+2), B(c,d, 2e+1), and B(c,d, 2e+2). The 4:1 Mux F(c,d, 2e+1) has four inputs namely Ri(c,d, 2e+1), Ri(c,d, 2e+2), Ui(c,d, 2e+2), and J(c, d, e+1), and has one output Fo(c,d, 2e+1). The 4:1 Mux F(c,d, 2e+2) has four inputs namely Ri(c,d, 2e+1), Ri(c,d, 2e+2), Ui(c,d, 2e+1), and K(c, d, e+1), and has one output Fo(c,d, 2e+2).

The 4:1 Mux B(c,d, 2e+1) has four inputs namely Ui(c,d, 2e+1), Ui(c,d, 2e+2), Ri(c,d, 2e+2), and L(c, d, e+1), and has one output Bo(c,d, 2e+1). The 4:1 Mux B(c,d, 2e+2) has four inputs namely Ui(c,d, 2e+1), Ui(c,d, 2e+2), Ri(c,d, 2e+1) and M(c, d, e+1), and has one output Bo(c,d, 2e+2). In different embodiments the inputs J(c, d, e+1), K(c, d, e+1), L(c, d, e+1), and M(c, d, e+1) are connected from any of the outputs of any other stages of any ring of any block of the multi-stage hierarchical network $V_{comb}(N_1, N_2,d,s)$.

The stage (slice "c", ring "d", stage "e+1") consists of 8 inputs namely Ri(c,d, 2e+3), Ri(c,d, 2e+4), Ui(c,d, 2e+3), Ui(c,d, 2e+4), J(c, d, e+2), K(c, d, e+2), L(c, d, e+2), and M(c, d, e+2); and 4 outputs Bo(c,d, 2e+3), Bo(c,d, 2e+4), Fo(c,d, 2e+3), and Fo(c,d, 2e+4). The stage (slice "c", ring "d", stage "e+1") also consists of four 4:1 Muxes namely F(c,d, 2e+3), F(c,d, 2e+4), B(c,d, 2e+3), and B(c,d, 2e+4). The 4:1 Mux F(c,d, 2e+3) has four inputs namely Ri(c,d, 2e+3), Ri(c,d, 2e+4), Ui(c,d, 2e+4), and J(c, d, e+2), and has one output Fo(c,d, 2e+3). The 4:1 Mux F(c,d, 2e+4) has four inputs namely Ri(c,d, 2e+3), Ri(c,d, 2e+4), Ui(c,d, 2e+3), and K(c, d, e+2), and has one output Fo(c,d, 2e+4).

The 4:1 Mux B(c,d, 2e+3) has four inputs namely Ui(c,d, 2e+3), Ui(c,d, 2e+4), Ri(c,d, 2e+4), and L(c, d, e+2), and has one output Bo(c,d, 2e+3). The 4:1 Mux B(c,d, 2e+4) has four inputs namely Ui(c,d, 2e+3), Ui(c,d, 2e+4), Ri(c,d, 2e+3) and M(c, d, e+2), and has one output Bo(c,d, 2e+4). In different embodiments the inputs J(c, d, e+2), K(c, d, e+2), L(c, d, e+2), and M(c, d, e+2) are connected from any of the outputs of any other stages of any ring of any block of the multi-stage hierarchical network $V_{comb}(N_1, N_2,d,s)$.

The output Fo(c,d, 2e+1) of the stage (slice "c", ring "d", stage "e") is connected to the input Ri(c,d, 2e+3) of the stage (slice "c", ring "d", stage "e+1") which is called hereinafter an internal connection between two successive stages of a ring. And the output Bo(c,d, 2e+3) of the stage (slice "c", ring "d", stage "e+1") is connected to the input Ui(c,d, 2e+1) of the stage (slice "c", ring "d", stage "e"), is another internal connection between stage "e" and stage "e+1" of the ring (slice "c", ring "d").

Just the same way the two successive stages (slice "c", ring "d", stage "e") and (slice "c", ring "d", stage "e+1") have internal connections between them as described above, any two successive stages have similar internal connections for any values of "c", "d", "e" of the partial multi-stage hierarchical network $V_{Comb}(N_1, N_2, d, s)$ 100C in FIG. 1C belonging to any block of the two dimensional grid 800 in FIG. 8, in some embodiments. For example stage (slice 1, ring 1, stage 0) and stage (slice 1, ring 1, stage 1) have similar internal connections; and stage (slice 1, ring 1, stage "m−1") and stage (slice 1, ring 1, stage "m") have similar internal connections.

Stage (slice 1, ring 1, stage 0) is also called hereinafter the "entry stage" or "first stage" of (slice 1, ring 1), since inlet links and outlet links of the computational block are directly connected to stage (slice 1, ring 1, stage 0). Also stage (slice 1, ring 1, stage "m") is hereinafter the "last stage" or "root stage" of (slice 1, ring 1).

The stage (slice 1, ring 2, stage 0) consists of 8 inputs namely Ri(1,2,1), Ri(1,2,2), Ui(1,2,1), Ui(1,2,2), J(1,2,1), K(1,2,1), L(1,2,1), and M(1,2,1); and 4 outputs Bo(1,2,1), Bo(1,2,2), Fo(1,2,1), and Fo(1,2,2). The stage (slice 1, ring "2", stage "0") also consists of four 4:1 Muxes namely F(1,2,1), F(1,2,2), B(1,2,1), and B(1,2,2). The 4:1 Mux F(1,2,1) has four inputs namely Ri(1,2,1), Ri(1,2,2), Ui(1,2,2), and J(1,2,1), and has one output Fo(1,2,1). The 4:1 Mux F(1,2,2) has four inputs namely Ri(1,2,1), Ri(1,2,2), Ui(1,2,1), and K(1,2,1), and has one output Fo(1,2,2).

The 4:1 Mux B(1,2,1) has four inputs namely Ui(1,2,1), Ui(1,2,2), Ri(1,2,2), and L(1,2,1), and has one output Bo(1,2,1). The 4:1 Mux B(1,2,2) has four inputs namely Ui(1,2,1), Ui(1,2,2), Ri(1,2,1) and M(1,2,1), and has one output Bo(1,2,2). In different embodiments the inputs J(1,2,1), K(1,2,1), L(1,2,1), and M(1,2,1) are connected from any of the outputs of any other stages of any ring of any block of the multi-stage hierarchical network $V_{Comb}(N_1, N_2,d,s)$.

The stage (slice 1, ring 2, stage "n") consists of 8 inputs namely Ri(1,2,2n+1), Ri(1,2,2n+2), Ui(1,2,2n+1), Ui(1,2,2n+2), J(1,2,n+1), K(1,2,n+1), L(1,2,n+1), and M(1,2,n+1); and 4 outputs Bo(1,2,2n+1), Bo(1,2,2n+2), Fo(1,2,2n+1), and Fo(1,2,2n+2).

The stage (slice 1, ring 2, stage "n") also consists of four 4:1 Muxes namely F(1,2,2n+1), F(1,2,2n+2), B(1,2,2n+1), and B(1,2,2n+2). The 4:1 Mux F(1,2,2n+1) has four inputs namely Ri(1,2,2n+1), Ri(1,2,2n+2), Ui(1,2,2n+2), and J(1,2,n+1), and has one output Fo(1,2,2n+1). The 4:1 Mux F(1,2,2n+2) has four inputs namely Ri(1,2,2n+1), Ri(1,2,2n+2), Ui(1,2,2n+1), and K(1,2,n+1), and has one output Fo(1,2,2n+2).

The 4:1 Mux B(1,2,2n+1) has four inputs namely Ui(1,2,n+1), Ui(1,2,2n+2), Ri(1,2,2n+2), and L(1,2,n+1), and has one output Bo(1,2,2n+1). The 4:1 Mux B(1,2,2n+2) has four inputs namely Ui(1,2,2n+1), Ui(1,2,2n+2), Ri(1,2,2n+1) and M(1,2,n+1), and has one output Bo(1,2,2n+2). In different embodiments the inputs J(1,2,n+1), K(1,2,n+1), L(1,2,n+1), and M(1,2,n+1) are connected from any of the outputs of any other stages of any ring of any block of the multi-stage hierarchical network $V_{comb}(N_1, N_2,d,s)$.

Just the same way the stage (slice 1, ring 2, stage 0), there are also stages (slice 1, ring 2, stage 1), (slice 1, ring 2, stage 2), (slice 1, ring 2, stage 3), . . . (slice 1, ring 2, stage "n−1"), (slice 1, ring 2, stage "n") in that order, where the stages from (slice 1, ring 2, stage 1), (slice 1, ring 2, stage 2), . . . , (slice 1, ring 2, stage "n−1") are not shown in the diagram 100C.

The stage (slice 2, ring 1, stage 0) consists of 8 inputs namely Ri(2,1,1), Ri(2,1,2), Ui(2,1,1), Ui(2,1,2), J(2,1,1), K(2,1,1), L(2,1,1), and M(2,1,1); and 4 outputs Bo(2,1,1), Bo(2,1,2), Fo(2,1,1), and Fo(2,1,2). The stage (slice 2, ring "1", stage "0") also consists of four 4:1 Muxes namely F(2,1,1), F(2,1,2), B(2,1,1), and B(2,1,2). The 4:1 Mux F(2,1,1) has four inputs namely Ri(2,1,1), Ri(2,1,2), Ui(2,1,2), and J(2,1,1), and has one output Fo(2,1,1). The 4:1 Mux F(2,1,2) has four inputs namely Ri(2,1,1), Ri(2,1,2), Ui(2,1,1), and K(2,1,1), and has one output Fo(2,1,2).

The 4:1 Mux B(2,1,1) has four inputs namely Ui(2,1,1), Ui(2,1,2), Ri(2,1,2), and L(2,1,1), and has one output Bo(2,1,1). The 4:1 Mux B(2,1,2) has four inputs namely Ui(2,1,1), Ui(2,1,2), Ri(2,1,1) and M(2,1,1), and has one output Bo(2,1,2). In different embodiments the inputs J(2,1,1), K(2,1,1), L(2,1,1), and M(2,1,1) are connected from any of the outputs of any other stages of any ring of any block of the multi-stage hierarchical network $V_{Comb}(N_1, N_2,d,s)$.

The stage (slice 2, ring 1, stage "x") consists of 8 inputs namely Ri(2,1,2x+1), Ri(2,1,2x+2), Ui(2,1,2x+1), Ui(2,1,2x+2), J(2,1,x+1), K(2,1,x+1), L(2,1,x+1), and M(2,1,x+1); and 4 outputs Bo(2,1,2x+1), Bo(2,1,2x+2), Fo(2,1,2x+1), and Fo(2,1,2x+2). The stage (slice 2, ring 1, stage "x") also consists of four 4:1 Muxes namely F(2,1,2x+1), F(2,1,2x+2), B(2,1,2x+1), and B(2,1,2x+2). The 4:1 Mux F(2,1,2x+1) has four inputs namely Ri(2,1,2x+1), Ri(2,1,2x+2), Ui(2,1,2x+2), and J(2,1,x+1), and has one output Fo(2,1,2x+1). The 4:1 Mux F(2,1,2x+2) has four inputs namely Ri(2,1,2x+1), Ri(2,1,2x+2), Ui(2,1,2x+1), and K(2,1,x+1), and has one output Fo(2,1,2x+2).

The 4:1 Mux B(2,1,2x+1) has four inputs namely Ui(2,1,2x+1), Ui(2,1,2x+2), Ri(2,1,2x+2), and L(2,1,x+1), and has one output Bo(2,1,2x+1). The 4:1 Mux B(2,1,2x+2) has four inputs namely Ui(2,1,2x+1), Ui(2,1,2x+2), Ri(2,1,2x+1) and M(2,1,x+1), and has one output Bo(2,1,2x+2). In different embodiments the inputs J(2,1,x+1), K(2,1,x+1), L(2,1,x+1), and M(2,1,x+1) are connected from any of the outputs of any other stages of any ring of any block of the multi-stage hierarchical network $V_{Comb}(N_1, N_2,d,s)$.

Just the same way the stage (slice 2, ring 1, stage 0), there are also stages (slice 2, ring 1, stage 1), (slice 2, ring 1, stage 2), (slice 2, ring 1, stage 3), . . . (slice 2, ring 1, stage "m−1"), (slice 2, ring 1, stage "x") in that order, where the stages from (slice 2, ring 1, stage 1), (slice 2, ring 1, stage 2), . . . , (slice 2, ring 1, stage "x−1") are not shown in the diagram 100C.

The stage (slice 2, ring 2, stage 0) consists of 8 inputs namely Ri(2,2,1), Ri(2,2,2), Ui(2,2,1), Ui(2,2,2), J(2,2,1), K(2,2,1), L(2,2,1), and M(2,2,1); and 4 outputs Bo(2,2,1), Bo(2,2,2), Fo(2,2,1), and Fo(2,2,2). The stage (slice 2, ring "2", stage "0") also consists of four 4:1 Muxes namely F(2,2,1), F(2,2,2), B(2,2,1), and B(2,2,2). The 4:1 Mux F(2,2,1) has four inputs namely Ri(2,2,1), Ri(2,2,2), Ui(2,2,2), and J(2,2,1), and has one output Fo(2,2,1). The 4:1 Mux F(2,2,2) has four inputs namely Ri(2,2,1), Ri(2,2,2), Ui(2,2,1), and K(2,2,1), and has one output Fo(2,2,2).

The 4:1 Mux B(2,2,1) has four inputs namely Ui(2,2,1), Ui(2,2,2), Ri(2,2,2), and L(2,2,1), and has one output Bo(2,2,1). The 4:1 Mux B(2,2,2) has four inputs namely Ui(2,2,1), Ui(2,2,2), Ri(2,2,1) and M(2,2,1), and has one output Bo(2,2,2). In different embodiments the inputs J(2,2,1), K(2,2,1), L(2,2,1), and M(2,2,1) are connected from any of the outputs of any other stages of any ring of any block of the multi-stage hierarchical network $V_{comb}(N_1, N_2,d,s)$.

The stage (slice 2, ring 2, stage "x") consists of 8 inputs namely Ri(2,2,2x+1), Ri(2,2,2x+2), Ui(2,2,2x+1), Ui(2,2,2x+2), J(2,2,x+1), K(2,2,x+1), L(2,2,x+1), and M(2,2,x+1); and 4 outputs Bo(2,2,2x+1), Bo(2,2,2x+2), Fo(2,2,2x+1), and Fo(2,2,2x+2).

The stage (slice 2, ring 2, stage "y") also consists of four 4:1 Muxes namely F(2,2,2y+1), F(2,2,2y+2), B(2,2,2y+1), and B(2,2,2y+2). The 4:1 Mux F(2,2,2y+1) has four inputs namely Ri(2,2,2y+1), Ri(2,2,2y+2), Ui(2,2,2y+2), and J(2,2,y+1), and has one output Fo(2,2,2y+1). The 4:1 Mux F(2,2,2y+2) has four inputs namely Ri(2,2,2y+1), Ri(2,2,2y+2), Ui(2,2,2y+1), and K(2,2,y+1), and has one output Fo(2,2,2y+2).

The 4:1 Mux B(2,2,2y+1) has four inputs namely Ui(2,2,2y+1), Ui(2,2,2y+2), Ri(2,2,2y+2), and L(2,2,y+1), and has one output Bo(2,2,2y+1). The 4:1 Mux B(2,2,2y+2) has four inputs namely Ui(2,2,2y+1), Ui(2,2,2y+2), Ri(2,2,2y+1) and M(2,2,y+1), and has one output Bo(2,2,2y+2). In different embodiments the inputs J(2,2,y+1), K(2,2,y+1), L(2,2,y+1), and M(2,2,y+1) are connected from any of the outputs of any other stages of any ring of any block of the multi-stage hierarchical network $V_{Comb}(N_1, N_2,d,s)$.

Just the same way the stage (slice 2, ring 2, stage 0), there are also stages (slice 2, ring 2, stage 1), (slice 2, ring 2, stage 2), (slice 2, ring 2, stage 3), . . . (slice 2, ring 2, stage "y−1"), (slice 2, ring 2, stage "y") in that order, where the stages from (slice 2, ring 2, stage 1), (slice 2, ring 2, stage 2), . . . , (slice 2, ring 2, stage "y−1") are not shown in the diagram 100C.

As illustrated in diagram 1005C in FIG. 1C5, the similar internal connections between two successive stages of any ring of any slice of partial multi-stage hierarchical network $V_{Comb}(N_1, N_2,d,s)$ 100C in FIG. 1C, in some embodiments are provided for all the slices c=1, 2; for all the rings in each of the slices d=1, 2; and for all the stages namely when c=1, d=1, e=[1,m]; when c=1, d=2, e=[1,n]; when c=2, d=1, e=[1,x]; and when c=2, d=2; e=[1,y].

Each stage of any ring of the partial multi-stage hierarchical network $V_{Comb}(N_1, N_2,d,s)$ 100B consists of 2*d=4 outputs. Even though each stage has four 4:1 muxes, in other embodiments any of these stages can be one of the four by four switch diagrams namely 200A of FIG. 2A, 200B of FIG. 2B, 200C of FIG. 2C, and one of the eight by four switch diagrams namely 200E of FIG. 2E, 200F of FIG. 2F.

In general, any ring of the partial multi-stage hierarchical network $V_{Comb}(N_1, N_2,d,s)$ illustrated in 100C also may have inputs and outputs connected from computational block from either only from left-hand side as in the partial multi-stage hierarchical network $V_{comb}(N_1, N_2,d,s)$ 100A; or only from right-hand side; or from both left-hand and right-hand sides as in the partial multi-stage hierarchical network $V_{comb}(N_1, N_2,d,s)$ 100B.

Applicant now notes a few aspects of the diagram 100C in FIG. 1C an exemplary partial multi-stage hierarchical network $V_{comb}(N_1, N_2,d,s)$ corresponding to one computational block, with each computational block having 16 inlet links and 4 outlet links as follows: (Also these aspects are helpful in more optimization of the partial multi-stage hierarchical network $V_{Comb}(N_1, N_2,d,s)$ as well as faster scheduling of the connections between outlet links of the computational blocks and the inlet links of the computational blocks.)

1) The partial multi-stage hierarchical network $V_{comb}((N_1, N_2,d,s)$ 100C in FIG. 1C is divided into two slices namely slice 1 and slice 2. The outlet links of the computational block namely O1 and O2 are connected to only one slice i.e. slice 1. In other words outlet links O1 and O2 are absolutely not connected to slice 2. Similarly the outlet links of the computational block namely O3 and O4 are connected to only one slice i.e. slice 2. In other words outlet links O3 and O4 are absolutely not connected to slice 1. 2) The second aspect is all the hop wires and multi-drop hop wires originating from slice 1 from any block will be terminating only in the slice 1 of any other block. Similarly all the hop wires and multi-drop hop wires originating from slice 2 from any block will be terminating only in the slice 2 of any other block. 3) The third aspect is the mux whose output is directly connected to each inlet link of the computational block must have at least one input connected from each slice of the partial multi-stage hierarchical network $V_{comb}(N_1, N_2,d,s)$ 100C. That is for example since the 4:1 mux B(1,1,1), belonging to slice 1, and having its output Bo(1,1,1) directly connected to inlet link I1 must have at least one of its inputs connecting from an output of a mux of a stage of a ring of slice 2 as well. This property must be satisfied for all the inlet links of the partial multi-stage hierarchical network $V_{comb}(N_1, N_2,d,s)$ 100C.

Referring to diagram 100C1 in FIG. 1C1, diagram 100C2 in FIG. 1C2, diagram 100C3 in FIG. 1C3, and diagram 100C4 in FIG. 1C4 illustrate the details of the foregoing third aspect of the partial multi-stage hierarchical network $V_{Comb}(N_1, N_2,d,s)$ 100C of FIG. 1C. Applicant notes that diagram 100C1 in FIG. 1C1, diagram 100C2 in FIG. 1C2, diagram 100C3 in FIG. 1C3, and diagram 100C4 in FIG. 1C4 are all actually part of the partial multi-stage hierarchical network $V_{Comb}(N_1, N_2,d,s)$ 100C of FIG. 1C and these separate diagrams are necessary only to avoid the clutter in the diagram 100C of FIG. 1C.

The connections illustrated between different slices in diagram 100C1 in FIG. 1C1, diagram 100C2 in FIG. 1C2, diagram 100C3 in FIG. 1C3, and diagram 100C4 in FIG. 1C4 are the only connections between different slices, in some exemplary embodiments. In general the connections between different slices are given only at the terminating muxes i.e. whose outputs are directly connected to one of the inlet links of the computational block.

Referring to diagram 100C1 in FIG. 1C1 illustrate the connections between the stage (slice 1, ring 1, stage 0) and between the stage (slice 2, ring 1, stage 0). The same connection that is given to the input Ui(1,1,1) is also connected to the input L(2,1,1). The same connection that is given to the input Ui(1,1,2) is also connected to the input M(2,1,1). Similarly the same connection that is given to the input Ui(2,1,1) is also connected to the input L(1,1,1). The same connection that is given to the input Ui(2,1,2) is also connected to the input M(1,1,1).

Therefore inlet link I1 can be essentially connected through the 4:1 mux B(1,1,1) with three of its inputs connecting from slice 1 namely Ui(1,1,1), Ui(1,1,2), Ri(1,1,2) and one input L(1,1,1) connecting from slice 2. The inlet link I2 can be essentially connected through the 4:1 mux B(1,1,2) with three of its inputs connecting from slice 1 namely Ui(1,1,1), Ui(1,1,2), Ri(1,1,1) and one input M(1,1,1) connecting from slice 2. The inlet link I9 can be essentially connected through the 4:1 mux B(1,2,1) with three of its inputs connecting from slice 2 namely Ui(2,1,1), Ui(2,1,2), Ri(2,1,2) and one input L(2,1,1) connecting from slice 1. The inlet link I10 can be essentially connected through the 4:1 mux B(2,1,2) with three of its inputs connecting from slice 2 namely Ui(2,1,1), Ui(2,1,2), Ri(2,1,1) and one input M(2,1,1) connecting from slice 1. Hence all the inlet links I1, I2, I9 and I10 are all independently reachable from both slice 1 and slice2.

Referring to diagram 100C2 in FIG. 1C2 illustrate the connections between the stage (slice 1, ring 2, stage 0) and between the stage (slice 2, ring 2, stage 0). The same connection that is given to the input Ui(1,2,1) is also connected to the input M(2,2,1). The same connection that is given to the input Ui(1,2,2) is also connected to the input L(2,2,1). Similarly the same connection that is given to the input Ui(2,2,1) is also connected to the input M(1,2,1). The same connection that is given to the input Ui(2,2,2) is also connected to the input L(1,2,1).

Therefore inlet link I3 can be essentially connected through the 4:1 mux B(1,2,1) with three of its inputs connecting from slice 1 namely Ui(1,2,1), Ui(1,2,2), Ri(1,2,2) and one input M(2,2,1) connecting from slice 2. The inlet link I4 can be essentially connected through the 4:1 mux B(1,2,2) with three of its inputs connecting from slice 1 namely Ui(1,2,1), Ui(1,2,2), Ri(1,2,1) and one input M(1,2,1) connecting from slice 2. The inlet link I11 can be essentially connected through the 4:1 mux B(2,2,1) with three of its inputs connecting from slice 2 namely Ui(2,2,1), Ui(2,2,2), Ri(2,2,2) and one input L(2,2,1) connecting from slice 1. The inlet link I12 can be essentially connected through the 4:1 mux B(2,2,2) with three of its inputs connecting from slice 2 namely Ui(2,2,1), Ui(2,2,2), Ri(2,2,1) and one input M(2,2,1) connecting from slice 1. Hence all the inlet links I3, I4, I11 and I12 are all independently reachable from both slice 1 and slice2.

Referring to diagram 100C3 in FIG. 1C3 illustrate the connections between the stage (slice 1, ring 1, stage "m") and between the stage (slice 2, ring 2, stage "y"). The same connection that is given to the input Ri(1,1,2m+1) is also connected to the input J(2,2,y+1). The same connection that is given to the input Ri(1,1,2m+2) is also connected to the input K(2,2,y+1). Similarly the same connection that is given to the input Ri(2,2,2y+1) is also connected to the input J(1,1,m+1). The same connection that is given to the input Ri(2,2,2y+2) is also connected to the input K(1,1,m+1).

Therefore inlet link I5 can be essentially connected through the 4:1 mux F(1,1,2m+1) with three of its inputs connecting from slice 1 namely Ri(1,1,2m+1), Ri(1,1,2m+2), Ui(1,1,2m+2) and one input J(1,1,m+1) connecting from slice 2. The inlet link I6 can be essentially connected through the 4:1 mux F(1,1,2m+2) with three of its inputs connecting from slice 1 namely Ri(1,1,2m+1), Ri(1,1,2m+2),Ui(1,1,2m+1) and one input K(1,1,m+1) connecting from slice 2. The inlet link I15 can be essentially connected through the 4:1 mux F(2,2,2y+1) with three of its inputs connecting from slice 2 namely Ri(2,2,2y+1), Ri(2,2,2y+2), Ui(2,2,2y+2) and one input J(2,2,y+1) connecting from slice 1. The inlet link I16 can be essentially connected through the 4:1 mux F(2,2,2y+2) with three of its inputs connecting from slice 2 namely Ri(2,2,2y+1), Ri(2,2,2y+2), Ui(2,2,2y+1) and one input K(2,2,y+1) connecting from slice 1. Hence all the inlet links I5, 16, 115 and 116 are all independently reachable from both slice 1 and slice2.

Referring to diagram 100C4 in FIG. 1C4 illustrate the connections between the stage (slice 1, ring 2, stage "n") and between the stage (slice 2, ring 1, stage "x"). The same connection that is given to the input Ri(1,2,2n+1) is also connected to the input K(2,1,x+1). The same connection that is given to the input Ri(1,2,2n+2) is also connected to the input J(2,1,x+1). Similarly the same connection that is given to the input Ri(2,1,2x+1) is also connected to the input K(1,2,n+1). The same connection that is given to the input Ri(2,1,2x+2) is also connected to the input J(1,2,n+1).

Therefore inlet link I7 can be essentially connected through the 4:1 mux F(1,2,2n+1) with three of its inputs connecting from slice 1 namely Ri(1,2,2n+1), Ri(1,2,2n+2), Ui(1,2,2n+2) and one input J(1,2,n+1) connecting from slice 2. The inlet link I8 can be essentially connected through the 4:1 mux F(1,2,2n+2) with three of its inputs connecting from slice 1 namely Ri(1,2,2n+1), Ri(1,2,2n+2),Ui(1,2,2n+1) and one input K(1,2,n+1) connecting from slice 2. The inlet link I13 can be essentially connected through the 4:1 mux F(2,1,2x+1) with three of its inputs connecting from slice 2 namely Ri(2,1,2x+1), Ri(2,1,2x+2), Ui(2,1,2x+2) and one input J(2,1,x+1) connecting from slice 1. The inlet link I14 can be essentially connected through the 4:1 mux F(2,1,2x+2) with three of its inputs connecting from slice 2 namely Ri(2,1,2x+1), Ri(2,1,2x+2), Ui(2,1,2x+1) and one input K(2,1,x+1) connecting from slice 1. Hence all the inlet links I7, I8, I13 and I14 are all independently reachable from both slice 1 and slice2.

The connections illustrated between different slices, in several embodiments, in diagram 100C1 in FIG. 1C1, diagram 100C2 in FIG. 1C2, diagram 100C3 in FIG. 1C3, and diagram 100C4 in FIG. 1C4 are the only connections between different slices. And also the terminating muxes i.e. whose outputs are directly connected to one of the inlet links of the computational block have three inputs coming from one slice and one input coming from another slice. In other embodiments it is also possible so that the terminating muxes i.e. whose outputs are directly connected to one of the inlet links of the computational block have two inputs coming from one slice and two inputs coming from another slice.

Also in general the number of slices in the partial multi-stage hierarchical network $V_{Comb}(N_1, N_2,d,s)$ 100C of FIG. 1C may be more than or equal to two. In such a case terminating muxes i.e. whose outputs are directly connected to one of the inlet links of the computational block will have at least one input coming from each slice. And the outlet links of the computational block will be divided and connected to each slice; however each outlet link of the computational block will be connected to only one slice. Also in general the hop wires and multi-drop hop wires are connected to only between the corresponding slices of different blocks, in some embodiments some of the hop wires and multi-drop hop wires may be connected between different slices of different blocks even if it is done partially.

Figure 2A:
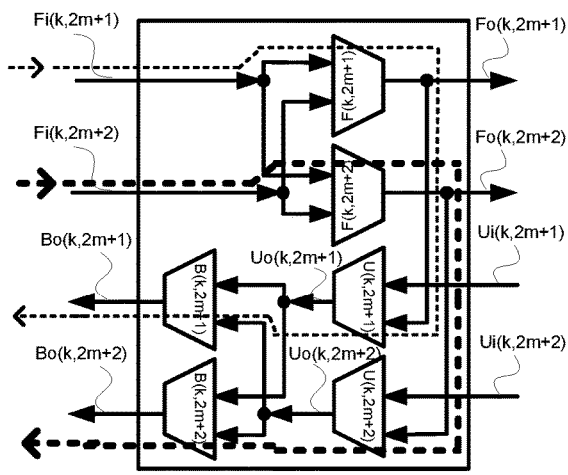
FIG. 2A is a diagram 200A, in an embodiment of, a stage in a ring of multi-stage hierarchical network corresponding to one block.

FIG. 2A illustrates a stage (ring "k", stage "m") 200A consists of 4 inputs namely Fi(k,2m+1), Fi(k,2m+2), Ui(k,2m+1), and Ui(k,2m+2); and 4 outputs Bo(k,2m+1), Bo(k,2m+2), Fo(k,2m+1), and Fo(k,2m+2). The stage (ring "k", stage "m") also consists of six 2:1 Muxes namely F(k,2m+1), F(k,2m+2) (comprising in combination a forward switch), U(k,2m+1), U(k,2m+2) (comprising in combination a U-turn switch), B(k,2m+1), and B(k,2m+2) (comprising in combination a backward switch). The 2:1 Mux F(k,2m+1) has two inputs namely Fi(k,2m+1) and Fi(k,2m+2) and has one output Fo(k,2m+1). The 2:1 Mux F(k,2m+2) has two inputs namely Fi(k,2m+1) and Fi(k,2m+2) and has one output Fo(k,2m+2).

The 2:1 Mux U(k,2m+1) has two inputs namely Ui(k,2m+1) and Fo(k,2m+1) and has one output Uo(k,2m+1). The 2:1 Mux U(k,2m+2) has two inputs namely Ui(k,2m+2) and Fo(k,2m+2) and has one output Uo(k,2m+2). The 2:1 Mux B(k,2m+1) has two inputs namely Uo(k,2m+1) and Uo(k,2m+2) and has one output Bo(k,2m+1). The 2:1 Mux B(k,2m+2) has two inputs namely Uo(k,2m+1) and Uo(k,2m+2) and has one output Bo(k,2m+2).

Figure 2B:
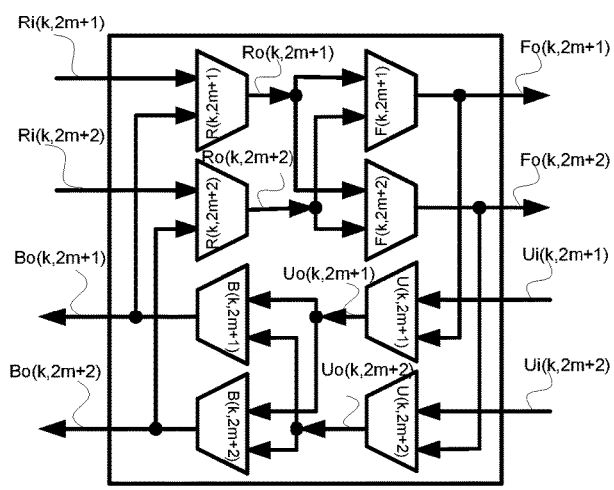
FIG. 2B is a diagram 200B, in an embodiment of, a stage in a ring of multi-stage hierarchical network corresponding to one block.

FIG. 2B illustrates a stage (ring "k", stage "m") 200B consists of 4 inputs namely Ri(k,2m+1), Ri(k,2m+2), Ui(k,2m+1), and Ui(k,2m+2); and 4 outputs Bo(k,2m+1), Bo(k,2m+2), Fo(k,2m+1), and Fo(k,2m+2). The stage (ring "k", stage "m") also consists of eight 2:1 Muxes namely R(k,2m+1), R(k,2m+2) (comprising in combination a Reverse U-turn switch), F(k,2m+1), F(k,2m+2) (comprising in combination a forward switch), U(k,2m+1), U(k,2m+2) (comprising in combination a U-turn switch), B(k,2m+1), and B(k,2m+2) (comprising in combination a backward switch). The 2:1 Mux R(k,2m+1) has two inputs namely Ri(k,2m+1) and Bo(k,2m+1) and has one output Ro(k,2m+1). The 2:1 Mux R(k,2m+2) has two inputs namely Ri(k,2m+2) and Bo(k,2m+2) and has one output Ro(k,2m+2). The 2:1 Mux F(k,2m+1) has two inputs namely Ro(k,2m+1) and Ro(k,2m+2) and has one output Fo(k,2m+1). The 2:1 Mux F(k,2m+2) has two inputs namely Ro(k,2m+1) and Ro(k,2m+2) and has one output Fo(k,2m+2).

The 2:1 Mux U(k,2m+1) has two inputs namely Ui(k,2m+1) and Fo(k,2m+1) and has one output Uo(k,2m+1). The 2:1 Mux U(k,2m+2) has two inputs namely Ui(k,2m+2) and Fo(k,2m+2) and has one output Uo(k,2m+2). The 2:1 Mux B(k,2m+1) has two inputs namely Uo(k,2m+1) and Uo(k,2m+2) and has one output Bo(k,2m+1). The 2:1 Mux B(k,2m+2) has two inputs namely Uo(k,2m+1) and Uo(k,2m+2) and has one output Bo(k,2m+2).

Figure 2C:
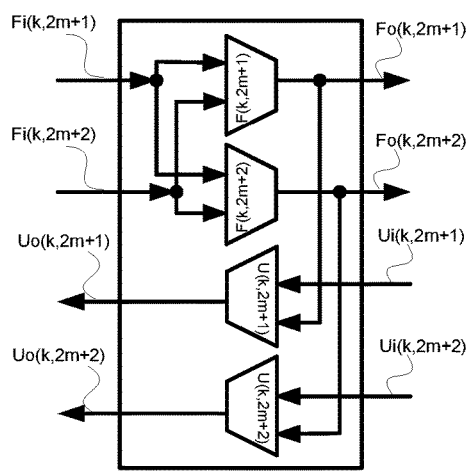
FIG. 2C is a diagram 200C, in an embodiment of, a stage in a ring of multi-stage hierarchical network corresponding to one block.

FIG. 2C illustrates a stage (ring "k", stage "m") 200C consists of 4 inputs namely Fi(k,2m+1), Fi(k,2m+2), Ui(k,2m+1), and Ui(k,2m+2); and 4 outputs Uo(k,2m+1), Uo(k,2m+2), Fo(k,2m+1), and Fo(k,2m+2). The stage (ring "k", stage "m") also consists of four 2:1 Muxes namely F(k,2m+1), F(k,2m+2) (comprising in combination a forward switch), U(k,2m+1), and U(k,2m+2) (comprising in combination a U-turn switch). The 2:1 Mux F(k,2m+1) has two inputs namely Fi(k,2m+1) and Fi(k,2m+2) and has one output Fo(k,2m+1). The 2:1 Mux F(k,2m+2) has two inputs namely Fi(k,2m+1) and Fi(k,2m+2) and has one output Fo(k,2m+2).

The 2:1 Mux U(k,2m+1) has two inputs namely Ui(k,2m+1) and Ui(k,2m+2) and has one output Uo(k,2m+1). The 2:1 Mux U(k,2m+2) has two inputs namely Ui(k,2m+1) and Ui(k,2m+2) and has one output Uo(k,2m+2).

Figure 2D:
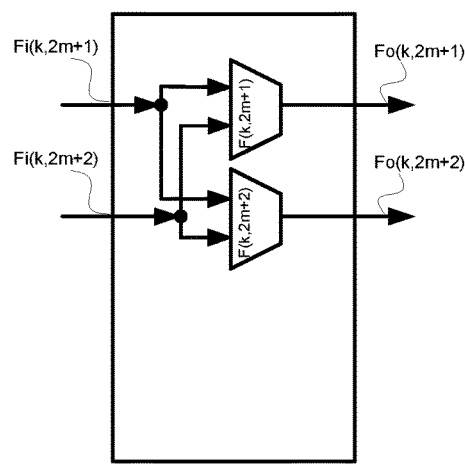
FIG. 2D is a diagram 200D, in an embodiment of, a stage in a ring of multi-stage hierarchical network corresponding to one block.

However the stage "m" of ring "k" with "m+1" stages of the partial multi-stage hierarchical network $V_{Comb}(N_1, N_2,d,s)$, in another embodiment, may have 2 inputs and 2 outputs as shown in diagram 200D in FIG. 2D. FIG. 2D illustrates a stage (ring "k", stage "m") 200D consists of 2 inputs namely Fi(k,2m+1) and Fi(k,2m+2); and 2 outputs Fo(k,2m+1) and Fo(k,2m+2). The stage (ring "k", stage "m") also consists of two 2:1 Muxes namely F(k,2m+1), F(k,2m+2) (comprising in combination a forward switch). The 2:1 Mux F(k,2m+1) has two inputs namely Fi(k,2m+1) and Fi(k,2m+2) and has one output Fo(k,2m+1). The 2:1 Mux F(k,2m+2) has two inputs namely Fi(k,2m+1) and Fi(k,2m+2) and has one output Fo(k,2m+2). A stage with 2 inputs and 2 outputs is, in one embodiment, the "last stage" or "root stage" of ring.

Figure 2E:
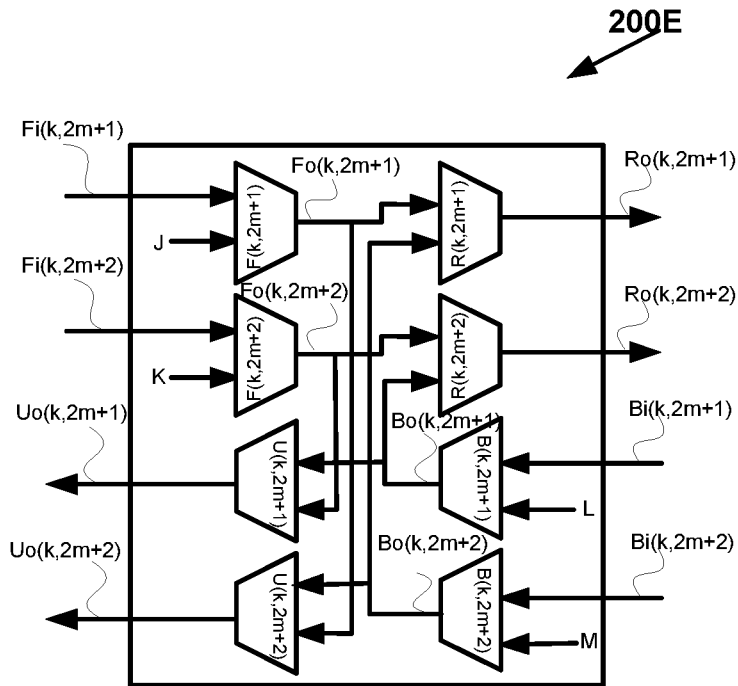
FIG. 2E is a diagram 200E, in an embodiment of, a stage in a ring of multi-stage hierarchical network corresponding to one block.

The stage "m" of ring "k" with "m+1" stages of the partial multi-stage hierarchical network $V_{Comb}(N_1, N_2,d,s)$, in another embodiment, may have 8 inputs and 4 outputs as shown in diagram 200E in FIG. 2E. FIG. 2E illustrates a stage (ring "k", stage "m") 200E consists of 8 inputs namely Fi(k,2m+1), Fi(k,2m+2), Bi(k,2m+1), Bi(k,2m+2), J, K, L, and M; and 4 outputs Uo(k,2m+1), Uo(k,2m+2), Ro(k,2m+1), and Ro(k,2m+2). The stage (ring "k", stage "m") also consists of eight 2:1 Muxes namely F(k,2m+1), F(k,2m+2) (comprising in combination a forward switch), R(k,2m+1), R(k,2m+2) (comprising in combination a Reverse U-turn switch), B(k,2m+1), B(k,2m+2) (comprising in combination a backward switch), U(k,2m+1), and U(k,2m+2) (comprising in combination a U-turn switch). The 2:1 Mux R(k,2m+1) has two inputs namely Fi(k,2m+1) and J, and has one output Fo(k,2m+1). The 2:1 Mux F(k,2m+2) has two inputs namely Fi(k,2m+2) and K, and has one output Fo(k,2m+2). The 2:1 Mux R(k,2m+1) has two inputs namely Fo(k,2m+1) and Bo(k,2m+2), and has one output Ro(k,2m+1). The 2:1 Mux R(k,2m+2) has two inputs namely Fo(k,2m+2) and Bo(k,2m+1), and has one output Ro(k,2m+2).

The 2:1 Mux B(k,2m+1) has two inputs namely Bi(k,2m+1) and L, and has one output Bo(k,2m+1). The 2:1 Mux B(k,2m+2) has two inputs namely Bi(k,2m+2) and M, and has one output Bo(k,2m+2). The 2:1 Mux U(k,2m+1) has two inputs namely Bo(k,2m+1) and Fo(k,2m+2), and has one output Uo(k,2m+1). The 2:1 Mux U(k,2m+2) has two inputs namely Bo(k,2m+2) and Fo(k,2m+1), and has one output Uo(k,2m+2). In different embodiments the inputs J, K, L, and M are connected from any of the outputs of any other stages of any ring of any block of the multi-stage hierarchical network $V_{Comb}(N_1,N_2,d,s)$.

The diagram 200E of FIG. 2E eliminates the 180-degree turn paths from the internal connection Fi(k,2m+1) to the internal connection Uo(k,2m+1). Similarly the diagram 200E of FIG. 2E eliminates the 180-degree turn paths from the connection Fi(k,2m+2) to the connection Uo(k,2m+2). The diagram 200E of FIG. 2E eliminates the 180-degree turn paths from the internal connection Bi(k,2m+1) to the internal connection Ro(k,2m+1). Similarly the diagram 200E of FIG. 2E eliminates the 180-degree turn paths from the connection Bi(k,2m+2) to the connection Ro(k,2m+2). Hence diagram 200E of FIG. 2E comprises a forward switch, a backward switch, U-turn switch and reverse U-turn switch without 180-degree U-turn paths.

In contrast to diagram 200E of FIG. 2E, the diagram 200A of FIG. 2A, diagram 200B of FIG. 2B, and diagram 200C of FIG. 2C provide 180-degree U-turn paths. Two exemplary 180-degree U-turn paths in diagram 200A of FIG. 2A are shown (by two types of dotted lines) in the attached replacement diagram of FIG. 2A. One of the 180-degree turn path shown in the replacement diagram of FIG. 2A starts at the internal connection Fi(k,2m+1) through the Mux F(k,2m+1) to Fo(k,2m+1) through the Mux U(k,2m+1) to Uo(k,2m+1) through the Mux B(k,2m+1) to the internal connection Bo(k,2m+1). The second of the 180-degree turn path shown in the replacement diagram of FIG. 2A starts at the hop wire Fi(k,2m+2) through the Mux F(k,2m+2) to Fo(k,2m+2) through the Mux U(k,2m+2) to Uo(k,2m+2) through the Mux B(k, 2m+2) to the hop wire Bo(k,2m+2).

Figure 2F:
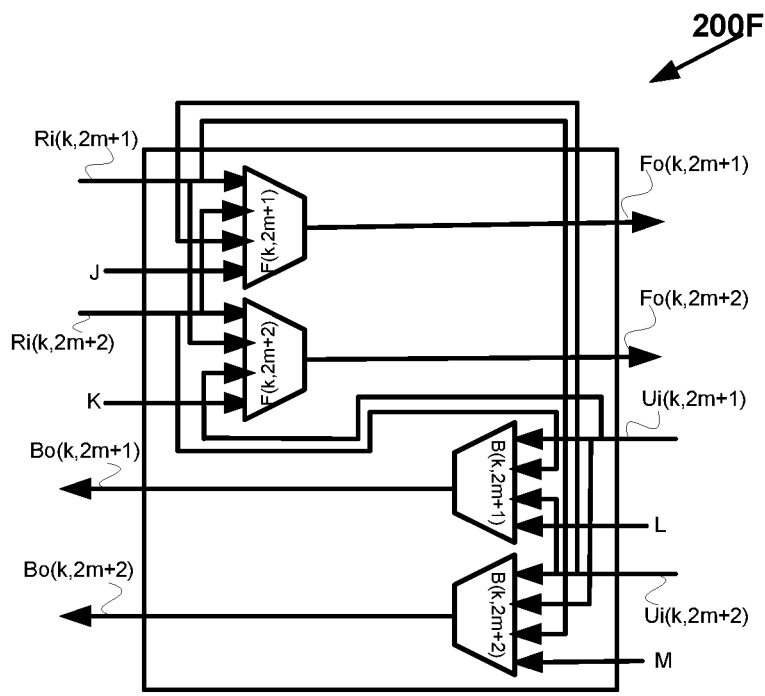
FIG. 2F is a diagram 200F, in an embodiment of, a stage in a ring of multi-stage hierarchical network corresponding to one block.

The stage "m" of ring "k" with "m" stages of the partial multi-stage hierarchical network $V_{Comb}(N_1, N_2,d,s)$, in another embodiment, may have 8 inputs and 4 outputs as shown in diagram 200F in FIG. 2F. FIG. 2F illustrates a stage (ring "k", stage "m") 200F consists of 8 inputs namely Ri(k,2m+1), Ri(k,2m+2), Ui(k,2m+1), Ui(k,2m+2), J, K, L, and M; and 4 outputs Bo(k,2m+1), Bo(k,2m+2), Fo(k,2m+1), and Fo(k,2m+2). The stage (ring "k", stage "m") also consists of four 4:1 Muxes namely F(k,2m+1), F(k,2m+2), B(k,2m+1), and B(k,2m+2). The 4:1 Mux F(k,2m+1) has four inputs namely Ri(k,2m+1), Ri(k,2m+2), Ui(k,2m+2), and J, and has one output Fo(k,2m+1). The 4:1 Mux F(k,2m+2) has four inputs namely Ri(k,2m+1), Ri(k,2m+2), Ui(k,2m+1), and K, and has one output Fo(k,2m+2).

The 4:1 Mux B(k,2m+1) has four inputs namely Ui(k,2m+1), Ui(k,2m+2), Ri(k,2m+2), and L, and has one output Bo(k,2m+1). The 4:1 Mux B(k,2m+2) has four inputs namely Ui(k,2m+1), Ui(k,2m+2), Ri(k,2m+1) and M, and has one output Bo(k,2m+2). In different embodiments the inputs J, K, L, and M are connected from any of the outputs of any other stages of any ring of any block of the multi-stage hierarchical network $V_{Comb}(N_1, N_2,d,s)$.

The diagram 200F of FIG. 2F eliminates the 180-degree turn paths from the internal connection Ri(k,2m+1) to the internal connection Bo(k,2m+1). Similarly the diagram 200F of FIG. 2F eliminates the 180-degree turn paths from the connection Ri(k,2m+2) to the connection Bo(k,2m+2). The diagram 200F of FIG. 2F eliminates the 180-degree turn paths from the internal connection Ui(k,2m+1) to the internal connection Fo(k,2m+1). Similarly the diagram 200F of FIG. 2F eliminates the 180-degree turn paths from the connection Ui(k,2m+2) to the connection Fo(k,2m+2). Hence diagram 200F of FIG. 2F comprises an integrated switch of a forward switch, a backward switch, a U-turn switch and a reverse U-turn switch without 180-degree U-turn paths.

The number of stages in a ring of any block may not be equal to the number of stages in any other ring of the same of block or any ring of any other block of the multi-stage hierarchical network $V_{Comb}(N_1, N_2,d,s)$. For example the number of stages in ring 1 of the partial multi-stage hierarchical network $V_{Comb}(N_1, N_2,d,s)$ 100A or of the partial multi-stage hierarchical network $V_{Comb}(N_1, N_2,d,s)$ 100B or of the partial multi-stage hierarchical network $V_{Comb}(N_1, N_2,d,s)$ 100C is denoted by "m" and the number of stages in ring 2 of the partial multi-stage hierarchical network is denoted by "n", and so "m" may or may not be equal to "n". Similarly the number of stages in ring 2 corresponding to block (3,3) of 2D-grid 800 may not be equal to the number of stages in ring 2 corresponding to block (6,9) of 2D-grid 800. Similarly in the partial multi-stage hierarchical network $V_{Comb}(N_1, N_2,d,s)$ 100C the number of stages in (slice 1, ring 2) corresponding to block (3,3) of 2D-grid 800 may not be equal to the number of stages in (slice 1, ring 2) corresponding to block (6,9) of 2D-grid 800.

Even though the number of inlet links to the computational block is four and the number of outlet links to the computational block is two in the partial multi-stage hierarchical network $V_{Comb}(N_1, N_2,d,s)$ 100A, the number of inlet links to the computational block is eight and the number of outlet links to the computational block is four in the partial multi-stage hierarchical network $V_{Comb}(N_1, N_2,d,s)$ 100B, and the number of inlet links to the computational block is sixteen and the number of outlet links to the computational block is four in the partial multi-stage hierarchical network $V_{Comb}(N_1, N_2,d,s)$ 100C, in other embodiments the number of inlet links to the computational block may be any arbitrary number and the number of outlet links to the computational block may also be another arbitrary number. However the total number of rings of all the slices corresponding to the partial multi-stage hierarchical network $V_{Comb}(N_1, N_2,d,s)$ of a block is generally equal to the number of inlet links to the computational block divided by d=2 if the inputs and outputs are connected either only from left-hand side or only from right-hand side, if the number of inlet links to the computational block is greater than or equal to the number of outlet links to the computational block. In such a case one or more of the outlet links to the computational block are connected to more than one inlet links of the partial multi-stage hierarchical network $V_{Comb}(N_1, N_2,d,s)$ corresponding to a block. Similarly the total number of rings of all the slices corresponding to the partial multi-stage hierarchical network $V_{Comb}(N_1, N_2,d,s)$ of a block is generally equal to the number of inlet links to the computational block divided by 2*d=4 if the inputs and outputs are connected from both left-hand side and from right-hand side, if the number of inlet links to the computational block is greater than or equal to the number of outlet links to the computational block.

Otherwise the total number of rings of all the slices corresponding to the partial multi-stage hierarchical network $V_{comb}(N_1, N_2,d,s)$ of a block is generally equal to the number of outlet links to the computational block divided by d=2 if the inputs and outputs are connected either only from left-hand side or only from right-hand side, if the number of outlet links to the computational block is greater than the number of inlet links to the computational block. In such a case one or more of the outlet links of the partial multi-stage hierarchical network $V_{comb}(N_1, N_2,d,s)$ corresponding to a block are connected to more than one inlet link of the computational block. Similarly the total number of rings of all the slices corresponding to the partial multi-stage hierarchical network $V_{Comb}(N_1, N_2,d,s)$ of a block is generally equal to the number of outlet links to the computational block divided by 2*d=4 if the inputs and outputs are connected from both left-hand side and from right-hand side, if the number of outlet links to the computational block is greater than or equal to the number of inlet links to the computational block.

In another embodiment, the number of inlet links to the computational block corresponding to a block of 2D-grid of blocks may or may not be equal to the number of inlet links to the computational block corresponding to another block. Similarly the number of outlet links to the computational block corresponding to a block of 2D-grid of blocks may or may not be equal to the number of outlet links to the computational block corresponding to another block. Hence the total number of rings of the partial multi-stage hierarchical network $V_{Comb}(N_1, N_2,d,s)$ corresponding to a block of 2D-grid of blocks may or may not be equal to the partial multi-stage hierarchical network $V_{Comb}(N_1, N_2,d,s)$ corresponding to another block. For example the total number of rings corresponding to block (4,5) of 2D-grid 800 may be two and the total number of rings in block (5,4) of 2D-grid 800 may be three.

A multi-stage hierarchical network can be represented with the notation $V_{Comb}(N_1, N_2,d,s)$, where $N_1$ represents the total number of inlet links of the complete multi-stage hierarchical network and $N_2$ represents the total number of outlet links of the complete multi-stage hierarchical network, d represents the number of inlet links of any ring in any block of the complete multi-stage hierarchical network either from only left-hand side or only right-hand side, or equivalently the number of outlet links of any ring in any block of the complete multi-stage hierarchical network either from only left-hand side or only right-hand side, and when the inputs and outputs are connected from left-hand side, s is the ratio of number of outgoing links from each stage 0 of any ring in any block to the number of inlet links of any ring in any block of the complete multi-stage hierarchical network (for example the complete multi-stage hierarchical network corresponding to $V_{comb}(N_1, N_2,d,s)$ 100A in FIG. 1A, $N_1$=200, $N_2$=400, d=2, s=1). Also a multi-stage hierarchical network where $N_1$=$N_2$=N is represented as $V_{Comb}(N,d,s)$.

Figure 3A:
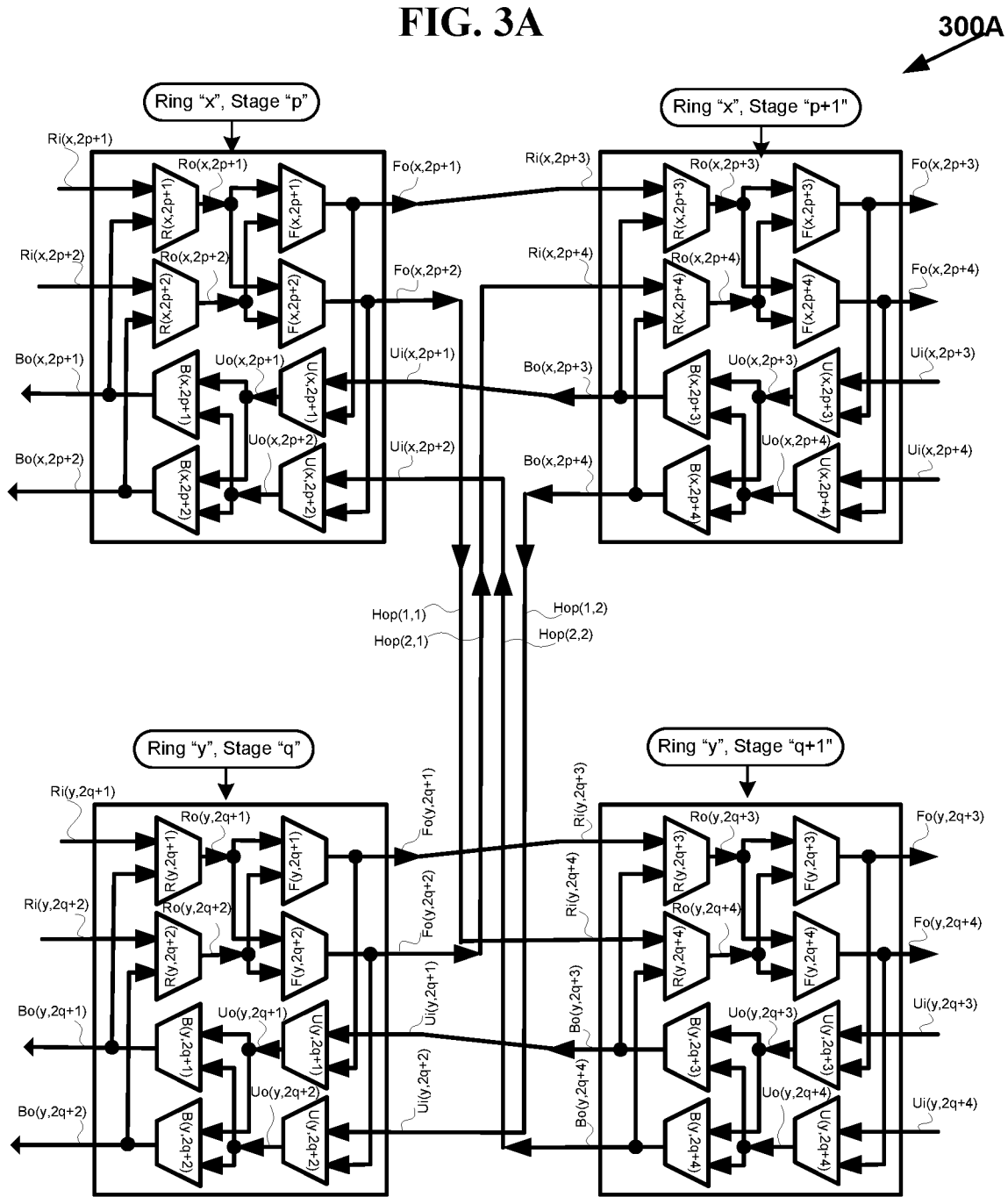
FIG. 3A is a diagram 300A, in an embodiment of, all the connections between two successive stages of two different rings in the same block or in two different blocks of a multi-stage hierarchical network.
Figure 3B:
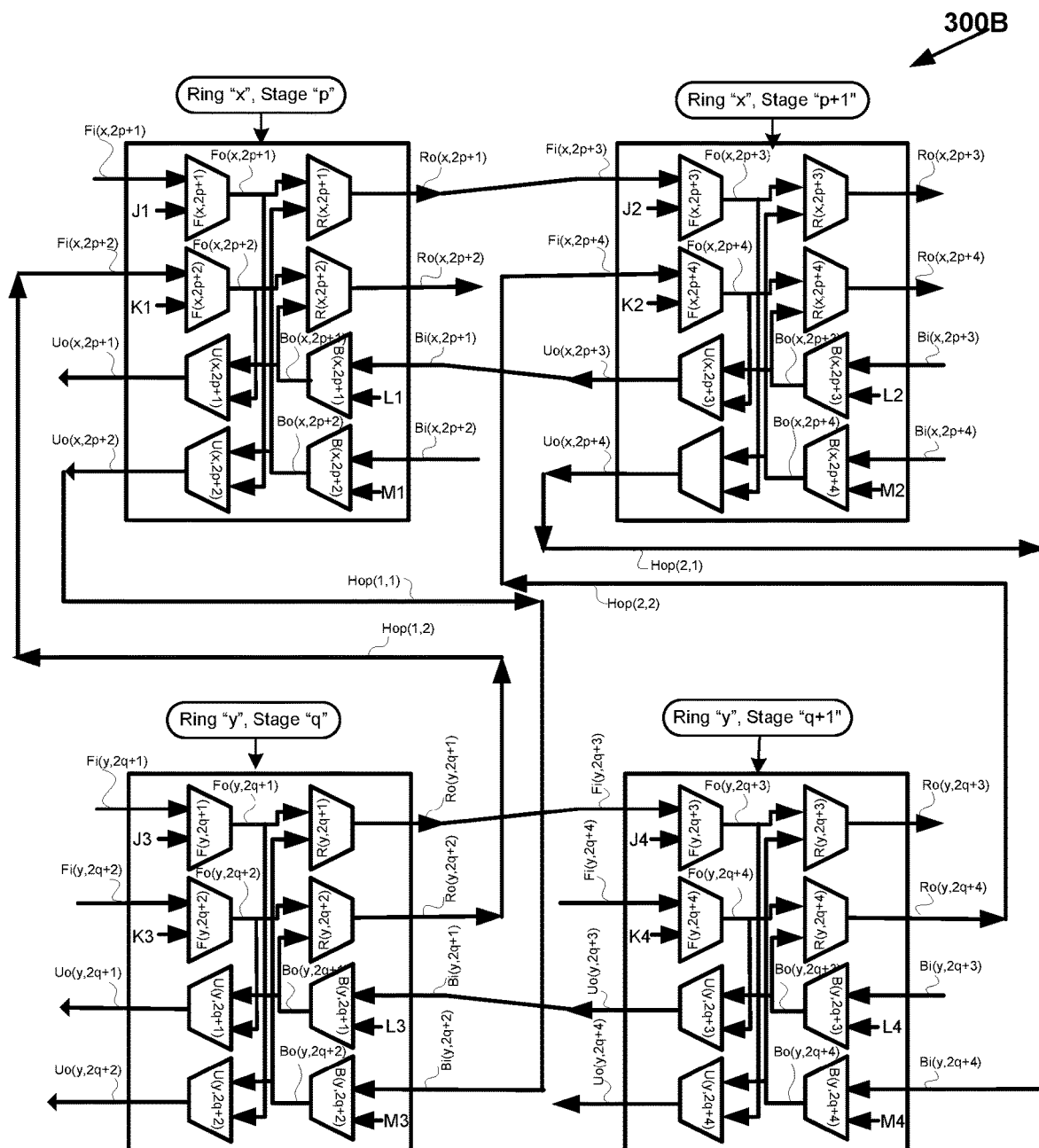
FIG. 3B is a diagram 300B, in an embodiment of, all the connections between two successive stages of two different rings in the same block or in two different blocks of a multi-stage hierarchical network.
Figure 3C:
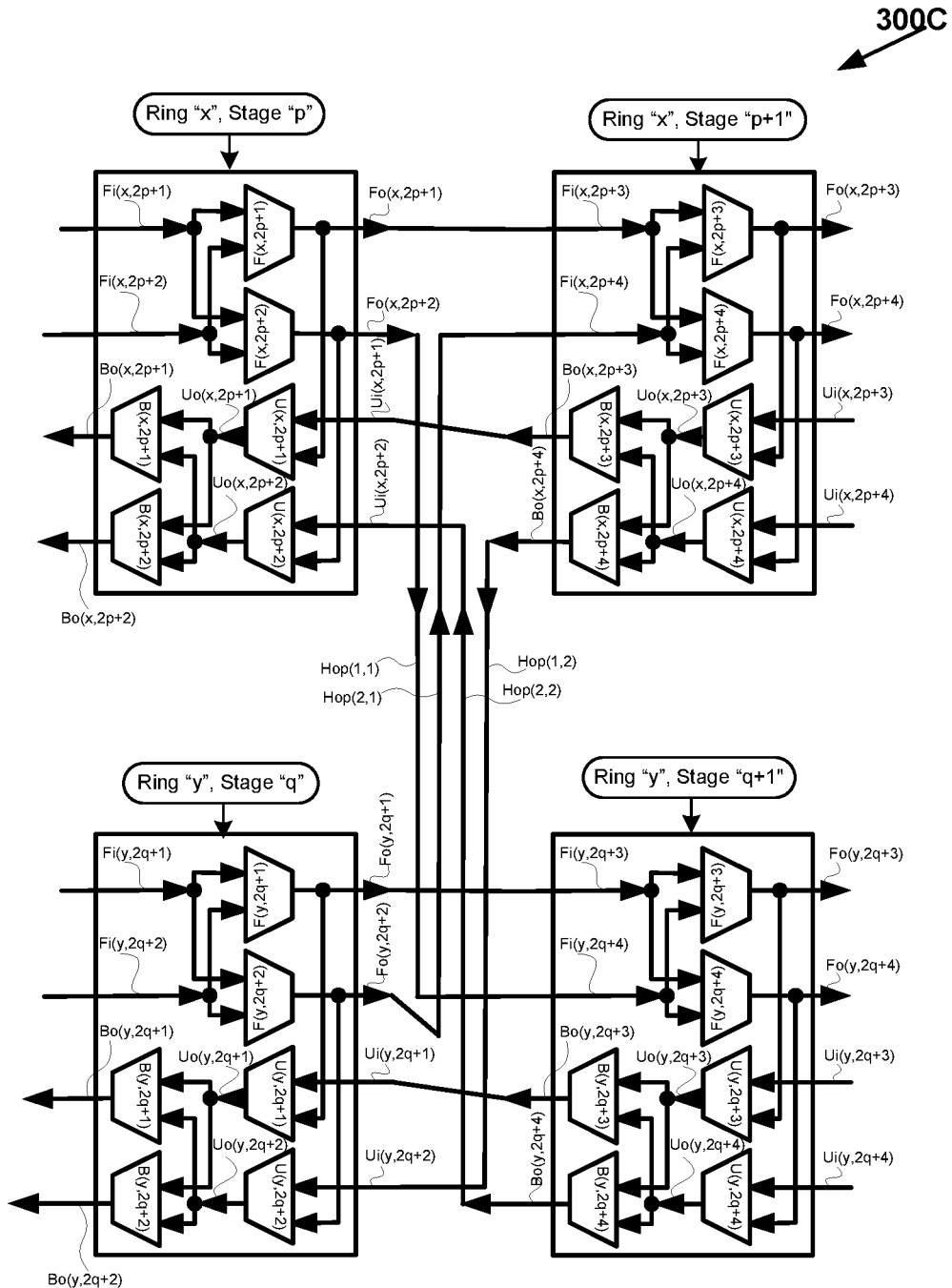
FIG. 3C is a diagram 300C, in an embodiment of, all the connections between two successive stages of two different rings in the same block or in two different blocks of a multi-stage hierarchical network.
Figure 3D:
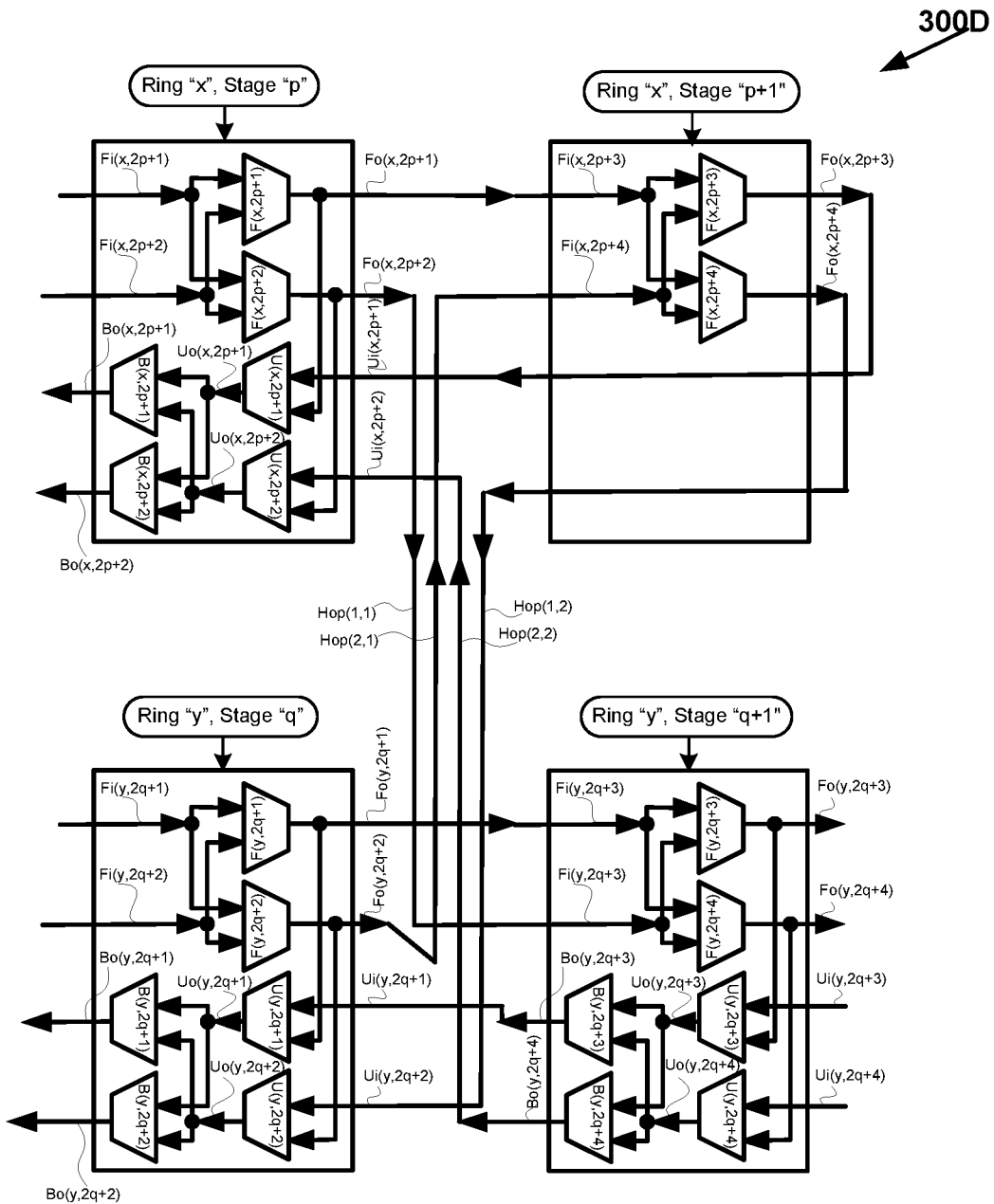
FIG. 3D is a diagram 300D, in an embodiment of, all the connections between two successive stages of two different rings in the same block or in two different blocks of a multi-stage hierarchical network.
Figure 3E:
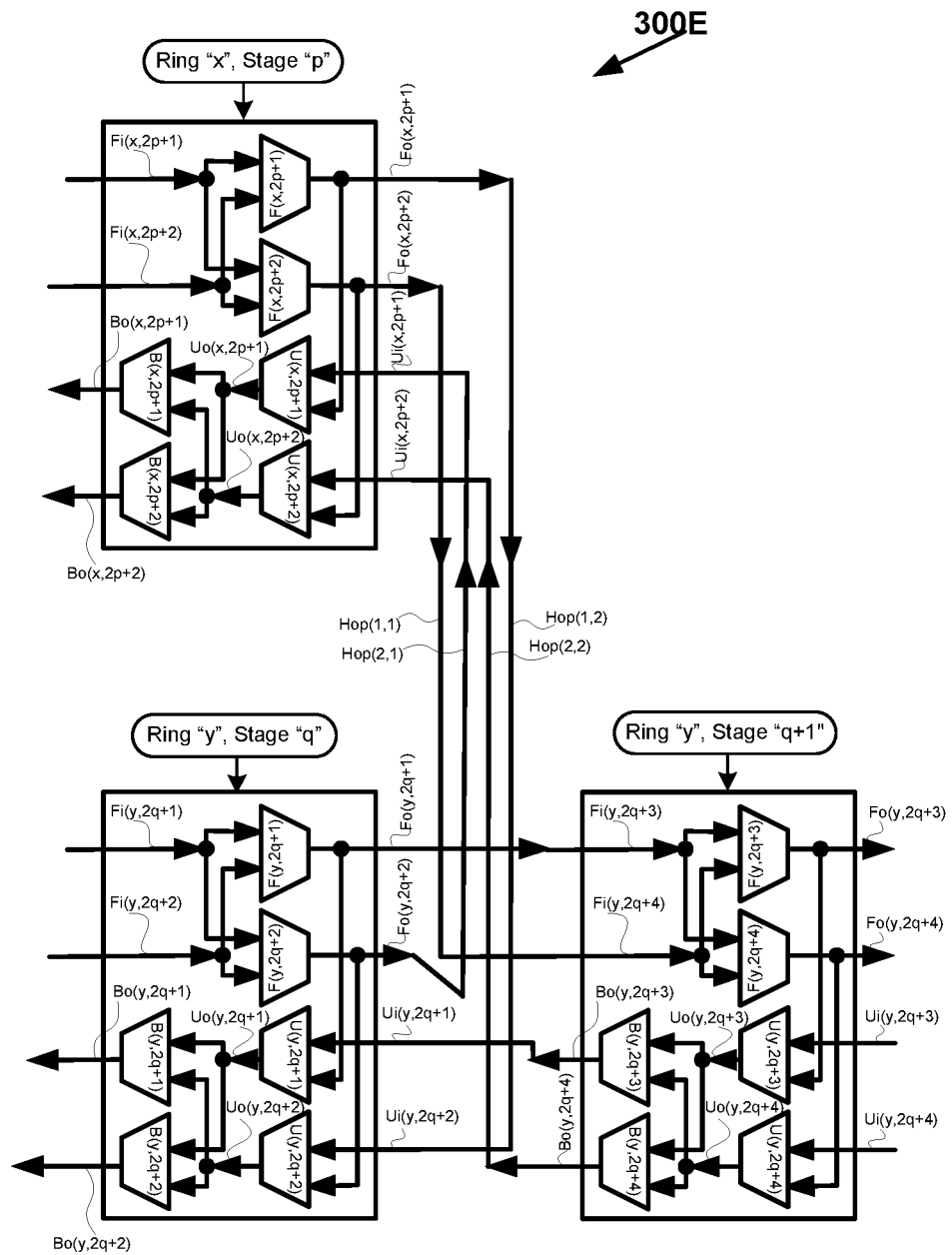
FIG. 3E is a diagram 300E, in an embodiment of, all the connections between two successive stages of two different rings in the same block or in two different blocks of a multi-stage hierarchical network.

The diagram 300A of FIG. 3A, 300B of FIG. 3B, 300C of FIG. 3C, 300D of FIGS. 3D, and 300E of FIG. 3E are different embodiments of all the connections between two arbitrary successive stages in two different rings of the same block or two different rings of different blocks of 2D-grid 800. Referring to diagram 300A in FIG. 3A illustrates all the connections between two arbitrary successive stages of a ring namely the stages (ring "x", stage "p") and (ring "x", stage "p+1") and two other arbitrary successive stages of any other ring namely the stages (ring "y", stage "q") and (ring "y", stage "q+1"), of the complete multi-stage hierarchical network $V_{Comb}(N_1, N_2,d,s)$.

The stage (ring "x", stage "p") consists of 4 inputs namely Ri(x,2p+1), Ri(x,2p+2), Ui(x,2p+1), and Ui(x,2p+2); and 4 outputs Bo(x,2p+1), Bo(x,2p+2), Fo(x,2p+1), and Fo(x,2p+2). The stage (ring "x", stage "p') also consists of eight 2:1 Muxes namely R(x,2p+1), R(x,2p+2), F(x,2p+1), F(x,2p+2), U(x,2p+1), U(x,2p+2), B(x,2p+1), and B(x,2p+2). The 2:1 Mux R(x,2p+1) has two inputs namely Ri(x,2p+1) and Bo(x,2p+1) and has one output Ro(x,2p+1). The 2:1 Mux R(x,2p+2) has two inputs namely Ri(x,2p+2) and Bo(x,2p+2) and has one output Ro(x,2p+2). The 2:1 Mux F(x,2p+1) has two inputs namely Ro(x,2p+1) and Ro(x,2p+2) and has one output Fo(x,2p+1). The 2:1 Mux F(x,2p+2) has two inputs namely Ro(x,2p+1) and Ro(x,2p+2) and has one output Fo(x,2p+2).

The 2:1 Mux U(x,2p+1) has two inputs namely Ui(x,2p+1) and Fo(x,2p+1) and has one output Uo(x,2p+1). The 2:1 Mux U(x,2p+2) has two inputs namely Ui(x,2p+2) and Fo(x,2p+2) and has one output Uo(x,2p+2). The 2:1 Mux B(x,2p+1) has two inputs namely Uo(x,2p+1) and Uo(x,2p+2) and has one output Bo(x,2p+1). The 2:1 Mux B(x,2p+2) has two inputs namely Uo(x,2p+1) and Uo(x,2p+2) and has one output Bo(x,2p+2).

The stage (ring "x", stage "p+1") consists of 4 inputs namely Ri(x,2p+3), Ri(x,2p+4), Ui(x,2p+3), and Ui(x,2p+4); and 4 outputs Bo(x,2p+3), Bo(x,2p+4), Fo(x,2p+3), and Fo(x,2p+4). The stage (ring "x", stage "p+1") also consists of eight 2:1 Muxes namely R(x,2p+3), R(x,2p+4), F(x,2p+3), F(x,2p+4), U(x,2p+3), U(x,2p+4), B(x,2p+3), and B(x,2p+4). The 2:1 Mux R(x,2p+3) has two inputs namely Ri(x,2p+

3) and Bo(x,2p+3) and has one output Ro(x,2p+3). The 2:1 Mux R(x,2p+4) has two inputs namely Ri(x,2p+4) and Bo(x,2p+4) and has one output Ro(x,2p+4). The 2:1 Mux F(x,2p+3) has two inputs namely Ro(x,2p+3) and Ro(x,2p+4) and has one output Fo(x,2p+3). The 2:1 Mux F(x,2p+4) has two inputs namely Ro(x,2p+3) and Ro(x,2p+4) and has one output Fo(x,2p+4).

The 2:1 Mux U(x,2p+3) has two inputs namely Ui(x,2p+3) and Fo(x,2p+3) and has one output Uo(x,2p+3). The 2:1 Mux U(x,2p+4) has two inputs namely Ui(x,2p+4) and Fo(x,2p+4) and has one output Uo(x,2p+4). The 2:1 Mux B(x,2p+3) has two inputs namely Uo(x,2p+3) and Uo(x,2p+4) and has one output Bo(x,2p+3). The 2:1 Mux B(x,2p+4) has two inputs namely Uo(x,2p+3) and Uo(x,2p+4) and has one output Bo(x,2p+4).

The output Fo(x,2p+1) of the stage (ring "x", stage "p") is connected to the input Ri(x,2p+3) of the stage (ring "x", stage "p+1"). And the output Bo(x,2p+3) of the stage (ring "x", stage "p+1") is connected to the input Ui(x,2p+1) of the stage (ring "x", stage "p").

The stage (ring "y", stage "q") consists of 4 inputs namely Ri(y,2q+1), Ri(y,2q+2), Ui(y,2q+1), and Ui(y,2q+2); and 4 outputs Bo(y,2q+1), Bo(y,2q+2), Fo(y,2q+1), and Fo(y,2q+2). The stage (ring "y", stage "q') also consists of eight 2:1 Muxes namely R(y,2q+1), R(y,2q+2), F(y,2q+1), F(y,2q+2), U(y,2q+1), U(y,2q+2), B(y,2q+1), and B(y,2q+2). The 2:1 Mux R(y,2q+1) has two inputs namely Ri(y,2q+1) and Bo(y,2q+1) and has one output Ro(y,2q+1). The 2:1 Mux R(y,2q+2) has two inputs namely Ri(y,2q+2) and Bo(y,2q+2) and has one output Ro(y,2q+2). The 2:1 Mux F(y,2q+1) has two inputs namely Ro(y,2q+1) and Ro(y,2q+2) and has one output Fo(y,2q+1). The 2:1 Mux F(y,2q+2) has two inputs namely Ro(y,2q+1) and Ro(y,2q+2) and has one output Fo(y,2q+2).

The 2:1 Mux U(y,2q+1) has two inputs namely Ui(y,2q+1) and Fo(y,2q+1) and has one output Uo(y,2q+1). The 2:1 Mux U(y,2q+2) has two inputs namely Ui(y,2q+2) and Fo(y,2q+2) and has one output Uo(y,2q+2). The 2:1 Mux B(y,2q+1) has two inputs namely Uo(y,2q+1) and Uo(y,2q+2) and has one output Bo(y,2q+1). The 2:1 Mux B(y,2q+2) has two inputs namely Uo(y,2q+1) and Uo(y,2q+2) and has one output Bo(y,2q+2).

The stage (ring "y", stage "q+1") consists of 4 inputs namely Ri(y,2q+3), Ri(y,2q+4), Ui(y,2q+3), and Ui(y,2q+4); and 4 outputs Bo(y,2q+3), Bo(y,2q+4), Fo(y,2q+3), and Fo(y,2q+4). The stage (ring "y", stage "q+1") also consists of eight 2:1 Muxes namely R(y,2q+3), R(y,2q+4), F(y,2q+3), F(y,2q+4), U(y,2q+3), U(y,2q+4), B(y,2q+3), and B(y,2q+4). The 2:1 Mux R(y,2q+3) has two inputs namely Ri(y,2q+3) and Bo(y,2q+3) and has one output Ro(y,2q+3). The 2:1 Mux R(y,2q+4) has two inputs namely Ri(y,2q+4) and Bo(y,2q+4) and has one output Ro(y,2q+4). The 2:1 Mux F(y,2q+3) has two inputs namely Ro(y,2q+3) and Ro(y,2q+4) and has one output Fo(y,2q+3). The 2:1 Mux F(y,2q+4) has two inputs namely Ro(y,2q+3) and Ro(y,2q+4) and has one output Fo(y,2q+4).

The 2:1 Mux U(y,2q+3) has two inputs namely Ui(y,2q+3) and Fo(y,2q+3) and has one output Uo(y,2q+3). The 2:1 Mux U(y,2q+4) has two inputs namely Ui(y,2q+4) and Fo(y,2q+4) and has one output Uo(y,2q+4). The 2:1 Mux B(y,2q+3) has two inputs namely Uo(y,2q+3) and Uo(y,2q+4) and has one output Bo(y,2q+3). The 2:1 Mux B(y,2q+4) has two inputs namely Uo(y,2q+3) and Uo(y,2q+4) and has one output Bo(y,2q+4).

The output Fo(y,2q+1) of the stage (ring "y", stage "q") is connected to the input Ri(y,2q+3) of the stage (ring "y", stage "q+1"). And the output Bo(y,2q+3) of the stage (ring "y", stage "q+1") is connected to the input Ui(y,2q+1) of the stage (ring "y", stage "q").

The output Fo(x,2p+2) of the stage (ring "x", stage "p") is connected via the wire Hop(1,1) to the input Ri(y,2q+4) of the stage (ring "y", stage "q+1"). The output Bo(x,2p+4) of the stage (ring "x", stage "p+1") is connected via the wire Hop(1,2) to the input Ui(y,2q+2) of the stage (ring "y", stage "q").

The output Fo(y,2q+2) of the stage (ring "y", stage "q") is connected via the wire Hop(2,1) to the input Ri(x,2p+4) of the stage (ring "x", stage "p+1"). The output Bo(y,2q+4) of the stage (ring "y", stage "q+1") is connected via the wire Hop(2,2) to the input Ui(x,2p+2) of the stage (ring "x", stage "p").

Ring "x" and ring "y" may or may not belong to the same block of the complete multi-stage hierarchical network $V_{Comb}(N_1, N_2, d, s)$. If ring "x" and ring "y" belong to the same block of the complete multi-stage hierarchical network $V_{Comb}(N_1, N_2, d, s)$, then the wires Hop(1,1), Hop(1,2), Hop(2,1), and Hop(2,2) are hereinafter called "internal hop wires". For example if "x=2" and "y=3" and both the ring 2 and ring 3 belong to the same block (9,9) of 2D-grid 800, then the wires Hop(1,1), Hop(1,2), Hop(2,1), and Hop(2,2) are "internal hop wires".

If ring "x" and ring "y" belong to the different blocks of the complete multi-stage hierarchical network $V_{Comb}(N_1, N_2, d, s)$, then the wires Hop(1,1), Hop(1,2), Hop(2,1), and Hop(2,2) are hereinafter called "external hop wires". The external hop wires Hop(1,1), Hop(1,2), Hop(2,1), and Hop(2,2) may be horizontal wires or vertical wires. The length of the external hop wires is Manhattan distance between the corresponding blocks, hereinafter "hop length". For example if ring "x" belongs to block (1,1) and ring "y" belongs to block (1,6) of 2D-grid 800 then the external hop wires are hereinafter called "horizontal external hop wires". And the hop length of the horizontal hop wires Hop(1,1), Hop(1,2), Hop(2,1), and Hop(2,2) is given by 6-1=5. Similarly if ring "x" and ring "y" belong to two blocks in the same horizontal row of 2D-grid 800, then the wires Hop(1,1), Hop(1,2), Hop(2,1), and Hop(2,2) are horizontal external hop wires.

For example if ring "x" belongs to block (1,1) and ring "y" belongs to block (9,1) of 2D-grid 800 then the external hop wires are hereinafter called "vertical external hop wires". And the hop length of the vertical hop wires Hop(1,1), Hop(1,2), Hop(2,1), and Hop(2,2) is given by 9-1=8. Similarly if ring "x" and ring "y" belong to two blocks in the same vertical column of 2D-grid 800, then the wires Hop(1,1), Hop(1,2), Hop(2,1), and Hop(2,2) are vertical external hop wires. External hop wires are typically horizontal or vertical according to the current invention.

Referring to diagram 300B in FIG. 3B illustrates all the connections between two arbitrary successive stages of a ring namely the stages (ring "x", stage "p") and (ring "x", stage "p+1") and two other arbitrary successive stages of any other ring namely the stages (ring "y", stage "q") and (ring "y", stage "q+1"), of the complete multi-stage hierarchical network $V_{Comb}(N_1, N_2, d, s)$.

The stage (ring "x", stage "p") consists of 8 inputs namely Fi(x,2p+1), Fi(x,2p+2), Bi(x,2p+1), Bi(x,2p+2), J1, K1, L1, and M1; and 4 outputs Uo(x,2p+1), Uo(x,2p+2), Ro(x,2p+1), and Ro(x,2p+2). The stage (ring "x", stage "p') also consists of eight 2:1 Muxes namely F(x,2p+1), F(x,2p+2), R(x,2p+1), R(x,2p+2), B(x,2p+1), B(x,2p+2), U(x,2p+1), and U(x,2p+2). The 2:1 Mux F(x,2p+1) has two inputs namely Fi(x,2p+1) and J1, and has one output Fo(x,2p+1).

The 2:1 Mux F(x,2p+2) has two inputs namely Fi(x,2p+2) and K1, and has one output Fo(x,2p+2). The 2:1 Mux R(x,2p+1) has two inputs namely Fo(x,2p+1) and Bo(x,2p+2), and has one output Ro(x,2p+1). The 2:1 Mux R(x,2p+2) has two inputs namely Fo(x,2p+2) and Bo(x,2p+1), and has one output Ro(x,2p+2).

The 2:1 Mux B(x,2p+1) has two inputs namely Bi(x,2p+1) and L1, and has one output Bo(x,2p+1). The 2:1 Mux B(x,2p+2) has two inputs namely Bi(x,2p+2) and M1, and has one output Bo(x,2p+2). The 2:1 Mux U(x,2p+1) has two inputs namely Bo(x,2p+1) and Fo(x,2p+2), and has one output Uo(x,2p+1). The 2:1 Mux U(x,2p+2) has two inputs namely Bo(x,2p+2) and Fo(x,2p+1), and has one output Uo(x,2p+2).

The stage (ring "x", stage "p+1") consists of 8 inputs namely Fi(x,2p+3), Fi(x,2p+4), Bi(x,2p+3), Bi(x,2p+4), J2, K2, L2, and M2; and 4 outputs Uo(x,2p+3), Uo(x,2p+4), Ro(x,2p+3), and Ro(x,2p+4). The stage (ring "x", stage "p+1") also consists of eight 2:1 Muxes namely F(x,2p+3), F(x,2p+4), R(x,2p+3), R(x,2p+4), B(x,2p+3), B(x,2p+4), U(x,2p+3), and U(x,2p+4). The 2:1 Mux F(x,2p+3) has two inputs namely Fi(x,2p+3) and J2, and has one output Fo(x,2p+3). The 2:1 Mux F(x,2p+4) has two inputs namely Fi(x,2p+4) and K2, and has one output Fo(x,2p+4). The 2:1 Mux R(x,2p+3) has two inputs namely Fo(x,2p+3) and Bo(x,2p+4), and has one output Ro(x,2p+3). The 2:1 Mux R(x,2p+4) has two inputs namely Fo(x,2p+4) and Bo(x,2p+3), and has one output Ro(x,2p+4).

The 2:1 Mux B(x,2p+3) has two inputs namely Bi(x,2p+3) and L2, and has one output Bo(x,2p+3). The 2:1 Mux B(x,2p+4) has two inputs namely Bi(x,2p+4) and M2, and has one output Bo(x,2p+4). The 2:1 Mux U(x,2p+3) has two inputs namely Bo(x,2p+3) and Fo(x,2p+4), and has one output Uo(x,2p+3). The 2:1 Mux U(x,2p+4) has two inputs namely Bo(x,2p+4) and Fo(x,2p+3), and has one output Uo(x,2p+4).

The output Ro(x,2p+1) of the stage (ring "x", stage "p") is connected to the input Fi(x,2p+3) of the stage (ring "x", stage "p+1"). And the output Uo(x,2p+3) of the stage (ring "x", stage "p+1") is connected to the input Bi(x,2p+1) of the stage (ring "x", stage "p").

The stage (ring "y", stage "q") consists of 8 inputs namely Fi(y,2q+1), Fi(y,2q+2), Bi(y,2q+1), Bi(y,2q+2), J3, K3, L3, and M3; and 4 outputs Uo(y,2q+1), Uo(y,2q+2), Ro(y,2q+1), and Ro(y,2q+2). The stage (ring "y", stage "q") also consists of eight 2:1 Muxes namely F(y,2q+1), F(y,2q+2), R(y,2q+1), R(y,2q+2), B(y,2q+1), B(y,2q+2), U(y,2q+1), and U(y,2q+2). The 2:1 Mux F(y,2q+1) has two inputs namely Fi(y,2q+1) and J3, and has one output Fo(y,2q+1). The 2:1 Mux F(y,2q+2) has two inputs namely Fi(y,2q+2) and K3, and has one output Fo(y,2q+2). The 2:1 Mux R(y,2q+1) has two inputs namely Fo(y,2q+1) and Bo(y,2q+2), and has one output Ro(y,2q+1). The 2:1 Mux R(y,2q+2) has two inputs namely Fo(y,2q+2) and Bo(y,2q+1) and has one output Ro(y,2q+2).

The 2:1 Mux B(y,2q+1) has two inputs namely Bi(y,2q+1) and L3, and has one output Bo(y,2q+1). The 2:1 Mux B(y,2q+2) has two inputs namely Bi(y,2q+2) and M3, and has one output Bo(y,2q+2). The 2:1 Mux U(y,2q+1) has two inputs namely Bo(y,2q+1) and Fo(y,2q+2), and has one output Uo(y,2q+1). The 2:1 Mux U(y,2q+2) has two inputs namely Bo(y,2q+2) and Fo(y,2q+1), and has one output Uo(y,2q+2).

The stage (ring "y", stage "q+1") consists of 8 inputs namely Fi(y,2q+3), Fi(y,2q+4), Bi(y,2q+3), Bi(y,2q+4), J4, K4, L4, and M4; and 4 outputs Uo(y,2q+3), Uo(y,2q+4), Ro(y,2q+3), and Ro(y,2q+4). The stage (ring "y", stage "q+1") also consists of eight 2:1 Muxes namely F(y,2q+3), F(y,2q+4), R(y,2q+3), R(y,2q+4), B(y,2q+3), B(y,2q+4), U(y,2q+3), and U(y,2q+4). The 2:1 Mux F(y,2q+3) has two inputs namely Fi(y,2q+3) and J4, and has one output Fo(y,2q+3). The 2:1 Mux F(y,2q+4) has two inputs namely Fi(y,2q+4) and K4, and has one output Fo(y,2q+4). The 2:1 Mux R(y,2q+3) has two inputs namely Fo(y,2q+3) and Bo(y,2q+4), and has one output Ro(y,2q+3). The 2:1 Mux R(y,2q+4) has two inputs namely Fo(y,2q+4) and Bo(y,2q+3), and has one output Ro(y,2q+4).

The 2:1 Mux B(y,2q+3) has two inputs namely Bi(y,2q+3) and L4, and has one output Bo(y,2q+3). The 2:1 Mux B(y,2q+4) has two inputs namely Bi(y,2q+4) and M4, and has one output Bo(y,2q+4). The 2:1 Mux U(y,2q+3) has two inputs namely Bo(y,2q+3) and Fo(y,2q+4), and has one output Uo(y,2q+3). The 2:1 Mux U(y,2q+4) has two inputs namely Bo(y,2q+4) and Fo(y,2q+3), and has one output Uo(y,2q+4).

The output Ro(y,2q+1) of the stage (ring "y", stage "q") is connected to the input Fi(y,2q+3) of the stage (ring "y", stage "q+1"). And the output Uo(y,2q+3) of the stage (ring "y", stage "q+1") is connected to the input Bi(y,2q+1) of the stage (ring "y", stage "q").

The output Uo(x,2p+2) of the stage (ring "x", stage "p") is connected via the wire Hop(1,1) to the input Bi(y,2q+2) of the stage (ring "y", stage "q"). The output Ro(y,2q+2) of the stage (ring "y", stage "q") is connected via the wire Hop(1,2) to the input Fi(x,2p+2) of the stage (ring "x", stage "p").

The output Uo(x,2p+4) of the stage (ring "x", stage "p+1") is connected via the wire Hop(2,1) to the input Bi(y,2q+4) of the stage (ring "y", stage "q+1"). The output Ro(y,2q+4) of the stage (ring "y", stage "q+1") is connected via the wire Hop(2,2) to the input Fi(x,2p+4) of the stage (ring "x", stage "p+1").

In various embodiments, the inputs J1, K1, L1, and M1 are connected from any of the outputs of any other stages of any ring of any block of the multi-stage hierarchical network $V_{Comb}(N_1, N_2, d, s)$. Similarly the inputs J2, K2, L2, and M2 are connected from any of the outputs of any other stages of any ring of any block of the multi-stage hierarchical network $V_{Comb}(N_1, N_2, d, s)$. Similarly the inputs J3, K3, L3, and M3 are connected from any of the outputs of any other stages of any ring of any block of the multi-stage hierarchical network $V_{Comb}(N_1, N_2, d, s)$. Finally the inputs J4, K4, L4, and M4 are connected from any of the outputs of any other stages of any ring of any block of the multi-stage hierarchical network $V_{Comb}(N_1, N_2, d, s)$.

Referring to diagram 300C in FIG. 3C, illustrates all the connections between two arbitrary successive stages of a ring namely the stages (ring "x", stage "p") and (ring "x", stage "p+1") and two other arbitrary successive stages of any other ring namely the stages (ring "y", stage "q") and (ring "y", stage "q+1"), of the complete multi-stage hierarchical network $V_{comb}(N_1, N_2, d, s)$.

The stage (ring "x", stage "p") consists of 4 inputs namely Fi(x,2p+1), Fi(x,2p+2), Ui(x,2p+1), and Ui(x,2p+2); and 4 outputs Bo(x,2p+1), Bo(x,2p+2), Fo(x,2p+1), and Fo(x,2p+2). The stage (ring "x", stage "p') also consists of six 2:1 Muxes namely F(x,2p+1), F(x,2p+2), U(x,2p+1), U(x,2p+2), B(x,2p+1), and B(x,2p+2). The 2:1 Mux F(x,2p+1) has two inputs namely Fi(x,2p+1) and Fi(x,2p+2) and has one output Fo(x,2p+1). The 2:1 Mux F(x,2p+2) has two inputs namely Fi(x,2p+1) and Fi(x,2p+2) and has one output Fo(x,2p+2).

The 2:1 Mux U(x,2p+1) has two inputs namely Ui(x,2p+1) and Fo(x,2p+1) and has one output Uo(x,2p+1). The 2:1 Mux U(x,2p+2) has two inputs namely Ui(x,2p+2) and Fo(x,2p+2) and has one output Uo(x,2p+2). The 2:1 Mux B(x,2p+1) has two inputs namely Uo(x,2p+1) and Uo(x,2p+2) and has one output Bo(x,2p+1). The 2:1 Mux B(x,2p+2) has two inputs namely Uo(x,2p+1) and Uo(x,2p+2) and has one output Bo(x,2p+2).

The stage (ring "x", stage "p+l") consists of 4 inputs namely Fi(x,2p+3), Fi(x,2p+4), Ui(x,2p+3), and Ui(x,2p+4); and 4 outputs Bo(x,2p+3), Bo(x,2p+4), Fo(x,2p+3), and Fo(x,2p+4). The stage (ring "x", stage "p+l") also consists of six 2:1 Muxes namely F(x,2p+3), F(x,2p+4), U(x,2p+3), U(x,2p+4), B(x,2p+3), and B(x,2p+4). The 2:1 Mux F(x,2p+3) has two inputs namely Fi(x,2p+3) and Fi(x,2p+4) and has one output Fo(x,2p+3). The 2:1 Mux F(x,2p+4) has two inputs namely Fi(x,2p+3) and Fi(x,2p+4) and has one output Fo(x,2p+4).

The 2:1 Mux U(x,2p+3) has two inputs namely Ui(x,2p+3) and Fo(x,2p+3) and has one output Uo(x,2p+3). The 2:1 Mux U(x,2p+4) has two inputs namely Ui(x,2p+4) and Fo(x,2p+4) and has one output Uo(x,2p+4). The 2:1 Mux B(x,2p+3) has two inputs namely Uo(x,2p+3) and Uo(x,2p+4) and has one output Bo(x,2p+3). The 2:1 Mux B(x,2p+4) has two inputs namely Uo(x,2p+3) and Uo(x,2p+4) and has one output Bo(x,2p+4).

The output Fo(x,2p+1) of the stage (ring "x", stage "p") is connected to the input Fi(x,2p+3) of the stage (ring "x", stage "p+l"). And the output Bo(x,2p+3) of the stage (ring "x", stage "p+1") is connected to the input Ui(x,2p+1) of the stage (ring "x", stage "p").

The stage (ring "y", stage "q") consists of 4 inputs namely Fi(y,2q+1), Fi(y,2q+2), Ui(y,2q+1), and Ui(y,2q+2); and 4 outputs Bo(y,2q+1), Bo(y,2q+2), Fo(y,2q+1), and Fo(y,2q+2). The stage (ring "y", stage "q') also consists of six 2:1 Muxes namely F(y,2q+1), F(y,2q+2), U(y,2q+1), U(y,2q+2), B(y,2q+1), and B(y,2q+2). The 2:1 Mux F(y,2q+1) has two inputs namely Fi(y,2q+1) and Fi(y,2q+2) and has one output Fo(y,2q+1). The 2:1 Mux F(y,2q+2) has two inputs namely Fi(y,2q+1) and Fi(y,2q+2) and has one output Fo(y,2q+2).

The 2:1 Mux U(y,2q+1) has two inputs namely Ui(y,2q+1) and Fo(y,2q+1) and has one output Uo(y,2q+1). The 2:1 Mux U(y,2q+2) has two inputs namely Ui(y,2q+2) and Fo(y,2q+2) and has one output Uo(y,2q+2). The 2:1 Mux B(y,2q+1) has two inputs namely Uo(y,2q+1) and Uo(y,2q+2) and has one output Bo(y,2q+1). The 2:1 Mux B(y,2q+2) has two inputs namely Uo(y,2q+1) and Uo(y,2q+2) and has one output Bo(y,2q+2).

The stage (ring "y", stage "q+1") consists of 4 inputs namely Fi(y,2q+3), Fi(y,2q+4), Ui(y,2q+3), and Ui(y,2q+4); and 4 outputs Bo(y,2q+3), Bo(y,2q+4), Fo(y,2q+3), and Fo(y,2q+4). The stage (ring "y", stage "q+1") also consists of six 2:1 Muxes namely F(y,2q+3), F(y,2q+4), U(y,2q+3), U(y,2q+4), B(y,2q+3), and B(y,2q+4). The 2:1 Mux F(y,2q+3) has two inputs namely Fi(y,2q+3) and Fi(y,2q+4) and has one output Fo(y,2q+3). The 2:1 Mux F(y,2q+4) has two inputs namely Fi(y,2q+3) and Fi(y,2q+4) and has one output Fo(y,2q+4).

The 2:1 Mux U(y,2q+3) has two inputs namely Ui(y,2q+3) and Fo(y,2q+3) and has one output Uo(y,2q+3). The 2:1 Mux U(y,2q+4) has two inputs namely Ui(y,2q+4) and Fo(y,2q+4) and has one output Uo(y,2q+4). The 2:1 Mux B(y,2q+3) has two inputs namely Uo(y,2q+3) and Uo(y,2q+4) and has one output Bo(y,2q+3). The 2:1 Mux B(y,2q+4) has two inputs namely Uo(y,2q+3) and Uo(y,2q+4) and has one output Bo(y,2q+4).

The output Fo(y,2q+1) of the stage (ring "y", stage "q") is connected to the input Fi(y,2q+3) of the stage (ring "y", stage "q+1"). And the output Bo(y,2q+3) of the stage (ring "y", stage "q+1") is connected to the input Ui(y,2q+1) of the stage (ring "y", stage "q").

The output Fo(x,2p+2) of the stage (ring "x", stage "p") is connected via the wire Hop(1,1) to the input Fi(y,2q+4) of the stage (ring "y", stage "q+1"). The output Bo(x,2p+4) of the stage (ring "x", stage "p+l") is connected via the wire Hop(1,2) to the input Ui(y,2q+2) of the stage (ring "y", stage "q").

The output Fo(y,2q+2) of the stage (ring "y", stage "q") is connected via the wire Hop(2,1) to the input Fi(x,2p+4) of the stage (ring "x", stage "p+1"). The output Bo(y,2q+4) of the stage (ring "y", stage "q+1") is connected via the wire Hop(2,2) to the input Ui(x,2p+2) of the stage (ring "x", stage "p").

Referring to diagram 300D in FIG. 3D, illustrates all the connections between two arbitrary successive stages of a ring namely the stages (ring "x", stage "p") and (ring "x", stage "p+1") and two other arbitrary successive stages of any other ring namely the stages (ring "y", stage "q") and (ring "y", stage "q+1"), of the complete multi-stage hierarchical network $V_{Comb}(N_1, N_2, d, s)$.

The stage (ring "x", stage "p") consists of 4 inputs namely Fi(x,2p+1), Fi(x,2p+2), Ui(x,2p+1), and Ui(x,2p+2); and 4 outputs Bo(x,2p+1), Bo(x,2p+2), Fo(x,2p+1), and Fo(x,2p+2). The stage (ring "x", stage "p') also consists of six 2:1 Muxes namely F(x,2p+1), F(x,2p+2), U(x,2p+1), U(x,2p+2), B(x,2p+1), and B(x,2p+2). The 2:1 Mux F(x,2p+1) has two inputs namely Fi(x,2p+1) and Fi(x,2p+2) and has one output Fo(x,2p+1). The 2:1 Mux F(x,2p+2) has two inputs namely Fi(x,2p+1) and Fi(x,2p+2) and has one output Fo(x,2p+2).

The 2:1 Mux U(x,2p+1) has two inputs namely Ui(x,2p+1) and Fo(x,2p+1) and has one output Uo(x,2p+1). The 2:1 Mux U(x,2p+2) has two inputs namely Ui(x,2p+2) and Fo(x,2p+2) and has one output Uo(x,2p+2). The 2:1 Mux B(x,2p+1) has two inputs namely Uo(x,2p+1) and Uo(x,2p+2) and has one output Bo(x,2p+1). The 2:1 Mux B(x,2p+2) has two inputs namely Uo(x,2p+1) and Uo(x,2p+2) and has one output Bo(x,2p+2).

The stage (ring "x", stage "p+l") consists of 2 inputs namely Fi(x,2p+3), Fi(x,2p+4); and 2 outputs Fo(x,2p+3), and Fo(x,2p+4). The stage (ring "x", stage "p+1") also consists of two 2:1 Muxes namely F(x,2p+3) and F(x,2p+4). The 2:1 Mux F(x,2p+3) has two inputs namely Fi(x,2p+3) and Fi(x,2p+4) and has one output Fo(x,2p+3). The 2:1 Mux F(x,2p+4) has two inputs namely Fi(x,2p+3) and Fi(x,2p+4) and has one output Fo(x,2p+4).

The output Fo(x,2p+1) of the stage (ring "x", stage "p") is connected to the input Fi(x,2p+3) of the stage (ring "x", stage "p+1"). And the output Fo(x,2p+3) of the stage (ring "x", stage "p+1") is connected to the input Ui(x,2p+1) of the stage (ring "x", stage "p").

The stage (ring "y", stage "q") consists of 4 inputs namely Fi(y,2q+1), Fi(y,2q+2), Ui(y,2q+1), and Ui(y,2q+2); and 4 outputs Bo(y,2q+1), Bo(y,2q+2), Fo(y,2q+1), and Fo(y,2q+2). The stage (ring "y", stage "q') also consists of six 2:1 Muxes namely F(y,2q+1), F(y,2q+2), U(y,2q+1), U(y,2q+2), B(y,2q+1), and B(y,2q+2). The 2:1 Mux F(y,2q+1) has two inputs namely Fi(y,2q+1) and Fi(y,2q+2) and has one output Fo(y,2q+1). The 2:1 Mux F(y,2q+2) has two inputs namely Fi(y,2q+1) and Fi(y,2q+2) and has one output Fo(y,2q+2).

The 2:1 Mux U(y,2q+1) has two inputs namely Ui(y,2q+1) and Fo(y,2q+1) and has one output Uo(y,2q+1). The 2:1 Mux U(y,2q+2) has two inputs namely Ui(y,2q+2) and Fo(y,2q+2) and has one output Uo(y,2q+2). The 2:1 Mux B(y,2q+1) has two inputs namely Uo(y,2q+1) and Uo(y,2q+

2) and has one output Bo(y,2q+1). The 2:1 Mux B(y,2q+2) has two inputs namely Uo(y,2q+1) and Uo(y,2q+2) and has one output Bo(y,2q+2).

The stage (ring "y", stage "q+1") consists of 4 inputs namely Fi(y,2q+3), Fi(y,2q+4), Ui(y,2q+3), and Ui(y,2q+4); and 4 outputs Bo(y,2q+3), Bo(y,2q+4), Fo(y,2q+3), and Fo(y,2q+4). The stage (ring "y", stage "q+1") also consists of six 2:1 Muxes namely F(y,2q+3), F(y,2q+4), U(y,2q+3), U(y,2q+4), B(y,2q+3), and B(y,2q+4).

The 2:1 Mux F(y,2q+3) has two inputs namely Fi(y,2q+3) and Fi(y,2q+4) and has one output Fo(y,2q+3). The 2:1 Mux F(y,2q+4) has two inputs namely Fi(y,2q+3) and Fi(y,2q+4) and has one output Fo(y,2q+4).

The 2:1 Mux U(y,2q+3) has two inputs namely Ui(y,2q+3) and Fo(y,2q+3) and has one output Uo(y,2q+3). The 2:1 Mux U(y,2q+4) has two inputs namely Ui(y,2q+4) and Fo(y,2q+4) and has one output Uo(y,2q+4). The 2:1 Mux B(y,2q+3) has two inputs namely Uo(y,2q+3) and Uo(y,2q+4) and has one output Bo(y,2q+3). The 2:1 Mux B(y,2q+4) has two inputs namely Uo(y,2q+3) and Uo(y,2q+4) and has one output Bo(y,2q+4).

The output Fo(y,2q+1) of the stage (ring "y", stage "q") is connected to the input Fi(y,2q+3) of the stage (ring "y", stage "q+1"). And the output Bo(y,2q+3) of the stage (ring "y", stage "q+1") is connected to the input Ui(y,2q+1) of the stage (ring "y", stage "q").

The output Fo(x,2p+2) of the stage (ring "x", stage "p") is connected via the wire Hop(1,1) to the input Fi(y,2q+4) of the stage (ring "y", stage "q+1"). The output Fo(x,2p+4) of the stage (ring "x", stage "p+l") is connected via the wire Hop(1,2) to the input Ui(y,2q+2) of the stage (ring "y", stage "q").

The output Fo(y,2q+2) of the stage (ring "y", stage "q") is connected via the wire Hop(2,1) to the input Fi(x,2p+4) of the stage (ring "x", stage "p+1"). The output Bo(y,2q+4) of the stage (ring "y", stage "q+1") is connected via the wire Hop(2,2) to the input Ui(x,2p+2) of the stage (ring "x", stage "p").

Referring to diagram 300E in FIG. 3E, illustrates all the connections between root stage of a ring namely the stage (ring "x", stage "p") and two other arbitrary successive stages of any other ring namely the stages (ring "y", stage "q") and (ring "y", stage "q+1"), of the complete multi-stage hierarchical network $V_{Comb}(N_1, N_2, d, s)$.

The stage (ring "x", stage "p") consists of 4 inputs namely Fi(x,2p+1), Fi(x,2p+2), Ui(x,2p+1), and Ui(x,2p+2); and 4 outputs Bo(x,2p+1), Bo(x,2p+2), Fo(x,2p+1), and Fo(x,2p+2). The stage (ring "x", stage "p') also consists of six 2:1 Muxes namely F(x,2p+1), F(x,2p+2), U(x,2p+1), U(x,2p+2), B(x,2p+1), and B(x,2p+2). The 2:1 Mux F(x,2p+1) has two inputs namely Fi(x,2p+1) and Fi(x,2p+2) and has one output Fo(x,2p+1). The 2:1 Mux F(x,2p+2) has two inputs namely Fi(x,2p+1) and Fi(x,2p+2) and has one output Fo(x,2p+2).

The 2:1 Mux U(x,2p+1) has two inputs namely Ui(x,2p+1) and Fo(x,2p+1) and has one output Uo(x,2p+1). The 2:1 Mux U(x,2p+2) has two inputs namely Ui(x,2p+2) and Fo(x,2p+2) and has one output Uo(x,2p+2). The 2:1 Mux B(x,2p+1) has two inputs namely Uo(x,2p+1) and Uo(x,2p+2) and has one output Bo(x,2p+1). The 2:1 Mux B(x,2p+2) has two inputs namely Uo(x,2p+1) and Uo(x,2p+2) and has one output Bo(x,2p+2).

The stage (ring "y", stage "q") consists of 4 inputs namely Fi(y,2q+1), Fi(y,2q+2), Ui(y,2q+1), and Ui(y,2q+2); and 4 outputs Bo(y,2q+1), Bo(y,2q+2), Fo(y,2q+1), and Fo(y,2q+2). The stage (ring "y", stage "q') also consists of six 2:1 Muxes namely F(y,2q+1), F(y,2q+2), U(y,2q+1), U(y,2q+2), B(y,2q+1), and B(y,2q+2). The 2:1 Mux F(y,2q+1) has two inputs namely Fi(y,2q+1) and Fi(y,2q+2) and has one output Fo(y,2q+1). The 2:1 Mux F(y,2q+2) has two inputs namely Fi(y,2q+1) and Fi(y,2q+2) and has one output Fo(y,2q+2).

The 2:1 Mux U(y,2q+1) has two inputs namely Ui(y,2q+1) and Fo(y,2q+1) and has one output Uo(y,2q+1). The 2:1 Mux U(y,2q+2) has two inputs namely Ui(y,2q+2) and Fo(y,2q+2) and has one output Uo(y,2q+2). The 2:1 Mux B(y,2q+1) has two inputs namely Uo(y,2q+1) and Uo(y,2q+2) and has one output Bo(y,2q+1). The 2:1 Mux B(y,2q+2) has two inputs namely Uo(y,2q+1) and Uo(y,2q+2) and has one output Bo(y,2q+2).

The stage (ring "y", stage "q+1") consists of 4 inputs namely Fi(y,2q+3), Fi(y,2q+4), Ui(y,2q+3), and Ui(y,2q+4); and 4 outputs Bo(y,2q+3), Bo(y,2q+4), Fo(y,2q+3), and Fo(y,2q+4). The stage (ring "y", stage "q+1") also consists of six 2:1 Muxes namely F(y,2q+3), F(y,2q+4), U(y,2q+3), U(y,2q+4), B(y,2q+3), and B(y,2q+4). The 2:1 Mux F(y,2q+3) has two inputs namely Fi(y,2q+3) and Fi(y,2q+4) and has one output Fo(y,2q+3). The 2:1 Mux F(y,2q+4) has two inputs namely Fi(y,2q+3) and Fi(y,2q+4) and has one output Fo(y,2q+4).

The 2:1 Mux U(y,2q+3) has two inputs namely Ui(y,2q+3) and Fo(y,2q+3) and has one output Uo(y,2q+3). The 2:1 Mux U(y,2q+4) has two inputs namely Ui(y,2q+4) and Fo(y,2q+4) and has one output Uo(y,2q+4). The 2:1 Mux B(y,2q+3) has two inputs namely Uo(y,2q+3) and Uo(y,2q+4) and has one output Bo(y,2q+3). The 2:1 Mux B(y,2q+4) has two inputs namely Uo(y,2q+3) and Uo(y,2q+4) and has one output Bo(y,2q+4).

The output Fo(y,2q+1) of the stage (ring "y", stage "q") is connected to the input Fi(y,2q+3) of the stage (ring "y", stage "q+1"). And the output Bo(y,2q+3) of the stage (ring "y", stage "q+1") is connected to the input Ui(y,2q+1) of the stage (ring "y", stage "1q").

The output Fo(x,2p+1) of the stage (ring "x", stage "p") is connected via the wire Hop(1,2) to the input Ui(y,2q+2) of the stage (ring "y", stage "q"). The output Fo(x,2p+2) of the stage (ring "x", stage "p") is connected via the wire Hop(1,1) to the input Fi(y,2q+4) of the stage (ring "y", stage "q+1").

The output Fo(y,2q+2) of the stage (ring "y", stage "q") is connected via the wire Hop(2,1) to the input Ui(x,2p+1) of the stage (ring "x", stage "p"). The output Bo(y,2q+4) of the stage (ring "y", stage "q+1") is connected via the wire Hop(2,2) to the input Ui(x,2p+2) of the stage (ring "x", stage "p").

Just like in diagram 300A of FIG. 3A, in diagram 300B of FIG. 3B, in diagram 300C of FIG. 3C, diagram 300D of FIG. 3D, and in diagram 300E of FIG. 3E, the wires Hop(1,1), Hop(1,2), Hop(2,1), and Hop(2,2) are either internal hop wires or horizontal external hop wires or vertical external hop wires (hereinafter alternatively referred to as "cross links" or "cross middle links").

Figure 4A:
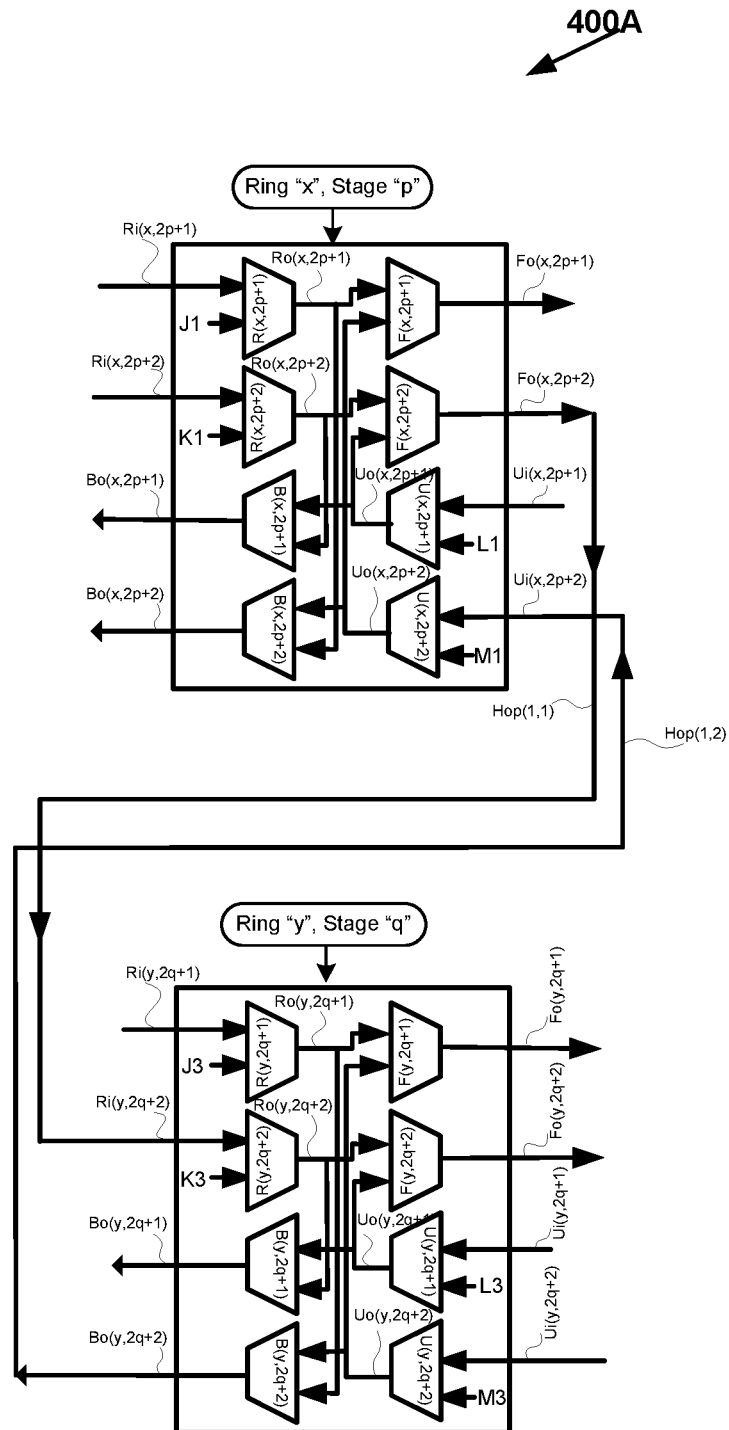
FIG. 4A is a diagram 400A, in an embodiment of, all the connections between different stages of two different rings in the same block or in two different blocks of a multi-stage hierarchical network.
Figure 4B:
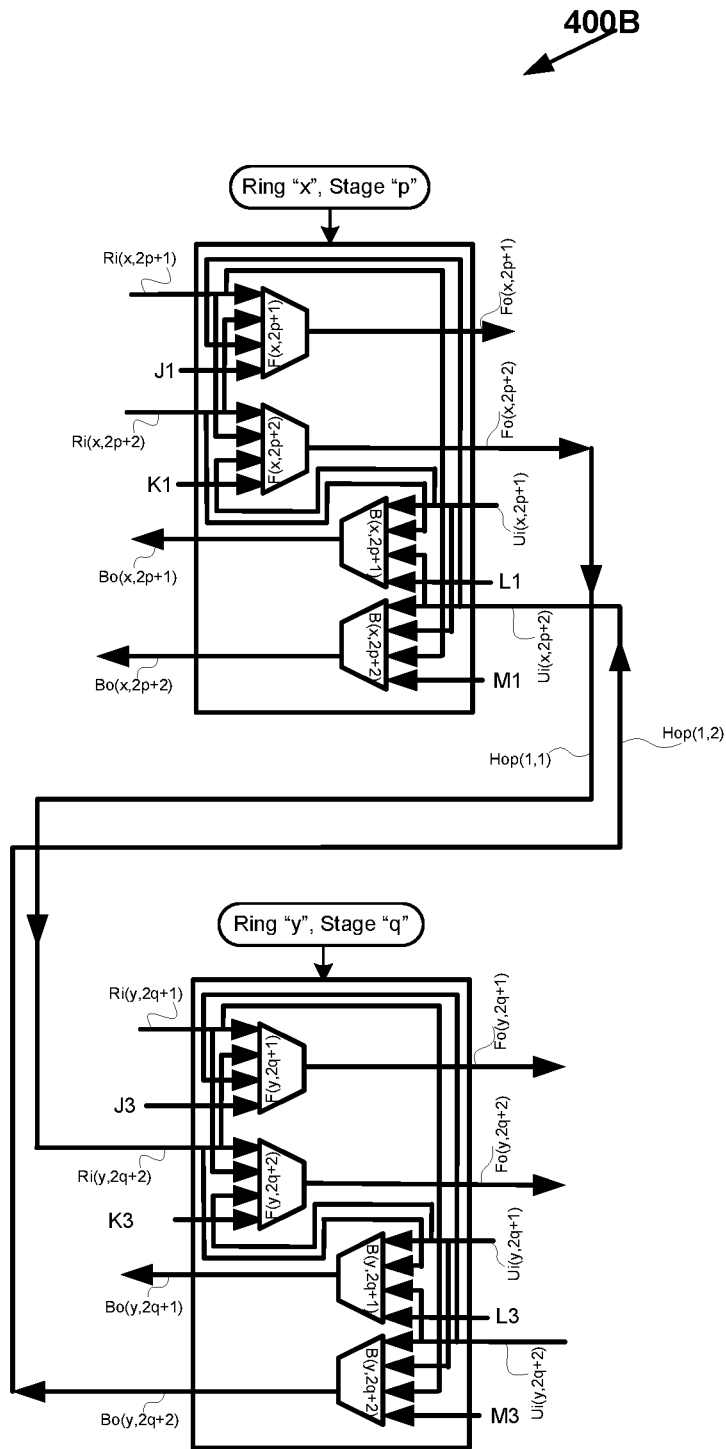
FIG. 4B is a diagram 400B, in an embodiment of, all the connections between different stages of two different rings in the same block or in two different blocks of a multi-stage hierarchical network.

The diagram 400A of FIGS. 4A and 400B of FIG. 4B are different embodiments of all the connections between two arbitrary stages in two different rings of the same block or two different rings of different blocks of 2D-grid 800. Referring to diagram 400A in FIG. 4A illustrates all the connections between an arbitrary stage of a ring namely the stages (ring "x", stage "p"), and another arbitrary stage of any other ring namely the stages (ring "y", stage "q") of the complete multi-stage hierarchical network $V_{Comb}(N_1, N_2, d, s)$.

The stage (ring "x", stage "p") consists of 8 inputs namely Ri(x,2p+1), Ri(x,2p+2), Ui(x,2p+1), Ui(x,2p+2), J1, K1, L1, and M1; and 4 outputs Bo(x,2p+1), Bo(x,2p+2), Fo(x,2p+1), and Fo(x,2p+2). The stage (ring "x", stage "p') also consists of eight 2:1 Muxes namely R(x,2p+1), R(x,2p+2), F(x,2p+1), F(x,2p+2), U(x,2p+1), U(x,2p+2), B(x,2p+1), and B(x,2p+2). The 2:1 Mux R(x,2p+1) has two inputs namely Ri(x,2p+1) and J1 and has one output Ro(x,2p+1). The 2:1 Mux R(x,2p+2) has two inputs namely Ri(x,2p+2) and K1 and has one output Ro(x,2p+2). The 2:1 Mux F(x,2p+1) has two inputs namely Ro(x,2p+1) and Uo(x,2p+2) and has one output Fo(x,2p+1). The 2:1 Mux F(x,2p+2) has two inputs namely Ro(x,2p+2) and Uo(x,2p+1) and has one output Fo(x,2p+2).

The 2:1 Mux U(x,2p+1) has two inputs namely Ui(x,2p+1) and L1 and has one output Uo(x,2p+1). The 2:1 Mux U(x,2p+2) has two inputs namely Ui(x,2p+2) and M1 and has one output Uo(x,2p+2). The 2:1 Mux B(x,2p+1) has two inputs namely Uo(x,2p+1) and Ro(x,2p+2) and has one output Bo(x,2p+1). The 2:1 Mux B(x,2p+2) has two inputs namely Uo(x,2p+2) and Ro(x,2p+1) and has one output Bo(x,2p+2).

The stage (ring "y", stage "q") consists of 8 inputs namely Ri(y,2q+1), Ri(y,2q+2), Ui(y,2q+1), Ui(y,2q+2), J3, K3, L3, and M3; and 4 outputs Bo(y,2q+1), Bo(y,2q+2), Fo(y,2q+1), and Fo(y,2q+2). The stage (ring "y", stage "q") also consists of eight 2:1 Muxes namely R(y,2q+1), R(y,2q+2), F(y,2q+1), F(y,2q+2), U(y,2q+1), U(y,2q+2), B(y,2q+1), and B(y,2q+2). The 2:1 Mux R(y,2q+1) has two inputs namely Ri(y,2q+1) and J3 and has one output Ro(y,2q+1). The 2:1 Mux R(y,2q+2) has two inputs namely Ri(y,2q+2) and K3 and has one output Ro(y,2q+2). The 2:1 Mux F(y,2q+1) has two inputs namely Ro(y,2q+1) and Uo(y,2q+2) and has one output Fo(y,2q+1). The 2:1 Mux F(y,2q+2) has two inputs namely Ro(y,2q+2) and Uo(y,2q+1) and has one output Fo(y,2q+2).

The 2:1 Mux U(y,2q+1) has two inputs namely Ui(y,2q+1) and L3, and has one output Uo(y,2q+1). The 2:1 Mux U(y,2q+2) has two inputs namely Ui(y,2q+2) and M3, and has one output Uo(y,2q+2). The 2:1 Mux B(y,2q+1) has two inputs namely Uo(y,2q+1) and Ro(y,2q+2) and has one output Bo(y,2q+1). The 2:1 Mux B(y,2q+2) has two inputs namely Uo(y,2q+2) and Ro(y,2q+1) and has one output Bo(y,2q+2).

The output Fo(x,2p+2) of the stage (ring "x", stage "p") is connected via the wire Hop(1,1) to the input Ri(y,2q+2) of the stage (ring "y", stage "q"). The output Bo(y,2q+2) of the stage (ring "y", stage "q") is connected via the wire Hop(1,2) to the input Ui(x,2p+2) of the stage (ring "x", stage "p").

Ring "x" and ring "y" may or may not belong to the same block of the complete multi-stage hierarchical network $V_{Comb}(N_1, N_2,d,s)$. If ring "x" and ring "y" belong to the same block of the complete multi-stage hierarchical network $V_{Comb}(N_1, N_2,d,s)$, then the wires Hop(1,1) and Hop(1,2) are hereinafter called "internal hop wires". For example if "x=2" and "y=3" and both the ring 2 and ring 3 belong to the same block (9,9) of 2D-grid 800, then the wires Hop(1,1) and Hop(1,2) are "internal hop wires".

If ring "x" and ring "y" belong to the different blocks of the complete multi-stage hierarchical network $V_{Comb}(N_1, N_2,d,s)$, then the wires Hop(1,1) and Hop(1,2) are hereinafter called "external hop wires". The external hop wires Hop(1,1) and Hop(1,2) may be horizontal wires or vertical wires. The length of the external hop wires is Manhattan distance between the corresponding blocks, hereinafter "hop length". For example if ring "x" belongs to block (1,1) and ring "y" belongs to block (1,6) of 2D-grid 800 then the external hop wires are hereinafter called "horizontal external hop wires".

And the hop length of the horizontal hop wires Hop(1,1) and Hop(1,2) is given by 6−1=5. Similarly if ring "x" and ring "y" belong to two blocks in the same horizontal row of 2D-grid 800, then the wires Hop(1,1) and Hop(1,2) are horizontal external hop wires.

For example if ring "x" belongs to block (1,1) and ring "y" belongs to block (9,1) of 2D-grid 800 then the external hop wires are hereinafter called "vertical external hop wires". And the hop length of the vertical hop wires Hop (1,1) and Hop(1,2) is given by 9−1=8. Similarly if ring "x" and ring "y" belong to two blocks in the same vertical column of 2D-grid 800, then the wires Hop(1,1) and Hop (1,2) are vertical external hop wires. External hop wires are typically horizontal or vertical according to the current invention.

Referring to diagram 400B in FIG. 4B illustrates all the connections between an arbitrary stage of a ring namely the stages (ring "x", stage "p"), and another arbitrary stage of any other ring namely the stages (ring "y", stage "q") of the complete multi-stage hierarchical network $V_{comb}(N_1, N_2,d, s)$.

The stage (ring "x", stage "p") consists of 8 inputs namely Ri(x,2p+1), Ri(x,2p+2), Ui(x,2p+1), Ui(x,2p+2), J1, K1, L1, and M1; and 4 outputs Bo(x,2p+1), Bo(x,2p+2), Fo(x,2p+1), and Fo(x,2p+2). The stage (ring "x", stage "p') also consists of four 4:1 Muxes namely F(x,2p+1), F(x,2p+2), B(x,2p+1), and B(x,2p+2). The 4:1 Mux F(x,2p+1) has four inputs namely Ri(x,2p+1), Ri(x,2p+2), Ui(x,2p+2), and J1 and has one output Fo(x,2p+1). The 4:1 Mux F(x,2p+2) has four inputs namely Ri(x,2p+1), Ri(x,2p+2), Ui(x,2p+1), and K1 and has one output Fo(x,2p+2).

The 4:1 Mux B(x,2p+1) has four inputs namely Ui(x,2p+1), Ui(x,2p+2), Ri(x,2p+2), and L1 and has one output Bo(x,2p+1). The 2:1 Mux B(x,2p+2) has two inputs namely Ui(x,2p+1), Ui(x,2p+2), Ri(x,2p+1), and M1 and has one output Bo(x,2p+2).

The stage (ring "y", stage "q") consists of 8 inputs namely Ri(y,2q+1), Ri(y,2q+2), Ui(y,2q+1), Ui(y,2q+2), J3, K3, L3, and M3; and 4 outputs Bo(y,2q+1), Bo(y,2q+2), Fo(y,2q+1), and Fo(y,2q+2). The stage (ring "y", stage "q') also consists of four 4:1 Muxes namely F(y,2q+1), F(y,2q+2), B(y,2q+1), and B(y,2q+2). The 4:1 Mux F(y,2q+1) has four inputs namely Ri(y,2q+1), Ri(y,2q+2), Ui(y,2q+2), and J3 and has one output Fo(y,2q+1). The 4:1 Mux F(y,2q+2) has four inputs namely Ri(y,2q+1), Ri(y,2q+2), Ui(y,2q+1), and K3 and has one output Fo(y,2q+2).

The 4:1 Mux B(y,2q+1) has four inputs namely Ui(y,2q+1), Ui(y,2q+2), Ri(y,2q+2), and L3, and has one output Bo(y,2q+1). The 4:1 Mux B(y,2q+2) has four inputs namely Ui(y,2q+1), Ui(y,2q+2), Ri(y,2q+1), and M3, and has one output Bo(y,2q+2).

The output Fo(x,2p+2) of the stage (ring "x", stage "p") is connected via the wire Hop(1,1) to the input Ri(y,2q+2) of the stage (ring "y", stage "q"). The output Bo(y,2q+2) of the stage (ring "y", stage "q") is connected via the wire Hop(1,2) to the input Ui(x,2p+2) of the stage (ring "x", stage "p").

Ring "x" and ring "y" may or may not belong to the same block of the complete multi-stage hierarchical network $V_{Comb}(N_1, N_2,d,s)$. If ring "x" and ring "y" belong to the same block of the complete multi-stage hierarchical network $V_{Comb}(N_1, N_2,d,s)$, then the wires Hop(1,1) and Hop(1,2) are hereinafter called "internal hop wires". For example if "x=2" and "y=3" and both the ring 2 and ring 3 belong to the same block (9,9) of 2D-grid 800, then the wires Hop(1,1) and Hop(1,2) are "internal hop wires".

If ring "x" and ring "y" belong to the different blocks of the complete multi-stage hierarchical network $V_{Comb}(N_1,$ $N_2$, d, s), then the wires Hop(1,1) and Hop(1,2) are hereinafter called "external hop wires". The external hop wires Hop(1,1) and Hop(1,2) may be horizontal wires or vertical wires. The length of the external hop wires is Manhattan distance between the corresponding blocks, hereinafter "hop length". For example if ring "x" belongs to block (1,1) and ring "y" belongs to block (1,6) of 2D-grid 800 then the external hop wires are hereinafter called "horizontal external hop wires". And the hop length of the horizontal hop wires Hop(1,1) and Hop(1,2) is given by 6-1=5. Similarly if ring "x" and ring "y" belong to two blocks in the same horizontal row of 2D-grid 800, then the wires Hop(1,1) and Hop(1,2) are horizontal external hop wires.

For example if ring "x" belongs to block (1,1) and ring "y" belongs to block (9,1) of 2D-grid 800 then the external hop wires are hereinafter called "vertical external hop wires". And the hop length of the vertical hop wires Hop (1,1) and Hop(1,2) is given by 9-1=8. Similarly if ring "x" and ring "y" belong to two blocks in the same vertical column of 2D-grid 800, then the wires Hop(1,1) and Hop (1,2) are vertical external hop wires. External hop wires are typically horizontal or vertical according to the current invention.

Figure 5A:
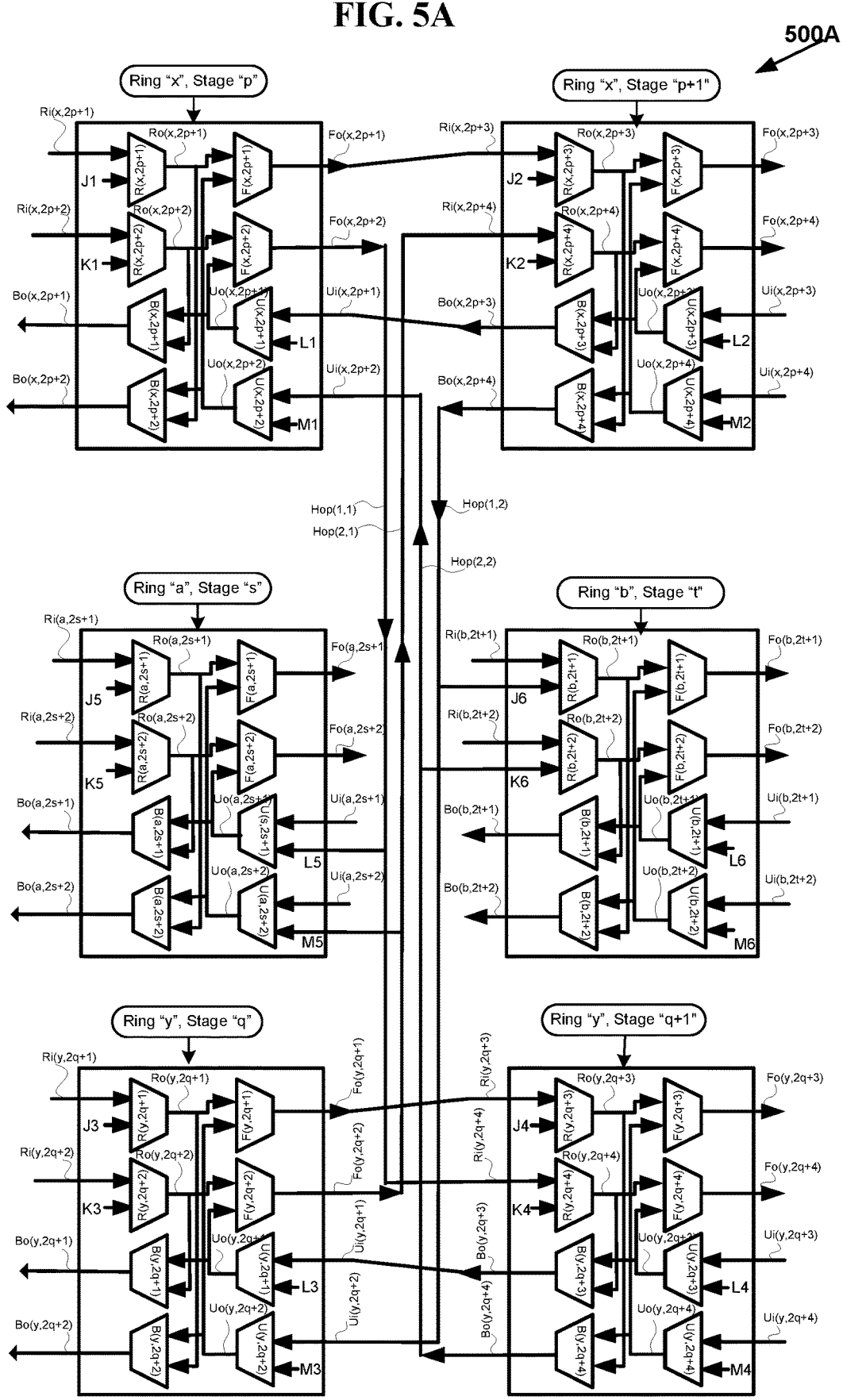
FIG. 5A is a diagram 500A, in an embodiment of, all the connections with multi-drop hop wires, between two successive stages of two different rings in the same block or in two different blocks of a multi-stage hierarchical network.

The diagram 500A of FIG. 5A is an embodiments of all the connections with multi-drop hop wires, between two arbitrary successive stages in two different rings of different blocks of 2D-grid 800. Referring to diagram 500A in FIG. 5A illustrates all the connections with multi-drop hop wires, between two arbitrary successive stages of a ring namely the stages (ring "x", stage "p") and (ring "x", stage "p+l") and two other arbitrary successive stages of any other ring namely the stages (ring "y", stage "q") and (ring "y", stage "q+1"), of the complete multi-stage hierarchical network $V_{Comb}(N_1, N_2, d, s)$. The multi-drop hop wires are also connected to two other stages (ring "a", stage "s") and (ring "b", stage "t") belonging to a third block.

The stage (ring "x", stage "p") consists of 8 inputs namely Ri(x,2p+1), Ri(x,2p+2), Ui(x,2p+1), Ui(x,2p+2), J1, K1, L1, and M1; and 4 outputs Bo(x,2p+1), Bo(x,2p+2), Fo(x,2p+1), and Fo(x,2p+2). The stage (ring "x", stage "p') also consists of eight 2:1 Muxes namely R(x,2p+1), R(x,2p+2), F(x,2p+1), F(x,2p+2), U(x,2p+1), U(x,2p+2), B(x,2p+1), and B(x,2p+2). The 2:1 Mux R(x,2p+1) has two inputs namely Ri(x,2p+1) and J1, and has one output Ro(x,2p+1). The 2:1 Mux R(x,2p+2) has two inputs namely Ri(x,2p+2) and K1, and has one output Ro(x,2p+2). The 2:1 Mux F(x,2p+1) has two inputs namely Ro(x,2p+1) and Uo(x,2p+2), and has one output Fo(x,2p+1). The 2:1 Mux F(x,2p+2) has two inputs namely Ro(x,2p+2) and Uo(x,2p+1), and has one output Fo(x,2p+2).

The 2:1 Mux U(x,2p+1) has two inputs namely Ui(x,2p+1) and L1, and has one output Uo(x,2p+1). The 2:1 Mux U(x,2p+2) has two inputs namely Ui(x,2p+2) and M1, and has one output Uo(x,2p+2). The 2:1 Mux B(x,2p+1) has two inputs namely Uo(x,2p+1) and Ro(x,2p+2), and has one output Bo(x,2p+1). The 2:1 Mux B(x,2p+2) has two inputs namely Uo(x,2p+2) and Ro(x,2p+1), and has one output Bo(x,2p+2).

The stage (ring "x", stage "p+1") consists of 8 inputs namely Ri(x,2p+3), Ri(x,2p+4), Ui(x,2p+3), Ui(x,2p+4), J2, K2, L2, and M2; and 4 outputs Bo(x,2p+3), Bo(x,2p+4), Fo(x,2p+3), and Fo(x,2p+4). The stage (ring "x", stage "p+l") also consists of eight 2:1 Muxes namely R(x,2p+3), R(x,2p+4), F(x,2p+3), F(x,2p+4), U(x,2p+3), U(x,2p+4), B(x,2p+3), and B(x,2p+4). The 2:1 Mux R(x,2p+3) has two inputs namely Ri(x,2p+3) and J2, and has one output Ro(x,2p+3). The 2:1 Mux R(x,2p+4) has two inputs namely Ri(x,2p+4) and K2, and has one output Ro(x,2p+4). The 2:1 Mux F(x,2p+3) has two inputs namely Ro(x,2p+3) and Uo(x,2p+4), and has one output Fo(x,2p+3). The 2:1 Mux F(x,2p+4) has two inputs namely Ro(x,2p+4) and Uo(x,2p+3), and has one output Fo(x,2p+4).

The 2:1 Mux U(x,2p+3) has two inputs namely Ui(x,2p+3) and L2, and has one output Uo(x,2p+3). The 2:1 Mux U(x,2p+4) has two inputs namely Ui(x,2p+4) and M2, and has one output Uo(x,2p+4). The 2:1 Mux B(x,2p+3) has two inputs namely Uo(x,2p+3) and Ro(x,2p+4), and has one output Bo(x,2p+3). The 2:1 Mux B(x,2p+4) has two inputs namely Uo(x,2p+4) and Ro(x,2p+3), and has one output Bo(x,2p+4).

The output Fo(x,2p+1) of the stage (ring "x", stage "p") is connected to the input Ri(x,2p+3) of the stage (ring "x", stage "p+l"). And the output Bo(x,2p+3) of the stage (ring "x", stage "p+1") is connected to the input Ui(x,2p+1) of the stage (ring "x", stage "p").

The stage (ring "y", stage "q") consists of 8 inputs namely Ri(y,2q+1), Ri(y,2q+2), Ui(y,2q+1), Ui(y,2q+2), J3, K3, L3, and M3; and 4 outputs Bo(y,2q+1), Bo(y,2q+2), Fo(y,2q+1), and Fo(y,2q+2). The stage (ring "y", stage "q') also consists of eight 2:1 Muxes namely R(y,2q+1), R(y,2q+2), F(y,2q+1), F(y,2q+2), U(y,2q+1), U(y,2q+2), B(y,2q+1), and B(y,2q+2). The 2:1 Mux R(y,2q+1) has two inputs namely Ri(y,2q+1) and J3, and has one output Ro(y,2q+1). The 2:1 Mux R(y,2q+2) has two inputs namely Ri(y,2q+2) and K3, and has one output Ro(y,2q+2). The 2:1 Mux F(y,2q+1) has two inputs namely Ro(y,2q+1) and Uo(y,2q+2), and has one output Fo(y,2q+1). The 2:1 Mux F(y,2q+2) has two inputs namely Ro(y,2q+2) and Uo(y,2q+1) and has one output Fo(y,2q+2).

The 2:1 Mux U(y,2q+1) has two inputs namely Ui(y,2q+1) and L3, and has one output Uo(y,2q+1). The 2:1 Mux U(y,2q+2) has two inputs namely Ui(y,2q+2) and M3, and has one output Uo(y,2q+2). The 2:1 Mux B(y,2q+1) has two inputs namely Uo(y,2q+1) and Ro(y,2q+2), and has one output Bo(y,2q+1). The 2:1 Mux B(y,2q+2) has two inputs namely Uo(y,2q+2) and Ro(y,2q+1), and has one output Bo(y,2q+2).

The stage (ring "y", stage "q+1") consists of 8 inputs namely Ri(y,2q+3), Ri(y,2q+4), Ui(y,2q+3), Ui(y,2q+4), J4, K4, L4, and M4; and 4 outputs Bo(y,2q+3), Bo(y,2q+4), Fo(y,2q+3), and Fo(y,2q+4). The stage (ring "y", stage "q+1") also consists of eight 2:1 Muxes namely R(y,2q+3), R(y,2q+4), F(y,2q+3), F(y,2q+4), U(y,2q+3), U(y,2q+4), B(y,2q+3), and B(y,2q+4). The 2:1 Mux R(y,2q+3) has two inputs namely Ri(y,2q+3) and J4, and has one output Ro(y,2q+3). The 2:1 Mux R(y,2q+4) has two inputs namely Ri(y,2q+4) and K4, and has one output Ro(y,2q+4). The 2:1 Mux F(y,2q+3) has two inputs namely Ro(y,2q+3) and Uo(y,2q+4), and has one output Fo(y,2q+3). The 2:1 Mux F(y,2q+4) has two inputs namely Ro(y,2q+4) and Uo(y,2q+3), and has one output Fo(y,2q+4).

The 2:1 Mux U(y,2q+3) has two inputs namely Ui(y,2q+3) and L4, and has one output Uo(y,2q+3). The 2:1 Mux U(y,2q+4) has two inputs namely Ui(y,2q+4) and M4, and has one output Uo(y,2q+4). The 2:1 Mux B(y,2q+3) has two inputs namely Uo(y,2q+3) and Ro(y,2q+4), and has one output Bo(y,2q+3). The 2:1 Mux B(y,2q+4) has two inputs namely Uo(y,2q+4) and Ro(y,2q+3), and has one output Bo(y,2q+4).

The output Fo(y,2q+1) of the stage (ring "y", stage "q") is connected to the input Ri(y,2q+3) of the stage (ring "y", stage "q+1"). And the output Bo(y,2q+3) of the stage (ring "y", stage "q+1") is connected to the input Ui(y,2q+1) of the stage (ring "y", stage "1q") The output Fo(x,2p+2) of the stage (ring "x", stage "p") is connected via the wire Hop(1,1) to the input Ri(y,2q+4) of the stage (ring "y", stage "q+1"). The output Bo(x,2p+4) of the stage (ring "x", stage "p+l") is connected via the wire Hop(1,2) to the input Ui(y,2q+2) of the stage (ring "y", stage "q").

The output Fo(y,2q+2) of the stage (ring "y", stage "q") is connected via the wire Hop(2,1) to the input Ri(x,2p+4) of the stage (ring "x", stage "p+1"). The output Bo(y,2q+4) of the stage (ring "y", stage "q+1") is connected via the wire Hop(2,2) to the input Ui(x,2p+2) of the stage (ring "x", stage "p").

In various embodiments, the inputs J1, K1, L1, and M1 are connected from any of the outputs of any other stages of any ring of any block of the multi-stage hierarchical network $V_{Comb}(N_1, N_2,d,s)$. Similarly the inputs J2, K2, L2, and M2 are connected from any of the outputs of any other stages of any ring of any block of the multi-stage hierarchical network $V_{Comb}(N_1, N_2,d,s)$. Similarly the inputs J3, K3, L3, and M3 are connected from any of the outputs of any other stages of any ring of any block of the multi-stage hierarchical network $V_{Comb}(N_1, N_2,d,s)$. Finally the inputs J4, K4, L4, and M4 are connected from any of the outputs of any other stages of any ring of any block of the multi-stage hierarchical network $V_{Comb}(N_1, N_2,d,s)$.

The stage (ring "a", stage "s") consists of 8 inputs namely Ri(a,2s+1), Ri(a,2s+2), Ui(a,2s+1), Ui(a,2s+2), J5, K5, L5, and M5; and 4 outputs Bo(a,2s+1), Bo(a,2s+2), Fo(a,2s+1), and Fo(a,2s+2). The stage (ring "a", stage "s') also consists of eight 2:1 Muxes namely R(a,2s+1), R(a,2s+2), F(a,2s+1), F(a,2s+2), U(a,2s+1), U(a,2s+2), B(a,2s+1), and B(a,2s+2). The 2:1 Mux R(a,2s+1) has two inputs namely Ri(a,2s+1) and J5, and has one output Ro(a,2s+1). The 2:1 Mux R(a,2s+2) has two inputs namely Ri(a,2s+2) and K5, and has one output Ro(a,2s+2). The 2:1 Mux F(a,2s+1) has two inputs namely Ro(a,2s+1) and Uo(a,2s+2), and has one output Fo(a,2s+1). The 2:1 Mux F(a,2s+2) has two inputs namely Ro(a,2s+2) and Uo(a,2s+1), and has one output Fo(a,2s+2).

The 2:1 Mux U(a,2s+1) has two inputs namely Ui(a,2s+1) and L5, and has one output Uo(a,2s+1). The 2:1 Mux U(a,2s+2) has two inputs namely Ui(a,2s+2) and M5, and has one output Uo(a,2s+2). The 2:1 Mux B(a,2s+1) has two inputs namely Uo(a,2s+1) and Ro(a,2s+2), and has one output Bo(a,2s+1). The 2:1 Mux B(a,2s+2) has two inputs namely Uo(a,2s+2) and Ro(a,2s+1), and has one output Bo(a,2s+2).

The stage (ring "b", stage "t") consists of 8 inputs namely Ri(b,2t+1), Ri(b,2t+2), Ui(b,2t+1), Ui(b,2t+2), J6, K6, L6, and M6; and 4 outputs Bo(b,2t+1), Bo(b,2t+2), Fo(b,2t+1), and Fo(b,2t+2). The stage (ring "b", stage "t') also consists of eight 2:1 Muxes namely R(b,2t+1), R(b,2t+2), F(b,2t+1), F(b,2t+2), U(b,2t+1), U(b,2t+2), B(b,2t+1), and B(b,2t+2). The 2:1 Mux R(b,2t+1) has two inputs namely Ri(b,2t+1) and J6, and has one output Ro(b,2t+1). The 2:1 Mux R(b,2t+2) has two inputs namely Ri(b,2t+2) and K6, and has one output Ro(b,2t+2). The 2:1 Mux F(b,2t+1) has two inputs namely Ro(b,2t+1) and Uo(b,2t+2), and has one output Fo(b,2t+1). The 2:1 Mux F(b,2t+2) has two inputs namely Ro(b,2t+2) and Uo(b,2t+1), and has one output Fo(b,2t+2).

The 2:1 Mux U(b,2t+1) has two inputs namely Ui(b,2t+1) and L6, and has one output Uo(b,2t+1). The 2:1 Mux U(b,2t+2) has two inputs namely Ui(b,2t+2) and M6, and has one output Uo(b,2t+2). The 2:1 Mux B(b,2t+1) has two inputs namely Uo(b,2t+1) and Ro(b,2t+2), and has one output Bo(b,2t+1). The 2:1 Mux B(b,2t+2) has two inputs namely Uo(b,2t+2) and Ro(b,2t+1), and has one output Bo(b,2t+2).

The wire Hop(1,1) starting from the output Fo(x,2p+2) of the stage (ring "x", stage "p") is also connected to L5 of the stage (ring "a", stage "s"), in addition to the input Ri(y,2q+4) of the stage (ring "y", stage "q+1"). The stage (ring "x", stage "p"), the stage (ring "a", stage "s"), and the stage (ring "y", stage "q+1") may belong to three different blocks of the multi-stage hierarchical network $V_{Comb}(N_1, N_2,d,s)$. Therefore the hop length between the blocks consisting of the stage (ring "x", stage "p") and the stage (ring "a", stage "s") may not be equal to the hop length between the blocks consisting of the stage (ring "x", stage "p") and the stage (ring "y", stage "q+1"). For example the hop length between the blocks consisting of the stage (ring "x", stage "p") and the stage (ring "a", stage "s") may be one where as the hop length between the blocks consisting of the stage (ring "x", stage "p") and the stage (ring "q", stage "y+1") may be two. In such a case the wire Hop(1,1) is called hereinafter a "multi-drop hop wire". The wire Hop(1,1) may be either horizontal hop wire or vertical hop wire. Also multi-drop hop wires are either horizontal external hop wires or vertical external hop wires. Similarly the hop length between the blocks consisting of the stage (ring "x", stage "p") and the stage (ring "a", stage "s") may be any number greater than or equal to one, and also the hop length between the blocks consisting of the stage (ring "x", stage "p") and the stage (ring "q", stage "y+1") may be any number greater or equal to one.

In general a multi-drop hop wire may be dropping or terminating in more than one different blocks of the multi-stage hierarchical network $V_{Comb}(N_1, N_2,d,s)$. For example a multi-drop hop wire starting from one block of the multi-stage hierarchical network $V_{Comb}(N_1, N_2,d,s)$ may be terminating at three different blocks or four different blocks, etc.

The wire Hop(1,2) starting from the output Bo(x,2p+4) of the stage (ring "x", stage "p+l") is also connected to J6 of the stage (ring "b", stage "t"), in addition to the input Ui(y,2q+2) of the stage (ring "y", stage "q"). The wire Hop(1,2) is also an example of multi-drop hop wire when the stage (ring "x", stage "p+1"), the stage (ring "b", stage "t") and the stage (ring "y", stage "q") belong to three different blocks of the multi-stage hierarchical network $V_{comb}(N_1, N_2,d,s)$.

The wire Hop(2,1) starting from the output Fo(y,2q+2) of the stage (ring "y", stage "q") is also connected to M5 of the stage (ring "a", stage "s"), in addition to the input Ri(x,2p+4) of the stage (ring "x", stage "p+l"). The wire Hop(2,1) is also an example of multi-drop hop wire when the stage (ring "x", stage "p+1"), the stage (ring "a", stage "s") and the stage (ring "y", stage "q") belong to three different blocks of the multi-stage hierarchical network $V_{comb}(N_1, N_2,d,s)$.

The wire Hop(2,2) starting from the output Bo(y,2q+4) of the stage (ring "y", stage "q+1") is also connected to K6 of the stage (ring "b", stage "t"), in addition to the input Ui(x,2p+2) of the stage (ring "x", stage "p"). The wire Hop(2,2) is also an example of multi-drop hop wire when the stage (ring "x", stage "p"), the stage (ring "b", stage "t") and the stage (ring "y", stage "q+1") belong to three different blocks of the multi-stage hierarchical network $V_{comb}(N_1, N_2,d,s)$.

In various embodiments, the inputs J5, K5, L5, and M5 are connected from any of the multi-drop hop wires starting from any other stages of any ring of any block of the multi-stage hierarchical network $V_{comb}(N_1, N_2,d,s)$. Also the inputs J6, K6, L6, and M6 are connected from any of the multi-drop hop wires starting from any other stages of any ring of any block of the multi-stage hierarchical network $V_{comb}(N_1, N_2,d,s)$.

Figure 6A:
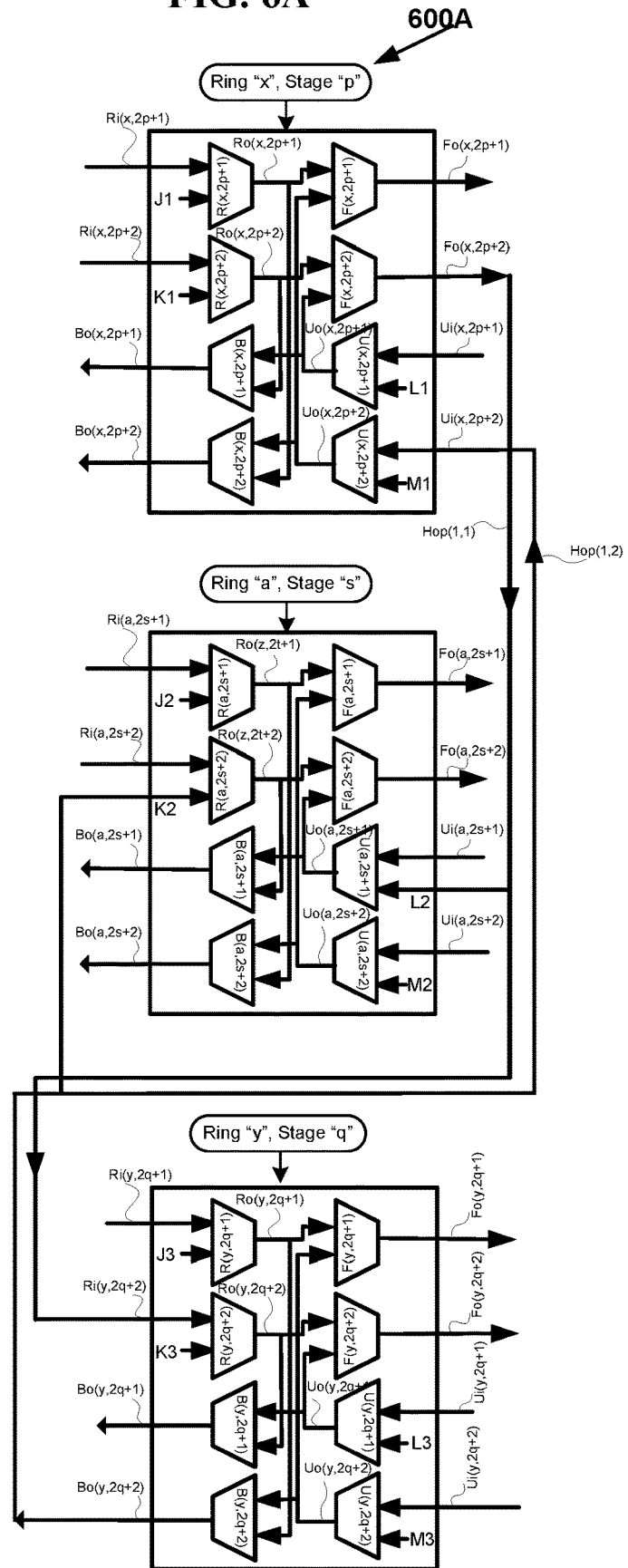
FIG. 6A is a diagram 600A, in an embodiment of, all the connections with multi-drop hop wires, between different stages of two different rings in the same block or in two different blocks of a multi-stage hierarchical network.
Figure 6B:
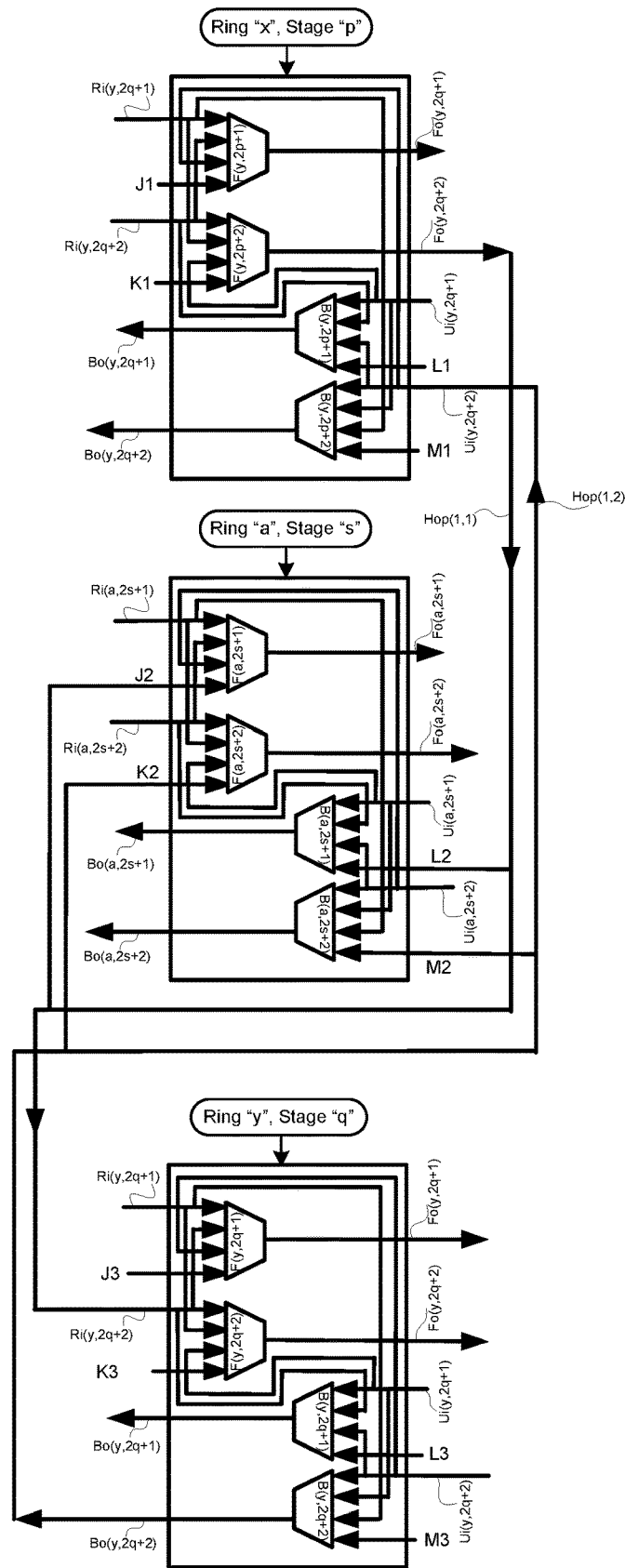
FIG. 6B is a diagram 600B, in an embodiment of, all the connections with multi-drop hop wires, between different stages of two different rings in the same block or in two different blocks of a multi-stage hierarchical network.

The diagram 600A of FIGS. 6A and 600B of FIG. 6B are different embodiments of all the connections with multi-drop hop wires, between two arbitrary stages in two different rings of different blocks of 2D-grid 800. Referring to diagram 600A in FIG. 6A illustrates all the connections with multi-drop hop wires, between an arbitrary stage of a ring namely the stages (ring "x", stage "p"), and another arbitrary stage of any other ring namely the stages (ring "y", stage "q") of the complete multi-stage hierarchical network $V_{Comb}(N_1, N_2,d,s)$. The multi-drop hop wires are also connected to another stage (ring "a", stage "s") belonging to a third block.

The stage (ring "x", stage "p") consists of 8 inputs namely Ri(x,2p+1), Ri(x,2p+2), Ui(x,2p+1), Ui(x,2p+2), J1, K1, L1, and M1; and 4 outputs Bo(x,2p+1), Bo(x,2p+2), Fo(x,2p+1), and Fo(x,2p+2). The stage (ring "x", stage "p') also consists of eight 2:1 Muxes namely R(x,2p+1), R(x,2p+2), F(x,2p+1), F(x,2p+2), U(x,2p+1), U(x,2p+2), B(x,2p+1), and B(x,2p+2). The 2:1 Mux R(x,2p+1) has two inputs namely Ri(x,2p+1) and J1 and has one output Ro(x,2p+1). The 2:1 Mux R(x,2p+2) has two inputs namely Ri(x,2p+2) and K1 and has one output Ro(x,2p+2). The 2:1 Mux F(x,2p+1) has two inputs namely Ro(x,2p+1) and Uo(x,2p+2) and has one output Fo(x,2p+1). The 2:1 Mux F(x,2p+2) has two inputs namely Ro(x,2p+2) and Uo(x,2p+1) and has one output Fo(x,2p+2).

The 2:1 Mux U(x,2p+1) has two inputs namely Ui(x,2p+1) and L1 and has one output Uo(x,2p+1). The 2:1 Mux U(x,2p+2) has two inputs namely Ui(x,2p+2) and M1 and has one output Uo(x,2p+2). The 2:1 Mux B(x,2p+1) has two inputs namely Uo(x,2p+1) and Ro(x,2p+2) and has one output Bo(x,2p+1). The 2:1 Mux B(x,2p+2) has two inputs namely Uo(x,2p+2) and Ro(x,2p+1) and has one output Bo(x,2p+2).

The stage (ring "y", stage "q") consists of 8 inputs namely Ri(y,2q+1), Ri(y,2q+2), Ui(y,2q+1), Ui(y,2q+2), J3, K3, L3, and M3; and 4 outputs Bo(y,2q+1), Bo(y,2q+2), Fo(y,2q+1), and Fo(y,2q+2). The stage (ring "y", stage "q') also consists of eight 2:1 Muxes namely R(y,2q+1), R(y,2q+2), F(y,2q+1), F(y,2q+2), U(y,2q+1), U(y,2q+2), B(y,2q+1), and B(y,2q+2). The 2:1 Mux R(y,2q+1) has two inputs namely Ri(y,2q+1) and J3 and has one output Ro(y,2q+1). The 2:1 Mux R(y,2q+2) has two inputs namely Ri(y,2q+2) and K3 and has one output Ro(y,2q+2). The 2:1 Mux F(y,2q+1) has two inputs namely Ro(y,2q+1) and Uo(y,2q+2) and has one output Fo(y,2q+1). The 2:1 Mux F(y,2q+2) has two inputs namely Ro(y,2q+2) and Uo(y,2q+1) and has one output Fo(y,2q+2).

The 2:1 Mux U(y,2q+1) has two inputs namely Ui(y,2q+1) and L3, and has one output Uo(y,2q+1). The 2:1 Mux U(y,2q+2) has two inputs namely Ui(y,2q+2) and M3, and has one output Uo(y,2q+2). The 2:1 Mux B(y,2q+1) has two inputs namely Uo(y,2q+1) and Ro(y,2q+2) and has one output Bo(y,2q+1). The 2:1 Mux B(y,2q+2) has two inputs namely Uo(y,2q+2) and Ro(y,2q+1) and has one output Bo(y,2q+2).

The output Fo(x,2p+2) of the stage (ring "x", stage "p") is connected via the wire Hop(1,1) to the input Ri(y,2q+2) of the stage (ring "y", stage "q"). The output Bo(y,2q+2) of the stage (ring "y", stage "q") is connected via the wire Hop(1,2) to the input Ui(x,2p+2) of the stage (ring "x", stage "p").

The wire Hop(1,1) starting from the output Fo(x,2p+2) of the stage (ring "x", stage "p") is also connected to L2 of the stage (ring "a", stage "s"), in addition to the input Ri(y,2q+2) of the stage (ring "y", stage "q"). The stage (ring "x", stage "p"), the stage (ring "a", stage "s"), and the stage (ring "y", stage "q") may belong to three different blocks of the multi-stage hierarchical network $V_{Comb}(N_1, N_2,d,s)$. Therefore the hop length between the blocks consisting of the stage (ring "x", stage "p") and the stage (ring "a", stage "s") may not be equal to the hop length between the blocks consisting of the stage (ring "x", stage "p") and the stage (ring "y", stage "q"). For example the hop length between the blocks consisting of the stage (ring "x", stage "p") and the stage (ring "a", stage "s") may be one where as the hop length between the blocks consisting of the stage (ring "x", stage "p") and the stage (ring "q", stage "y") may be two. Hence the wire Hop(1,1) is a multi-drop hop wire. Also the wire Hop(1,1) is either horizontal external hop wire or vertical external hop wire. Similarly the hop length between the blocks consisting of the stage (ring "x", stage "p") and the stage (ring "a", stage "s") may be any number greater than or equal to one, and also the hop length between the blocks consisting of the stage (ring "x", stage "p") and the stage (ring "q", stage "y") may be any number greater or equal to one.

The wire Hop(1,2) starting from the output Bo(y,2q+2) of the stage (ring "y", stage "q") is also connected to K2 of the stage (ring "a", stage "s"), in addition to the input Ui(x,2p+2) of the stage (ring "x", stage "p"). The wire Hop(1,2) is also an example of multi-drop hop wire when the stage (ring "x", stage "p"), the stage (ring "a", stage "s") and the stage (ring "y", stage "q") belong to three different blocks of the multi-stage hierarchical network $V_{comb}(N_1, N_2,d,s)$.

In various embodiments, the inputs J2, K2, L2, and M2 are connected from any of the multi-drop hop wires starting from any other stages of any ring of any block of the multi-stage hierarchical network $V_{Comb}(N_1, N_2,d,s)$.

Referring to diagram 600B in FIG. 6B illustrates all the connections with multi-drop hop wires, between an arbitrary stage of a ring namely the stages (ring "x", stage "p"), and another arbitrary stage of any other ring namely the stages (ring "y", stage "q") of the complete multi-stage hierarchical network $V_{Comb}(N_1, N_2,d,s)$. The multi-drop hop wires are also connected to another stage (ring "a", stage "s") belonging to a third block.

The stage (ring "x", stage "p") consists of 8 inputs namely Ri(x,2p+1), Ri(x,2p+2), Ui(x,2p+1), Ui(x,2p+2), J1, K1, L1, and M1; and 4 outputs Bo(x,2p+1), Bo(x,2p+2), Fo(x,2p+1), and Fo(x,2p+2). The stage (ring "x", stage "p') also consists of four 4:1 Muxes namely F(x,2p+1), F(x,2p+2), B(x,2p+1), and B(x,2p+2). The 4:1 Mux F(x,2p+1) has four inputs namely Ri(x,2p+1), Ri(x,2p+2), Ui(x,2p+2), and J1 and has one output Fo(x,2p+1). The 4:1 Mux F(x,2p+2) has four inputs namely Ri(x,2p+1), Ri(x,2p+2), Ui(x,2p+1), and K1 and has one output Fo(x,2p+2).

The 4:1 Mux B(x,2p+1) has four inputs namely Ui(x,2p+1), Ui(x,2p+2), Ri(x,2p+2), and L1 and has one output Bo(x,2p+1). The 2:1 Mux B(x,2p+2) has two inputs namely Ui(x,2p+1), Ui(x,2p+2), Ri(x,2p+1), and M1 and has one output Bo(x,2p+2).

The stage (ring "y", stage "q") consists of 8 inputs namely Ri(y,2q+1), Ri(y,2q+2), Ui(y,2q+1), Ui(y,2q+2), J3, K3, L3, and M3; and 4 outputs Bo(y,2q+1), Bo(y,2q+2), Fo(y,2q+1), and Fo(y,2q+2). The stage (ring "y", stage "q') also consists of four 4:1 Muxes namely F(y,2q+1), F(y,2q+2), B(y,2q+1), and B(y,2q+2). The 4:1 Mux F(y,2q+1) has four inputs namely Ri(y,2q+1), Ri(y,2q+2), Ui(y,2q+2), and J3 and has one output Fo(y,2q+1). The 4:1 Mux F(y,2q+2) has four inputs namely Ri(y,2q+1), Ri(y,2q+2), Ui(y,2q+1), and K3 and has one output Fo(y,2q+2).

The 4:1 Mux B(y,2q+1) has four inputs namely Ui(y,2q+1), Ui(y,2q+2), Ri(y,2q+2), and L3, and has one output Bo(y,2q+1). The 4:1 Mux B(y,2q+2) has four inputs namely Ui(y,2q+1), Ui(y,2q+2), Ri(y,2q+1), and M3, and has one output Bo(y,2q+2).

The output Fo(x,2p+2) of the stage (ring "x", stage "p") is connected via the wire Hop(1,1) to the input Ri(y,2q+2) of the stage (ring "y", stage "q"). The output Bo(y,2q+2) of the stage (ring "y", stage "q") is connected via the wire Hop(1,2) to the input Ui(x,2p+2) of the stage (ring "x", stage "p").

The wire Hop(1,1) starting from the output Fo(x,2p+2) of the stage (ring "x", stage "p") is also connected to L2 and J2 of the stage (ring "a", stage "s"), in addition to the input Ri(y,2q+2) of the stage (ring "y", stage "q"). The stage (ring "x", stage "p"), the stage (ring "a", stage "s"), and the stage (ring "y", stage "q") may belong to three different blocks of the multi-stage hierarchical network $V_{Comb}(N_1, N_2,d,s)$. Therefore the hop length between the blocks consisting of the stage (ring "x", stage "p") and the stage (ring "a", stage "s") may not be equal to the hop length between the blocks consisting of the stage (ring "x", stage "p") and the stage (ring "y", stage "q"). For example the hop length between the blocks consisting of the stage (ring "x", stage "p") and the stage (ring "a", stage "s") may be one where as the hop length between the blocks consisting of the stage (ring "x", stage "p") and the stage (ring "q", stage "y") may be two. Hence the wire Hop(1,1) is a multi-drop hop wire. Also the wire Hop(1,1) is either horizontal external hop wire or vertical external hop wire. Similarly the hop length between the blocks consisting of the stage (ring "x", stage "p") and the stage (ring "a", stage "s") may be any number greater than or equal to one, and also the hop length between the blocks consisting of the stage (ring "x", stage "p") and the stage (ring "q", stage "y") may be any number greater or equal to one.

The wire Hop(1,2) starting from the output Bo(y,2q+2) of the stage (ring "y", stage "q") is also connected to K2 and M2 of the stage (ring "a", stage "s"), in addition to the input Ui(x,2p+2) of the stage (ring "x", stage "p"). The wire Hop(1,2) is also an example of multi-drop hop wire when the stage (ring "x", stage "p"), the stage (ring "a", stage "s") and the stage (ring "y", stage "q") belong to three different blocks of the multi-stage hierarchical network $V_{comb}(N_1, N_2,d,s)$.

In various embodiments, the inputs J2, K2, L2, and M2 are connected from any of the multi-drop hop wires starting from any other stages of any ring of any block of the multi-stage hierarchical network $V_{comb}(N_1, N_2,d,s)$.

Figure 7A:
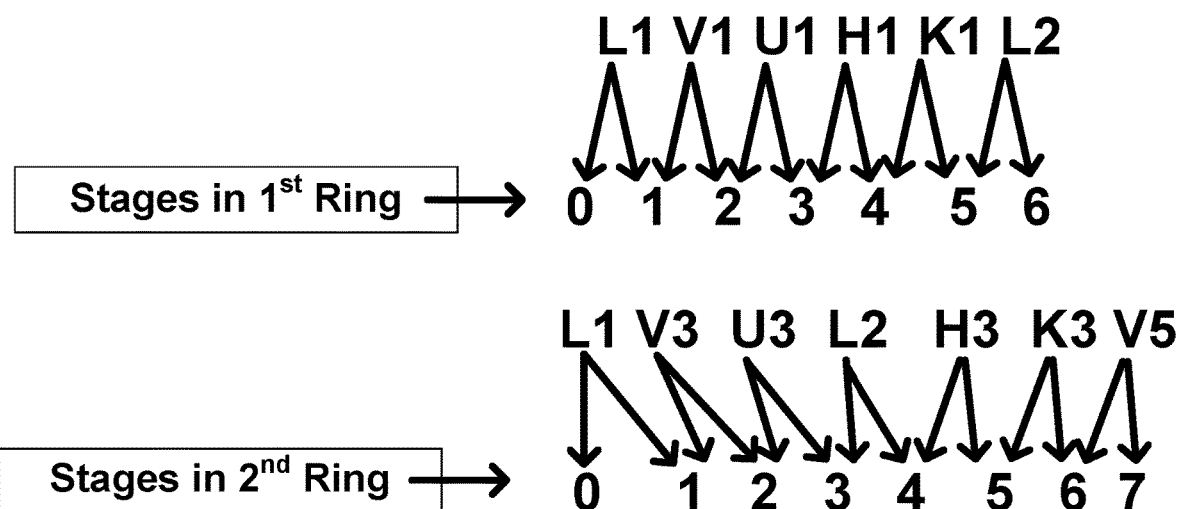
FIG. 7A is a diagram 700A, is an embodiment of hop wire connection chart corresponding to a block of multi-stage hierarchical network, where the inter-ring connections are given between two successive stages of two different rings as described in diagrams 300A of FIG. 3A to 300E of FIG. 3E.

Referring to diagram 700A in FIG. 7A, illustrates, in one embodiment, the hop wire connections chart of a partial multi-stage hierarchical network $V_{comb}(N_1, N_2,d,s)$ 100A or a partial multi-stage hierarchical network $V_{comb}(N_1, N_2,d,s)$ 100B, or a partial multi-stage hierarchical network $V_{comb}(N_1, N_2,d,s)$ 100C, with m=6 and n=7. The hop wire connections chart shows two rings namely ring 1 and ring 2. And there are m+1=7 stages in ring 1 and n+1=8 stages in ring 2.

The hop wire connections chart 700A illustrates how the hop wires are connected between any two successive stages of all the rings corresponding to a block of 2D-grid 800. "Lx" denotes an internal hop wire connection, where symbol "L" denotes internal hop wire and "x" is an integer. For example "L1" between the stages (ring 1, stage 0) and (ring 1, stage 1) denotes that the corresponding hop wires Hop(1,1), Hop(1,2), Hop(2,1), and Hop(2,2) are connected to two successive stages of another ring in the same block or alternatively hop wires Hop(1,1), Hop(1,2), Hop(2,1), and Hop(2,2) are internal hop wires. Since there is also "L1" between the stages (ring 2, stage 0) and (ring 2, stage 1), there are internal hop wire connections Hop(1,1), Hop(1,2), Hop(2,1), and Hop(2,2) connected between the stages (ring 1, stage 0) and (ring 1, stage 1) and the stages (ring 2, stage 0) and (ring 2, stage 1). Hence there can be only two "L1" labels in the hop wire connection chart 700A.

Similarly there are two "L2" labels in the hop wire connections chart 700A. Since the label "L2" is given between the stages (ring 1, stage 5) and (ring 1, stage 6) and also the label "L2" is given between the stages (ring 2, stage 3) and (ring 2, stage 4), there are corresponding internal hop wire connections Hop(1,1), Hop(1,2), Hop(2,1), and Hop(2,2) connected between the stages (ring 1, stage 5) and (ring 1, stage 6) and the stages (ring 2, stage 3) and (ring 2, stage 4). "Vx" denotes an external vertical hop wire, where symbol "V" denotes vertical external hop wire connections from blocks of the topmost row of 2D-grid 800 (i.e., row of blocks consisting of block (1,1), block (1,2), . . . , and block (1,10)) to the same corresponding stages of the same numbered ring of another block that is directly down south, with "x" vertical hop length, where "x" is a positive integer. For example "V1" between the stages (ring 1, stage 1) and (ring 1, stage 2) denote that from block (1,1) of 2D-grid 800 to another block directly below it, which is block (2,1), since "V1" denotes hop length of 1, there are external hop wire connections Hop(1,1), Hop(1,2), Hop(2,1), and Hop(2,2) from (ring 1, stage 1) and (ring 1, stage 2) of block (1,1) to (ring 1, stage 1) and (ring 1, stage 2) of block (2,1). It also means there are external hop wire connections Hop(1,1), Hop(1,2), Hop(2,1), and Hop(2,2) from (ring 1, stage 1) and (ring 1, stage 2) of block (3,1) to (ring 1, stage 1) and (ring 1, stage 2) of block (4,1). This pattern continues and finally there are external hop wire connections Hop(1,1), Hop(1,2), Hop(2,1), and Hop(2,2) from (ring 1, stage 1) and (ring 1, stage 2) of block (9,1) to (ring 1, stage 1) and (ring 1, stage 2) of block (10,1). The same pattern continues for all the columns starting from the block in the topmost row of each column.

Similarly "V3" between the stages (ring 2, stage 1) and (ring 2, stage 2) denote that from block (1,1) of 2D-grid 800 to another block below it and at a hop length of 3 which is block (4,1), there are external hop wire connections Hop(1,1), Hop(1,2), Hop(2,1), and Hop(2,2) from (ring 2, stage 1) and (ring 2, stage 2) of block (1,1) to (ring 2, stage 1) and (ring 2, stage 2) of block (4,1). It also means there are external hop wire connections Hop(1,1), Hop(1,2), Hop(2, 1), and Hop(2,2) from (ring 2, stage 1) and (ring 2, stage 2) of block (2,1) to (ring 2, stage 1) and (ring 2, stage 2) of block (5,1). This pattern continues and finally there are external hop wire connections Hop(1,1), Hop(1,2), Hop(2, 1), and Hop(2,2) from (ring 2, stage 1) and (ring 2, stage 2) of block (7,1) to (ring 2, stage 1) and (ring 2, stage 2) of block (10,1). The same pattern continues for all the columns starting from the block in the topmost row of each column.

If there is no block that is directly below a block with hop length equal to 3 then there is no vertical external hop wire connections is given corresponding to those two successive stages of the blocks. For example block (8,1) does not have any block that is directly below and with hop length equal to 3 then none of the vertical external hop wires are connected from (ring 2, stage 1) and (ring 2, stage 2) of block (8,1). Similarly from (ring 2, stage 1) and (ring 2, stage 2) of block (9,1) and from (ring 2, stage 1) and (ring 2, stage 2) of block (10,1), none of the vertical external hop wires are connected. Similarly vertical external hop wires are connected corresponding to "V5", "V7" etc., labels given in the hop wire connections chart 700A. "Ux" denotes an external vertical hop wire, where symbol "U" denotes vertical external hop wire connections starting from blocks that are "x" hop length below the topmost row of 2D-grid 800 (i.e., row of blocks consisting of block (1+x,1), block (1+x,2), . . . , and block (1+x,10)) to the same corresponding stages of the same numbered ring of another block that is directly down below, with "x" vertical hop length, where "x" is a positive integer. For example "U1" between the stages (ring 1, stage 2) and (ring 1, stage 3) denote that from block (2,1) of 2D-grid 800 to another block directly below it, which is block (3,1), since "U1" denotes hop length of 1, there are external hop wire connections Hop(1,1), Hop(1,2), Hop(2,1), and Hop(2,2) from (ring 1, stage 2) and (ring 1, stage 3) of block (2,1) to (ring 1, stage 2) and (ring 1, stage 3) of block (3,1). It also means there are external hop wire connections Hop(1,1), Hop(1,2), Hop(2,1), and Hop(2,2) from (ring 1, stage 2) and (ring 1, stage 3) of block (4,1) to (ring 1, stage 2) and (ring 1, stage 3) of block (5,1). This pattern continues and finally there are external hop wire connections Hop(1,1), Hop(1,2), Hop(2,1), and Hop(2,2) from (ring 1, stage 2) and (ring 1, stage 3) of block (8,1) to (ring 1, stage 2) and (ring 1, stage 3) of block (9,1). The same pattern continues for all the columns starting from the block in the topmost row of each column.

If there is no block that is directly below a block with hop length equal to 1 then no vertical external hop wire connections is given corresponding to those two successive stages of the blocks. For example block (10,1) does not have any block that is directly below and with hop length equal to 1 then none of the vertical external hop wires are connected from (ring 1, stage 2) and (ring 1, stage 3) of block (10,1). Similarly for all the blocks in each column from the topmost row up to the row "x", no vertical external hop wires are connected to the corresponding (ring 1, stage 2) and (ring 1, stage 3).

Similarly "U3" between the stages (ring 2, stage 2) and (ring 2, stage 3) denote that starting from blocks that are 3 hop length below the topmost row of 2D-grid 800 (i.e., row of blocks consisting of block (4,1), block (4,2), . . . , and block (4,10)) to the same corresponding stages of the same numbered ring of another block that is directly down below, with vertical hop length of 3, there are external hop wire connections Hop(1,1), Hop(1,2), Hop(2,1), and Hop(2,2) connected. For example from block (4,1) of 2D-grid 800 to another block below it and at a hop length of 3 which is block (7,1), there are external hop wire connections Hop(1,1), Hop(1,2), Hop(2,1), and Hop(2,2) from (ring 2, stage 2) and (ring 2, stage 3) of block (4,1) to (ring 2, stage 1) and (ring 2, stage 2) of block (7,1). It also means there are external hop wire connections Hop(1,1), Hop(1,2), Hop(2,1), and Hop(2,2) from (ring 2, stage 2) and (ring 2, stage 3) of block (5,1) to (ring 2, stage 2) and (ring 2, stage 3) of block (8,1). This pattern continues and finally there are external hop wire connections Hop(1,1), Hop(1,2), Hop(2,1), and Hop(2,2) from (ring 2, stage 2) and (ring 2, stage 3) of block (7,1) to (ring 2, stage 2) and (ring 2, stage 3) of block (10,1). The same pattern continues for all the columns starting from the block in the topmost row of each column.

If there is no block that is directly below a block with hop length equal to 3 then no vertical external hop wire connections is given corresponding to those two successive stages of the blocks. For example block (8,1) does not have any block that is directly below and with hop length equal to 3 then none of the vertical external hop wires are connected from (ring 2, stage 2) and (ring 2, stage 3) of block (8,1). Similarly from (ring 2, stage 2) and (ring 2, stage 3) of block (9,1) and from (ring 2, stage 2) and (ring 2, stage 3) of block (10,1), none of the vertical external hop wires are connected. Similarly vertical external hop wires are connected corresponding to "U5", "U7" etc. labels given in the hop wire connections chart 700A.

"Hx" denotes an external horizontal hop wire, where symbol "H" denotes horizontal external hop wire connections from blocks of the leftmost column of 2D-grid 800 (i.e., column of blocks consisting of block (1,1), block (2,1), . . . , and block (10,1)) to the same corresponding stages of the same numbered ring of another block that is directly to the right, with "x" horizontal hop length, where "x" is a positive integer. For example "H1" between the stages (ring 1, stage 3) and (ring 1, stage 4) denote that from block (1,1) of 2D-grid 800 to another block directly to the right, which is block (1,2), since "H1" denotes hop length of 1, there are external hop wire connections Hop(1,1), Hop(1,2), Hop(2,1), and Hop(2,2) from (ring 1, stage 3) and (ring 1, stage 4) of block (1,1) to (ring 1, stage 3) and (ring 1, stage 4) of block (1,2). It also means there are external hop wire connections Hop(1,1), Hop(1,2), Hop(2,1), and Hop(2,2) from (ring 1, stage 3) and (ring 1, stage 4) of block (1,3) to (ring 1, stage 3) and (ring 1, stage 4) of block (1,4). This pattern continues and finally there are external hop wire connections Hop(1,1), Hop(1,2), Hop(2,1), and Hop(2,2) from (ring 1, stage 3) and (ring 1, stage 4) of block (9,1) to (ring 1, stage 3) and (ring 1, stage 4) of block (10,1). The same pattern continues for all the rows starting from the block in the leftmost block of each row.

Similarly "H3" between the stages (ring 2, stage 4) and (ring 2, stage 5) denote that from block (1,1) of 2D-grid 800 to another block to the right and at a hop length of 3 which is block (1,4), there are external hop wire connections Hop(1,1), Hop(1,2), Hop(2,1), and Hop(2,2) from (ring 2, stage 4) and (ring 2, stage 5) of block (1,1) to (ring 2, stage 4) and (ring 2, stage 5) of block (1,4). It also means there are external hop wire connections Hop(1,1), Hop(1,2), Hop(2,1), and Hop(2,2) from (ring 2, stage 4) and (ring 2, stage 5) of block (1,2) to (ring 2, stage 4) and (ring 2, stage 5) of block (1,5). This pattern continues and finally there are external hop wire connections Hop(1,1), Hop(1,2), Hop(2,1), and Hop(2,2) from (ring 2, stage 4) and (ring 2, stage 5) of block (1,7) to (ring 2, stage 4) and (ring 2, stage 5) of block (1,10). The same pattern continues for all the columns starting from the block in the leftmost column of each row.

If there is no block that is directly to the right with hop length equal to 3 then there is no horizontal external hop wire connections is given corresponding to those two successive stages of the blocks. For example block (1,8) does not have any block that is directly to the right and with hop length equal to 3 then none of the horizontal external hop wires are connected from (ring 2, stage 4) and (ring 2, stage 5) of block (1,8). Similarly from (ring 2, stage 4) and (ring 2, stage 5) of block (1,9) and from (ring 2, stage 4) and (ring 2, stage 5) of block (1,10), none of the horizontal external hop wires are connected. Similarly horizontal external hop wires are connected corresponding to "H5", "H7" etc., labels given in the hop wire connections chart 700A.

"Kx" denotes an external horizontal hop wire, where symbol "K" denotes horizontal external hop wire connections starting from blocks that are "x" hop length below the leftmost column of 2D-grid 800 (i.e., column of blocks consisting of block (1, 1+x), block (2, 1+x), . . . , and block (10, 1+x)) to the same corresponding stages of the same numbered ring of another block that is directly to the right, with "x" horizontal hop length, where "x" is a positive integer. For example "K1" between the stages (ring 1, stage 4) and (ring 1, stage 5) denote that from block (1,2) of 2D-grid 800 to another block directly to the right, which is block (1,3), since "K1" denotes hop length of 1, there are external hop wire connections Hop(1,1), Hop(1,2), Hop(2, 1), and Hop(2,2) from (ring 1, stage 4) and (ring 1, stage 5) of block (1,2) to (ring 1, stage 4) and (ring 1, stage 5) of block (1,3). It also means there are external hop wire connections Hop(1,1), Hop(1,2), Hop(2,1), and Hop(2,2) from (ring 1, stage 4) and (ring 1, stage 4) of block (1,4) to (ring 1, stage 4) and (ring 1, stage 5) of block (1,5). This pattern continues and finally there are external hop wire connections Hop(1,1), Hop(1,2), Hop(2,1), and Hop(2,2) from (ring 1, stage 4) and (ring 1, stage 5) of block (1,8) to (ring 1, stage 4) and (ring 1, stage 5) of block (1,9). The same pattern continues for all the rows starting from the block in the leftmost column of each row.

If there is no block that is directly to the right of a block with hop length equal to 1 then no horizontal external hop wire connections is given corresponding to those two successive stages of the blocks. For example block (1,10) does not have any block that is directly to the right and with hop length equal to 1 then none of the horizontal external hop wires are connected from (ring 1, stage 4) and (ring 1, stage 5) of block (1,10). Similarly for all the blocks in each row from the leftmost column up to the column "x" no horizontal external hop wires are connected to the corresponding (ring 1, stage 4) and (ring 1, stage 5).

Similarly "K3" between the stages (ring 2, stage 5) and (ring 2, stage 6) denote that starting from blocks that are 3 hop length to the right of the leftmost column of 2D-grid 800 (i.e., column of blocks consisting of block (1,4), block (2,4), ..., and block (10,4)) to the same corresponding stages of the same numbered ring of another block that is directly to the right, with horizontal hop length of 3, there are external hop wire connections Hop(1,1), Hop(1,2), Hop(2,1), and Hop(2,2) connected. For example from block (1,4) of 2D-grid 800 to another block to the right and at a hop length of 3 which is block (1,7), there are external hop wire connections Hop(1,1), Hop(1,2), Hop(2,1), and Hop(2,2) from (ring 2, stage 5) and (ring 2, stage 6) of block (1,4) to (ring 2, stage 5) and (ring 2, stage 6) of block (1,7). It also means there are external hop wire connections Hop(1,1), Hop(1,2), Hop(2,1), and Hop(2,2) from (ring 2, stage 5) and (ring 2, stage 6) of block (1,5) to (ring 2, stage 5) and (ring 2, stage 6) of block (1,8). This pattern continues and finally there are external hop wire connections Hop(1,1), Hop(1,2), Hop(2,1), and Hop(2,2) from (ring 2, stage 5) and (ring 2, stage 6) of block (1,7) to (ring 2, stage 5) and (ring 2, stage 6) of block (1,10). The same pattern continues for all the rows starting from the block in the leftmost block of each row.

If there is no block that is directly to the right of a block with hop length equal to 3 then no horizontal external hop wire connections is given corresponding to those two successive stages of the blocks. For example block (1,8) does not have any block that is directly to the right and with hop length equal to 3 then none of the horizontal external hop wires are connected from (ring 2, stage 5) and (ring 2, stage 6) of block (1,8). Similarly from (ring 2, stage 5) and (ring 2, stage 6) of block (1,9) and from (ring 2, stage 5) and (ring 2, stage 6) of block (1,10), none of the horizontal external hop wires are connected. Similarly horizontal external hop wires are connected corresponding to "K5", "K7" etc. labels given in the hop wire connections chart 700A.

In general the hop length of an external vertical hop wire can be any positive number. Similarly the hop length of an external horizontal hop wire can be any positive number.

The hop wire connections between two arbitrary successive stages in two different rings of the same block or two different rings of different blocks described in diagram 700A of FIG. 7A may be any one of the embodiments of either the diagrams 300A of FIG. 3A, 300B of FIG. 3B, 300C of FIG. 3C, 300D of FIGS. 3D, and 300E of FIG. 3E. Similarly the multi-drop hop wire connections between two arbitrary successive stages in two different rings of different blocks described in diagram 700A of FIG. 7A may be any one of the embodiments of either the diagrams 500A of FIG. 5A.

In accordance with the invention, the hop wire connections between two arbitrary stages in two different rings of the same block or two different rings of different blocks may also be any one of the embodiments of either the diagrams 400A of FIGS. 4A and 400B of FIG. 4B. Similarly the multi-drop hop wire connections between two arbitrary stages in two different rings of different blocks may also be any one of the embodiments of either the diagrams 600A of FIG. 6A or 600B of FIG. 6B.

In accordance with the current invention, either partial multi-stage hierarchical network $V_{Comb}(N_1, N_2,d,s)$ 100A of FIG. 1A or partial multi-stage hierarchical network $V_{Comb}(N_1, N_2,d,s)$ 100B of FIG. 1B, or partial multi-stage hierarchical network $V_{Comb}(N_1, N_2,d,s)$ 100C of FIG. 1C, corresponding to a block of 2D-grid of blocks 800 of FIG. 8, using any one of the embodiments of 200A-200E of FIGS. 2A-2E to implement a stage of a ring of the multi-stage hierarchical network, either by using the hop wire connections or multi-drop hop wire connections between two arbitrary stages in two different rings of the same block or two different rings of different blocks described in diagram 700A of FIG. 7A may be any one of the embodiments of either the diagrams 300A of FIG. 3A, 300B of FIG. 3B, 300C of FIG. 3C, 300D of FIG. 3D, 300E of FIG. 3E, 500A of FIG. 5A, or by using the hop wire connections or multi-drop hop wire connections between two arbitrary stages in two different rings of the same block or two different rings of different blocks may be any one of the embodiments of either the diagrams 400A of FIG. 4A, 400B of FIG. 4B, 600A of FIG. 6A, or 600B of FIG. 6B is very efficient in the reduction of the die size, power consumption, and for lower wire/path delay for higher performance for practical routing applications to particularly to set up broadcast, unicast and multicast connections. In general in accordance with the current invention, where $N_1$ and $N_2$ of the complete multi-stage hierarchical network $V_{Comb}(N_1, N_2,d,s)$ may be arbitrarily large in size and also the 2D-grid size 800 may also be arbitrarily large in size in terms of both the number of rows and number of columns.

Delay Optimizations in Multi-Stage Hierarchical Network $V_{D-Comb}(N_1, N_2,d,s)$:

The multi-stage hierarchical network $V_{Comb}(N_1, N_2,d,s)$ according to the current invention can further be optimized to reduce the delay in the routed path of the connection. The delay optimized multi-stage hierarchical network $V_{Comb}(N_1, N_2,d,s)$ is hereinafter denoted by $V_{D-Comb}(N_1, N_2,d,s)$. The delay optimizing embodiments of the stages of a ring are one of the diagrams namely 900A-900E of FIGS. 9A-9D, 1000A-1000F of FIGS. 10A-10F, and 1100A-1100C of FIGS. 11A-11C. The diagram 1200 of FIG. 12, 1300 of FIG. 13, 1400 of FIGS. 14, and 1500 of FIG. 15 are different embodiments for the implementation of delay optimizations with all the connections between two arbitrary successive stages in two different rings of the same block or two different rings of different blocks of 2D-grid 800.

Figure 9A:
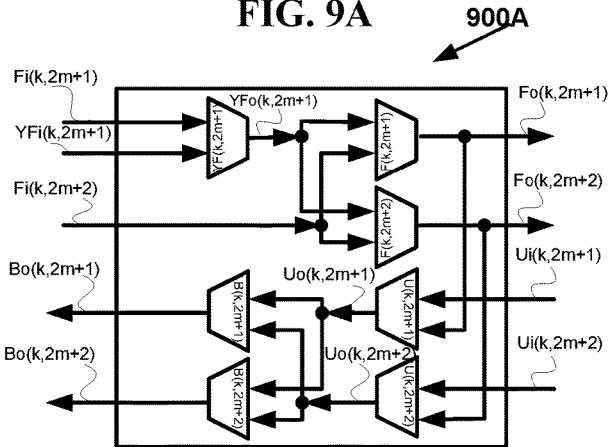
FIG. 9A is a diagram 900A, in an embodiment of, a stage in a ring of multi-stage hierarchical network corresponding to one block, with delay optimizations.

FIG. 9A illustrates a stage (ring "k", stage "m") 900A consists of 5 inputs namely Fi(k,2m+1), Fi(k,2m+2), YFi(k, 2m+1), Ui(k,2m+1), and Ui(k,2m+2); and 4 outputs Bo(k,2m+1), Bo(k,2m+2), Fo(k,2m+1), and Fo(k,2m+2). The stage (ring "k", stage "m") also consists of seven 2:1 Muxes namely YF(k,2m+1), F(k,2m+1), F(k,2m+2), U(k,2m+1), U(k,2m+2), B(k,2m+1), and B(k,2m+2). The 2:1 Mux YF(k,2m+1) has two inputs namely Fi(k,2m+1) and YFi(k,2m+1) and has one output YFo(k,2m+1). The 2:1 Mux F(k,2m+1) has two inputs namely YFo(k,2m+1) and Fi(k,2m+2) and has one output Fo(k,2m+1). The 2:1 Mux F(k,2m+2) has two inputs namely YFo(k,2m+1) and Fi(k,2m+2) and has one output Fo(k,2m+2).

The 2:1 Mux U(k,2m+1) has two inputs namely Ui(k,2m+1) and Fo(k,2m+1) and has one output Uo(k,2m+1). The 2:1 Mux U(k,2m+2) has two inputs namely Ui(k,2m+2) and Fo(k,2m+2) and has one output Uo(k,2m+2). The 2:1 Mux B(k,2m+1) has two inputs namely Uo(k,2m+1) and Uo(k,2m+2) and has one output Bo(k,2m+1). The 2:1 Mux B(k,2m+2) has two inputs namely Uo(k,2m+1) and Uo(k,2m+2) and has one output Bo(k,2m+2).

Figure 9B:
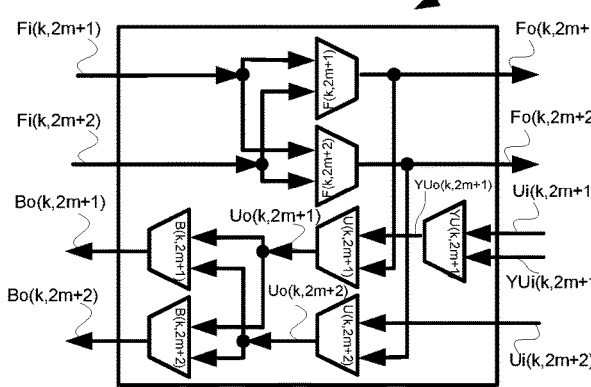
FIG. 9B is a diagram 900B, in an embodiment of, a stage in a ring of multi-stage hierarchical network corresponding to one block, with delay optimizations.

FIG. 9B illustrates a stage (ring "k", stage "m") 900B consists of 5 inputs namely Fi(k,2m+1), Fi(k,2m+2), YUi(k,2m+1), Ui(k,2m+1), and Ui(k,2m+2); and 4 outputs Bo(k,2m+1), Bo(k,2m+2), Fo(k,2m+1), and Fo(k,2m+2). The stage (ring "k", stage "m") also consists of seven 2:1 Muxes namely F(k,2m+1), F(k,2m+2), YF(k,2m+1), U(k,2m+1), U(k,2m+2), B(k,2m+1), and B(k,2m+2). The 2:1 Mux F(k,2m+1) has two inputs namely Fi(k,2m+1) and Fi(k,2m+2) and has one output Fo(k,2m+1). The 2:1 Mux F(k,2m+2) has two inputs namely Fi(k,2m+1) and Fi(k,2m+2) and has one output Fo(k,2m+2).

The 2:1 Mux YU(k,2m+1) has two inputs namely Ui(k,2m+1) and YUi(k,2m+1) and has one output YUo(k,2m+1). The 2:1 Mux U(k,2m+1) has two inputs namely YUo(k,2m+1) and Fo(k,2m+1) and has one output Uo(k,2m+1). The 2:1 Mux U(k,2m+2) has two inputs namely Ui(k,2m+2) and Fo(k,2m+2) and has one output Uo(k,2m+2). The 2:1 Mux B(k,2m+1) has two inputs namely Uo(k,2m+1) and Uo(k,2m+2) and has one output Bo(k,2m+1). The 2:1 Mux B(k,2m+2) has two inputs namely Uo(k,2m+1) and Uo(k,2m+2) and has one output Bo(k,2m+2).

Figure 9C:
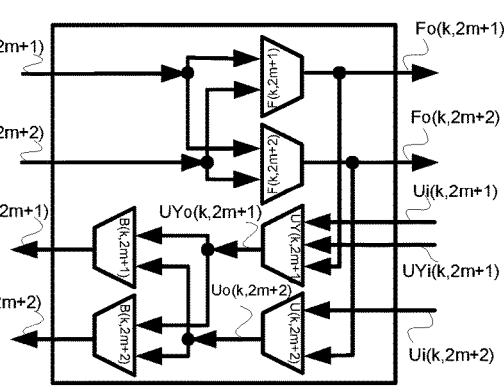
FIG. 9C is a diagram 900C, in an embodiment of, a stage in a ring of multi-stage hierarchical network corresponding to one block, with delay optimizations.

FIG. 9C illustrates a stage (ring "k", stage "m") 900C consists of 5 inputs namely Fi(k,2m+1), Fi(k,2m+2), UYi(k,2m+1), Ui(k,2m+1), and Ui(k,2m+2); and 4 outputs Bo(k,2m+1), Bo(k,2m+2), Fo(k,2m+1), and Fo(k,2m+2). The stage (ring "k", stage "m") also consists of five 2:1 Muxes namely F(k,2m+1), F(k,2m+2), U(k,2m+2), B(k,2m+1), and B(k,2m+2). The stage (ring "k", stage "m") also consists of one 3:1 Mux namely UY(k,2m+1). The 2:1 Mux F(k,2m+1) has two inputs namely Fi(k,2m+1) and Fi(k,2m+2) and has one output Fo(k,2m+1). The 2:1 Mux F(k,2m+2) has two inputs namely Fi(k,2m+1) and Fi(k,2m+2) and has one output Fo(k,2m+2).

The 3:1 Mux UY(k,2m+1) has three inputs namely Ui(k,2m+1), UYi(k,2m+1) and Fo(k,2m+1) and has one output UYo(k,2m+1). The 2:1 Mux U(k,2m+2) has two inputs namely Ui(k,2m+2) and Fo(k,2m+2) and has one output Uo(k,2m+2). The 2:1 Mux B(k,2m+1) has two inputs namely UYo(k,2m+1) and Uo(k,2m+2) and has one output Bo(k,2m+1). The 2:1 Mux B(k,2m+2) has two inputs namely UYo(k,2m+1) and Uo(k,2m+2) and has one output Bo(k,2m+2).

Figure 9D:
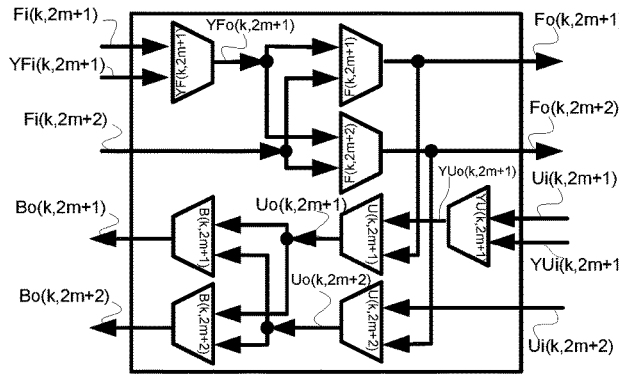
FIG. 9D is a diagram 900D, in an embodiment of, a stage in a ring of multi-stage hierarchical network corresponding to one block, with delay optimizations.

FIG. 9D illustrates a stage (ring "k", stage "m") 900D consists of 6 inputs namely Fi(k,2m+1), Fi(k,2m+2), YFi(k,2m+1), Ui(k,2m+1), Ui(k,2m+2), and YUi(k,2m+1); and 4 outputs Bo(k,2m+1), Bo(k,2m+2), Fo(k,2m+1), and Fo(k,2m+2). The stage (ring "k", stage "m") also consists of eight 2:1 Muxes namely F(k,2m+1), F(k,2m+2), YF(k,2m+1), U(k,2m+1), U(k,2m+2), YU(k,2m+1), B(k,2m+1), and B(k,2m+2). The 2:1 Mux YF(k,2m+1) has two inputs namely Fi(k,2m+1) and YFi(k,2m+1) and has one output YFo(k,2m+1). The 2:1 Mux F(k,2m+1) has two inputs namely YFo(k,2m+1) and Fi(k,2m+2) and has one output Fo(k,2m+1). The 2:1 Mux F(k,2m+2) has two inputs namely YFo(k,2m+1) and Fi(k,2m+2) and has one output Fo(k,2m+2).

The 2:1 Mux YU(k,2m+1) has two inputs namely Ui(k,2m+1) and YUi(k,2m+1) and has one output YUo(k,2m+1). The 2:1 Mux U(k,2m+1) has two inputs namely YUo(k,2m+1) and Fo(k,2m+1) and has one output Uo(k,2m+1). The 2:1 Mux U(k,2m+2) has two inputs namely Ui(k,2m+2) and Fo(k,2m+2) and has one output Uo(k,2m+2). The 2:1 Mux B(k,2m+1) has two inputs namely Uo(k,2m+1) and Uo(k,2m+2) and has one output Bo(k,2m+1). The 2:1 Mux B(k,2m+2) has two inputs namely Uo(k,2m+1) and Uo(k,2m+2) and has one output Bo(k,2m+2).

Figure 9E:
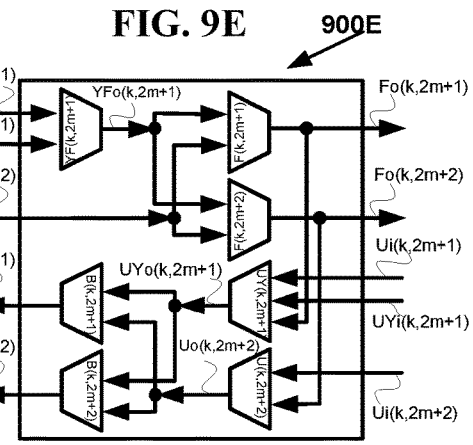
FIG. 9E is a diagram 900E, in an embodiment of, a stage in a ring of multi-stage hierarchical network corresponding to one block, with delay optimizations.

FIG. 9E illustrates a stage (ring "k", stage "m") 900E consists of 6 inputs namely Fi(k,2m+1), Fi(k,2m+2), YFi(k,2m+1), Ui(k,2m+1), Ui(k,2m+2), and UYi(k,2m+1); and 4 outputs Bo(k,2m+1), Bo(k,2m+2), Fo(k,2m+1), and Fo(k,2m+2). The stage (ring "k", stage "m") also consists of six 2:1 Muxes namely F(k,2m+1), F(k,2m+2), YF(k,2m+1), U(k,2m+2), B(k,2m+1), and B(k,2m+2). The stage (ring "k", stage "m") also consists of one 3:1 Mux namely UY(k,2m+1). The 2:1 Mux YF(k,2m+1) has two inputs namely Fi(k,2m+1) and YFi(k,2m+1) and has one output YFo(k,2m+1). The 2:1 Mux F(k,2m+1) has two inputs namely YFo(k,2m+1) and Fi(k,2m+2) and has one output Fo(k,2m+1). The 2:1 Mux F(k,2m+2) has two inputs namely YFo(k,2m+1) and Fi(k,2m+2) and has one output Fo(k,2m+2).

The 3:1 Mux UY(k,2m+1) has three inputs namely Ui(k,2m+1), UYi(k,2m+1) and Fo(k,2m+1) and has one output UYo(k,2m+1). The 2:1 Mux U(k,2m+2) has two inputs namely Ui(k,2m+2) and Fo(k,2m+2) and has one output Uo(k,2m+2). The 2:1 Mux B(k,2m+1) has two inputs namely UYo(k,2m+1) and Uo(k,2m+2) and has one output Bo(k,2m+1). The 2:1 Mux B(k,2m+2) has two inputs namely UYo(k,2m+1) and Uo(k,2m+2) and has one output Bo(k,2m+2).

Figure 10A:
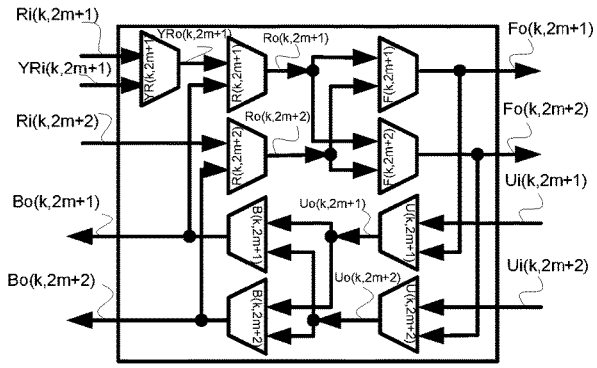
FIG. 10A is a diagram 1000A, in an embodiment of, a stage in a ring of multi-stage hierarchical network corresponding to one block, with delay optimizations.

FIG. 10A illustrates a stage (ring "k", stage "m") 1000A consists of 5 inputs namely Ri(k,2m+1), Ri(k,2m+2), YRi(k,2m+1), Ui(k,2m+1), and Ui(k,2m+2); and 4 outputs Bo(k,2m+1), Bo(k,2m+2), Fo(k,2m+1), and Fo(k,2m+2). The stage (ring "k", stage "m") also consists of nine 2:1 Muxes namely R(k,2m+1), R(k,2m+2), YR(k,2m+1), F(k,2m+1), F(k,2m+2), U(k,2m+1), U(k,2m+2), B(k,2m+1), and B(k,2m+2). The 2:1 Mux YR(k,2m+1) has two inputs namely Ri(k,2m+1) and YRi(k,2m+1) and has one output YRo(k,2m+1). The 2:1 Mux R(k,2m+1) has two inputs namely YRo(k,2m+1) and Bo(k,2m+1) and has one output Ro(k,2m+1). The 2:1 Mux R(k,2m+2) has two inputs namely Ri(k,2m+2) and Bo(k,2m+2) and has one output Ro(k,2m+2). The 2:1 Mux F(k,2m+1) has two inputs namely Ro(k,2m+1) and Ro(k,2m+2) and has one output Fo(k,2m+1). The 2:1 Mux F(k,2m+2) has two inputs namely Ro(k,2m+1) and Ro(k,2m+2) and has one output Fo(k,2m+2).

The 2:1 Mux U(k,2m+1) has two inputs namely Ui(k,2m+1) and Fo(k,2m+1) and has one output Uo(k,2m+1). The 2:1 Mux U(k,2m+2) has two inputs namely Ui(k,2m+2) and Fo(k,2m+2) and has one output Uo(k,2m+2). The 2:1 Mux B(k,2m+1) has two inputs namely Uo(k,2m+1) and Uo(k,2m+2) and has one output Bo(k,2m+1). The 2:1 Mux B(k,2m+2) has two inputs namely Uo(k,2m+1) and Uo(k,2m+2) and has one output Bo(k,2m+2).

Figure 10B:
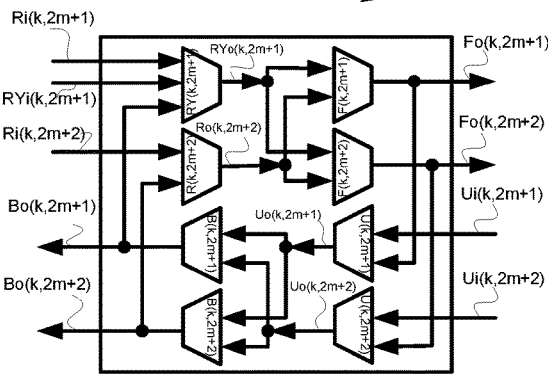
FIG. 10B is a diagram 1000B, in an embodiment of, a stage in a ring of multi-stage hierarchical network corresponding to one block, with delay optimizations.

FIG. 10B illustrates a stage (ring "k", stage "m") 1000B consists of 5 inputs namely Ri(k,2m+1), Ri(k,2m+2), RYi(k,2m+1), Ui(k,2m+1), and Ui(k,2m+2); and 4 outputs Bo(k,2m+1), Bo(k,2m+2), Fo(k,2m+1), and Fo(k,2m+2). The stage (ring "k", stage "m") also consists of seven 2:1 Muxes namely R(k,2m+2), F(k,2m+1), F(k,2m+2), U(k,2m+1), U(k,2m+2), B(k,2m+1), and B(k,2m+2). The stage (ring "k", stage "m") also consists of one 3:1 Mux namely RY(k,2m+1). The 3:1 Mux RY(k,2m+1) has three inputs namely Ri(k,2m+1), RYi(k,2m+1), and Bo(k,2m+1), and has one output RYo(k,2m+1).

The 2:1 Mux R(k,2m+2) has two inputs namely Ri(k,2m+2) and Bo(k,2m+2) and has one output Ro(k,2m+2). The 2:1 Mux F(k,2m+1) has two inputs namely RYo(k,2m+1) and Ro(k,2m+2) and has one output Fo(k,2m+1). The 2:1 Mux F(k,2m+2) has two inputs namely RYo(k,2m+1) and Ro(k,2m+2) and has one output Fo(k,2m+2).

The 2:1 Mux U(k,2m+1) has two inputs namely Ui(k,2m+1) and Fo(k,2m+1) and has one output Uo(k,2m+1). The 2:1 Mux U(k,2m+2) has two inputs namely Ui(k,2m+2) and Fo(k,2m+2) and has one output Uo(k,2m+2). The 2:1 Mux B(k,2m+1) has two inputs namely Uo(k,2m+1) and Uo(k,2m+2) and has one output Bo(k,2m+1). The 2:1 Mux B(k,2m+2) has two inputs namely Uo(k,2m+1) and Uo(k,2m+2) and has one output Bo(k,2m+2).

Figure 10C:
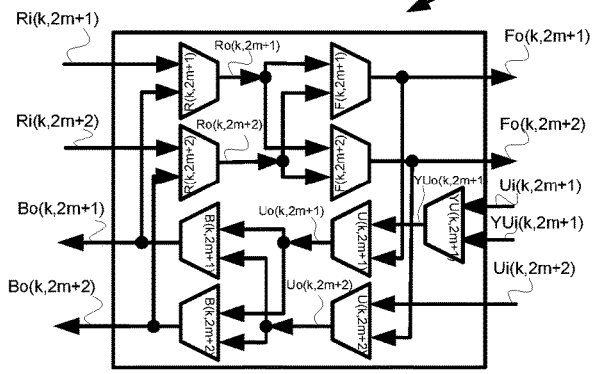
FIG. 10C is a diagram 1000C, in an embodiment of, a stage in a ring of multi-stage hierarchical network corresponding to one block, with delay optimizations.

FIG. 10C illustrates a stage (ring "k", stage "m") 1000C consists of 5 inputs namely Ri(k,2m+1), Ri(k,2m+2), Ui(k,2m+1), Ui(k,2m+2), and YUi(k,2m+1); and 4 outputs Bo(k,2m+1), Bo(k,2m+2), Fo(k,2m+1), and Fo(k,2m+2). The stage (ring "k", stage "m") also consists of nine 2:1 Muxes namely R(k,2m+1), R(k,2m+2), F(k,2m+1), F(k,2m+2), YU(k,2m+1), U(k,2m+1), U(k,2m+2), B(k,2m+1), and B(k,2m+2). The 2:1 Mux R(k,2m+1) has two inputs namely Ri(k,2m+1) and Bo(k,2m+1) and has one output Ro(k,2m+1). The 2:1 Mux R(k,2m+2) has two inputs namely Ri(k,2m+2) and Bo(k,2m+2) and has one output Ro(k,2m+2). The 2:1 Mux F(k,2m+1) has two inputs namely Ro(k,2m+1) and Ro(k,2m+2) and has one output Fo(k,2m+1). The 2:1 Mux F(k,2m+2) has two inputs namely Ro(k,2m+1) and Ro(k,2m+2) and has one output Fo(k,2m+2).

The 2:1 Mux YU(k,2m+1) has two inputs namely Ui(k,2m+1) and YUi(k,2m+1) and has one output YUo(k,2m+1). The 2:1 Mux U(k,2m+1) has two inputs namely YUo(k,2m+1) and Fo(k,2m+1) and has one output Uo(k,2m+1). The 2:1 Mux U(k,2m+2) has two inputs namely Ui(k,2m+2) and Fo(k,2m+2) and has one output Uo(k,2m+2). The 2:1 Mux B(k,2m+1) has two inputs namely Uo(k,2m+1) and Uo(k,2m+2) and has one output Bo(k,2m+1). The 2:1 Mux B(k,2m+2) has two inputs namely Uo(k,2m+1) and Uo(k,2m+2) and has one output Bo(k,2m+2).

Figure 10D:
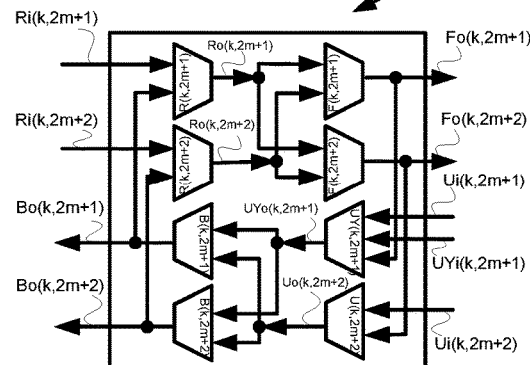
FIG. 10D is a diagram 1000D, in an embodiment of, a stage in a ring of multi-stage hierarchical network corresponding to one block, with delay optimizations.

FIG. 10D illustrates a stage (ring "k", stage "m") 1000D consists of 5 inputs namely Ri(k,2m+1), Ri(k,2m+2), Ui(k,2m+1), Ui(k,2m+2), and UYi(k,2m+1); and 4 outputs Bo(k,2m+1), Bo(k,2m+2), Fo(k,2m+1), and Fo(k,2m+2). The stage (ring "k", stage "m") also consists of seven 2:1 Muxes namely R(k,2m+1), R(k,2m+2), F(k,2m+1), F(k,2m+2), U(k,2m+2), B(k,2m+1), and B(k,2m+2). The stage (ring "k", stage "m") also consists of one 3:1 Mux namely UY(k,2m+1). The 2:1 Mux R(k,2m+1) has two inputs namely Ri(k,2m+1) and Bo(k,2m+1) and has one output Ro(k,2m+1). The 2:1 Mux R(k,2m+2) has two inputs namely Ri(k,2m+2) and Bo(k,2m+2) and has one output Ro(k,2m+2). The 2:1 Mux F(k,2m+1) has two inputs namely Ro(k,2m+1) and Ro(k,2m+2) and has one output Fo(k,2m+1). The 2:1 Mux F(k,2m+2) has two inputs namely Ro(k,2m+1) and Ro(k,2m+2) and has one output Fo(k,2m+2).

The 3:1 Mux UY(k,2m+1) has three inputs namely Ui(k,2m+1), UYi(k,2m+1), and Fo(k,2m+1), and has one output UYo(k,2m+1). The 2:1 Mux U(k,2m+2) has two inputs namely Ui(k,2m+2) and Fo(k,2m+2) and has one output Uo(k,2m+2). The 2:1 Mux B(k,2m+1) has two inputs namely UYo(k,2m+1) and Uo(k,2m+2) and has one output Bo(k,2m+1). The 2:1 Mux B(k,2m+2) has two inputs namely UYo(k,2m+1) and Uo(k,2m+2) and has one output Bo(k,2m+2).

Figure 10E:
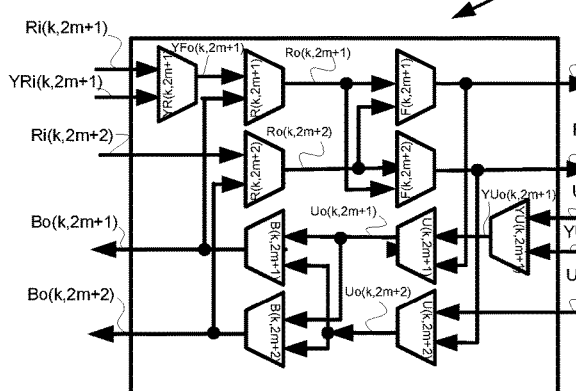
FIG. 10E is a diagram 1000E, in an embodiment of, a stage in a ring of multi-stage hierarchical network corresponding to one block, with delay optimizations.

FIG. 10E illustrates a stage (ring "k", stage "m") 1000E consists of 6 inputs namely Ri(k,2m+1), Ri(k,2m+2), YRi(k,2m+1), Ui(k,2m+1), Ui(k,2m+2), and YUi(k,2m+1); and 4 outputs Bo(k,2m+1), Bo(k,2m+2), Fo(k,2m+1), and Fo(k,2m+2). The stage (ring "k", stage "m") also consists of ten 2:1 Muxes namely YR(k,2m+1), R(k,2m+1), R(k,2m+2), F(k,2m+1), F(k,2m+2), YU(k,2m+1), U(k,2m+1), U(k,2m+2), B(k,2m+1), and B(k,2m+2). The 2:1 Mux YR(k,2m+1) has two inputs namely Ri(k,2m+1) and YRi(k,2m+1) and has one output YRo(k,2m+1). The 2:1 Mux R(k,2m+1) has two inputs namely YRo(k,2m+1) and Bo(k,2m+1) and has one output Ro(k,2m+1). The 2:1 Mux R(k,2m+2) has two inputs namely Ri(k,2m+2) and Bo(k,2m+2) and has one output Ro(k,2m+2). The 2:1 Mux F(k,2m+1) has two inputs namely Ro(k,2m+1) and Ro(k,2m+2) and has one output Fo(k,2m+1). The 2:1 Mux F(k,2m+2) has two inputs namely Ro(k,2m+1) and Ro(k,2m+2) and has one output Fo(k,2m+2).

The 2:1 Mux YU(k,2m+1) has two inputs namely Ui(k,2m+1) and YUi(k,2m+1) and has one output YUo(k,2m+1). The 2:1 Mux U(k,2m+1) has two inputs namely YUo(k,2m+1) and Fo(k,2m+1) and has one output Uo(k,2m+1). The 2:1 Mux U(k,2m+2) has two inputs namely Ui(k,2m+2) and Fo(k,2m+2) and has one output Uo(k,2m+2). The 2:1 Mux B(k,2m+1) has two inputs namely Uo(k,2m+1) and Uo(k,2m+2) and has one output Bo(k,2m+1). The 2:1 Mux B(k,2m+2) has two inputs namely Uo(k,2m+1) and Uo(k,2m+2) and has one output Bo(k,2m+2).

Figure 10F:
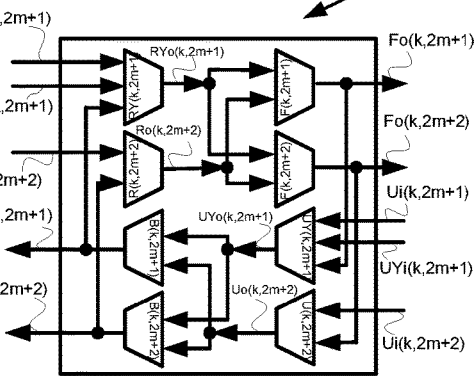
FIG. 10F is a diagram 1000F, in an embodiment of, a stage in a ring of multi-stage hierarchical network corresponding to one block, with delay optimizations.

FIG. 10F illustrates a stage (ring "k", stage "m") 1000F consists of 6 inputs namely Ri(k,2m+1), Ri(k,2m+2), RYi(k,2m+1), Ui(k,2m+1), Ui(k,2m+2), and UYi(k,2m+1); and 4 outputs Bo(k,2m+1), Bo(k,2m+2), Fo(k,2m+1), and Fo(k,2m+2).

The stage (ring "k", stage "m") also consists of six 2:1 Muxes namely R(k,2m+2), F(k,2m+1), F(k,2m+2), U(k,2m+2), B(k,2m+1), and B(k,2m+2). The stage (ring "k", stage "m") also consists of two 3:1 Mux namely RY(k,2m+1) and UY(k,2m+1). The 3:1 Mux RY(k,2m+1) has three inputs namely Ri(k,2m+1), RYi(k,2m+1), and Bo(k,2m+1) and has one output RYo(k,2m+1). The 2:1 Mux R(k,2m+2) has two inputs namely Ri(k,2m+2) and Bo(k,2m+2) and has one output Ro(k,2m+2). The 2:1 Mux F(k,2m+1) has two inputs namely RYo(k,2m+1) and Ro(k,2m+2) and has one output Fo(k,2m+1). The 2:1 Mux F(k,2m+2) has two inputs namely RYo(k,2m+1) and Ro(k,2m+2) and has one output Fo(k,2m+2).

The 3:1 Mux UY(k,2m+1) has three inputs namely Ui(k,2m+1), UYi(k,2m+1), and Fo(k,2m+1), and has one output UYo(k,2m+1). The 2:1 Mux U(k,2m+2) has two inputs namely Ui(k,2m+2) and Fo(k,2m+2) and has one output Uo(k,2m+2). The 2:1 Mux B(k,2m+1) has two inputs namely UYo(k,2m+1) and Uo(k,2m+2) and has one output Bo(k,2m+1). The 2:1 Mux B(k,2m+2) has two inputs namely UYo(k,2m+1) and Uo(k,2m+2) and has one output Bo(k,2m+2).

Figure 11A:
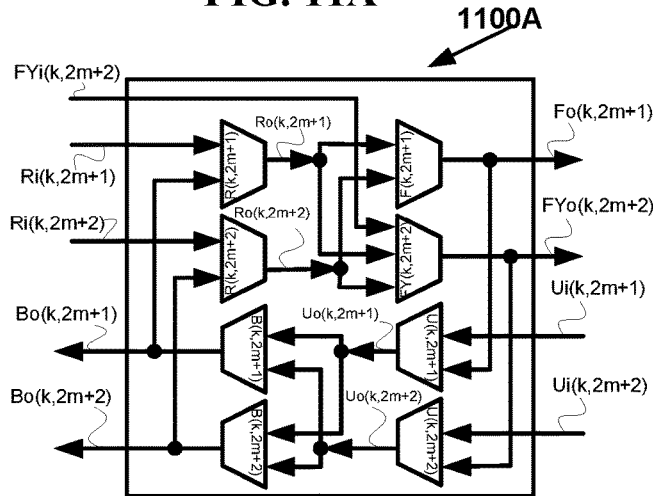
FIG. 11A is a diagram 1100A, in an embodiment of, a stage in a ring of multi-stage hierarchical network corresponding to one block, with delay optimizations.

FIG. 11A illustrates a stage (ring "k", stage "m") 1100A consists of 5 inputs namely Ri(k,2m+1), Ri(k,2m+2), FYi(k,2m+2), Ui(k,2m+1), and Ui(k,2m+2); and 4 outputs Bo(k, 2m+1), Bo(k,2m+2), Fo(k,2m+1), and Fo(k,2m+2). The stage (ring "k", stage "m") also consists of seven 2:1 Muxes namely R(k,2m+1), R(k,2m+2), F(k,2m+1), U(k,2m+1), U(k,2m+2), B(k,2m+1), and B(k,2m+2). The stage (ring "k", stage "m") also consists of one 3:1 Mux namely FY(k,2m+2). The 2:1 Mux R(k,2m+1) has two inputs namely Ri(k,2m+1) and Bo(k,2m+1) and has one output Ro(k,2m+1). The 2:1 Mux R(k,2m+2) has two inputs namely Ri(k,2m+2) and Bo(k,2m+2) and has one output Ro(k,2m+2). The 2:1 Mux F(k,2m+1) has two inputs namely Ro(k,2m+1) and Ro(k,2m+2) and has one output Fo(k,2m+1). The 3:1 Mux FY(k,2m+2) has three inputs namely Ro(k,2m+1), Ro(k,2m+2), and FYi(k,2m+2), and has one output FYo(k,2m+2).

The 2:1 Mux U(k,2m+1) has two inputs namely Ui(k,2m+1) and Fo(k,2m+1) and has one output Uo(k,2m+1). The 2:1 Mux U(k,2m+2) has two inputs namely Ui(k,2m+2) and FYo(k,2m+2) and has one output Uo(k,2m+2). The 2:1 Mux B(k,2m+1) has two inputs namely Uo(k,2m+1) and Uo(k,2m+2) and has one output Bo(k,2m+1). The 2:1 Mux B(k,2m+2) has two inputs namely Uo(k,2m+1) and Uo(k,2m+2) and has one output Bo(k,2m+2).

Figure 11B:
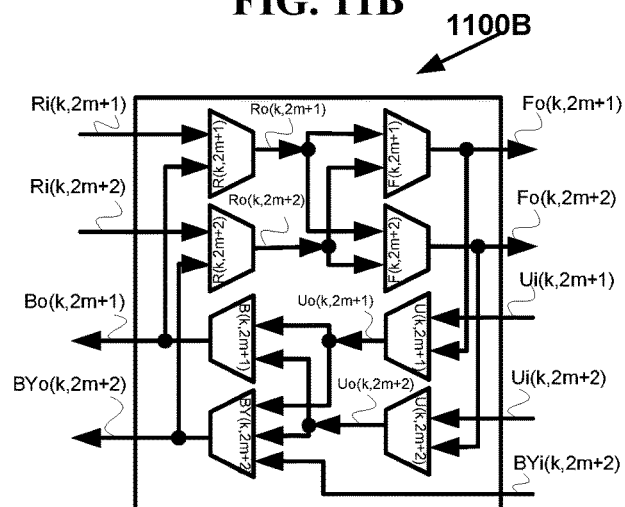
FIG. 11B is a diagram 1100B, in an embodiment of, a stage in a ring of multi-stage hierarchical network corresponding to one block, with delay optimizations.

FIG. 11B illustrates a stage (ring "k", stage "m") 1100B consists of 5 inputs namely Ri(k,2m+1), Ri(k,2m+2), Ui(k,2m+1), Ui(k,2m+2), and BYi(k,2m+2); and 4 outputs Bo(k,2m+1), Bo(k,2m+2), Fo(k,2m+1), and Fo(k,2m+2). The stage (ring "k", stage "m") also consists of seven 2:1 Muxes namely R(k,2m+1), R(k,2m+2), F(k,2m+1), F(k,2m+2), U(k,2m+1), U(k,2m+2), and B(k,2m+1). The stage (ring "k", stage "m") also consists of one 3:1 Mux namely BY(k,2m+2). The 2:1 Mux R(k,2m+1) has two inputs namely Ri(k,2m+1) and Bo(k,2m+1) and has one output Ro(k,2m+1). The 2:1 Mux R(k,2m+2) has two inputs namely Ri(k,2m+2) and Bo(k,2m+2) and has one output Ro(k,2m+2). The 2:1 Mux F(k,2m+1) has two inputs namely Ro(k,2m+1) and Ro(k,2m+2) and has one output Fo(k,2m+1). The 2:1 Mux F(k,2m+2) has two inputs namely Ro(k,2m+1), and Ro(k,2m+2), and has one output Fo(k,2m+2).

The 2:1 Mux U(k,2m+1) has two inputs namely Ui(k,2m+1) and Fo(k,2m+1) and has one output Uo(k,2m+1). The 2:1 Mux U(k,2m+2) has two inputs namely Ui(k,2m+2) and Fo(k,2m+2) and has one output Uo(k,2m+2). The 2:1 Mux B(k,2m+1) has two inputs namely Uo(k,2m+1) and Uo(k,2m+2) and has one output Bo(k,2m+1). The 3:1 Mux BY(k,2m+2) has three inputs namely Uo(k,2m+1), Uo(k,2m+2), and BYi(k,2m+2), and has one output BYo(k,2m+2).

Figure 11C:
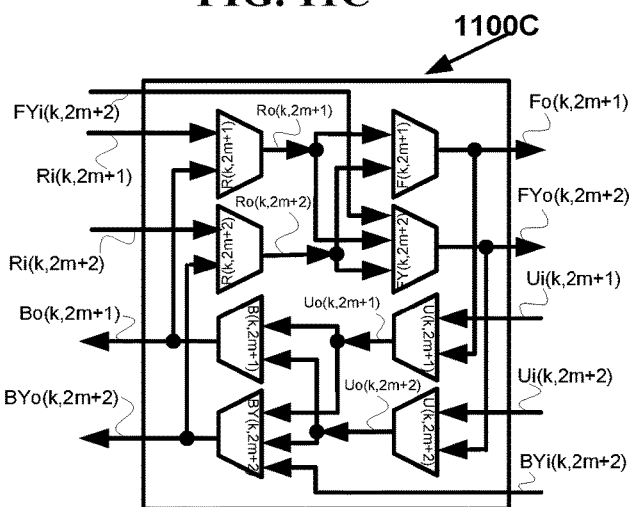
FIG. 11C is a diagram 1100C, in an embodiment of, a stage in a ring of multi-stage hierarchical network corresponding to one block, with delay optimizations.

FIG. 11C illustrates a stage (ring "k", stage "m") 1100C consists of 6 inputs namely Ri(k,2m+1), Ri(k,2m+2), FYi(k,2m+2), Ui(k,2m+1), Ui(k,2m+2), and BYi(k,2m+2); and 4 outputs Bo(k,2m+1), Bo(k,2m+2), Fo(k,2m+1), and Fo(k,2m+2). The stage (ring "k", stage "m") also consists of six 2:1 Muxes namely R(k,2m+1), R(k,2m+2), F(k,2m+1), U(k,2m+1), U(k,2m+2), and B(k,2m+1). The stage (ring "k", stage "m") also consists of two 3:1 Muxes namely FY(k,2m+2) and BY(k,2m+2). The 2:1 Mux R(k,2m+1) has two inputs namely Ri(k,2m+1) and Bo(k,2m+1) and has one output Ro(k,2m+1). The 2:1 Mux R(k,2m+2) has two inputs namely Ri(k,2m+2) and Bo(k,2m+2) and has one output Ro(k,2m+2). The 2:1 Mux F(k,2m+1) has two inputs namely Ro(k,2m+1) and Ro(k,2m+2) and has one output Fo(k,2m+1). The 3:1 Mux FY(k,2m+2) has three inputs namely Ro(k,2m+1), Ro(k,2m+2), and FYi(k,2m+2), and has one output FYo(k,2m+2).

The 2:1 Mux U(k,2m+1) has two inputs namely Ui(k,2m+1) and Fo(k,2m+1) and has one output Uo(k,2m+1). The 2:1 Mux U(k,2m+2) has two inputs namely Ui(k,2m+2) and FYo(k,2m+2) and has one output Uo(k,2m+2). The 2:1 Mux B(k,2m+1) has two inputs namely Uo(k,2m+1) and Uo(k,2m+2) and has one output Bo(k,2m+1). The 3:1 Mux BY(k,2m+2) has three inputs namely Uo(k,2m+1), Uo(k,2m+2), and BYi(k,2m+2), and has one output BYo(k,2m+2).

Figure 12:
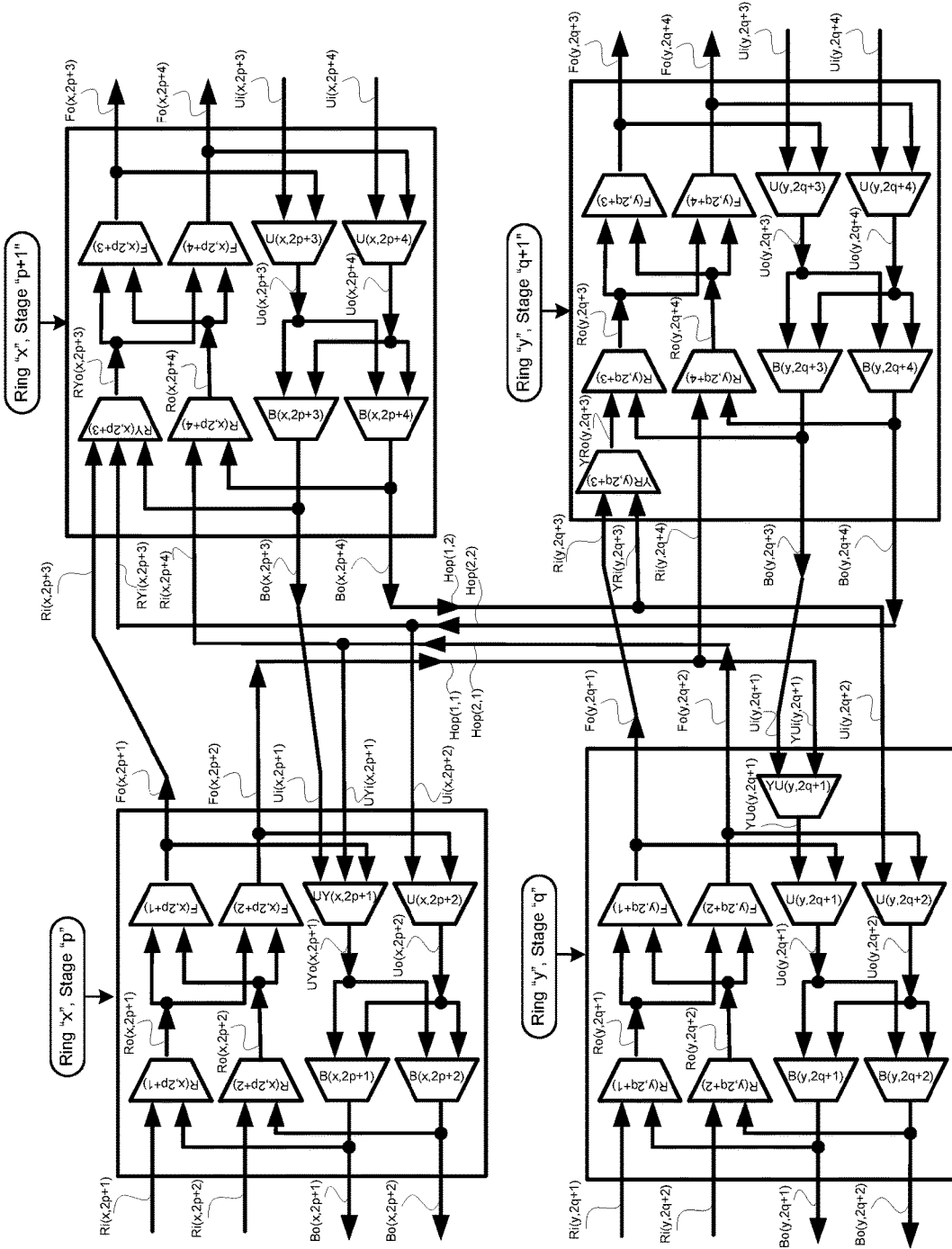
FIG. 12 is a diagram 1200, in an embodiment, all the connections between two successive stages of two different rings in the same block or in two different blocks of a multi-stage hierarchical network with delay optimizations.

Referring to diagram 1200 in FIG. 12, illustrates all the connections between two arbitrary successive stages of a ring namely the stages (ring "x", stage "p") and (ring "x", stage "p+1") and two other arbitrary successive stages of any other ring namely the stages (ring "y", stage "q") and (ring "y", stage "q+1"), of the complete multi-stage hierarchical network $V_{D\text{-}Comb}(N_1, N_2, d, s)$.

The stage (ring "x", stage "p") consists of 5 inputs namely Ri(x,2p+1), Ri(x,2p+2), Ui(x,2p+1), Ui(x,2p+2), and UYi(x,2p+1); and 4 outputs Bo(x,2p+1), Bo(x,2p+2), Fo(x,2p+1), and Fo(x,2p+2). The stage (ring "x", stage "p") also consists of seven 2:1 Muxes namely R(x,2p+1), R(x,2p+2), F(x,2p+1), F(x,2p+2), U(x,2p+2), B(x,2p+1), and B(x,2p+2). The stage (ring "x", stage "p") also consists of one 3:1 Mux namely UY(x,2p+1). The 2:1 Mux R(x,2p+1) has two inputs namely Ri(x,2p+1) and Bo(x,2p+1) and has one output Ro(x,2p+1). The 2:1 Mux R(x,2p+2) has two inputs namely Ri(x,2p+2) and Bo(x,2p+2) and has one output Ro(x,2p+2). The 2:1 Mux F(x,2p+1) has two inputs namely Ro(x,2p+1) and Ro(x,2p+2) and has one output Fo(x,2p+1). The 2:1 Mux F(x,2p+2) has two inputs namely Ro(x,2p+1) and Ro(x,2p+2) and has one output Fo(x,2p+2).

The 3:1 Mux UY(x,2p+1) has three inputs namely Ui(x,2p+1), UYi(x,2p+1), and Fo(x,2p+1), and has one output UYo(x,2p+1). The 2:1 Mux U(x,2p+2) has two inputs namely Ui(x,2p+2) and Fo(x,2p+2) and has one output Uo(x,2p+2). The 2:1 Mux B(x,2p+1) has two inputs namely UYo(x,2p+1) and Uo(x,2p+2) and has one output Bo(x,2p+1). The 2:1 Mux B(x,2p+2) has two inputs namely UYo(x,2p+1) and Uo(x,2p+2) and has one output Bo(x,2p+2).

The stage (ring "x", stage "p+1") consists of 5 inputs namely Ri(x,2p+3), Ri(x,2p+4), RYi(x,2p+3), Ui(x,2p+3), and Ui(x,2p+4); and 4 outputs Bo(x,2p+3), Bo(x,2p+4), Fo(x,2p+3), and Fo(x,2p+4). The stage (ring "x", stage "p+1") also consists of seven 2:1 Muxes namely R(x,2p+4), F(x,2p+3), F(x,2p+4), U(x,2p+3), U(x,2p+4), B(x,2p+3), and B(x,2p+4). The stage (ring "x", stage "p+1") also consists of one 3:1 Mux namely RY(x,2p+3). The 3:1 Mux RY(x,2p+3) has three inputs namely Ri(x,2p+3), RYi(x,2p+3), and Bo(x,2p+3), and has one output RYo(x,2p+3). The 2:1 Mux R(x,2p+4) has two inputs namely Ri(x,2p+4) and Bo(x,2p+4) and has one output Ro(x,2p+4). The 2:1 Mux F(x,2p+3) has two inputs namely RYo(x,2p+3) and Ro(x,2p+4) and has one output Fo(x,2p+3). The 2:1 Mux F(x,2p+4) has two inputs namely RYo(x,2p+3) and Ro(x,2p+4) and has one output Fo(x,2p+4).

The 2:1 Mux U(x,2p+3) has two inputs namely Ui(x,2p+3) and Fo(x,2p+3) and has one output Uo(x,2p+3). The 2:1 Mux U(x,2p+4) has two inputs namely Ui(x,2p+4) and Fo(x,2p+4) and has one output Uo(x,2p+4). The 2:1 Mux B(x,2p+3) has two inputs namely Uo(x,2p+3) and Uo(x,2p+4) and has one output Bo(x,2p+3). The 2:1 Mux B(x,2p+4) has two inputs namely Uo(x,2p+3) and Uo(x,2p+4) and has one output Bo(x,2p+4).

The output Fo(x,2p+1) of the stage (ring "x", stage "p") is connected to the input Ri(x,2p+3) of the stage (ring "x", stage "p+1"). And the output Bo(x,2p+3) of the stage (ring "x", stage "p+1") is connected to the input Ui(x,2p+1) of the stage (ring "x", stage "p").

The stage (ring "y", stage "q") consists of 5 inputs namely Ri(y,2q+1), Ri(y,2q+2), Ui(y,2q+1), Ui(y,2q+2), and YUi(y,2q+1); and 4 outputs Bo(y,2q+1), Bo(y,2q+2), Fo(y,2q+1), and Fo(y,2q+2). The stage (ring "y", stage "q") also consists of nine 2:1 Muxes namely R(y,2q+1), R(y,2q+2), F(y,2q+1), F(y,2q+2), YU(y,2q+1), U(y,2q+1), U(y,2q+2), B(y,2q+1), and B(y,2q+2). The 2:1 Mux R(y,2q+1) has two inputs namely Ri(y,2q+1) and Bo(y,2q+1) and has one output Ro(y,2q+1). The 2:1 Mux R(y,2q+2) has two inputs namely Ri(y,2q+2) and Bo(y,2q+2) and has one output Ro(y,2q+2). The 2:1 Mux F(y,2q+1) has two inputs namely Ro(y,2q+1) and Ro(y,2q+2) and has one output Fo(y,2q+1). The 2:1 Mux F(y,2q+2) has two inputs namely Ro(y,2q+1) and Ro(y,2q+2) and has one output Fo(y,2q+2).

The 2:1 Mux YU(y,2q+1) has two inputs namely Ui(y,2q+1) and YUi(y,2q+1) and has one output YUo(y,2q+1). The 2:1 Mux U(y,2q+1) has two inputs namely YUo(y,2q+1) and Fo(y,2q+1) and has one output Uo(y,2q+1). The 2:1 Mux U(y,2q+2) has two inputs namely Ui(y,2q+2) and Fo(y,2q+2) and has one output Uo(y,2q+2). The 2:1 Mux B(y,2q+1) has two inputs namely Uo(y,2q+1) and Uo(y,2q+2) and has one output Bo(y,2q+1). The 2:1 Mux B(y,2q+2) has two inputs namely Uo(y,2q+1) and Uo(y,2q+2) and has one output Bo(y,2q+2).

The stage (ring "y", stage "q+1") consists of 5 inputs namely Ri(y,2q+3), Ri(y,2q+4), YRi(y,2q+3), Ui(y,2q+3), and Ui(y,2q+4); and 4 outputs Bo(y,2q+3), Bo(y,2q+4), Fo(y,2q+3), and Fo(y,2q+4). The stage (ring "y", stage "q+1") also consists of nine 2:1 Muxes namely R(y,2q+3), R(y,2q+4), YR(y,2q+3), F(y,2q+3), F(y,2q+4), U(y,2q+3), U(y,2q+4), B(y,2q+3), and B(y,2q+4). The 2:1 Mux YR(y,2q+3) has two inputs namely Ri(y,2q+3) and YRi(y,2q+3) and has one output YRo(y,2q+3). The 2:1 Mux R(y,2q+3) has two inputs namely YRo(y,2q+3) and Bo(y,2q+3) and has one output Ro(y,2q+3). The 2:1 Mux R(y,2q+4) has two inputs namely Ri(y,2q+4) and Bo(y,2q+4) and has one output Ro(y,2q+4). The 2:1 Mux F(y,2q+3) has two inputs namely Ro(y,2q+3) and Ro(y,2q+4) and has one output Fo(y,2q+3). The 2:1 Mux F(y,2q+4) has two inputs namely Ro(y,2q+3) and Ro(y,2q+4) and has one output Fo(y,2q+4).

The 2:1 Mux U(y,2q+3) has two inputs namely Ui(y,2q+3) and Fo(y,2q+3) and has one output Uo(y,2q+3). The 2:1 Mux U(y,2q+4) has two inputs namely Ui(y,2q+4) and Fo(y,2q+4) and has one output Uo(y,2q+4). The 2:1 Mux B(y,2q+3) has two inputs namely Uo(y,2q+3) and Uo(y,2q+4) and has one output Bo(y,2q+3). The 2:1 Mux B(y,2q+4) has two inputs namely Uo(y,2q+3) and Uo(y,2q+4) and has one output Bo(y,2q+4).

The output Fo(y,2q+1) of the stage (ring "y", stage "q") is connected to the input Ri(y,2q+3) of the stage (ring "y", stage "q+1"). And the output Bo(y,2q+3) of the stage (ring "y", stage "q+1") is connected to the input Ui(y,2q+1) of the stage (ring "y", stage "q").

The output Fo(x,2p+2) of the stage (ring "x", stage "p") is connected via the wire Hop(1,1) to two inputs namely input Ri(y,2q+4) of the stage (ring "y", stage "q+1") and input YUi(y,2q+1) of the stage (ring "y", stage "q"). The output Bo(x,2p+4) of the stage (ring "x", stage "p+1") is connected via the wire Hop(1,2) to two inputs namely input Ui(y,2q+2) of the stage (ring "y", stage "q") and input YRi(y,2q+3) of the stage (ring "y", stage "q+1").

The output Fo(y,2q+2) of the stage (ring "y", stage "q") is connected via the wire Hop(2,1) to two inputs namely input Ri(x,2p+4) of the stage (ring "x", stage "p+1") and input UYi(x,2p+1) of the stage (ring "x", stage "p"). The output Bo(y,2q+4) of the stage (ring "y", stage "q+1") is connected via the wire Hop(2,2) to two inputs namely input Ui(x,2p+2) of the stage (ring "x", stage "p") and input RYi(x,2p+3) of the stage (ring "x", stage "p+1").

Figure 13:
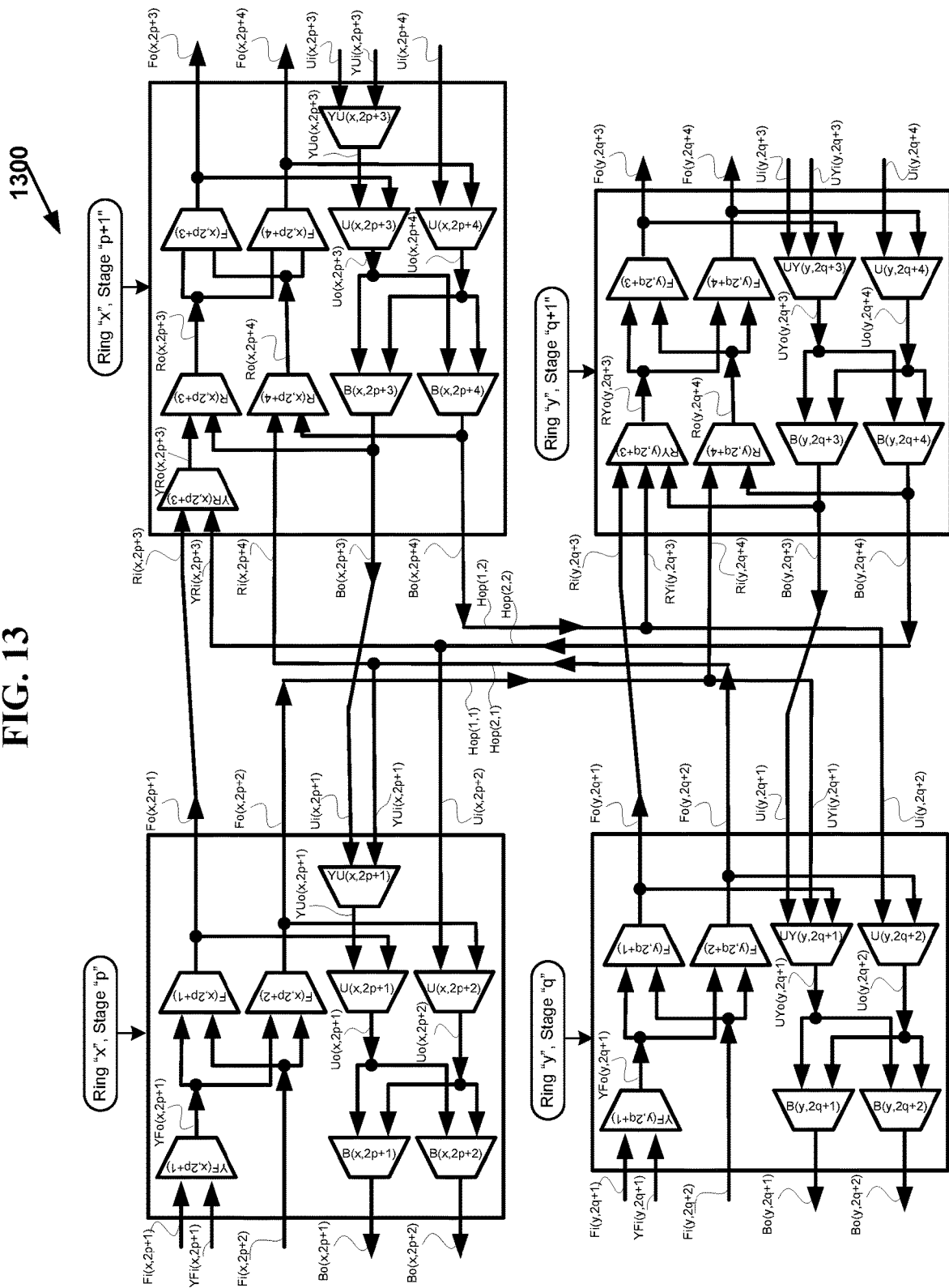
FIG. 13 is a diagram 1300, in one embodiment, all the connections between two successive stages of two different rings in the same block or in two different blocks of a multi-stage hierarchical network with delay optimizations.

Referring to diagram 1300 in FIG. 13, illustrates all the connections between two arbitrary successive stages of a ring namely the stages (ring "x", stage "p") and (ring "x", stage "p+1") and two other arbitrary successive stages of any other ring namely the stages (ring "y", stage "q") and (ring "y", stage "q+1"), of the complete multi-stage hierarchical network $V_{D-Comb}(N_1, N_2, d, s)$.

The stage (ring "x", stage "p") consists of 6 inputs namely Fi(x,2p+1), Fi(x,2p+2), YFi(x,2p+1), Ui(x,2p+1), Ui(x,2p+2), and YUi(x,2p+1); and 4 outputs Bo(x,2p+1), Bo(x,2p+2), Fo(x,2p+1), and Fo(x,2p+2). The stage (ring "x", stage "p") also consists of eight 2:1 Muxes namely F(x,2p+1), F(x,2p+2), YF(x,2p+1), U(x,2p+1), U(x,2p+2), YU(x,2p+1), B(x,2p+1), and B(x,2p+2). The 2:1 Mux YF(x,2p+1) has two inputs namely Fi(x,2p+1) and YFi(x,2p+1) and has one output YFo(x,2p+1). The 2:1 Mux F(x,2p+1) has two inputs namely YFo(x,2p+1) and Fi(x,2p+2) and has one output Fo(x,2p+1). The 2:1 Mux F(x,2p+2) has two inputs namely YFo(x,2p+1) and Fi(x,2p+2) and has one output Fo(x,2p+2).

The 2:1 Mux YU(x,2p+1) has two inputs namely Ui(x,2p+1) and YUi(x,2p+1) and has one output YUo(x,2p+1). The 2:1 Mux U(x,2p+1) has two inputs namely YUo(x,2p+1) and Fo(x,2p+1) and has one output Uo(x,2p+1). The 2:1 Mux U(x,2p+2) has two inputs namely Ui(x,2p+2) and Fo(x,2p+2) and has one output Uo(x,2p+2). The 2:1 Mux B(x,2p+1) has two inputs namely Uo(x,2p+1) and Uo(x,2p+2) and has one output Bo(x,2p+1). The 2:1 Mux B(x,2p+2) has two inputs namely Uo(x,2p+1) and Uo(x,2p+2) and has one output Bo(x,2p+2).

The stage (ring "x", stage "p+1") consists of 6 inputs namely Ri(x,2p+3), Ri(x,2p+4), YRi(x,2p+3), Ui(x,2p+3), Ui(x,2p+4), and YUi(x,2p+3); and 4 outputs Bo(x,2p+3), Bo(x,2p+4), Fo(x,2p+3), and Fo(x,2p+4). The stage (ring "x", stage "p+1") also consists of ten 2:1 Muxes namely YR(x,2p+3), R(x,2p+3), R(x,2p+4), F(x,2p+3), F(x,2p+4), YU(x,2p+3), U(x,2p+3), U(x,2p+4), B(x,2p+3), and B(x,2p+4). The 2:1 Mux YR(x,2p+3) has two inputs namely Ri(x,2p+3) and YRi(x,2p+3) and has one output YRo(x,2p+3). The 2:1 Mux R(x,2p+3) has two inputs namely YRo(x,2p+3) and Bo(x,2p+3) and has one output Ro(x,2p+3). The 2:1 Mux R(x,2p+4) has two inputs namely Ri(x,2p+4) and Bo(x,2p+4) and has one output Ro(x,2p+4). The 2:1 Mux F(x,2p+3) has two inputs namely Ro(x,2p+3) and Ro(x,2p+4) and has one output Fo(x,2p+3). The 2:1 Mux F(x,2p+4) has two inputs namely Ro(x,2p+3) and Ro(x,2p+4) and has one output Fo(x,2p+4).

The 2:1 Mux YU(x,2p+3) has two inputs namely Ui(x,2p+3) and YUi(x,2p+3) and has one output YUo(x,2p+3). The 2:1 Mux U(x,2p+3) has two inputs namely YUo(x,2p+3) and Fo(x,2p+3) and has one output Uo(x,2p+3). The 2:1 Mux U(x,2p+4) has two inputs namely Ui(x,2p+4) and Fo(x,2p+4) and has one output Uo(x,2p+4). The 2:1 Mux B(x,2p+3) has two inputs namely Uo(x,2p+3) and Uo(x,2p+4) and has one output Bo(x,2p+3). The 2:1 Mux B(x,2p+4) has two inputs namely Uo(x,2p+3) and Uo(x,2p+4) and has one output Bo(x,2p+4).

The output Fo(x,2p+1) of the stage (ring "x", stage "p") is connected to the input Ri(x,2p+3) of the stage (ring "x", stage "p+1"). And the output Bo(x,2p+3) of the stage 5 (ring "x", stage "p+1") is connected to the input Ui(x,2p+1) of the stage (ring "x", stage "p").

The stage (ring "y", stage "q") consists of 6 inputs namely Fi(y,2q+1), Fi(y,2q+2), YFi(y,2q+1), Ui(y,2q+1), Ui(y,2q+2), and UYi(y,2q+1); and 4 outputs Bo(y,2q+1), Bo(y,2q+2), Fo(y,2q+1), and Fo(y,2q+2). The stage (ring "y", stage "q") also consists of six 2:1 Muxes namely F(y,2q+1), F(y,2q+2), YF(y,2q+1), U(y,2q+2), B(y,2q+1), and B(y,2q+2). The stage (ring "y", stage "q") also consists of one 3:1 Mux namely UY(y,2q+1). The 2:1 Mux YF(y,2q+1) has two inputs namely Fi(y,2q+1) and YFi(y,2q+1) and has one output YFo(y,2q+1). The 2:1 Mux F(y,2q+1) has two inputs namely YFo(y,2q+1) and Fi(y,2q+2) and has one output Fo(y,2q+1). The 2:1 Mux F(y,2q+2) has two inputs namely YFo(y,2q+1) and Fi(y,2q+2) and has one output Fo(y,2q+2).

The 3:1 Mux UY(y,2q+1) has three inputs namely Ui(y,2q+1), UYi(y,2q+1) and Fo(y,2q+1) and has one output UYo(y,2q+1). The 2:1 Mux U(y,2q+2) has two inputs namely Ui(y,2q+2) and Fo(y,2q+2) and has one output Uo(y,2q+2). The 2:1 Mux B(y,2q+1) has two inputs namely UYo(y,2q+1) and Uo(y,2q+2) and has one output Bo(y,2q+1). The 2:1 Mux B(y,2q+2) has two inputs namely UYo(y,2q+1) and Uo(y,2q+2) and has one output Bo(y,2q+2).

The stage (ring "y", stage "q+1") consists of 6 inputs namely Ri(y,2q+3), Ri(y,2q+4), RYi(y,2q+3), Ui(y,2q+3), Ui(y,2q+4), and UYi(y,2q+3); and 4 outputs Bo(y,2q+3), Bo(y,2q+4), Fo(y,2q+3), and Fo(y,2q+4). The stage (ring "y", stage "2q+1") also consists of six 2:1 Muxes namely R(y,2q+4), F(y,2q+3), F(y,2q+4), U(y,2q+4), B(y,2q+3), and B(y,2q+4). The stage (ring "y", stage "2q+1") also consists of two 3:1 Mux namely RY(y,2q+3) and UY(y,2q+3). The 3:1 Mux RY(y,2q+3) has three inputs namely Ri(y,2q+3), RYi(y,2q+3), and Bo(y,2q+3) and has one output RYo(y,2q+3). The 2:1 Mux R(y,2q+4) has two inputs namely Ri(y,2q+4) and Bo(y,2q+4) and has one output Ro(y,2q+4). The 2:1 Mux F(y,2q+3) has two inputs namely RYo(y,2q+3) and Ro(y,2q+4) and has one output Fo(y,2q+3). The 2:1 Mux F(y,2q+4) has two inputs namely RYo(y,2q+3) and Ro(y,2q+4) and has one output Fo(y,2q+4).

The 3:1 Mux UY(y,2q+3) has three inputs namely Ui(y,2q+3), UYi(y,2q+3), and Fo(y,2q+3), and has one output UYo(y,2q+3). The 2:1 Mux U(y,2q+4) has two inputs namely Ui(y,2q+4) and Fo(y,2q+4) and has one output Uo(y,2q+4). The 2:1 Mux B(y,2q+3) has two inputs namely UYo(y,2q+3) and Uo(y,2q+4) and has one output Bo(y,2q+3). The 2:1 Mux B(y,2q+4) has two inputs namely UYo(y,2q+3) and Uo(y,2q+4) and has one output Bo(y,2q+4).

The output Fo(y,2q+1) of the stage (ring "y", stage "q") is connected to the input Ri(y,2q+3) of the stage (ring "y", stage "q+1"). And the output Bo(y,2q+3) of the stage (ring "y", stage "q+1") is connected to the input Ui(y,2q+1) of the stage (ring "y", stage "1q") The output Fo(x,2p+2) of the stage (ring "x", stage "p") is connected via the wire Hop(1,1) to two inputs namely input Ri(y,2q+4) of the stage (ring "y", stage "q+1") and input UYi(y,2q+1) of the stage (ring "y", stage "q"). The output Bo(x,2p+4) of the stage (ring "x", stage "p+1") is connected via the wire Hop(1,2) to two inputs namely input Ui(y,2q+2) of the stage (ring "y", stage "q") and input RYi(y,2q+3) of the stage (ring "y", stage "q+1").

The output Fo(y,2q+2) of the stage (ring "y", stage "q") is connected via the wire Hop(2,1) to two inputs namely input Ri(x,2p+4) of the stage (ring "x", stage "p+1") and input YUi(x,2p+1) of the stage (ring "x", stage "p"). The output Bo(y,2q+4) of the stage (ring "y", stage "q+1") is connected via the wire Hop(2,2) to two inputs namely input Ui(x,2p+2) of the stage (ring "x", stage "p") and input YRi(x,2p+3) of the stage (ring "x", stage "p+1").

Figure 14:
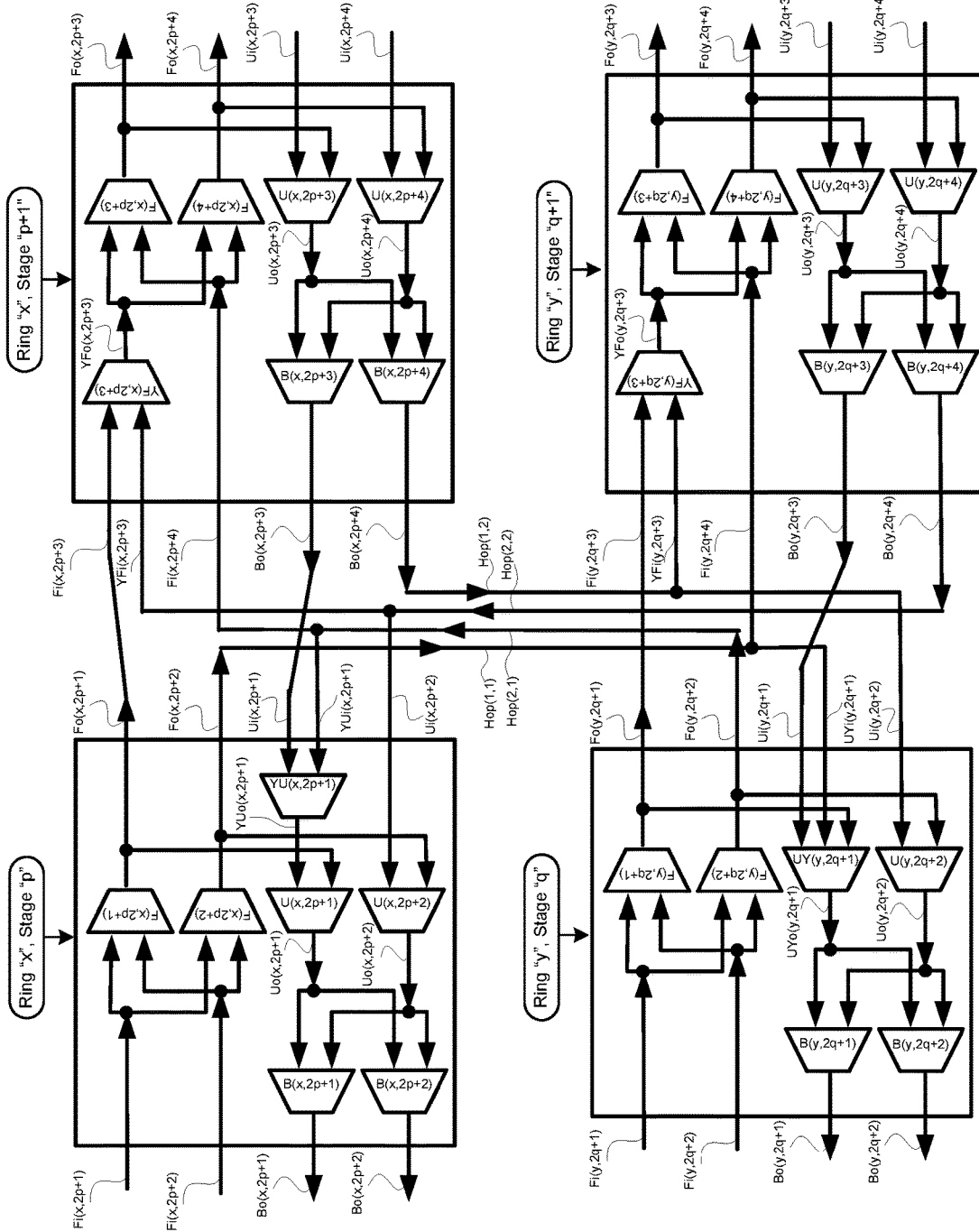
FIG. 14 is a diagram 1400, in an embodiment of, all the connections between two successive stages of two different rings in the same block or in two different blocks of a multi-stage hierarchical network with delay optimizations.
Figure 15:
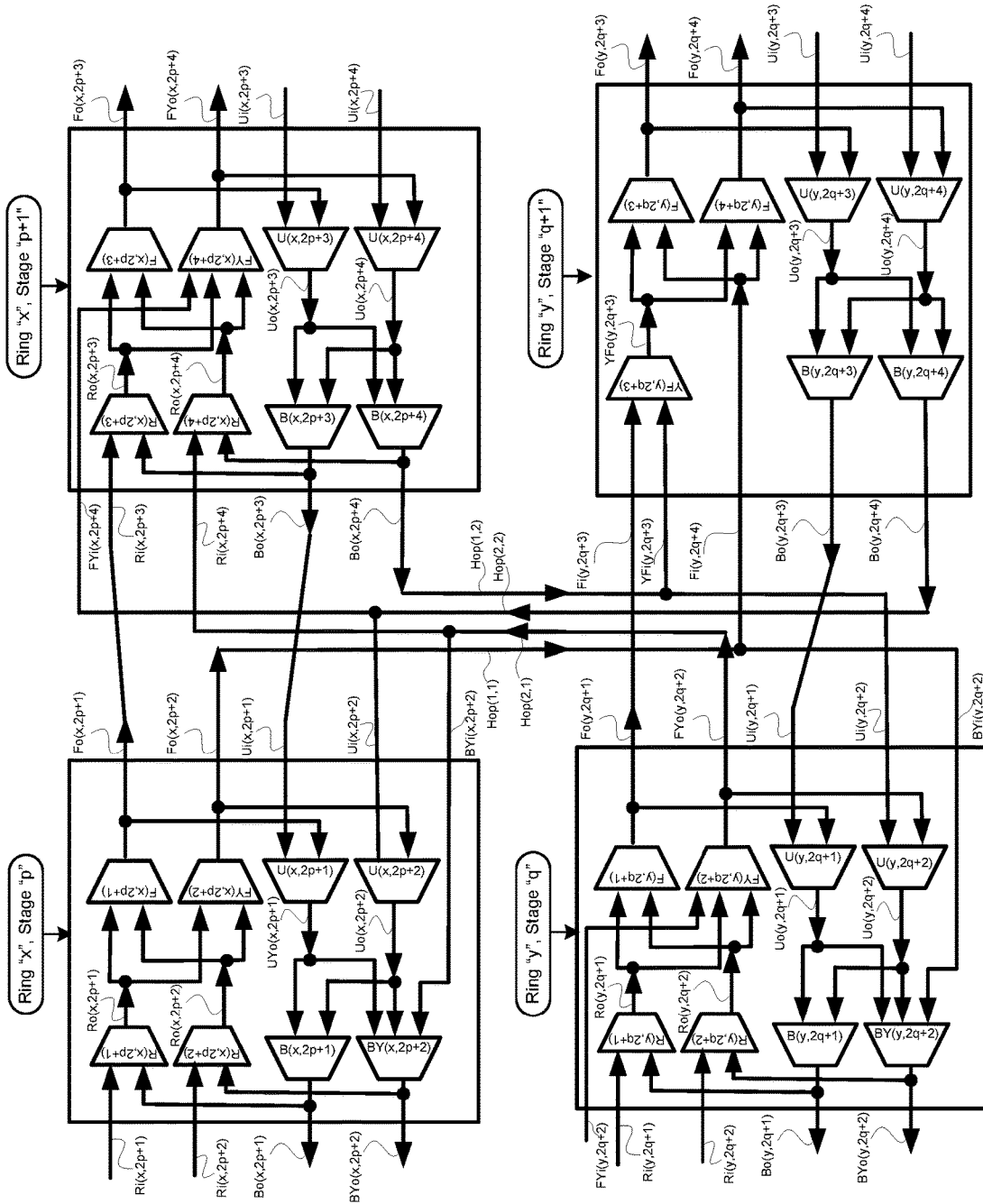
FIG. 15 is a diagram 1500, in an embodiment of, all the connections between two successive stages of two different rings in the same block or in two different blocks of a multi-stage hierarchical network with delay optimizations.

Referring to diagram 1400 in FIG. 14, illustrates all the connections between two arbitrary successive stages of a ring namely the stages (ring "x", stage "p") and (ring "x", stage "p+1") and two other arbitrary successive stages of any other ring namely the stages (ring "y", stage "q") and (ring "y", stage "q+1"), of the complete multi-stage hierarchical network $V_{D\text{-}Comb}(N_1, N_2, d, s)$.

The stage (ring "x", stage "p") consists of 5 inputs namely Fi(x,2p+1), Fi(x,2p+2), YUi(x,2p+1), Ui(x,2p+1), and Ui(x,2p+2); and 4 outputs Bo(x,2p+1), Bo(x,2p+2), Fo(x,2p+1), and Fo(x,2p+2). The stage (ring "x", stage "p") also consists of seven 2:1 Muxes namely F(x,2p+1), F(x,2p+2), YF(x,2p+1), U(x,2p+1), U(x,2p+2), B(x,2p+1), and B(x,2p+2). The 2:1 Mux F(x,2p+1) has two inputs namely Fi(x,2p+1) and Fi(x,2p+2) and has one output Fo(x,2p+1). The 2:1 Mux F(x,2p+2) has two inputs namely Fi(x,2p+1) and Fi(x,2p+2) and has one output Fo(x,2p+2).

The 2:1 Mux YU(x,2p+1) has two inputs namely Ui(x,2p+1) and YUi(x,2p+1) and has one output YUo(x,2p+1). The 2:1 Mux U(x,2p+1) has two inputs namely YUo(x,2p+1) and Fo(x,2p+1) and has one output Uo(x,2p+1). The 2:1 Mux U(x,2p+2) has two inputs namely Ui(x,2p+2) and Fo(x,2p+2) and has one output Uo(x,2p+2). The 2:1 Mux B(x,2p+1) has two inputs namely Uo(x,2p+1) and Uo(x,2p+2) and has one output Bo(x,2p+1). The 2:1 Mux B(x,2p+2) has two inputs namely Uo(x,2p+1) and Uo(x,2p+2) and has one output Bo(x,2p+2).

The stage (ring "x", stage "p+1") consists of 5 inputs namely Fi(x,2p+3), Fi(x,2p+4), YFi(x,2p+3), Ui(x,2p+3), and Ui(x,2p+4); and 4 outputs Bo(x,2p+3), Bo(x,2p+4), Fo(x,2p+3), and Fo(x,2p+4). The stage (ring "x", stage "p+1") also consists of seven 2:1 Muxes namely YF(x,2p+3), F(x,2p+3), F(x,2p+4), U(x,2p+3), U(x,2p+4), B(x,2p+3), and B(x,2p+4). The 2:1 Mux YF(x,2p+3) has two inputs namely Fi(x,2p+3) and YFi(x,2p+3) and has one output YFo(x,2p+3). The 2:1 Mux F(x,2p+3) has two inputs namely YFo(x,2p+3) and Fi(x,2p+4) and has one output Fo(x,2p+3). The 2:1 Mux F(x,2p+4) has two inputs namely YFo(x,2p+3) and Fi(x,2p+4) and has one output Fo(x,2p+4).

The 2:1 Mux U(x,2p+3) has two inputs namely Ui(x,2p+3) and Fo(x,2p+3) and has one output Uo(x,2p+3). The 2:1 Mux U(x,2p+4) has two inputs namely Ui(x,2p+4) and Fo(x,2p+4) and has one output Uo(x,2p+4). The 2:1 Mux B(x,2p+3) has two inputs namely Uo(x,2p+3) and Uo(x,2p+4) and has one output Bo(x,2p+3). The 2:1 Mux B(x,2p+4) has two inputs namely Uo(x,2p+3) and Uo(x,2p+4) and has one output Bo(x,2p+4).

The output Fo(x,2p+1) of the stage (ring "x", stage "p") is connected to the input Fi(x,2p+3) of the stage (ring "x", stage "p+1"). And the output Bo(x,2p+3) of the stage (ring "x", stage "p+1") is connected to the input Ui(x,2p+1) of the stage (ring "x", stage "p").

The stage (ring "y", stage "q") consists of 5 inputs namely Fi(y,2q+1), Fi(y,2q+2), UYi(y,2q+1), Ui(y,2q+1), and Ui(y,2q+2); and 4 outputs Bo(y,2q+1), Bo(y,2q+2), Fo(y,2q+1), and Fo(y,2q+2). The stage (ring "y", stage "q") also consists of five 2:1 Muxes F(y,2q+1), F(y,2q+2), U(y,2q+2), B(y,2q+1), and B(y,2q+2). The stage (ring "y", stage "q") also consists of one 3:1 Mux namely UY(y,2q+1). The 2:1 Mux F(y,2q+1) has two inputs namely Fi(y,2q+1) and Fi(y,2q+2) and has one output Fo(y,2q+1). The 2:1 Mux F(y,2q+2) has two inputs namely Fi(y,2q+1) and Fi(y,2q+2) and has one output Fo(y,2q+2).

The 3:1 Mux UY(y,2q+1) has three inputs namely Ui(y,2q+1), UYi(y,2q+1) and Fo(y,2q+1) and has one output UYo(y,2q+1). The 2:1 Mux U(y,2q+2) has two inputs namely Ui(y,2q+2) and Fo(y,2q+2) and has one output Uo(y,2q+2). The 2:1 Mux B(y,2q+1) has two inputs namely UYo(y,2q+1) and Uo(y,2q+2) and has one output Bo(y,2q+1). The 2:1 Mux B(y,2q+2) has two inputs namely UYo(y,2q+1) and Uo(y,2q+2) and has one output Bo(y,2q+2).

The stage (ring "y", stage "q+1") consists of 5 inputs namely Fi(y,2q+3), Fi(y,2q+4), YFi(y,2q+3), Ui(y,2q+3), and Ui(y,2q+4); and 4 outputs Bo(y,2q+3), Bo(y,2q+4), Fo(y,2q+3), and Fo(y,2q+4). The stage (ring "y", stage "q+1") also consists of seven 2:1 Muxes namely YF(y,2q+

3), F(y,2q+3), F(y,2q+4), U(y,2q+3), U(y,2q+4), B(y,2q+3), and B(y,2q+4). The 2:1 Mux YF(y,2q+3) has two inputs namely Fi(y,2q+3) and YFi(y,2q+3) and has one output YFo(y,2q+3). The 2:1 Mux F(y,2q+3) has two inputs namely YFo(y,2q+3) and Fi(y,2q+4) and has one output Fo(y,2q+3). The 2:1 Mux F(y,2q+4) has two inputs namely YFo(y,2q+3) and Fi(y,2q+4) and has one output Fo(y,2q+4).

The 2:1 Mux U(y,2q+3) has two inputs namely Ui(y,2q+3) and Fo(y,2q+3) and has one output Uo(y,2q+3). The 2:1 Mux U(y,2q+4) has two inputs namely Ui(y,2q+4) and Fo(y,2q+4) and has one output Uo(y,2q+4). The 2:1 Mux B(y,2q+3) has two inputs namely Uo(y,2q+3) and Uo(y,2q+4) and has one output Bo(y,2q+3). The 2:1 Mux B(y,2q+4) has two inputs namely Uo(y,2q+3) and Uo(y,2q+4) and has one output Bo(y,2q+4).

The output Fo(y,2q+1) of the stage (ring "y", stage "q") is connected to the input Fi(y,2q+3) of the stage (ring "y", stage "q+1"). And the output Bo(y,2q+3) of the stage (ring "y", stage "q+1") is connected to the input Ui(y,2q+1) of the stage (ring "y", stage "q").

The output Fo(x,2p+2) of the stage (ring "x", stage "p") is connected via the wire Hop(1,1) to two inputs namely input Fi(y,2q+4) of the stage (ring "y", stage "q+1") and input UYi(y,2q+1) of the stage (ring "y", stage "q"). The output Bo(x,2p+4) of the stage (ring "x", stage "p+1") is connected via the wire Hop(1,2) to two inputs namely input Ui(y,2q+2) of the stage (ring "y", stage "q") and input YFi(y,2q+3) of the stage (ring "y", stage "q+1").

The output Fo(y,2q+2) of the stage (ring "y", stage "q") is connected via the wire Hop(2,1) to two inputs namely input Fi(x,2p+4) of the stage (ring "x", stage "p+1") and input YUi(x,2p+1) of the stage (ring "x", stage "p"). The output Bo(y,2q+4) of the stage (ring "y", stage "q+1") is connected via the wire Hop(2,2) to two inputs namely input Ui(x,2p+2) of the stage (ring "x", stage "p") and input YFi(x,2p+3) of the stage (ring "x", stage "p+1").

Referring to diagram 1500 in FIG. 15, illustrates all the connections between two arbitrary successive stages of a ring namely the stages (ring "x", stage "p") and (ring "x", stage "p+1") and two other arbitrary successive stages of any other ring namely the stages (ring "y", stage "q") and (ring "y", stage "q+1"), of the complete multi-stage hierarchical network $V_{D-Comb}(N_1, N_2,d,s)$.

The stage (ring "x", stage "p") consists of 5 inputs namely Ri(x,2p+1), Ri(x,2p+2), Ui(x,2p+1), Ui(x,2p+2), and BYi(x,2p+2); and 4 outputs Bo(x,2p+1), Bo(x,2p+2), Fo(x,2p+1), and Fo(x,2p+2). The stage (ring "x", stage "p") also consists of seven 2:1 Muxes namely R(x,2p+1), R(x,2p+2), F(x,2p+1), F(x,2p+2), U(x,2p+1), U(x,2p+2), and B(x,2p+1). The stage (ring "x", stage "p") also consists of one 3:1 Mux namely BY(x,2p+2). The 2:1 Mux R(x,2p+1) has two inputs namely Ri(x,2p+1) and Bo(x,2p+1) and has one output Ro(x,2p+1). The 2:1 Mux R(x,2p+2) has two inputs namely Ri(x,2p+2) and Bo(x,2p+2) and has one output Ro(x,2p+2). The 2:1 Mux F(x,2p+1) has two inputs namely Ro(x,2p+1) and Ro(x,2p+2) and has one output Fo(x,2p+1). The 2:1 Mux F(x,2p+2) has two inputs namely Ro(x,2p+1), and Ro(x,2p+2), and has one output Fo(x,2p+2).

The 2:1 Mux U(x,2p+1) has two inputs namely Ui(x,2p+1) and Fo(x,2p+1) and has one output Uo(x,2p+1). The 2:1 Mux U(x,2p+2) has two inputs namely Ui(x,2p+2) and Fo(x,2p+2) and has one output Uo(x,2p+2). The 2:1 Mux B(x,2p+1) has two inputs namely Uo(x,2p+1) and Uo(x,2p+2) and has one output Bo(x,2p+1). The 3:1 Mux BY(x,2p+2) has three inputs namely Uo(x,2p+1), Uo(x,2p+2), and BYi(x,2p+2), and has one output BYo(x,2p+2).

The stage (ring "x", stage "p+1") consists of 5 inputs namely Ri(x,2p+3), Ri(x,2p+4), FYi(x,2p+4), Ui(x,2p+3), and Ui(x,2p+4); and 4 outputs Bo(x,2p+3), Bo(x,2p+4), Fo(x,2p+3), and Fo(x,2p+4). The stage (ring "x", stage "p+1") also consists of seven 2:1 Muxes namely R(x,2p+3), R(x,2p+4), F(x,2p+3), U(x,2p+3), U(x,2p+4), B(x,2p+3), and B(x,2p+4). The stage (ring "x", stage "p+1") also consists of one 3:1 Mux namely FY(x,2p+4). The 2:1 Mux R(x,2p+3) has two inputs namely Ri(x,2p+3) and Bo(x,2p+3) and has one output Ro(x,2p+3). The 2:1 Mux R(x,2p+4) has two inputs namely Ri(x,2p+4) and Bo(x,2p+4) and has one output Ro(x,2p+4). The 2:1 Mux F(x,2p+3) has two inputs namely Ro(x,2p+3) and Ro(x,2p+4) and has one output Fo(x,2p+3). The 3:1 Mux FY(x,2p+4) has three inputs namely Ro(x,2p+3), Ro(x,2p+4), and FYi(x,2p+4), and has one output FYo(x,2p+4).

The 2:1 Mux U(x,2p+3) has two inputs namely Ui(x,2p+3) and Fo(x,2p+3) and has one output Uo(x,2p+3). The 2:1 Mux U(x,2p+4) has two inputs namely Ui(x,2p+4) and FYo(x,2p+4) and has one output Uo(x,2p+4). The 2:1 Mux B(x,2p+3) has two inputs namely Uo(x,2p+3) and Uo(x,2p+4) and has one output Bo(x,2p+3). The 2:1 Mux B(x,2p+4) has two inputs namely Uo(x,2p+3) and Uo(x,2p+4) and has one output Bo(x,2p+4).

The output Fo(x,2p+1) of the stage (ring "x", stage "p") is connected to the input Ri(x,2p+3) of the stage (ring "x", stage "p+1"). And the output Bo(x,2p+3) of the stage (ring "x", stage "p+1") is connected to the input Ui(x,2p+1) of the stage (ring "x", stage "p").

The stage (ring "y", stage "q") consists of 6 inputs namely Ri(y,2q+1), Ri(y,2q+2), FYi(y,2q+2), Ui(y,2q+1), Ui(y,2q+2), and BYi(y,2q+2); and 4 outputs Bo(y,2q+1), Bo(y,2q+2), Fo(y,2q+1), and Fo(y,2q+2). The stage (ring "y", stage "q") also consists of six 2:1 Muxes namely R(y,2q+1), R(y,2q+2), F(y,2q+1), U(y,2q+1), U(y,2q+2), and B(y,2q+1). The stage (ring "y", stage "q") also consists of two 3:1 Muxes namely FY(y,2q+2) and BY(y,2q+2). The 2:1 Mux R(y,2q+1) has two inputs namely Ri(y,2q+1) and Bo(y,2q+1) and has one output Ro(y,2q+1). The 2:1 Mux R(y,2q+2) has two inputs namely Ri(y,2q+2) and Bo(y,2q+2) and has one output Ro(y,2q+2). The 2:1 Mux F(y,2q+1) has two inputs namely Ro(y,2q+1) and Ro(y,2q+2) and has one output Fo(y,2q+1). The 3:1 Mux FY(y,2q+2) has three inputs namely Ro(y,2q+1), Ro(y,2q+2), and FYi(y,2q+2), and has one output FYo(y,2q+2).

The 2:1 Mux U(y,2q+1) has two inputs namely Ui(y,2q+1) and Fo(y,2q+1) and has one output Uo(y,2q+1). The 2:1 Mux U(y,2q+2) has two inputs namely Ui(y,2q+2) and FYo(y,2q+2) and has one output Uo(y,2q+2). The 2:1 Mux B(y,2q+1) has two inputs namely Uo(y,2q+1) and Uo(y,2q+2) and has one output Bo(y,2q+1). The 3:1 Mux BY(y,2q+2) has three inputs namely Uo(y,2q+1), Uo(y,2q+2), and BYi(y,2q+2) and has one output BYo(y,2q+2).

The stage (ring "y", stage "q+1") consists of 5 inputs namely Fi(y,2q+3), Fi(y,2q+4), YFi(y,2q+3), Ui(y,2q+3), and Ui(y,2q+4); and 4 outputs Bo(y,2q+3), Bo(y,2q+4), Fo(y,2q+3), and Fo(y,2q+4). The stage (ring "y", stage "q+1") also consists of seven 2:1 Muxes namely YF(y,2q+3), F(y,2q+3), F(y,2q+4), U(y,2q+3), U(y,2q+4), B(y,2q+3), and B(y,2q+4). The 2:1 Mux YF(y,2q+3) has two inputs namely Fi(y,2q+3) and YFi(y,2q+3) and has one output YFo(y,2q+3). The 2:1 Mux F(y,2q+3) has two inputs namely YFo(y,2q+3) and Fi(y,2q+4) and has one output Fo(y,2q+3). The 2:1 Mux F(y,2q+4) has two inputs namely YFo(y,2q+3) and Fi(y,2q+4) and has one output Fo(y,2q+4).

The 2:1 Mux U(y,2q+3) has two inputs namely Ui(y,2q+3) and Fo(y,2q+3) and has one output Uo(y,2q+3). The 2:1

Mux U(y,2q+4) has two inputs namely Ui(y,2q+4) and Fo(y,2q+4) and has one output Uo(y,2q+4). The 2:1 Mux B(y,2q+3) has two inputs namely Uo(y,2q+3) and Uo(y,2q+4) and has one output Bo(y,2q+3). The 2:1 Mux B(y,2q+4) has two inputs namely Uo(y,2q+3) and Uo(y,2q+4) and has one output Bo(y,2q+4).

The output Fo(y,2q+1) of the stage (ring "y", stage "q") is connected to the input Fi(y,2q+3) of the stage (ring "y", stage "q+1"). And the output Bo(y,2q+3) of the stage (ring "y", stage "q+1") is connected to the input Ui(y,2q+1) of the stage (ring "y", stage "q").

The output Fo(x,2p+2) of the stage (ring "x", stage "p") is connected via the wire Hop(1,1) to two inputs namely input Fi(y,2q+4) of the stage (ring "y", stage "q+1") and input BYi(y,2q+1) of the stage (ring "y", stage "q"). The output Bo(x,2p+4) of the stage (ring "x", stage "p+1") is connected via the wire Hop(1,2) to two inputs namely input Ui(y,2q+2) of the stage (ring "y", stage "q") and input YFi(y,2q+3) of the stage (ring "y", stage "q+1").

The output Fo(y,2q+2) of the stage (ring "y", stage "q") is connected via the wire Hop(2,1) to two inputs namely input Ri(x,2p+4) of the stage (ring "x", stage "p+1") and input BYi(x,2p+1) of the stage (ring "x", stage "p"). The output Bo(y,2q+4) of the stage (ring "y", stage "q+1") is connected via the wire Hop(2,2) to two inputs namely input Ui(x,2p+2) of the stage (ring "x", stage "p") and input YFi(x,2p+4) of the stage (ring "x", stage "p+1").

In accordance with the current invention, either partial multi-stage hierarchical network $V_{D\text{-}Comb}(N_1, N_2,d,s)$ 100A of FIG. 1A, or partial multi-stage hierarchical network $V_{D\text{-}Comb}(N_1, N_2,d,s)$ 100B of FIG. 1B, or partial multi-stage hierarchical network $V_{D\text{-}Comb}(N_1, N_2,d,s)$ 100C of FIG. 1C, corresponding to a block of 2D-grid of blocks 800 of FIG. 8, using any one of the embodiments of 200A-200F of FIGS. 2A-2F, 900A-900E of FIGS. 9A-9E, 1000A-1000F of FIGS. 10A-10F, 1100A-1100C of FIGS. 11A-11C to implement a stage of a ring of the multi-stage hierarchical network, either by using the hop wire connections or multi-drop hop wire connections between two arbitrary stages in two different rings of the same block or two different rings of different blocks described in diagram 700A of FIG. 7A may be any one of the embodiments of either the diagrams 300A of FIG. 3A, 300B of FIG. 3B, 300C of FIG. 3C, 300D of FIG. 3D, 300E of FIG. 3E, 500A of FIG. 5A, 1200 of FIG. 12, 1300 of FIG. 13, 1400 of FIGS. 14, and 1500 of FIG. 15 or by using the hop wire connections or multi-drop hop wire connections between two arbitrary stages in two different rings of the same block or two different rings of different blocks may be any one of the embodiments of either the diagrams 400A of FIG. 4A, 400B of FIG. 4B, 600A of FIG. 6A, or 600B of FIG. 6B is very efficient in the reduction of the die size, power consumption, and highly optimized for lower wire/path delay for higher performance for practical routing applications to particularly to set up broadcast, unicast and multicast connections. In general in accordance with the current invention, where $N_1$ and $N_2$ of the complete multi-stage hierarchical network $V_{D\text{-}Comb}(N_1, N_2,d,s)$ may be arbitrarily large in size and also the 2D-grid size 800 may also be arbitrarily large in size in terms of both the number of rows and number of columns.

1) Programmable Integrated Circuit Embodiments:

All the embodiments disclosed in the current invention are useful in programmable integrated circuit applications. FIG. 16A2 illustrates the detailed diagram 1600A2 for the implementation of the diagram 1600A1 in programmable integrated circuit embodiments. Each crosspoint is implemented by a transistor coupled between the corresponding inlet link and outlet link, and a programmable cell in programmable integrated circuit embodiments. Specifically crosspoint CP(1,1) is implemented by transistor C(1,1) coupled between inlet link IL1 and outlet link OL1, and programmable cell P(1,1); crosspoint CP(1,2) is implemented by transistor C(1,2) coupled between inlet link IL1 and outlet link OL2, and programmable cell P(1,2); crosspoint CP(2,1) is implemented by transistor C(2,1) coupled between inlet link IL2 and outlet link OL1, and programmable cell P(2,1); and crosspoint CP(2,2) is implemented by transistor C(2,2) coupled between inlet link IL2 and outlet link OL2, and programmable cell P(2,2).

If the programmable cell is programmed ON, the corresponding transistor couples the corresponding inlet link and outlet link. If the programmable cell is programmed OFF, the corresponding inlet link and outlet link are not connected. For example if the programmable cell P(1,1) is programmed ON, the corresponding transistor C(1,1) couples the corresponding inlet link IL1 and outlet link OL1. If the programmable cell P(1,1) is programmed OFF, the corresponding inlet link IL1 and outlet link OL1 are not connected. In volatile programmable integrated circuit embodiments the programmable cell may be an SRAM (Static Random Address Memory) cell. In non-volatile programmable integrated circuit embodiments the programmable cell may be a Flash memory cell. Also the programmable integrated circuit embodiments may implement field programmable logic arrays (FPGA) devices, or programmable Logic devices (PLD), or Application Specific Integrated Circuits (ASIC) embedded with programmable logic circuits or 3D-FPGAs.

FIG. 16A2 also illustrates a buffer B1 on inlet link IL2. The signals driven along inlet link IL2 are amplified by buffer B1. Buffer B1 can be inverting or non-inverting buffer. Buffers such as B1 are used to amplify the signal in links which are usually long.

In other embodiments all the d*d switches described in the current invention are also implemented using muxes of different sizes controlled by SRAM cells or flash cells etc.
2) One-Time Programmable Integrated Circuit Embodiments:

All the embodiments disclosed in the current invention are useful in one-time programmable integrated circuit applications. FIG. 16A3 illustrates the detailed diagram 1600A3 for the implementation of the diagram 1600A1 in one-time programmable integrated circuit embodiments. Each crosspoint is implemented by a via coupled between the corresponding inlet link and outlet link in one-time programmable integrated circuit embodiments. Specifically crosspoint CP(1,1) is implemented by via V(1,1) coupled between inlet link IL1 and outlet link OL1; crosspoint CP(1,2) is implemented by via V(1,2) coupled between inlet link IL1 and outlet link OL2; crosspoint CP(2,1) is implemented by via V(2,1) coupled between inlet link IL2 and outlet link OL1; and crosspoint CP(2,2) is implemented by via V(2,2) coupled between inlet link IL2 and outlet link OL2.

If the via is programmed ON, the corresponding inlet link and outlet link are permanently connected which is denoted by thick circle at the intersection of inlet link and outlet link. If the via is programmed OFF, the corresponding inlet link and outlet link are not connected which is denoted by the absence of thick circle at the intersection of inlet link and outlet link. For example in the diagram 1600A3 the via V(1,1) is programmed ON, and the corresponding inlet link IL1 and outlet link OL1 are connected as denoted by thick circle at the intersection of inlet link IL1 and outlet link OL1; the via V(2,2) is programmed ON, and the corresponding inlet link IL2 and outlet link OL2 are connected as denoted by thick circle at the intersection of inlet link IL2 and outlet link OL2; the via V(1,2) is programmed OFF, and the corresponding inlet link IL1 and outlet link OL2 are not connected as denoted by the absence of thick circle at the intersection of inlet link IL1 and outlet link OL2; the via V(2,1) is programmed OFF, and the corresponding inlet link IL2 and outlet link OL1 are not connected as denoted by the absence of thick circle at the intersection of inlet link IL2 and outlet link OL1. One-time programmable integrated circuit embodiments may be anti-fuse based programmable integrated circuit devices or mask programmable structured ASIC devices.

3) Integrated Circuit Placement and Route Embodiments:

All the embodiments disclosed in the current invention are useful in Integrated Circuit Placement and Route applications, for example in ASIC backend Placement and Route tools. FIG. 16A4 illustrates the detailed diagram 1600A4 for the implementation of the diagram 1600A1 in Integrated Circuit Placement and Route embodiments. In an integrated circuit since the connections are known a-priori, the switch and crosspoints are actually virtual. However the concept of virtual switch and virtual crosspoint using the embodiments disclosed in the current invention reduces the number of required wires, wire length needed to connect the inputs and outputs of different netlists and the time required by the tool for placement and route of netlists in the integrated circuit.

Each virtual crosspoint is used to either to hardwire or provide no connectivity between the corresponding inlet link and outlet link. Specifically crosspoint CP(1,1) is implemented by direct connect point DCP(1,1) to hardwire (i.e., to permanently connect) inlet link IL1 and outlet link OL1 which is denoted by the thick circle at the intersection of inlet link IL1 and outlet link OL1; crosspoint CP(2,2) is implemented by direct connect point DCP(2,2) to hardwire inlet link IL2 and outlet link OL2 which is denoted by the thick circle at the intersection of inlet link IL2 and outlet link OL2. The diagram 1600A4 does not show direct connect point DCP(1,2) and direct connect point DCP(1,3) since they are not needed and in the hardware implementation they are eliminated. Alternatively inlet link IL1 needs to be connected to outlet link OL1 and inlet link IL1 does not need to be connected to outlet link OL2. Also inlet link IL2 needs to be connected to outlet link OL2 and inlet link IL2 does not need to be connected to outlet link OL1. Furthermore in the example of the diagram 1600A4, there is no need to drive the signal of inlet link IL1 horizontally beyond outlet link OL1 and hence the inlet link IL1 is not even extended horizontally until the outlet link OL2. Also the absence of direct connect point DCP(2,1) illustrates there is no need to connect inlet link IL2 and outlet link OL1.

In summary in integrated circuit placement and route tools, the concept of virtual switches and virtual cross points is used during the implementation of the placement & routing algorithmically in software, however during the hardware implementation cross points in the cross state are implemented as hardwired connections between the corresponding inlet link and outlet link, and in the bar state are implemented as no connection between inlet link and outlet link.

3) More Application Embodiments:

All the embodiments disclosed in the current invention are also useful in the design of SoC interconnects, Field programmable interconnect chips, parallel computer systems and in time-space-time switches.

Figure 17:
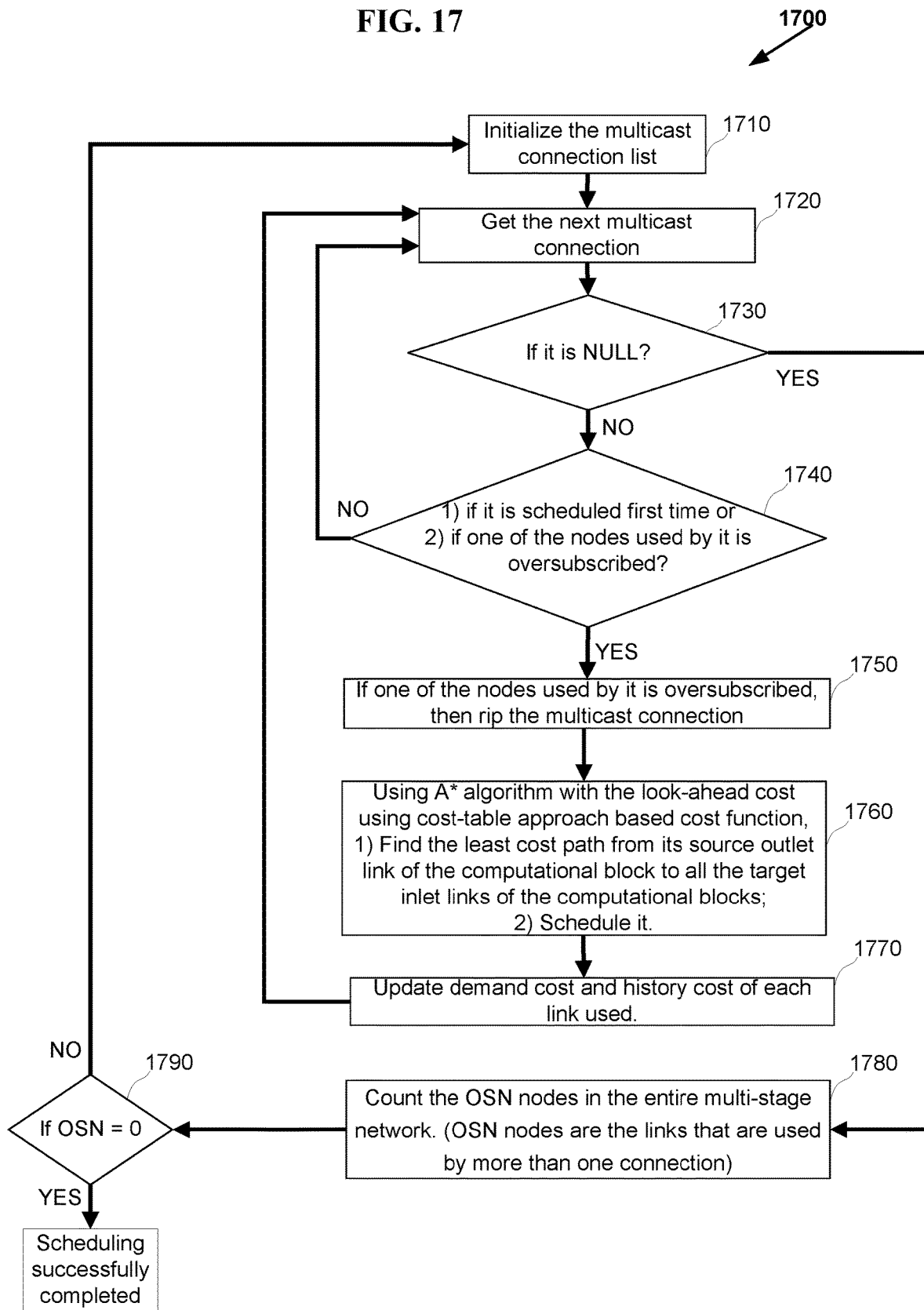
FIG. 17 is high-level flowchart of a scheduling method 1700 according to the invention, used to set up a set of multicast connections in the complete multi-stage hierarchical network as disclosed in the current invention.

Scheduling Method Embodiments the Multi-Stage Hierarchical Network $V_{Comb}(N_1, N_2, d, s)$:

FIG. 17 shows a high-level flowchart of a scheduling method 1700, in one embodiment executed to setup multicast and unicast connections in the multi-stage hierarchical network $V_{Comb}(N_1, N_2, d, s)$ disclosed in this invention. According to this embodiment, the set of multicast connections are initialized to the beginning of the set in act 1710. Then the control goes to act 1720. In act 1720, next multicast connection is selected in sequence form the set of multicast connections. Then the control goes to act 1730.

In act 1730 it is checked if this is the next multicast connection in sequence is NULL or i.e. all the multicast connections are scheduled. If act 1730 results "no", that is there are more multicast connections to be scheduled the control goes to act 1740. In act 1740 it is checked if this multicast connection is being scheduled for the first time. Or if it is not scheduled for the first time, it is checked if any one of the links taken by this multicast connection is oversubscribed by any other multicast connection is checked. If either the multicast connection is being scheduled for the first time or if any one of the links taken by this multicast connection is oversubscribed the control goes to act 1750. Otherwise control goes to act 1720 where the next multicast connection will be selected. So act 1720, act 1730, and act 1740 are executed in a loop.

In act 1750 the multicast connection is not being scheduled for the first time and since at least one of the links taken by this multicast connection is oversubscribed, the complete path taken this multicast connection is cleared or the multicast connection's path is ripped. Then the control goes to act 1760. In act 1760, using the well-known A* search algorithm the least cost path from its source outlet link of the computational block to all the target inlet links of the corresponding computational blocks are found out one after another target inlet links. The cost function used is based on the Manhattan distance between the target inlet link's block and source outlet link's block by taking the delays on each wire is considered in the cost function and also that longest wires are chosen first in the A* search algorithm.

According to the current invention, before scheduling the set of multicast connections in the scheduling method 1700, first a set of static cost tables will be prepared with the least cost paths from each link of the partial multistage network $V_{Comb}(N_1, N_2, d, s)$ to each outgoing hop wire from that partial multistage network as well as to each inlet link of the computational block connected form that partial multistage network. So there will be as many cost tables created equal to the sum of the total number of outgoing hop wires from the partial multistage network and the inlet links of the computational block connected form that partial multistage network. Each cost table will also have as many entries as there are internal links of that partial multistage network. And the value at each entry of these cost tables is equal to the total delay from the corresponding internal link to the corresponding outgoing hop wire or to the inlet link of the computational block.

In act 1760, according to the current invention, for the look-ahead cost computation during the A* search algorithm both the cost from the static cost tables from the current internal link in the current partial multistage network and the cost value computed based on the Manhattan distance between the target inlet link's block and the current link's corresponding block by taking the delays on each wire into consideration are added. Also the least of the cost values from all the cost tables corresponding to the current link and all the outgoing wires in the right direction of the target block, is selected before it is added to the Manhattan distance based cost. Finally in act 1760, the multicast connection is scheduled as for the A* search algorithm. Then the control goes to act 1770.

In act 1770, the demand cost and history cost of each link used by the current multicast connection are updated. And the control goes to act 1720. Thus act 1720, act 1730, act 1740, act 1750, act 1760, and act 1770 are executed in a loop to schedule the multicast connections by going through the list of all multicast connections which will be one pass or iteration.

In act 1730 results "yes", i.e. all the required multicast connections in the list are scheduled in this pass or iteration, then the control goes to act 1780. In act 1780, the total number of links in the complete multistage network that are taken by more than one multicast connection are counted, hereinafter "OSN" or "Over Subscription nodes". Then the control goes to act 1790. In act 1790 it will be checked and if OSN is not equal to zero then the act 1790 results in "no" and the control goes to act 1710 to start the next iteration or pass to schedule all the required multicast connections in the list of all multicast connections. Thus act 1710, act 1720, act 1730, act 1740, act 1750, act 1760, act 1770, act 1780, and act 1790 are executed in a loop to implement different passes or iterations of scheduling the set of all multicast connections. If the act 1790 results in "yes", that means no link in the complete multistage network is taken by more than one multicast connection and hence the scheduling is successfully completed.

Each multicast connection of the type described above in reference to method 1700 of FIG. 17 can be unicast connection, a multicast connection or a broadcast connection, depending on the example.

Figure 18:
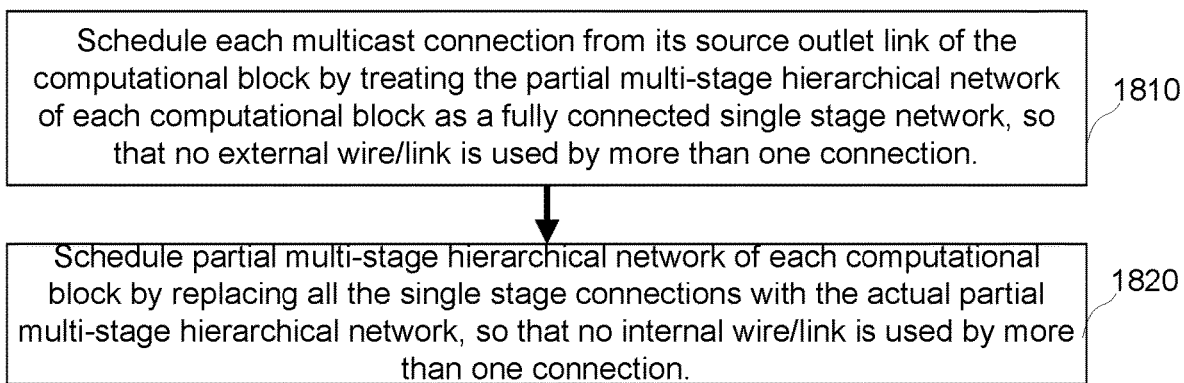
FIG. 18 is high-level flowchart of a scheduling method 1800 according to the invention, used to set up a set of multicast connections first on the external wires and then on internal wires in the complete multi-stage hierarchical network as disclosed in the current invention.

Inter-Block and Intra-Block Scheduling Method Embodiments the Multi-Stage Hierarchical Network $V_{Comb}(N_1, N_2, d, s)$:

FIG. 18 shows a high-level flowchart of a scheduling method 1800, in one embodiment executed to setup multicast connections in the multi-stage hierarchical network $V_{Comb}(N_1, N_2, d, s)$ disclosed in this invention in two steps (one for each act 1810 and act 1820 as shown in FIG. 18) namely: 1) scheduling the set of multicast connections outside the blocks of 2D-grid of blocks with each block corresponding to a partial multi-stage network, or in between the blocks of the complete multi-stage network, or alternatively on the external wires of the complete multi-stage network hereinafter "inter-block scheduling". Inter-block scheduling is implemented in act 1810 so that there are no OSN nodes. During inter-block scheduling the partial multi-stage hierarchical network corresponding to each block is considered as a single stage network or alternatively each internal wire of the partial multi-stage hierarchical network is directly connected to each outgoing wire or external wire of the partial multi-stage hierarchical network, and 2) scheduling the set of multicast connections inside the blocks of 2D-grid of blocks with each block corresponding to a partial multi-stage network or alternatively on the internal wires of the complete multi-stage network hereinafter "intra-block scheduling". The act 1820 implements intra-block scheduling for each block so that there are no OSN nodes.

The act 1810 may be implemented by the scheduling method 1700 of FIG. 17. Similarly in act 1820 for each block of the multi-stage hierarchical network, the inter-block scheduling may be implemented by the scheduling method 1700 of FIG. 17.

In accordance with the current invention, the scheduling method 1700 of FIG. 17 and the scheduling method 1800 of FIG. 18 are applicable to either partial multi-stage hierarchical network $V_{D\text{-}Comb}(N_1, N_2, d, s)$ 100A of FIG. 1A, or partial multi-stage hierarchical network $V_{D\text{-}Comb}(N_1, N_2, d, s)$ 100B of FIG. 1B, or partial multi-stage hierarchical network $V_{D\text{-}Comb}(N_1, N_2, d, s)$ 100C of FIG. 1C, corresponding to a block of 2D-grid of blocks 800 of FIG. 8, using any one of the embodiments of 200A-200F of FIGS. 2A-2F, 900A-900E of FIGS. 9A-9E, 1000A-1000F of FIGS. 10A-10F, 1100A-1100C of FIGS. 11A-11C to implement a stage of a ring of the multi-stage hierarchical network, either by using the hop wire connections or multi-drop hop wire connections between two arbitrary stages in two different rings of the same block or two different rings of different blocks described in diagram 700A of FIG. 7A may be any one of the embodiments of either the diagrams 300A of FIG. 3A, 300B of FIG. 3B, 300C of FIG. 3C, 300D of FIG. 3D, 300E of FIG. 3E, 500A of FIG. 5A, 1200 of FIG. 12, 1300 of FIG. 13, 1400 of FIGS. 14, and 1500 of FIG. 15 or by using the hop wire connections or multi-drop hop wire connections between two arbitrary stages in two different rings of the same block or two different rings of different blocks may be any one of the embodiments of either the diagrams 400A of FIG. 4A, 400B of FIG. 4B, 600A of FIG. 6A, or 600B of FIG. 6B is very efficient in the reduction of the die size, power consumption, and highly optimized for lower wire/path delay for higher performance for practical routing applications to particularly to set up broadcast, unicast and multicast connections.

Numerous modifications and adaptations of the embodiments, implementations, and examples described herein will be apparent to the skilled artisan in view of the disclosure.

What is claimed is:

1. A multi-stage hierarchical network comprising:
a plurality of partial multi-stage networks, a plurality of inlet links and a plurality of outlet links, said plurality of partial multi-stage networks arranged in a two-dimensional grid having a plurality of rows and a plurality of columns; and
each partial multi-stage network of said plurality of partial multi-stage networks comprising one or more slices, each slice of said one or more slices comprising one or more rings, each ring of said one or more rings comprising y stages, where y≥2; and
each stage of said y stages comprising at least one switch of size $d_i \times d_o$, where $d_i \geq 2$ and $d_o \geq 2$, each switch of said at least one switch of size $d_i \times d_o$ having $d_i$ incoming links and $d_o$ outgoing links, each switch of said at least one switch of size $d_i \times d_o$ comprising a plurality of multiplexers of size d≥2 with each multiplexer of said plurality of multiplexers comprising d inputs and one output; and
wherein said at least one switch of size $d_i \times d_o$ comprises one of a) a forward switch, b) both a forward switch and a U-turn switch, c) a forward switch, a backward switch and a U-turn switch, d) a forward switch, a backward switch, a U-turn switch and a reverse U-turn switch e) a forward switch, a backward switch, a U-turn switch and a reverse U-turn switch without 180-degree turn paths, and f) an integrated switch comprising a forward switch, a backward switch, a U-turn switch and a reverse U-turn switch without 180-degree turn paths; and
wherein said $d_i$ incoming links and said $d_o$ outgoing links comprise a one or more internal connections and a one or more hop wires where said one or more hop wires comprise a one or more internal hop wires or a one or more external hop wires; and wherein each outlet link of said plurality of outlet links is connected to the output of a first multiplexer of said plurality of multiplexers of a first switch of said at least one switch of size $d_i \times d_o$ of a first stage of said y stages of a first partial multi-stage network of said plurality of partial multi-stage networks, and each inlet link of said plurality of inlet links is connected to a first input of said d inputs of one or more multiplexers of said plurality of multiplexers of one or more switches of said at least one switch of size $d_i \times d_o$ of one or more stages of said y stages of one or more partial multi-stage networks of said plurality of partial multi-stage networks; and wherein each internal connection of said one or more internal connections connected from the output of a first multiplexer of said plurality of multiplexers of a first switch of said at least one switch of size $d_i \times d_o$ of a first stage of said y stages of a first ring of said one or more rings to a first input of said d inputs of a second multiplexer of said plurality of multiplexers of a second switch of said at least one switch of size $d_i \times d_o$ of a second stage of said y stages of the first ring of said one or more rings; and wherein each internal hop wire of said one or more internal hop wires is connected from the output of a multiplexer of said plurality of multiplexers of a switch of said at least one switch of size $d_i \times d_o$ of a stage of said y stages of a first ring of said one or more rings of a first slice of said one or more slices to a first input of said d inputs of one or more multiplexers of said plurality of multiplexers of one or more switches of said at least one switch of size $d_i \times d_o$ of one or more stages of said y stages of one or more rings different from the first ring of said one or more rings of the first slice of said one or more slices; and wherein each external hop wire of said one or more external hop wires is connected from the output a multiplexer of said plurality of multiplexers of a switch of said at least one switch of size $d_i \times d_o$ of a stage of said y stages of a ring of said one or more rings of a slice of said one or more slices of a first partial multi-stage network of said plurality of partial multi-stage networks to an input of said d inputs of one or more multiplexers of said plurality of multiplexers of one or more switches of said at least one switch of size $d_i \times d_o$ of one or more stages of said y stages of said one or more rings of a slice of said one or more slices of one or more partial multi-stage networks different from the first partial multi-stage network of said plurality of partial multi-stage networks; and wherein said at least one switch of size $d_i \times d_o$ of said y stages of said one or more rings of said one or more slices of said plurality of partial multi-stage hierarchical networks are either 1) fully connected or 2) not fully connected or alternatively optimized.

2. The multi-stage hierarchical network of claim 1, wherein said one or more external hop wires are connected vertically (hereinafter "vertical wires" or "vertical external hop wires"), or horizontally (hereinafter "horizontal wires" or "horizontal external hop wires").

3. The multi-stage hierarchical network of claim 1, wherein said one or more external hop wires are interconnected through only one multiplexer of said plurality of multiplexers at each switch of said at least one switch of size $d_i \times d_o$.

4. The multi-stage hierarchical network of claim 1, wherein each multiplexer of said plurality of multiplexers of size d≥2 is configurable by Static Random Address Memory cells or Flash memory Cells.

5. The multi-stage hierarchical network of claim 1, wherein
each multiplexer of said plurality of multiplexers of size d≥2 is of size d=4 or d>4.

6. The multi-stage hierarchical network of claim 1, wherein said one or more external hop wires are implemented in two or more metal layers, or
said one or more external hop wires use a plurality of buffers to amplify signals driven through them; and said plurality of buffers are either inverting or non-inverting buffers, or
one or more of said y stages in a first partial multi-stage network of said plurality of partial multi-stage networks comprise one of a) six 2:1 multiplexers, b) eight 2:1 multiplexers, and c) four 4:1 multiplexers.

7. The multi-stage hierarchical network of claim 1, wherein
said plurality of partial multi-stage networks are implemented in a 3D-FPGAs.

8. A programmable integrated circuit comprising:
a plurality of programmable logic blocks and a multi-stage hierarchical network, each programmable logic block of said plurality of programmable logic blocks comprising a plurality of inlet links and a plurality of outlet links, said multi-stage hierarchical network comprising a plurality of partial multi-stage networks wherein each programmable logic block of said plurality of programmable logic blocks is coupled with at least one partial multi-stage network of said plurality of partial multi-stage networks, said plurality of programmable logic blocks coupled with said plurality of partial multi-stage networks arranged in a two-dimensional grid of a plurality of rows and a plurality of columns; and each partial multi-stage network of said plurality of partial multi-stage networks comprising one or more slices, each slice of said one or more slices comprising one or more rings, each ring of said one or more rings comprising y stages, where y≥2; and each stage of said y stages comprising at least one switch of size $d_i \times d_o$, where $d_i \geq 2$ and $d_o \geq 2$, each switch of said at least one switch of size $d_i \times d_o$ having $d_i$ incoming links and $d_o$ outgoing links, each switch of said at least one switch of size $d_i \times d_o$ comprising a plurality of multiplexers of size d≥2 with each multiplexer of said plurality of multiplexers comprising d inputs and one output; and wherein said at least one switch of size $d_i \times d_o$ comprises one of a) a forward switch, b) both a forward switch and a U-turn switch, c) a forward switch, a backward switch and a U-turn switch, d) a forward switch, a backward switch, U-turn switch, and a reverse U-turn switch, e) a forward switch, a backward switch, U-turn switch, and a reverse U-turn switch without 180-degree turn paths, and f) an integrated switch comprising a forward switch, a backward switch, a U-turn switch and a reverse U-turn switch without 180-degree turn paths; and wherein said $d_i$ incoming links and said $d_o$ outgoing links comprise either a one or more internal connections, a one or more internal hop wires, or a one or more external hop wires; and wherein each inlet link of said plurality of inlet links is connected to the output of a first multiplexer of said plurality of multiplexers of a first switch of said at least one switch of size $d_i \times d_o$ of a first stage of said y stages of a first partial multi-stage network of said plurality of partial multi-stage networks, and each outlet link of said plurality of outlet links is connected to a first input of said d inputs of one or more multiplexers of said plurality of multiplexers of one or more switches of said at least one switch of size $d_i \times d_o$ of one or more stages of said y stages of one or more partial multi-stage networks of said plurality of partial multi-stage networks; and wherein each internal connection of said one or more internal connections connected from the output of a first multiplexer of said plurality of multiplexers of a first switch of said at least one switch of size $d_i \times d_o$ of a first stage of said y stages of a first ring of said one or more rings to a first input of said d inputs of a second multiplexer of said plurality of multiplexers of a second switch of said at least one switch of size $d_i \times d_o$ of a second stage of said y stages of the first ring of said one or more rings; and wherein each internal hop wire of said one or more internal hop wires is connected from the output of a multiplexer of said plurality of multiplexers of a switch of said at least one switch of size $d_i \times d_o$ of a stage of said y stages of a first ring of said one or more rings of a first slice of said one or more slices to a first input of said d inputs of one or more multiplexers of said plurality of multiplexers of one or more switches of said at least one switch of size $d_i \times d_o$ of one or more stages of said y stages of one or more rings different from the first ring of said one or more rings of the first slice of said one or more slices; and wherein each external hop wire of said one or more external hop wires is connected from the output a multiplexer of said plurality of multiplexers of a switch of said at least one switch of size $d_i \times d_o$ of a stage of said y stages of a ring of said one or more rings of a slice of said one or more slices of a first partial multi-stage network of said plurality of partial multi-stage networks to an input of said d inputs of one or more multiplexers of said plurality of multiplexers of one or more switches of said at least one switch of size $d_i \times d_o$ of one or more stages of said y stages of said one or more rings of a slice of said one or more slices of one or more partial multi-stage networks different from the first partial multi-stage network of said plurality of partial multi-stage networks; and wherein said at least one switch of size $d_i \times d_o$ of said y stages of said one or more rings of said one or more slices of said plurality of partial multi-stage hierarchical networks are either 1) fully connected or 2) not fully connected or alternatively optimized.

9. The programmable integrated circuit of claim 8 wherein said one or more external hop wires are connected vertically (hereinafter "vertical wires" or "vertical external hop wires"), or horizontally (hereinafter "horizontal wires" or "horizontal external hop wires").

10. The programmable integrated circuit of claim 8, wherein said one or more external hop wires are interconnected through only one multiplexer of said plurality of multiplexers at each switch of said at least one switch of size $d_i \times d_o$.

11. The programmable integrated circuit of claim 8, wherein each multiplexer of said plurality of multiplexers of size d≥2 is configurable by Static Random Address Memory cells or Flash memory Cells.

12. The programmable integrated circuit of claim 8, wherein
each multiplexer of said plurality of multiplexers of size d≥2 is of size d=4 or d>4.

13. The programmable integrated circuit of claim 8, wherein one or more of external hop wires of said plurality of external hop wires are implemented in two or more metal layers, or
said one or more external hop wires use a plurality of buffers to amplify signals driven through them; and
said plurality of buffers are either inverting or non-inverting buffers, or
one or more of said y stages in a first partial multi-stage network of said plurality of partial multi-stage networks comprise one of a) six 2:1 multiplexers, b) eight 2:1 multiplexers, and c) four 4:1 multiplexers.

14. The programmable integrated circuit of claim 8, wherein
said plurality of partial multi-stage networks are implemented in a 3D-FPGAs.

15. A programmable integrated circuit comprising:
a plurality of programmable logic blocks and a multi-stage hierarchical network, each programmable logic block of said plurality of programmable logic blocks comprising a plurality of inlet links and a plurality of outlet links, said multi-stage hierarchical network comprising a plurality of partial multi-stage networks wherein each programmable logic block of said plurality of programmable logic blocks is coupled with at least one partial multi-stage network of said plurality of partial multi-stage networks, said plurality of programmable logic blocks coupled with said plurality of partial multi-stage networks arranged in a two-dimensional grid having a plurality of rows and a plurality of columns; and each partial multi-stage network of said plurality of partial multi-stage networks comprising one or more slices, each slice of said one or more slices comprising one or more rings, each ring of said one or more rings comprising y stages, where y≥2; and each stage of said y stages comprising at least one switch of size $d_i \times d_o$ where $d_i \geq 2$ and $d_o \geq 2$, each switch of said at least one switch of size $d_i \times d_o$ having $d_i$ incoming links and $d_o$ outgoing links, each switch of said at least one switch of size $d_i \times d_o$ comprising a plurality of multiplexers of size d≥2 with each multiplexer of said plurality of multiplexers comprising d inputs and one output; and wherein said $d_i$ incoming links and said $d_o$ outgoing links comprise a one or more internal connections and a one or more hop wires where said one or more hop wires comprise a one or more internal hop wires or a one or more external hop wires; and wherein each inlet link of said plurality of inlet links is connected to the output of a first multiplexer of said plurality of multiplexers of a first switch of said at least one switch of size $d_i \times d_o$ of a first stage of said y stages of a first partial multi-stage network of said plurality of partial multi-stage networks, and each outlet link of said plurality of outlet links is connected to a first input of said d inputs of one or more multiplexers of said plurality of multiplexers of one or more switches of said at least one switch of size $d_i \times d_o$ of one or more stages of said y stages of one or more partial multi-stage networks of said plurality of partial multi-stage networks; and wherein each internal connection of said one or more internal connections connected from the output of a first multiplexer of said plurality of multiplexers of a first switch of said at least one switch of size $d_i \times d_o$ of a first stage of said y stages of a first ring of said one or more rings to a first input of said d inputs of a second multiplexer of said plurality of multiplexers of a second switch of said at least one switch of size $d_i \times d_o$ of a second stage of said y stages of the first ring of said one or more rings; and wherein each internal hop wire of said one or more internal hop wires is connected from the output of a multiplexer of said plurality of multiplexers of a switch of said at least one switch of size $d_i \times d_o$ of a stage of said y stages of a first ring of said one or more rings of a first slice of said one or more slices to a first input of said d inputs of one or more multiplexers of said plurality of multiplexers of one or more switches of said at least one switch of size $d_i \times d_o$ of one or more stages of said y stages of one or more rings different from the first ring of said one or more rings of the first slice of said one or more slices; and wherein each external hop wire of said one or more external hop wires is connected from the output a multiplexer of said plurality of multiplexers of a switch of said at least one switch of size $d_i \times d_o$ of a stage of said y stages of a ring of said one or more rings of a slice of said one or more slices of a first partial multi-stage network of said plurality of partial multi-stage networks to an input of said d inputs of one or more multiplexers of said plurality of multiplexers of one or more switches of said at least one switch of size $d_i \times d_o$ of one or more stages of said y stages of said one or more rings of a slice of said one or more slices of one or more partial multi-stage networks different from the first partial multi-stage network of said plurality of partial multi-stage networks; and wherein said at least one switch of size $d_i \times d_o$ of said y stages of said one or more rings of said one or more slices of said plurality of partial multi-stage hierarchical networks are either 1) fully connected or 2) not fully connected or alternatively optimized.

16. The programmable integrated circuit of claim 15, wherein said one or more external hop wires are connected vertically (hereinafter "vertical wires" or "vertical external hop wires"), or horizontally (hereinafter "horizontal wires" or "horizontal external hop wires").

17. The programmable integrated circuit of claim 15, wherein said one or more external hop wires are interconnected through only one multiplexer of said plurality of multiplexers at each switch of said at least one switch of size $d_i \times d_o$.

18. The programmable integrated circuit of claim 15, wherein each multiplexer of said plurality of multiplexers of size d≥2 is configurable by Static Random Address Memory cells or Flash memory Cells.

19. The programmable integrated circuit of claim 15, wherein
each multiplexer of said plurality of multiplexers of size d≥2 is of size d=4 or d>4.

20. The programmable integrated circuit of claim 15, wherein one or more external hop wires of said one or more external hop wires are implemented in two or more metal layers, or
said one or more external hop wires use a plurality of buffers to amplify signals driven through them; and said plurality of buffers are either inverting or non-inverting buffers, or
one or more of said y stages in a first partial multi-stage network of said plurality of partial multi-stage networks comprise one of a) six 2:1 multiplexers, b) eight 2:1 multiplexers, and c) four 4:1 multiplexers, or
said plurality of partial multi-stage networks are implemented in a 3D-FPGAs.

* * * * *